(12) United States Patent
Khlat

(10) Patent No.: US 9,954,436 B2
(45) Date of Patent: Apr. 24, 2018

(54) SINGLE μC-BUCKBOOST CONVERTER WITH MULTIPLE REGULATED SUPPLY OUTPUTS

(75) Inventor: Nadim Khlat, Cugnaux (FR)

(73) Assignee: Qorvo US, Inc., Greensboro, NC (US)

( * ) Notice: Subject to any disclaimer, the term of this patent is extended or adjusted under 35 U.S.C. 154(b) by 662 days.

(21) Appl. No.: 13/876,518

(22) PCT Filed: Sep. 29, 2011

(86) PCT No.: PCT/US2011/054106
§ 371 (c)(1),
(2), (4) Date: Mar. 28, 2013

(87) PCT Pub. No.: WO2012/047738
PCT Pub. Date: Apr. 12, 2012

(65) Prior Publication Data
US 2013/0181521 A1 Jul. 18, 2013

Related U.S. Application Data

(60) Provisional application No. 61/387,600, filed on Sep. 29, 2010.

(51) Int. Cl.
*H02J 1/10* (2006.01)
*H02J 3/00* (2006.01)
(Continued)

(52) U.S. Cl.
CPC ........ *H02M 3/07* (2013.01); *H02M 2001/009* (2013.01); *Y10T 307/406* (2015.04)

(58) Field of Classification Search
CPC ............. H02M 3/07; H02M 2001/009; H02M 3/1563; Y10T 307/406; Y10T 307/707; G11C 5/145
See application file for complete search history.

(56) References Cited

U.S. PATENT DOCUMENTS 3,969,682 A 7/1976 Rossum
3,980,964 A 9/1976 Grodinsky
(Continued)

FOREIGN PATENT DOCUMENTS

CN 1076567 A 9/1993
CN 1211355 A 3/1999
(Continued)

OTHER PUBLICATIONS

Non-Final Office Action for U.S. Appl. No. 12/836,307, dated Sep. 25, 2014, 5 pages.
(Continued)

*Primary Examiner* — Rasem Mourad
(74) *Attorney, Agent, or Firm* — Withrow & Terranova, P.L.L.C.

(57) ABSTRACT

The detailed description described embodiments of highly efficient power management systems configurable to simultaneously generate various output voltage levels for different components, sub-assemblies, and devices of electronic devices, sub-systems, and systems. In particular, the described embodiments include power management systems that substantially reduce or eliminate the need for inductors, large numbers of capacitors, and complex switching techniques to transform an available voltage level from a system power source, such as a battery, to more desirable power supply voltages. Some described embodiments include a charge pump that uses only two flying capacitors to simultaneously generate multiple supply outputs, where each of the multiple supply outputs may provide either the same or a different output voltage level. The described embodiments also include efficient power management systems that flexibly provide highly accurate voltage levels that are substantially insensitive to the voltage level provided by a system power source, such as a battery.

34 Claims, 39 Drawing Sheets

(51) Int. Cl.
    *H02M 3/07*     (2006.01)
    *H02M 1/00*     (2006.01)

(56) References Cited

U.S. PATENT DOCUMENTS

| | | |
|---|---|---|
| 4,131,860 A | 12/1978 | Fyot |
| 4,587,552 A | 5/1986 | Chin |
| 4,692,889 A | 9/1987 | McNeely |
| 4,831,258 A | 5/1989 | Paulk et al. |
| 4,996,500 A | 2/1991 | Larson et al. |
| 5,099,203 A | 3/1992 | Weaver et al. |
| 5,146,504 A | 9/1992 | Pinckley |
| 5,187,396 A | 2/1993 | Armstrong, II et al. |
| 5,311,309 A | 5/1994 | Ersoz et al. |
| 5,317,217 A | 5/1994 | Rieger et al. |
| 5,339,041 A | 8/1994 | Nitardy |
| 5,351,087 A | 9/1994 | Christopher et al. |
| 5,414,614 A | 5/1995 | Fette et al. |
| 5,420,643 A | 5/1995 | Romesburg et al. |
| 5,457,620 A | 10/1995 | Dromgoole |
| 5,486,871 A | 1/1996 | Filliman et al. |
| 5,532,916 A * | 7/1996 | Tamagawa ............... H02M 3/07 307/110 |
| 5,541,547 A | 7/1996 | Lam |
| 5,581,454 A | 12/1996 | Collins |
| 5,646,621 A | 7/1997 | Cabler et al. |
| 5,715,526 A | 2/1998 | Weaver, Jr. et al. |
| 5,767,744 A | 6/1998 | Irwin et al. |
| 5,822,318 A | 10/1998 | Tiedmann, Jr. et al. |
| 5,898,342 A | 4/1999 | Bell |
| 5,905,407 A | 5/1999 | Midya |
| 5,936,464 A | 8/1999 | Grondahl |
| 6,043,610 A | 3/2000 | Buell |
| 6,043,707 A | 3/2000 | Budnik |
| 6,055,168 A | 4/2000 | Kotowski et al. |
| 6,070,181 A | 5/2000 | Yeh |
| 6,118,343 A | 9/2000 | Winslow |
| 6,133,777 A | 10/2000 | Savelli |
| 6,141,541 A | 10/2000 | Midya et al. |
| 6,147,478 A | 11/2000 | Skelton et al. |
| 6,166,598 A | 12/2000 | Schlueter |
| 6,198,645 B1 | 3/2001 | Kotowski et al. |
| 6,204,731 B1 | 3/2001 | Jiang et al. |
| 6,256,482 B1 | 7/2001 | Raab |
| 6,300,826 B1 | 10/2001 | Mathe et al. |
| 6,313,681 B1 | 11/2001 | Yoshikawa |
| 6,348,780 B1 | 2/2002 | Grant |
| 6,400,775 B1 | 6/2002 | Gourgue et al. |
| 6,426,680 B1 | 7/2002 | Duncan et al. |
| 6,483,281 B2 | 11/2002 | Hwang |
| 6,559,689 B1 | 5/2003 | Clark |
| 6,566,935 B1 | 5/2003 | Renous |
| 6,583,610 B2 | 6/2003 | Groom et al. |
| 6,617,930 B2 | 9/2003 | Nitta |
| 6,621,808 B1 | 9/2003 | Sadri |
| 6,624,712 B1 | 9/2003 | Cygan et al. |
| 6,646,501 B1 | 11/2003 | Wessel |
| 6,658,445 B1 | 12/2003 | Gau et al. |
| 6,681,101 B1 | 1/2004 | Eidson et al. |
| 6,686,727 B2 | 2/2004 | Ledenev et al. |
| 6,690,652 B1 | 2/2004 | Sadri |
| 6,701,141 B2 | 3/2004 | Lam |
| 6,703,080 B2 | 3/2004 | Reyzelman et al. |
| 6,725,021 B1 | 4/2004 | Anderson et al. |
| 6,728,163 B2 | 4/2004 | Gomm et al. |
| 6,744,151 B2 | 6/2004 | Jackson et al. |
| 6,819,938 B2 | 11/2004 | Sahota |
| 6,885,176 B2 | 4/2005 | Librizzi |
| 6,958,596 B1 | 10/2005 | Sferrazza et al. |
| 6,995,995 B2 | 2/2006 | Zeng et al. |
| 7,026,868 B2 | 4/2006 | Robinson et al. |
| 7,038,536 B2 | 5/2006 | Cioffi et al. |
| 7,043,213 B2 | 5/2006 | Robinson et al. |
| 7,053,718 B2 | 5/2006 | Dupuis et al. |
| 7,058,373 B2 | 6/2006 | Grigore |
| 7,064,606 B2 | 6/2006 | Louis |
| 7,099,635 B2 | 8/2006 | McCune |
| 7,170,341 B2 | 1/2007 | Conrad et al. |
| 7,200,365 B2 | 4/2007 | Watanabe et al. |
| 7,233,130 B1 | 6/2007 | Kay |
| 7,253,589 B1 | 8/2007 | Potanin et al. |
| 7,254,157 B1 | 8/2007 | Crotty et al. |
| 7,262,658 B2 | 8/2007 | Ramaswamy et al. |
| 7,279,875 B2 | 10/2007 | Gan et al. |
| 7,304,537 B2 | 12/2007 | Kwon et al. |
| 7,348,847 B2 | 3/2008 | Whittaker |
| 7,391,190 B1 | 6/2008 | Rajagopalan |
| 7,394,233 B1 | 7/2008 | Trayling et al. |
| 7,405,618 B2 | 7/2008 | Lee et al. |
| 7,411,316 B2 | 8/2008 | Pai |
| 7,414,330 B2 | 8/2008 | Chen |
| 7,453,711 B2 * | 11/2008 | Yanagida ............... H02M 3/07 363/59 |
| 7,454,238 B2 | 11/2008 | Vinayak et al. |
| 7,515,885 B2 | 4/2009 | Sander et al. |
| 7,528,807 B2 | 5/2009 | Kim et al. |
| 7,529,523 B1 | 5/2009 | Young et al. |
| 7,539,466 B2 | 5/2009 | Tan et al. |
| 7,595,569 B2 | 9/2009 | Amerom et al. |
| 7,609,114 B2 | 10/2009 | Hsieh et al. |
| 7,615,979 B2 | 11/2009 | Caldwell |
| 7,627,622 B2 | 12/2009 | Conrad et al. |
| 7,646,108 B2 | 1/2010 | Paillet et al. |
| 7,653,366 B2 | 1/2010 | Grigore |
| 7,679,433 B1 | 3/2010 | Li |
| 7,684,216 B2 | 3/2010 | Choi et al. |
| 7,696,735 B2 | 4/2010 | Oraw et al. |
| 7,715,811 B2 | 5/2010 | Kenington |
| 7,724,837 B2 | 5/2010 | Filimonov et al. |
| 7,755,431 B2 | 7/2010 | Sun |
| 7,764,060 B2 | 7/2010 | Wilson |
| 7,773,691 B2 | 8/2010 | Khlat et al. |
| 7,773,965 B1 | 8/2010 | Van Brunt et al. |
| 7,777,459 B2 | 8/2010 | Williams |
| 7,782,036 B1 | 8/2010 | Wong et al. |
| 7,783,269 B2 | 8/2010 | Vinayak et al. |
| 7,800,427 B2 | 9/2010 | Chae et al. |
| 7,805,115 B1 | 9/2010 | McMorrow et al. |
| 7,852,150 B1 | 12/2010 | Arknaes-Pedersen |
| 7,856,048 B1 | 12/2010 | Smaini et al. |
| 7,859,336 B2 | 12/2010 | Markowski et al. |
| 7,863,828 B2 | 1/2011 | Melanson |
| 7,880,547 B2 | 2/2011 | Lee et al. |
| 7,884,681 B1 | 2/2011 | Khlat et al. |
| 7,894,216 B2 | 2/2011 | Melanson |
| 7,898,268 B2 | 3/2011 | Bernardon et al. |
| 7,898,327 B2 | 3/2011 | Nentwig |
| 7,907,010 B2 | 3/2011 | Wendt et al. |
| 7,915,961 B1 | 3/2011 | Li |
| 7,917,105 B2 | 3/2011 | Drogi et al. |
| 7,920,023 B2 | 4/2011 | Witchard |
| 7,923,974 B2 | 4/2011 | Martin et al. |
| 7,965,140 B2 | 6/2011 | Takahashi |
| 7,994,864 B2 | 8/2011 | Chen et al. |
| 8,000,117 B2 | 8/2011 | Petricek |
| 8,008,970 B1 | 8/2011 | Homol et al. |
| 8,022,761 B2 | 9/2011 | Drogi et al. |
| 8,026,765 B2 | 9/2011 | Giovannotto |
| 8,044,639 B2 | 10/2011 | Tamegai et al. |
| 8,054,126 B2 | 11/2011 | Yang et al. |
| 8,068,622 B2 | 11/2011 | Melanson et al. |
| 8,081,199 B2 | 12/2011 | Takata et al. |
| 8,093,951 B1 | 1/2012 | Zhang et al. |
| 8,093,953 B2 | 1/2012 | Pierdomenico et al. |
| 8,159,297 B2 | 4/2012 | Kumagai |
| 8,164,388 B2 | 4/2012 | Iwamatsu |
| 8,174,313 B2 | 5/2012 | Vice |
| 8,183,917 B2 | 5/2012 | Drogi et al. |
| 8,183,929 B2 | 5/2012 | Grondahl |
| 8,198,941 B2 | 6/2012 | Lesso |
| 8,204,456 B2 | 6/2012 | Xu et al. |
| 8,242,813 B1 | 8/2012 | Wile et al. |
| 8,253,485 B2 | 8/2012 | Clifton |
| 8,253,487 B2 | 8/2012 | Hou et al. |

(56) References Cited

U.S. PATENT DOCUMENTS

| | | |
|---|---|---|
| 8,274,332 B2 | 9/2012 | Cho et al. |
| 8,289,084 B2 | 10/2012 | Morimoto et al. |
| 8,358,113 B2 | 1/2013 | Cheng et al. |
| 8,362,837 B2 | 1/2013 | Koren et al. |
| 8,364,101 B2 | 1/2013 | Shizawa et al. |
| 8,446,135 B2 | 5/2013 | Chen et al. |
| 8,493,141 B2 | 7/2013 | Khlat et al. |
| 8,519,788 B2 | 8/2013 | Khlat |
| 8,541,993 B2 | 9/2013 | Notman et al. |
| 8,542,061 B2 | 9/2013 | Levesque et al. |
| 8,548,398 B2 | 10/2013 | Baxter et al. |
| 8,558,616 B2 | 10/2013 | Shizawa et al. |
| 8,571,498 B2 | 10/2013 | Khlat |
| 8,588,713 B2 | 11/2013 | Khlat |
| 8,611,402 B2 | 12/2013 | Chiron |
| 8,618,868 B2 | 12/2013 | Khlat et al. |
| 8,624,576 B2 | 1/2014 | Khlat et al. |
| 8,624,760 B2 | 1/2014 | Ngo et al. |
| 8,626,091 B2 | 1/2014 | Khlat et al. |
| 8,633,766 B2 | 1/2014 | Khlat et al. |
| 8,638,165 B2 | 1/2014 | Shah et al. |
| 8,643,435 B2 | 2/2014 | Lim et al. |
| 8,648,657 B1 | 2/2014 | Rozenblit |
| 8,659,355 B2 | 2/2014 | Henshaw et al. |
| 8,692,527 B2 | 4/2014 | Ritamaki et al. |
| 8,693,676 B2 | 4/2014 | Xiao et al. |
| 8,698,558 B2 | 4/2014 | Mathe et al. |
| 8,717,100 B2 | 5/2014 | Reisner et al. |
| 8,718,579 B2 | 5/2014 | Drogi |
| 8,718,582 B2 | 5/2014 | See et al. |
| 8,725,218 B2 | 5/2014 | Brown et al. |
| 8,744,382 B2 | 6/2014 | Hou et al. |
| 8,749,307 B2 | 6/2014 | Zhu et al. |
| 8,754,707 B2 | 6/2014 | Mathe et al. |
| 8,760,228 B2 | 6/2014 | Khlat |
| 8,782,107 B2 | 7/2014 | Myara et al. |
| 8,792,840 B2 | 7/2014 | Khlat et al. |
| 8,803,605 B2 | 8/2014 | Fowers et al. |
| 8,824,978 B2 | 9/2014 | Briffa et al. |
| 8,829,993 B2 | 9/2014 | Briffa et al. |
| 8,878,606 B2 | 11/2014 | Khlat et al. |
| 8,884,696 B2 | 11/2014 | Langer |
| 8,909,175 B1 | 12/2014 | McCallister |
| 8,942,313 B2 | 1/2015 | Khlat et al. |
| 8,942,651 B2 | 1/2015 | Jones |
| 8,942,652 B2 | 1/2015 | Khlat et al. |
| 8,947,161 B2 | 2/2015 | Khlat et al. |
| 8,947,162 B2 | 2/2015 | Wimpenny et al. |
| 8,952,710 B2 | 2/2015 | Retz et al. |
| 8,957,728 B2 | 2/2015 | Gorisse |
| 8,975,959 B2 | 3/2015 | Khlat |
| 8,981,839 B2 | 3/2015 | Kay et al. |
| 8,981,847 B2 | 3/2015 | Balteanu |
| 8,981,848 B2 | 3/2015 | Kay et al. |
| 8,994,345 B2 | 3/2015 | Wilson |
| 9,019,011 B2 | 4/2015 | Hietala et al. |
| 9,020,451 B2 | 4/2015 | Khlat |
| 9,024,688 B2 | 5/2015 | Kay et al. |
| 9,041,364 B2 | 5/2015 | Khlat |
| 9,041,365 B2 | 5/2015 | Kay et al. |
| 9,075,673 B2 | 7/2015 | Khlat et al. |
| 9,077,405 B2 | 7/2015 | Jones et al. |
| 9,088,247 B2 | 7/2015 | Amo et al. |
| 9,099,961 B2 | 8/2015 | Kay et al. |
| 9,112,452 B1 | 8/2015 | Khlat |
| 9,445,371 B2 | 9/2016 | Khesbak et al. |
| 9,491,314 B2 | 11/2016 | Wimpenny |
| 9,515,622 B2 | 12/2016 | Nentwig et al. |
| 9,628,025 B2 | 4/2017 | Wimpenny |
| 2002/0071497 A1 | 6/2002 | Bengtsson et al. |
| 2002/0125869 A1 | 9/2002 | Groom et al. |
| 2002/0176188 A1 | 11/2002 | Ruegg et al. |
| 2003/0031271 A1 | 2/2003 | Bozeki et al. |
| 2003/0062950 A1 | 4/2003 | Hamada et al. |
| 2003/0137286 A1 | 7/2003 | Kimball et al. |
| 2003/0146791 A1 | 8/2003 | Shvarts et al. |
| 2003/0153289 A1 | 8/2003 | Hughes et al. |
| 2003/0198063 A1 | 10/2003 | Smyth |
| 2003/0206603 A1 | 11/2003 | Husted |
| 2003/0220953 A1 | 11/2003 | Allred |
| 2003/0232622 A1 | 12/2003 | Seo et al. |
| 2004/0047329 A1 | 3/2004 | Zheng |
| 2004/0051384 A1 | 3/2004 | Jackson et al. |
| 2004/0124913 A1 | 7/2004 | Midya et al. |
| 2004/0127173 A1 | 7/2004 | Leizerovich |
| 2004/0132424 A1 | 7/2004 | Aytur et al. |
| 2004/0184569 A1 | 9/2004 | Challa et al. |
| 2004/0196095 A1 | 10/2004 | Nonaka |
| 2004/0219891 A1 | 11/2004 | Hadjichristos |
| 2004/0239301 A1 | 12/2004 | Kobayashi |
| 2004/0266366 A1 | 12/2004 | Robinson et al. |
| 2004/0267842 A1 | 12/2004 | Allred |
| 2005/0008093 A1 | 1/2005 | Matsuura et al. |
| 2005/0032499 A1 | 2/2005 | Cho |
| 2005/0047180 A1* | 3/2005 | Kim ............ H02M 3/07 363/59 |
| 2005/0064830 A1 | 3/2005 | Grigore |
| 2005/0079835 A1 | 4/2005 | Takabayashi et al. |
| 2005/0093630 A1 | 5/2005 | Whittaker et al. |
| 2005/0110562 A1 | 5/2005 | Robinson et al. |
| 2005/0122171 A1 | 6/2005 | Miki et al. |
| 2005/0156582 A1 | 7/2005 | Redl et al. |
| 2005/0156662 A1 | 7/2005 | Raghupathy et al. |
| 2005/0157778 A1 | 7/2005 | Trachewsky et al. |
| 2005/0184713 A1 | 8/2005 | Xu et al. |
| 2005/0200407 A1 | 9/2005 | Arai et al. |
| 2005/0208907 A1 | 9/2005 | Yamazaki et al. |
| 2005/0258891 A1* | 11/2005 | Ito ............ H02M 3/07 327/538 |
| 2005/0286616 A1 | 12/2005 | Kodavati |
| 2006/0006946 A1 | 1/2006 | Burns et al. |
| 2006/0062324 A1 | 3/2006 | Naito et al. |
| 2006/0087372 A1 | 4/2006 | Henze |
| 2006/0097711 A1 | 5/2006 | Brandt |
| 2006/0114069 A1 | 6/2006 | Kojima et al. |
| 2006/0128324 A1 | 6/2006 | Tan et al. |
| 2006/0147062 A1 | 7/2006 | Niwa et al. |
| 2006/0154637 A1 | 7/2006 | Eyries et al. |
| 2006/0178119 A1 | 8/2006 | Jarvinen |
| 2006/0181340 A1 | 8/2006 | Dhuyvetter |
| 2006/0220627 A1 | 10/2006 | Koh |
| 2006/0244513 A1* | 11/2006 | Yen ............ H02M 3/07 327/536 |
| 2006/0270366 A1 | 11/2006 | Rozenblit et al. |
| 2007/0008757 A1 | 1/2007 | Usui et al. |
| 2007/0008804 A1 | 1/2007 | Lu et al. |
| 2007/0014382 A1 | 1/2007 | Shakeshaft et al. |
| 2007/0024360 A1 | 2/2007 | Markowski |
| 2007/0024365 A1 | 2/2007 | Ramaswamy et al. |
| 2007/0054635 A1 | 3/2007 | Black et al. |
| 2007/0063681 A1 | 3/2007 | Liu |
| 2007/0082622 A1 | 4/2007 | Leinonen et al. |
| 2007/0146076 A1 | 6/2007 | Baba |
| 2007/0159256 A1 | 7/2007 | Ishikawa et al. |
| 2007/0182392 A1 | 8/2007 | Nishida |
| 2007/0183532 A1 | 8/2007 | Matero |
| 2007/0184794 A1 | 8/2007 | Drogi et al. |
| 2007/0249304 A1 | 10/2007 | Snelgrove et al. |
| 2007/0259628 A1 | 11/2007 | Carmel et al. |
| 2007/0290749 A1 | 12/2007 | Woo et al. |
| 2008/0003950 A1 | 1/2008 | Haapoja et al. |
| 2008/0044041 A1 | 2/2008 | Tucker et al. |
| 2008/0081572 A1 | 4/2008 | Rofougaran |
| 2008/0104432 A1 | 5/2008 | Vinayak et al. |
| 2008/0150619 A1 | 6/2008 | Lesso et al. |
| 2008/0150620 A1* | 6/2008 | Lesso ............ H02M 3/07 327/536 |
| 2008/0157745 A1 | 7/2008 | Nakata |
| 2008/0205095 A1 | 8/2008 | Pinon et al. |
| 2008/0224769 A1 | 9/2008 | Markowski et al. |
| 2008/0242246 A1 | 10/2008 | Minnis et al. |
| 2008/0252278 A1 | 10/2008 | Lindeberg et al. |
| 2008/0258831 A1 | 10/2008 | Kunihiro et al. |
| 2008/0259656 A1 | 10/2008 | Grant |

(56) References Cited

U.S. PATENT DOCUMENTS

| | | |
|---|---|---|
| 2008/0280577 A1 | 11/2008 | Beukema et al. |
| 2009/0004981 A1 | 1/2009 | Eliezer et al. |
| 2009/0015229 A1 | 1/2009 | Kotikalapoodi |
| 2009/0015299 A1* | 1/2009 | Ryu .................... H03F 1/0211 327/108 |
| 2009/0039947 A1* | 2/2009 | Williams ................ H02M 3/07 327/536 |
| 2009/0045872 A1 | 2/2009 | Kenington |
| 2009/0082006 A1 | 3/2009 | Pozsgay et al. |
| 2009/0097591 A1 | 4/2009 | Kim |
| 2009/0140706 A1 | 6/2009 | Taufik et al. |
| 2009/0160548 A1 | 6/2009 | Ishikawa et al. |
| 2009/0167260 A1 | 7/2009 | Pauritsch et al. |
| 2009/0174466 A1* | 7/2009 | Hsieh .................... H02M 3/07 327/536 |
| 2009/0184764 A1 | 7/2009 | Markowski et al. |
| 2009/0190699 A1 | 7/2009 | Kazakevich et al. |
| 2009/0191826 A1 | 7/2009 | Takinami et al. |
| 2009/0218995 A1 | 9/2009 | Ahn |
| 2009/0230934 A1 | 9/2009 | Hooijschuur et al. |
| 2009/0261908 A1 | 10/2009 | Markowski |
| 2009/0284235 A1 | 11/2009 | Weng et al. |
| 2009/0289720 A1 | 11/2009 | Takinami et al. |
| 2009/0319065 A1 | 12/2009 | Risbo |
| 2009/0326624 A1* | 12/2009 | Melse .................... A61N 1/378 607/116 |
| 2010/0001793 A1 | 1/2010 | Van Zeijl et al. |
| 2010/0002473 A1 | 1/2010 | Williams |
| 2010/0019749 A1 | 1/2010 | Katsuya et al. |
| 2010/0019840 A1 | 1/2010 | Takahashi |
| 2010/0026250 A1 | 2/2010 | Petty |
| 2010/0027301 A1 | 2/2010 | Hoyerby |
| 2010/0045247 A1 | 2/2010 | Blanken et al. |
| 2010/0171553 A1 | 7/2010 | Okubo et al. |
| 2010/0181973 A1* | 7/2010 | Pauritsch ................ H02M 3/07 323/280 |
| 2010/0237948 A1 | 9/2010 | Nguyen et al. |
| 2010/0253309 A1 | 10/2010 | Xi et al. |
| 2010/0266066 A1 | 10/2010 | Takahashi |
| 2010/0289568 A1 | 11/2010 | Eschauzier et al. |
| 2010/0301947 A1 | 12/2010 | Fujioka et al. |
| 2010/0308654 A1 | 12/2010 | Chen |
| 2010/0311365 A1 | 12/2010 | Vinayak et al. |
| 2010/0321127 A1 | 12/2010 | Watanabe et al. |
| 2010/0327825 A1 | 12/2010 | Mehas et al. |
| 2010/0327971 A1 | 12/2010 | Kumagai |
| 2011/0018626 A1 | 1/2011 | Kojima |
| 2011/0058601 A1 | 3/2011 | Kim et al. |
| 2011/0084756 A1* | 4/2011 | Saman .................... H02M 3/07 327/536 |
| 2011/0084760 A1 | 4/2011 | Guo et al. |
| 2011/0109387 A1 | 5/2011 | Lee |
| 2011/0148375 A1 | 6/2011 | Tsuji |
| 2011/0148385 A1* | 6/2011 | North ...................... G05F 3/16 323/304 |
| 2011/0193629 A1 | 8/2011 | Hou et al. |
| 2011/0204959 A1* | 8/2011 | Sousa .................... H02M 3/07 327/536 |
| 2011/0234182 A1 | 9/2011 | Wilson |
| 2011/0235827 A1 | 9/2011 | Lesso et al. |
| 2011/0260706 A1 | 10/2011 | Nishijima |
| 2011/0279180 A1 | 11/2011 | Yamanouchi et al. |
| 2011/0298433 A1 | 12/2011 | Tam |
| 2011/0298539 A1 | 12/2011 | Drogi et al. |
| 2011/0304400 A1 | 12/2011 | Stanley |
| 2012/0025907 A1 | 2/2012 | Koo et al. |
| 2012/0025919 A1 | 2/2012 | Huynh |
| 2012/0032658 A1 | 2/2012 | Casey et al. |
| 2012/0034893 A1 | 2/2012 | Baxter et al. |
| 2012/0049818 A1 | 3/2012 | Hester |
| 2012/0049894 A1 | 3/2012 | Berchtold et al. |
| 2012/0049953 A1 | 3/2012 | Khlat |
| 2012/0068767 A1 | 3/2012 | Henshaw et al. |
| 2012/0074916 A1 | 3/2012 | Trochut |
| 2012/0098595 A1 | 4/2012 | Stockert |
| 2012/0119813 A1 | 5/2012 | Khlat et al. |
| 2012/0133299 A1 | 5/2012 | Capodivacca et al. |
| 2012/0139516 A1 | 6/2012 | Tsai et al. |
| 2012/0139641 A1 | 6/2012 | Kaczman et al. |
| 2012/0146731 A1 | 6/2012 | Khesbak |
| 2012/0154035 A1 | 6/2012 | Hongo et al. |
| 2012/0154054 A1 | 6/2012 | Kaczman et al. |
| 2012/0170334 A1 | 7/2012 | Menegoli et al. |
| 2012/0170690 A1 | 7/2012 | Ngo et al. |
| 2012/0176196 A1 | 7/2012 | Khlat |
| 2012/0194274 A1 | 8/2012 | Fowers et al. |
| 2012/0200354 A1 | 8/2012 | Ripley et al. |
| 2012/0212197 A1 | 8/2012 | Fayed et al. |
| 2012/0236444 A1 | 9/2012 | Srivastava et al. |
| 2012/0244916 A1 | 9/2012 | Brown et al. |
| 2012/0249103 A1 | 10/2012 | Latham, II et al. |
| 2012/0269240 A1 | 10/2012 | Balteanu et al. |
| 2012/0274235 A1 | 11/2012 | Lee et al. |
| 2012/0299647 A1 | 11/2012 | Honjo et al. |
| 2012/0313701 A1 | 12/2012 | Khlat et al. |
| 2013/0024142 A1 | 1/2013 | Folkmann et al. |
| 2013/0034139 A1 | 2/2013 | Khlat et al. |
| 2013/0038305 A1 | 2/2013 | Amo et al. |
| 2013/0094553 A1 | 4/2013 | Paek et al. |
| 2013/0106378 A1 | 5/2013 | Khlat |
| 2013/0107769 A1 | 5/2013 | Khlat et al. |
| 2013/0127548 A1 | 5/2013 | Popplewell et al. |
| 2013/0134956 A1 | 5/2013 | Khlat |
| 2013/0135043 A1 | 5/2013 | Hietala et al. |
| 2013/0141064 A1 | 6/2013 | Kay et al. |
| 2013/0141068 A1 | 6/2013 | Kay et al. |
| 2013/0141072 A1 | 6/2013 | Khlat et al. |
| 2013/0141169 A1 | 6/2013 | Khlat et al. |
| 2013/0147445 A1 | 6/2013 | Levesque et al. |
| 2013/0154729 A1 | 6/2013 | Folkmann et al. |
| 2013/0169245 A1 | 7/2013 | Kay et al. |
| 2013/0176076 A1 | 7/2013 | Riehl |
| 2013/0214858 A1 | 8/2013 | Tournatory et al. |
| 2013/0229235 A1 | 9/2013 | Ohnishi |
| 2013/0231069 A1 | 9/2013 | Drogi |
| 2013/0238913 A1 | 9/2013 | Huang et al. |
| 2013/0271221 A1 | 10/2013 | Levesque et al. |
| 2013/0307617 A1 | 11/2013 | Khlat et al. |
| 2013/0328613 A1 | 12/2013 | Kay et al. |
| 2014/0009200 A1 | 1/2014 | Kay et al. |
| 2014/0009227 A1 | 1/2014 | Kay et al. |
| 2014/0028370 A1 | 1/2014 | Wimpenny |
| 2014/0028392 A1 | 1/2014 | Wimpenny |
| 2014/0042999 A1 | 2/2014 | Barth et al. |
| 2014/0049321 A1 | 2/2014 | Gebeyehu et al. |
| 2014/0055197 A1 | 2/2014 | Khlat et al. |
| 2014/0057684 A1 | 2/2014 | Khlat |
| 2014/0062590 A1 | 3/2014 | Khlat et al. |
| 2014/0077787 A1 | 3/2014 | Gorisse et al. |
| 2014/0097895 A1 | 4/2014 | Khlat et al. |
| 2014/0099906 A1 | 4/2014 | Khlat |
| 2014/0099907 A1 | 4/2014 | Chiron |
| 2014/0103995 A1 | 4/2014 | Langer |
| 2014/0111178 A1 | 4/2014 | Khlat et al. |
| 2014/0125408 A1 | 5/2014 | Kay et al. |
| 2014/0139199 A1 | 5/2014 | Khlat et al. |
| 2014/0184334 A1 | 7/2014 | Nobbe et al. |
| 2014/0184335 A1 | 7/2014 | Nobbe et al. |
| 2014/0184337 A1 | 7/2014 | Nobbe et al. |
| 2014/0203868 A1 | 7/2014 | Khlat et al. |
| 2014/0203869 A1 | 7/2014 | Khlat et al. |
| 2014/0218109 A1 | 8/2014 | Wimpenny |
| 2014/0225674 A1 | 8/2014 | Folkmann et al. |
| 2014/0232458 A1 | 8/2014 | Amo et al. |
| 2014/0266427 A1 | 9/2014 | Chiron |
| 2014/0266428 A1 | 9/2014 | Chiron et al. |
| 2014/0266462 A1 | 9/2014 | Schirmann et al. |
| 2014/0285164 A1 | 9/2014 | Oishi et al. |
| 2014/0306769 A1 | 10/2014 | Khlat et al. |
| 2015/0048891 A1 | 2/2015 | Rozek et al. |
| 2015/0054588 A1 | 2/2015 | Wimpenny |
| 2015/0097624 A1 | 4/2015 | Olson et al. |
| 2015/0123733 A1 | 5/2015 | Wimpenny et al. |

(56) References Cited

U.S. PATENT DOCUMENTS

| | | |
|---|---|---|
| 2015/0180422 A1 | 6/2015 | Khlat et al. |
| 2015/0234402 A1 | 8/2015 | Kay et al. |
| 2015/0270806 A1 | 9/2015 | Wagh et al. |
| 2015/0333781 A1 | 11/2015 | Alon et al. |
| 2016/0380597 A1 | 12/2016 | Midya |

FOREIGN PATENT DOCUMENTS

| | | | |
|---|---|---|---|
| CN | 1518209 | A | 8/2004 |
| CN | 1592089 | A | 3/2005 |
| CN | 1898860 | A | 1/2007 |
| CN | 101106357 | A | 1/2008 |
| CN | 101201891 | A | 6/2008 |
| CN | 101379695 | A | 3/2009 |
| CN | 101405671 | A | 4/2009 |
| CN | 101416385 | A | 4/2009 |
| CN | 101427459 | A | 5/2009 |
| CN | 101548476 | A | 9/2009 |
| CN | 101626355 | A | 1/2010 |
| CN | 101635697 | A | 1/2010 |
| CN | 101669280 | A | 3/2010 |
| CN | 101867284 | A | 10/2010 |
| CN | 201674399 | U | 12/2010 |
| CN | 102403967 | A | 4/2012 |
| EP | 0755121 | A2 | 1/1997 |
| EP | 1047188 | A2 | 10/2000 |
| EP | 1317105 | A1 | 6/2003 |
| EP | 1383235 | A1 | 1/2004 |
| EP | 1492227 | A1 | 12/2004 |
| EP | 1557955 | A1 | 7/2005 |
| EP | 1569330 | A1 | 8/2005 |
| EP | 2214304 | A1 | 8/2010 |
| EP | 2244366 | A1 | 10/2010 |
| EP | 2372904 | A1 | 10/2011 |
| EP | 2579456 | A1 | 4/2013 |
| GB | 2398648 | A | 8/2004 |
| GB | 2462204 | A | 2/2010 |
| GB | 2465552 | A | 5/2010 |
| GB | 2484475 | A | 4/2012 |
| JP | 2010166157 | A | 7/2010 |
| TW | 461168 | B | 10/2001 |
| WO | 0048306 | A1 | 8/2000 |
| WO | 2004002006 | A1 | 12/2003 |
| WO | 2004082135 | A2 | 9/2004 |
| WO | 2005013084 | A2 | 2/2005 |
| WO | 2006021774 | A1 | 3/2006 |
| WO | 2006070319 | A1 | 7/2006 |
| WO | 2006073208 | A1 | 7/2006 |
| WO | 2007107919 | A1 | 9/2007 |
| WO | 2007149346 | A2 | 12/2007 |
| WO | 2012151594 | A2 | 11/2012 |
| WO | 2012172544 | A1 | 12/2012 |

OTHER PUBLICATIONS

Advisory Action for U.S. Appl. No. 13/297,470, dated Sep. 19, 2014, 3 pages.
Non-Final Office Action for U.S. Appl. No. 13/297,470, dated Oct. 20, 2014, 22 pages.
Notice of Allowance for U.S. Appl. No. 13/367,973, dated Sep. 15, 2014, 7 pages.
Extended European Search Report for European Patent Application No. 12794149.0, dated Oct. 29, 2014, 6 pages.
Notice of Allowance for U.S. Appl. No. 13/647,815, dated Sep. 19, 2014, 6 pages.
Non-Final Office Action for U.S. Appl. No. 13/661,227, dated Sep. 29, 2014, 24 pages.
Notice of Allowance for U.S. Appl. No. 13/684,826, dated Sep. 8, 2014, 6 pages.
Non-Final Office Action for U.S. Appl. No. 13/714,600, dated Oct. 15, 2014, 13 pages.
Notice of Allowance for U.S. Appl. No. 13/914,888, dated Oct. 17, 2014, 10 pages.
Non-Final Office Action for U.S. Appl. No. 13/747,725, dated Oct. 7, 2014, 6 pages.
International Search Report and Written Opinion for PCT/US2014/012927, dated Sep. 30, 2014, 11 pages.
International Search Report and Written Opinion for PCT/US2014/028178, dated Sep. 30, 2014, 17 pages.
Lie, Donald Y.C. et al., "Design of Highly-Efficient Wideband RF Polar Transmitters Using Envelope-Tracking (ET) for Mobile WiMAX/Wibro Applications," IEEE 8th International Conference on ASIC (ASCION), Oct. 20-23, 2009, pp. 347-350.
Lie, Donald Y.C. et al., "Highly Efficient and Linear Class E SiGe Power Amplifier Design," 8th International Conference on Solid-State and Integrated Circuit Technology (ICSICT), Oct. 23-26, 2006, pp. 1526-1529.
Non-Final Office Action for U.S. Appl. No. 13/367,973, dated Sep. 24, 2013, 8 pages.
Notice of Allowance for U.S. Appl. No. 13/423,649, dated Aug. 30, 2013, 8 pages.
Notice of Allowance for U.S. Appl. No. 13/316,229, dated Aug. 29, 2013, 8 pages.
Quayle Action for U.S. Appl. No. 13/531,719, dated Oct. 10, 2013, 5 pages.
Notice of Allowance for U.S. Appl. No. 13/602,856, dated Sep. 24, 2013, 9 pages.
Wu, Patrick Y. et al., "A Two-Phase Switching Hybrid Supply Modulator for RF Power Amplifiers with 9% Efficiency Improvement," IEEE Journal of Solid-State Circuits, vol. 45, No. 12, Dec. 2010, pp. 2543-2556.
Yousefzadeh, Vahid et al., "Band Separation and Efficiency Optimization in Linear-Assisted Switching Power Amplifiers," 37th IEEE Power Electronics Specialists Conference, Jun. 18-22, 2006, pp. 1-7.
International Preliminary Report on Patentability for PCT/US2012/040317, dated Dec. 12, 2013, 5 pages.
Notice of Allowance for U.S. Appl. No. 13/531,719, dated Dec. 30, 2013, 7 pages.
Non-Final Office Action for U.S. Appl. No. 14/022,940, dated Dec. 20, 2013, 5 pages.
International Search Report and Written Opinion for PCT/US2013/052277, dated Jan. 7, 2014, 14 pages.
Notice of Allowance for U.S. Appl. No. 13/188,024, dated Jun. 18, 2013, 7 pages.
International Preliminary Report on Patentability for PCT/US2011/054106 dated Apr. 11, 2013, 8 pages.
International Preliminary Report on Patentability for PCT/US2011/061007 dated May 30, 2013, 11 pages.
International Preliminary Report on Patentability for PCT/US2011/061009 dated May 30, 2013, 10 pages.
Non-Final Office Action for U.S. Appl. No. 13/423,649, dated May 22, 2013, 7 pages.
Advisory Action for U.S. Appl. No. 13/222,484, dated Jun. 14, 2013, 3 pages.
International Preliminary Report on Patentability for PCT/US2011/064255, dated Jun. 20, 2013, 7 pages.
Notice of Allowance for U.S. Appl. No. 13/343,840, dated Jul. 1, 2013, 8 pages.
Notice of Allowance for U.S. Appl. No. 13/363,888, dated Jul. 18, 2013, 9 pages.
Notice of Allowance for U.S. Appl. No. 13/222,453, dated Aug. 22, 2013, 8 pages.
International Preliminary Report on Patentability for PCT/US2012/024124, dated Aug. 22, 2013, 8 pages.
Notice of Allowance for U.S. Appl. No. 13/550,060, dated Aug. 16, 2013, 8 pages.
Notice of Allowance for U.S. Appl. No. 13/222,484, dated Aug. 26, 2013, 8 pages.
International Preliminary Report on Patentability for PCT/US2012/023495, dated Aug. 15, 2013, 10 pages.
Notice of Allowance for U.S. Appl. No. 14/072,140, dated Aug. 20, 2015, 6 pages.
Non-Final Office Action for U.S. Appl. No. 14/072,225, dated Aug. 18, 2015, 4 pages.

(56) References Cited

OTHER PUBLICATIONS

Notice of Allowance for U.S. Appl. No. 13/747,725, dated Sep. 1, 2015, 9 pages.
Notice of Allowance for U.S. Appl. No. 14/027,416, dated Aug. 11, 2015, 9 pages.
International Preliminary Report on Patentability for PCT/US2014/012927, dated Aug. 6, 2015, 9 pages.
First Office Action and Search Report for Chinese Patent Application No. 201210596632.X, dated Jun. 25, 2015, 16 pages.
Notice of Allowance for U.S. Appl. No. 13/747,749, dated Oct. 2, 2015, 8 pages.
Notice of Allowance for U.S. Appl. No. 13/552,768, dated Sep. 22, 2015, 9 pages.
Final Office Action for U.S. Appl. No. 13/689,922, dated Oct. 6, 2015, 20 pages.
Notice of Allowance for U.S. Appl. No. 13/727,911, dated Sep. 14, 2015, 8 pages.
Notice of Allowance for U.S. Appl. No. 13/689,940, dated Sep. 16, 2015, 7 pages.
Non-Final Office Action for U.S. Appl. No. 14/101,770, dated Sep. 21, 2015, 5 pages.
Non-Final Office Action for U.S. Appl. No. 14/702,192, dated Oct. 7, 2015, 7 pages.
Second Office Action for Chinese Patent Application No. 201180030273.5, dated Aug. 14, 2015, 8 pages.
International Preliminary Report on Patentability for PCT/US2014/028089, dated Sep. 24, 2015, 8 pages.
International Preliminary Report on Patentability for PCT/US2014/028178, dated Sep. 24, 2015, 11 pages.
Notice of Allowance for U.S. Appl. No. 13/661,164, dated Oct. 21, 2015, 7 pages.
Non-Final Office Action for U.S. Appl. No. 14/254,215, dated Oct. 15, 2015, 5 pages.
First Office Action for Chinese Patent Application No. 201180067293.X, dated Aug. 6, 2015, 13 pages.
Hassan, Muhammad, et al., "A Combined Series-Parallel Hybrid Envelope Amplifier for Envelope Tracking Mobile Terminal RF Power Amplifier Applications," IEEE Journal of Solid-State Circuits, vol. 47, No. 5, May 2012, pp. 1185-1198.
Hoversten, John, et al., "Codesign of PA, Supply, and Signal Processing for Linear Supply-Modulated RF Transmitters," IEEE Transactions on Microwave Theory and Techniques, vol. 60, No. 6, Jun. 2012, pp. 2010-2020.
European Search Report for European Patent Application No. 14162682.0, dated Aug. 27, 2014, 7 pages.
Notice of Allowance for U.S. Appl. No. 14/072,140, dated Aug. 27, 2014, 8 pages.
Non-Final Office Action for U.S. Appl. No. 14/072,225, dated Aug. 15, 2014, 4 pages.
Non-Final Office Action for U.S. Appl. No. 13/486,012, dated Jul. 28, 2014, 7 pages.
Notice of Allowance for U.S. Appl. No. 13/548,283, dated Sep. 3, 2014, 7 pages.
Non-Final Office Action for U.S. Appl. No. 13/689,883, dated Aug. 27, 2014, 12 pages.
Notice of Allowance for U.S. Appl. No. 13/661,552, dated Jun. 13, 2014, 5 pages.
Notice of Allowance for U.S. Appl. No. 13/692,084, dated Jul. 23, 2014, 7 pages.
Notice of Allowance for U.S. Appl. No. 13/690,187, dated Sep. 3, 2014, 9 pages.
International Preliminary Report on Patentability and Written Opinion for PCT/US2012/067230, dated Jun. 12, 2014, 7 pages.
Notice of Allowance for U.S. Appl. No. 13/684,826, dated Jul. 18, 2014, 7 pages.
Non-Final Office Action for U.S. Appl. No. 13/782,142, dated Sep. 4, 2014, 6 pages.
International Search Report and Written Opinion for PCT/US2014/028089, dated Jul. 17, 2014, 10 pages.
Invitation to Pay Additional Fees and Partial International Search Report for PCT/US2014/028178, dated Jul. 24, 2014, 7 pages.
Notice of Allowance for U.S. Appl. No. 13/948,291, dated Feb. 11, 2015, 7 pages.
First Office Action for Chinese Patent Application No. 201180030273.5, dated Dec. 3, 2014, 15 pages (with English translation).
Notice of Allowance for U.S. Appl. No. 14/022,858, dated Feb. 17, 2015, 7 pages.
Notice of Allowance for U.S. Appl. No. 14/072,225, dated Jan. 22, 2015, 7 pages.
Final Office Action for U.S. Appl. No. 13/661,227, dated Feb. 6, 2015, 24 pages.
International Preliminary Report on Patentability for PCT/US2013/052277, dated Feb. 5, 2015, 9 pages.
Non-Final Office Action for U.S. Appl. No. 14/048,109, dated Feb. 18, 2015, 8 pages.
Notice of Allowance for U.S. Appl. No. 13/747,725, dated Feb. 2, 2015, 10 pages.
Notice of Allowance for U.S. Appl. No. 13/297,490, dated Feb. 27, 2014, 7 pages.
Non-Final Office Action for U.S. Appl. No. 13/297,470, dated Feb. 20, 2014, 16 pages.
Notice of Allowance for U.S. Appl. No. 13/550,049, dated Mar. 6, 2014, 5 pages.
International Preliminary Report on Patentability for PCT/US2012/046887, dated Jan. 30, 2014, 8 pages.
International Preliminary Report on Patentability for PCT/US2012/053654, dated Mar. 13, 2014, 7 pages.
Non-Final Office Action for U.S. Appl. No. 13/661,552, dated Feb. 21, 2014, 5 pages.
International Search Report and Written Opinion for PCT/US2013/065403, dated Feb. 5, 2014, 11 pages.
Notice of Allowance for U.S. Appl. No. 12/836,307, dated Mar. 2, 2015, 6 pages.
Notice of Allowance for U.S. Appl. No. 13/297,470, dated Feb. 25, 2015, 15 pages.
Corrected Notice of Allowance for U.S. Appl. No. 13/297,470, dated Apr. 6, 2015, 11 pages.
Extended European Search Report for European Patent Application No. 14190851.7, dated Mar. 5, 2015, 6 pages.
Non-Final Office Action for U.S. Appl. No. 14/122,852, dated Feb. 27, 2015, 5 pages.
Final Office Action for U.S. Appl. No. 13/714,600, dated Mar. 10, 2015, 14 pages.
Non-Final Office Action for U.S. Appl. No. 14/056,292, dated Mar. 6, 2015, 8 pages.
Final Office Action for U.S. Appl. No. 13/747,749, dated Mar. 20, 2015, 35 pages.
Non-Final Office Action for U.S. Appl. No. 14/072,120, dated Apr. 14, 2015, 8 pages.
Notice of Allowance for U.S. Appl. No. 12/836,307 dated May 5, 2014, 6 pages.
Notice of Allowance for U.S. Appl. No. 14/022,858 dated May 27, 2014, 6 pages.
Non-Final Office Action for U.S. Appl. No. 13/367,973 dated Apr. 25, 2014, 5 pages.
Non-Final Office Action for U.S. Appl. No. 13/647,815 dated May 2, 2014, 6 pages.
Non-Final Office Action for U.S. Appl. No. 13/689,883 dated Mar. 27, 2014, 13 pages.
Non-Final Office Action for U.S. Appl. No. 13/692,084 dated Apr. 10, 2014, 6 pages.
Non-Final Office Action for U.S. Appl. No. 13/684,826 dated Apr. 3, 2014, 5 pages.
Notice of Allowance for U.S. Appl. No. 14/022,940, dated Jun. 10, 2014, 7 pages.
Non-Final Office Action for U.S. Appl. No. 13/714,600 dated May 9, 2014, 14 pages.
Non-Final Office Action for U.S. Appl. No. 13/951,976 dated Apr. 4, 2014, 7 pages.
Examination Report for European Patent Application No. 11720630.0 dated Mar. 18, 2014, 4 pages.

(56) References Cited

OTHER PUBLICATIONS

International Preliminary Report on Patentability for PCT/US2012/062070 dated May 8, 2014, 8 pages.
International Search Report and Written Opinion for PCT/US2012/062110 dated Apr. 8, 2014, 12 pages.
International Preliminary Report on Patentability for PCT/US2012/062110 dated May 8, 2014, 9 pages.
European Examination Report for European Patent Application No. 14162682.0, dated May 22, 2015, 5 pages.
Corrected Notice of Allowance for U.S. Appl. No. 13/297,470, dated Jun. 5, 2015, 11 pages.
Advisory Action for U.S. Appl. No. 13/689,883, dated Apr. 20, 2015, 3 pages.
Advisory Action for U.S. Appl. No. 13/661,227, dated May 12, 2015, 3 pages.
Advisory Action for U.S. Appl. No. 13/714,600, dated May 26, 2015, 3 pages.
Notice of Allowance for U.S. Appl. No. 13/747,725, dated May 13, 2015, 9 pages.
Notice of Allowance for U.S. Appl. No. 13/747,749, dated Jun. 4, 2015, 8 pages.
Non-Final Office Action for U.S. Appl. No. 13/552,768, dated Apr. 20, 2015, 12 pages.
Non-Final Office Action for U.S. Appl. No. 13/689,922, dated Apr. 20, 2015, 19 pages.
Non-Final Office Action for U.S. Appl. No. 13/727,911, dated Apr. 20, 2015, 10 pages.
Non-Final Office Action for U.S. Appl. No. 14/163,229, dated Apr. 23, 2015, 9 pages.
Non-Final Office Action for U.S. Appl. No. 14/163,256, dated Apr. 23, 2015, 9 pages.
Notice of Allowance for U.S. Appl. No. 14/176,611, dated Apr. 27, 2015, 7 pages.
International Preliminary Report on Patentability for PCT/US2013/065403, dated Apr. 30, 2015, 8 pages.
Quayle Action for U.S. Appl. No. 13/689,940, dated May 14, 2015, 7 pages.
Notice of Allowance for U.S. Appl. No. 13/661,164, dated Jun. 3, 2015, 6 pages.
Non-Final Office Action for U.S. Appl. No. 14/082,629, dated Jun. 18, 2015, 15 pages.
First Office Action for Chinese Patent Application No. 201280052694.2, dated Mar. 24, 2015, 35 pages.
Notice of Allowance for U.S. Appl. No. 13/948,291, dated Jul. 17, 2015, 8 pages.
Non-Final Office Action for U.S. Appl. No. 13/689,883, dated Jul. 24, 2015, 13 pages.
Non-Final Office Action for U.S. Appl. No. 13/661,227, dated Jul. 27, 2015, 25 pages.
Non-Final Office Action for U.S. Appl. No. 13/714,600, dated Jul. 17, 2015, 14 pages.
Notice of Allowance for U.S. Appl. No. 14/212,154, dated Jul. 17, 2015, 8 pages.
Notice of Allowance for U.S. Appl. No. 14/212,199, dated Jul. 20, 2015, 8 pages.
First Office Action and Search Report for Chinese Patent Application No. 201280007941.7, dated May 13, 2015, 13 pages.
Notice of Allowance for U.S. Appl. No. 14/072,120, dated Jul. 30, 2015, 7 pages.
Notice of Allowance for U.S. Appl. No. 13/689,940, dated Aug. 3, 2015, 6 pages.
Yun, Hu et al., "Study of envelope tracking power amplifier design," Journal of Circuits and Systems, vol. 15, No. 6, Dec. 2010, pp. 6-10.
Choi, J. et al., "A New Power Management IC Architecture for Envelope Tracking Power Amplifier," IEEE Transactions on Microwave Theory and Techniques, vol. 59, No. 7, Jul. 2011, pp. 1796-1802.
Cidronali, A. et al., "A 240W Dual-Band 870 and 2140 MHz Envelope Tracking GaN PA Designed by a Probability Distribution Conscious Approach," IEEE MTT-S International Microwave Symposium Digest, Jun. 5-10, 2011, 4 pages.
Dixon, N., "Standardisation Boosts Momentum for Envelope Tracking," Microwave Engineering, Europe, Apr. 20, 2011, 2 pages, http://www.mwee.com/en/standardisation-boosts-momentum-for-envelope-tracking.html?cmp_ids=71&news_ids=222901746.
Hekkala, A. et al., "Adaptive Time Misalignment Compensation in Envelope Tracking Amplifiers," 2008 IEEE International Symposium on Spread Spectrum Techniques and Applications, Aug. 2008, pp. 761-765.
Kim et al., "High Efficiency and Wideband Envelope Tracking Power Amplifiers with Sweet Spot Tracking," 2010 IEEE Radio Frequency Integrated Circuits Symposium, May 23-25, 2010, pp. 255-258.
Kim, N. et al, "Ripple Feedback Filter Suitable for Analog/Digital Mixed-Mode Audio Amplifier for Improved Efficiency and Stability," 2002 IEEE Power Electronics Specialists Conference, vol. 1, Jun. 23, 2002, pp. 45-49.
Knutson, P, et al., "An Optimal Approach to Digital Raster Mapper Design," 1991 IEEE International Conference on Consumer Electronics held Jun. 5-7, 1991, vol. 37, Issue 4, published Nov. 1991, pp. 746-752.
Le, Hanh-Phuc et al., "A 32nm Fully Integrated Reconfigurable Switched-Capacitor DC-DC Convertor Delivering $0.55W/mm^2$ at 81% Efficiency," 2010 IEEE International Solid State Circuits Conference, Feb. 7-11, 2010, pp. 210-212.
Li, Y. et al., "A Highly Efficient SiGe Differential Power Amplifier Using an Envelope-Tracking Technique for 3GPP LTE Applications," 2010 IEEE Bipolar/BiCMOS Circuits and Technology Meeting (BCTM), Oct. 4-6, 2010, pp. 121-124.
Sahu, B. et al., "Adaptive Power Management of Linear RF Power Amplifiers in Mobile Handsets—An Integrated System Design Approach," submission for IEEE Asia Pacific Microwave Conference, Mar. 2004, 4 pages.
Unknown, "Nujira Files 100th Envelope Tracking Patent," CS: Compound Semiconductor, Apr. 11, 2011, 1 page, http://www.compoundsemiconductor.net/csc/news-details.php?cat=news&id=19733338&key=Nujira%20Files%20100th%20Envelope%20Tracking%20Patent&type=n.
Non-final Office Action for U.S. Appl. No. 11/113,873, now U.S. Pat. No. 7,773,691, dated Feb. 1, 2008, 17 pages.
Final Office Action for U.S. Appl. No. 11/113,873, now U.S. Pat. No. 7,773,691, dated Jul. 30, 2008, 19 pages.
Non-final Office Action for U.S. Appl. No. 11/113,873, now U.S. Pat. No. 7,773,691, dated Nov. 26, 2008, 22 pages.
Final Office Action for U.S. Appl. No. 11/113,873, now U.S. Pat. No. 7,773,691, dated May 4, 2009, 20 pages.
Non-final Office Action for U.S. Appl. No. 11/113,873, now U.S. Pat. No. 7,773,691, dated Feb. 3, 2010, 21 pages.
Notice of Allowance for U.S. Appl. No. 11/113,873, now U.S. Pat. No. 7,773,691, dated Jun. 9, 2010, 7 pages.
International Search Report for PCT/US06/12619 dated May 8, 2007, 2 pages.
Extended European Search Report for application 06740532.4 dated Dec. 7, 2010, 7 pages.
Non-final Office Action for U.S. Appl. No. 12/112,006 dated Apr. 5, 2010, 6 pages.
Notice of Allowance for U.S. Appl. No. 12/112,006 dated Jul. 19, 2010, 6 pages.
Non-final Office Action for U.S. Appl. No. 13/089,917 dated Nov. 23, 2012, 6 pages.
International Search Report for PCT/US11/033037, dated Aug. 9, 2011, 10 pages.
International Preliminary Report on Patentability for PCT/US2011/033037 dated Oct. 23, 2012, 7 pages.
Non-Final Office Action for U.S. Appl. No. 13/188,024, dated Feb. 5, 2013, 8 pages.
International Search Report for PCT/US2011/044857, dated Oct. 24, 2011, 10 pages.
International Preliminary Report on Patentability for PCT/US2011/044857 dated Mar. 7, 2013, 6 pages.

(56) References Cited

OTHER PUBLICATIONS

Non-final Office Action for U.S. Appl. No. 13/218,400 dated Nov. 8, 2012, 7 pages.
Notice of Allowance for U.S. Appl. No. 13/218,400 dated Apr. 11, 2013, 7 pages.
International Search Report for PCT/US11/49243, dated Dec. 22, 2011, 9 pages.
International Preliminary Report on Patentability for PCT/US11/49243 dated Nov. 13, 2012, 33 pages.
International Search Report for PCT/US2011/054106 dated Feb. 9, 2012, 11 pages.
International Search Report for PCT/US2011/061007 dated Aug. 16, 2012, 16 pages.
Non-Final Office Action for U.S. Appl. No. 13/297,470 dated May 8, 2013, 15 pages.
International Search Report for PCT/US2011/061009 dated Feb. 8, 2012, 14 pages.
International Search Report for PCT/US2012/023495 dated May 7, 2012, 13 pages.
Non-final Office Action for U.S. Appl. No. 13/222,453 dated Dec. 6, 2012, 13 pages.
Notice of Allowance for U.S. Appl. No. 13/222,453 dated Feb. 21, 2013, 7 pages.
Invitation to Pay Additional Fees and Where Applicable Protest Fee for PCT/US2012/024124 dated Jun. 1, 2012, 7 pages.
International Search Report for PCT/US2012/024124 dated Aug. 24, 2012, 14 pages.
Notice of Allowance for U.S. Appl. No. 13/316,229 dated Nov. 14, 2012, 9 pages.
International Search Report for PCT/US2011/064255 dated Apr. 3, 2012, 12 pages.
International Search Report for PCT/US2012/40317 dated Sep. 7, 2012, 7 pages.
International Search Report for PCT/US2012/046887 dated Dec. 21, 2012, 12 pages.
Non-final Office Action for U.S. Appl. No. 13/222,484 dated Nov. 8, 2012, 9 pages.
Final Office Action for U.S. Appl. No. 13/222,484 dated Apr. 10, 2013, 10 pages.
International Search Report and Written Opinion for PCT/US2012/053654 dated Feb. 15, 2013, 11 pages.
International Search Report and Written Opinion for PCT/US2012/062070, dated Jan. 21, 2013, 12 pages.
International Search Report and Written Opinion for PCT/US2012/067230 dated Feb. 21, 2013, 10 pages.
Notice of Allowance for U.S. Appl. No. 14/072,140, dated Dec. 2, 2014, 8 pages.
First Office Action for Chinese Patent Application No. 201280026559.0, dated Nov. 3, 2014, 14 pages. (with English translation).
Notice of Allowance for U.S. Appl. No. 13/486,012, dated Nov. 21, 2014, 8 pages.
Final Office Action for U.S. Appl. No. 13/689,883, dated Jan. 2, 2015, 13 pages.
Notice of Allowance for U.S. Appl. No. 13/690,187, dated Dec. 19, 2014, 8 pages.
Notice of Allowance for U.S. Appl. No. 13/747,694, dated Dec. 22, 2014, 9 pages.
Notice of Allowance for U.S. Appl. No. 13/951,976, dated Dec. 26, 2014, 9 pages.
Non-Final Office Action for U.S. Appl. No. 13/747,749, dated Nov. 12, 2014, 32 pages.
Notice of Allowance for U.S. Appl. No. 14/022,858, dated Oct. 25, 2013, 9 pages.
Non-Final Office Action for U.S. Appl. No. 13/550,049, dated Nov. 25, 2013, 6 pages.
Non-Final Office Action for U.S. Appl. No. 12/836,307, dated Nov. 5, 2013, 6 pages.
Examination Report for European Patent Application No. 11720630, dated Aug. 16, 2013, 5 pages.
Final Office Action for U.S. Appl. No. 13/297,470, dated Oct. 25, 2013, 17 pages.
First Office Action for Chinese Patent Application No. 201280052739.6, dated Mar. 3, 2016, 31 pages.
Communication under Rule 164(2)(a) EPC for European Patent Application No. 12725911.7, dated Feb. 17, 2016, 8 pages.
Author Unknown, "Automatically," Definition, Dictionary.com Unabridged, 2015, pp. 1-6, http://dictionary.reference.com/browse/automatically.
Final Office Action for U.S. Appl. No. 13/689,883, dated Dec. 23, 2015, 12 pages.
Final Office Action for U.S. Appl. No. 13/714,600, dated Dec. 24, 2015, 15 pages.
Notice of Allowance for U.S. Appl. No. 13/747,725, dated Oct. 28, 2015, 9 pages.
Advisory Action for U.S. Appl. No. 13/689,922, dated Dec. 18, 2015, 3 pages.
Notice of Allowance for U.S. Appl. No. 13/727,911, dated Nov. 10, 2015, 8 pages.
Notice of Allowance for U.S. Appl. No. 14/163,229, dated Nov. 5, 2015, 8 pages.
Final Office Action for U.S. Appl. No. 14/163,256, dated Nov. 2, 2015, 10 pages.
Corrected Notice of Allowability for U.S. Appl. No. 13/689,940, dated Nov. 17, 2015, 4 pages.
Final Office Action for U.S. Appl. No. 14/082,629, dated Nov. 4, 2015, 17 pages.
Non-Final Office Action for U.S. Appl. No. 14/458,341, dated Nov. 12, 2015, 5 pages.
First Office Action for Chinese Patent Application No. 201280042523.1, dated Dec. 4, 2015, 12 pages.
Notice of Allowance for U.S. Appl. No. 14/072,225, dated Feb. 3, 2016, 7 pages.
Final Office Action for U.S. Appl. No. 13/661,227, dated Feb. 9, 2016, 28 pages.
Advisory Action for U.S. Appl. No. 14/082,629, dated Jan. 22, 2016, 3 pages.
Notice of Allowance for U.S. Appl. No. 14/163,256, dated Feb. 10, 2016, 8 pages.
Advisory Action for U.S. Appl. No. 13/689,883, dated Mar. 4, 2016, 3 pages.
Advisory Action for U.S. Appl. No. 13/714,600, dated Mar. 14, 2016, 3 pages.
Notice of Allowance for U.S. Appl. No. 13/689,922, dated Mar. 18, 2016, 9 pages.
Notice of Allowance for U.S. Appl. No. 14/101,770, dated Apr. 11, 2016, 6 pages.
Notice of Allowance for U.S. Appl. No. 14/151,167, dated Mar. 4, 2016, 7 pages.
Non-Final Office Action for U.S. Appl. No. 14/082,629, dated Mar. 16, 2016, 23 pages.
Notice of Allowance for U.S. Appl. No. 14/702,192, dated Feb. 22, 2016, 8 pages.
Notice of Allowance for U.S. Appl. No. 14/254,215, dated Feb. 18, 2016, 7 pages.
Notice of Allowance for U.S. Appl. No. 14/458,341, dated Feb. 18, 2016, 6 pages.
Wang, Feipeng et al., An Improved Power-Added Efficiency 19-dBm Hybrid Envelope Elimination and Restoration Power Amplifier for 802.11g WLAN Applications, IEEE Transactions on Microwave Theory and Techniques, vol. 54, No. 12, Dec. 2006, pp. 4086-4099.
Examination Report for European Patent Application No. 14190851.7, dated May 2, 2016, 5 pages.
Combined Search and Examination Report for European Patent Application No. 12725911.7, dated Jun. 15, 2016, 14 pages.
Non-Final Office Action for U.S. Appl. No. 13/689,883, dated Apr. 20, 2016, 13 pages.
Notice of Allowance and Examiner Initiated Interview Summary for U.S. Appl. No. 13/661,227, dated May 13, 2016, 10 pages.
Non-Final Office Action for U.S. Appl. No. 13/714,600, dated May 4, 2016, 14 pages.

(56) References Cited

OTHER PUBLICATIONS

Advisory Action for U.S. Appl. No. 13/714,600, dated Dec. 16, 2016, 3 pages.
Notice of Allowance and Examiner Initiated Interview Summary for U.S. Appl. No. 14/082,629, dated Dec. 7, 2016, 11 pages.
Notice of Allowance for U.S. Appl. No. 14/638,374, dated Aug. 30, 2016, 7 pages.
Notice of Allowance for U.S. Appl. No. 13/689,883, dated Jul. 27, 2016, 9 pages.
Final Office Action for U.S. Appl. No. 14/082,629, dated Sep. 8, 2016, 13 pages.
First Office Action for Chinese Patent Application No. 201380039592.1, dated Oct. 31, 2016, 13 pages.
Invitation Pursuant to Rule 137(4) EPC and Article 94(3) EPC for European Patent Application No. 12725911.7, dated Jan. 2, 2017, 2 pages.
Final Office Action for U.S. Appl. No. 13/714,600, dated Oct. 5, 2016, 15 pages.
Notice of Allowance for U.S. Appl. No. 14/789,464, dated Oct. 26, 2016, 7 pages.
Notice of Allowance for U.S. Appl. No. 13/714,600, dated Jun. 29, 2017, 8 pages.
Notice of Allowance for U.S. Appl. No. 15/195,050, dated May 18, 2017, 7 pages.
Communication Pursuant to Article 94(3) EPC for European Patent Application No. 12725911.7, dated May 24, 2017, 6 pages.
Partial European Search Report for European Patent Application No. 16204437.4, dated Apr. 12, 2017, 9 pages.
Non-Final Office Action for U.S. Appl. No. 13/714,600, dated Feb. 16, 2017, 14 pages.
Notice of Allowance for U.S. Appl. No. 14/163,256, dated Feb. 21, 2017, 7 pages.
Non-Final Office Action for U.S. Appl. No. 15/142,634, dated Jan. 20, 2017, 6 pages.
Non-Final Office Action for U.S. Appl. No. 15/142,725, dated Jul. 21, 2017, 7 pages.
Non-Final Office Action for U.S. Appl. No. 15/142,859, dated Aug. 11, 2017, 7 pages.
Examination Report for European Patent Application No. 14162658.0, dated Jun. 29, 2017, 4 pages.
Extended European Search Report for European Patent Application No. 16204437.4, dated Sep. 14, 2017, 17 pages.
Notice of Allowance for U.S. Appl. No. 14/163,256, dated Dec. 21, 2017, 7 pages.
Notice of Allowance for U.S. Appl. No. 15/142,725, dated Nov. 22, 2017, 7 pages.
Notice of Allowance for U.S. Appl. No. 15/142,859, dated Dec. 7, 2017, 7 pages.
Notice of Allowance for U.S. Appl. No. 15/479,832, dated Jan. 10, 2018, 9 pages.
Notice of Allowability for U.S. Appl. No. 15/195,050, dated Feb. 5, 2018, 3 pages.

* cited by examiner

1st BUCK / BUCK MODE
(xμBB$_{RATIO}$ = 1/4)

$V_{\mu C\_OUT1} = \frac{1}{4} x V_{BAT}$     $V_{\mu C\_OUT2} = \frac{3}{4} x V_{BAT}$

1st BUCK / BUCK MODE
(xμBB$_{RATIO}$ = 1/4)

$$V_{\mu C\_OUT1} = \tfrac{1}{4} \times V_{BAT} \qquad V_{\mu C\_OUT2} = \tfrac{3}{4} \times V_{BAT}$$

PHASE 3
(SW 3, SW 9, AND SW 10 CLOSED)

PHASE 4
(SW 10, SW 11, AND SW 14 CLOSED)

2nd BUCK / BUCK MODE
(xμBB$_{RATIO}$ = 1/3)

$V_{\mu C\_OUT1} = \frac{1}{3} \times V_{BAT}$    $V_{\mu C\_OUT2} = \frac{2}{3} \times V_{BAT}$

PHASE 1
(SW 1, SW 5, AND SW 9 CLOSED)

PHASE 2
(SW 2, SW 3, SW 7, AND SW 8 CLOSED)

PHASE 3
(SW 1, SW 6, SW 12, AND SW 14 CLOSED)

5th BUCK / BUCK MODE
(xµBB$_{RATIO}$ = 3/4)

$$V_{\mu C\_OUT1} = \tfrac{3}{4} x V_{BAT} \qquad V_{\mu C\_OUT2} = \tfrac{1}{4} x V_{BAT}$$

PHASE 1
(SW 4, SW 10, AND SW 11 CLOSED)

PHASE 2
(SW 6 AND SW 9 CLOSED)

5th BUCK / BUCK MODE
(xμBB$_{RATIO}$ = 3/4)

$$V_{\mu C\_OUT1} = \tfrac{3}{4} x V_{BAT} \qquad V_{\mu C\_OUT2} = \tfrac{1}{4} x V_{BAT}$$

PHASE 3
(SW 2, SW 5, AND SW 8 CLOSED)

PHASE 4
(SW 1, SW 5, AND SW 12 CLOSED)

1st BUCK / BOOST MODE
($x\mu BB_{RATIO} = 1/4$)

$$V_{\mu C\_OUT1} = \frac{1}{4} \times V_{BAT} \qquad V_{\mu C\_OUT2} = \frac{5}{4} \times V_{BAT}$$

1st BUCK / BOOST MODE
(xµBB$_{RATIO}$ = 1/4)

$V_{\mu C\_OUT1} = \frac{1}{4} \times V_{BAT}$    $V_{\mu C\_OUT2} = \frac{5}{4} \times V_{BAT}$

PHASE 3
(SW 3, SW 9, AND SW 10 CLOSED)

PHASE 4
(SW 10, SW 12, AND SW 15 CLOSED)

5th BUCK / BOOST MODE
(xμBB$_{RATIO}$ = 3/4)

$V_{\mu C\_OUT1} = \frac{3}{4} \times V_{BAT}$   $V_{\mu C\_OUT2} = \frac{7}{4} \times V_{BAT}$

PHASE 1
(SW 4, SW 10, AND SW 11 CLOSED)

PHASE 2
(SW 6 AND SW 9 CLOSED)

5th BUCK / BOOST MODE
($x\mu BB_{RATIO}$ = 3/4)

$$V_{\mu C\_OUT1} = \tfrac{3}{4} x V_{BAT} \qquad V_{\mu C\_OUT2} = \tfrac{7}{4} x V_{BAT}$$

PHASE 3
(SW 2, SW 5, AND SW 8 CLOSED)

PHASE 4
(SW 5, SW 10, SW 11, AND SW 13 CLOSED)

6th BUCK / BOOST MODE
(xμBB$_{RATIO}$ = 1/4)

$V_{\mu C\_OUT1} = \frac{3}{4}xV_{BAT}$    $V_{\mu C\_OUT2} = \frac{5}{4}xV_{BAT}$

PHASE 3
(SW 2, SW 5, AND SW 8 CLOSED)

PHASE 4
(SW 10, SW 12, AND SW 15 CLOSED)

9Th BUCK / BOOST MODE
($x\mu BB_{RATIO} = 2/3$)

$V_{\mu C\_OUT1} = \frac{1}{3} x V_{BAT}$     $V_{\mu C\_OUT2} = \frac{5}{3} x V_{BAT}$

PHASE 1
(SW 1, SW 5, AND SW 9 CLOSED)

PHASE 2
(SW 2, SW 3, SW 7, AND SW 8 CLOSED)

PHASE 3
(SW 5, SW 10, SW 11, AND SW 13 CLOSED)

10th BUCK / BOOST MODE
($x\mu BB_{RATIO} = 3/4$)

$$V_{\mu C\_OUT1} = \tfrac{1}{4} x V_{BAT} \qquad V_{\mu C\_OUT2} = \tfrac{7}{4} x V_{BAT}$$

PHASE 1
(SW 1, SW 5, AND SW 9 CLOSED)

PHASE 2
(SW 7 AND SW 8 CLOSED)

10th BUCK / BOOST MODE
($x\mu BB_{RATIO} = 3/4$)

$$V_{\mu C\_OUT1} = \tfrac{1}{4} x V_{BAT} \qquad V_{\mu C\_OUT2} = \tfrac{7}{4} x V_{BAT}$$

PHASE 3
(SW 3, SW 9, AND SW 10 CLOSED)

PHASE 4
(SW 5, SW 10, SW 11, AND SW 13 CLOSED)

1st BOOST / BUCK MODE
$$(x\mu BB_{RATIO} = 1/4)$$

$$V_{\mu C\_OUT1} = \tfrac{5}{4} \times V_{BAT} \qquad V_{\mu C\_OUT2} = \tfrac{1}{4} \times V_{BAT}$$

PHASE 1
(SW 1, SW 5, AND SW 12 CLOSED)

PHASE 2
(SW 8 AND SW 13 CLOSED)

1st BOOST / BUCK MODE
(xμBB$_{RATIO}$ = 1/4)

$$V_{\mu C\_OUT1} = \tfrac{5}{4} \times V_{BAT} \qquad V_{\mu C\_OUT2} = \tfrac{1}{4} \times V_{BAT}$$

PHASE 3
(SW 3, SW 10, AND SW 12 CLOSED)

PHASE 4
(SW 9, SW 10, AND SW 15 CLOSED)

3rd BOOST / BUCK MODE
(xμBB$_{RATIO}$ = 1/2)

$V_{\mu C\_OUT1} = \frac{3}{2} x V_{BAT}$    $V_{\mu C\_OUT2} = \frac{1}{2} x V_{BAT}$

PHASE 1
(SW 1, SW 6, SW 12, AND SW 14 CLOSED)

PHASE 2
(SW 3, SW 8, SW 10, AND SW 13 CLOSED)

PHASE 3
(SW 2, SW 7, SW 11, AND SW 15 CLOSED)

4th BOOST / BUCK MODE
(xμBB$_{RATIO}$ = 2/3)

$V_{\mu C\_OUT1} = \frac{5}{3} \times V_{BAT}$         $V_{\mu C\_OUT2} = \frac{2}{3} \times V_{BAT}$

PHASE 1
(SW 1, SW 6, SW 12, AND SW 14 CLOSED)

PHASE 2
(SW 5, SW 8, SW 10, AND SW 13 CLOSED)

PHASE 3
(SW 2, SW 5, AND SW 11 CLOSED)

5th BOOST / BUCK MODE
($x\mu BB_{RATIO} = 3/4$)

$$V_{\mu C\_OUT1} = \tfrac{7}{4} \times V_{BAT} \qquad V_{\mu C\_OUT2} = \tfrac{3}{4} \times V_{BAT}$$

PHASE 1
(SW 10, SW 11, AND SW 14 CLOSED)

PHASE 2
(SW 6 AND SW 12 CLOSED)

5th BOOST / BUCK MODE
($x\mu BB_{RATIO} = 3/4$)

$$V_{\mu C\_OUT1} = \tfrac{7}{4} x V_{BAT} \qquad V_{\mu C\_OUT2} = \tfrac{3}{4} x V_{BAT}$$

PHASE 3
(SW 5, SW 8, SW 10, AND SW 13 CLOSED)

PHASE 4
(SW 2, SW 5, AND SW 11 CLOSED)

6th BOOST / BUCK MODE
($x\mu BB_{RATIO} = 1/4$)

$$V_{\mu C\_OUT1} = \tfrac{5}{4} x V_{BAT} \qquad V_{\mu C\_OUT2} = \tfrac{3}{4} x V_{BAT}$$

PHASE 1
(SW 10, SW 11, AND SW 14 CLOSED)

PHASE 2
(SW 6 AND SW 12 CLOSED)

6th BOOST / BUCK MODE
(xμBB$_{RATIO}$ = 1/4)

$$V_{\mu C\_OUT1} = \tfrac{5}{4} \times V_{BAT} \qquad V_{\mu C\_OUT2} = \tfrac{3}{4} \times V_{BAT}$$

PHASE 3
(SW 5, SW 8, SW 10, AND SW 13 CLOSED)

PHASE 4
(SW 9, SW 10, AND SW 15 CLOSED)

9th BOOST / BUCK MODE
(xμBB$_{RATIO}$ = 2/3)

$V_{\mu C\_OUT1} = \frac{5}{3} \times V_{BAT}$   $V_{\mu C\_OUT2} = \frac{1}{3} \times V_{BAT}$

PHASE 1
(SW 1, SW 5, AND SW 12 CLOSED)

PHASE 2
(SW 3, SW 8, SW 10, AND SW 13 CLOSED)

PHASE 3
(SW 2, SW 5, AND SW 11 CLOSED)

10th BOOST / BUCK MODE
($x\mu BB_{RATIO} = 3/4$)

$V_{\mu C\_OUT1} = \frac{7}{4} \times V_{BAT}$     $V_{\mu C\_OUT2} = \frac{1}{4} \times V_{BAT}$

PHASE 1
(SW 1, SW 5, AND SW 12 CLOSED)

PHASE 2
(SW 8 AND SW 13 CLOSED)

10th BOOST / BUCK MODE
(xμBB$_{RATIO}$ = 3/4)

$V_{\mu C\_OUT1} = \frac{7}{4} x V_{BAT}$  $\qquad$  $V_{\mu C\_OUT2} = \frac{1}{4} x V_{BAT}$

PHASE 3
(SW 3, SW 10, AND SW 12 CLOSED)

PHASE 4
(SW 2, SW 5, AND SW 11 CLOSED)

SINGLE μC-BUCKBOOST CONVERTER WITH MULTIPLE REGULATED SUPPLY OUTPUTS

RELATED APPLICATIONS

This application is a 35 U.S.C. § 371 national phase filing of International Application No. PCT/US2011/054106, filed Sep. 29, 2011, the disclosure of which is incorporated herein by reference in its entirety.

The '106 Application claims the benefit of U.S. provisional patent application No. 61/387,600, filed Sep. 29, 2010, the disclosure of which is incorporated herein by reference in its entirety.

FIELD OF THE DISCLOSURE

The embodiments described herein relate to a power management system for flexibly providing various output voltage levels to the components, sub-assemblies, and devices of electronic devices and systems. The embodiments described herein are further related to charge pump circuits that may be configured to simultaneously generate multiple supply voltage outputs, where each of the supply voltage outputs may be flexibly configured to provide a desired output voltage level. In addition, the embodiments described herein are still further related to various multiple output μC charge pump systems, where the supply voltage outputs provided by the charge pump circuits may be post regulated to provide highly accuralte voltage levels with a minimum impact on overall effeciency of the power management system.

BACKGROUND

Electronic devices and systems typically include a wide variety of components, sub-assemblies, and devices. For example, new electronic devices, such as mobile devices, may include memory, microprocessors, communication interfaces, transceivers, receivers, and display components. In addition, in many cases, these components, sub-assemblies, and devices will have differing power supply voltage and current requirements. For example, a display component configured to be in a sleep mode or turned off in order to conserve power may require a different power supply voltage level than when the display component is normally operating. Likewise, the power supply voltages and current requirements of the components, sub-assemblies, and devices may also vary depending upon the operational mode of the electronic devices and systems. These varying system power supply needs may be further complicated in the case where a battery is used to provide a system power source.

To meet the varying power supply needs of these diverse components, sub-assemblies, and devices, some electronic devices and systems rely upon power supply systems that use inductors to convert the voltage levels available from a system power source, such as a battery, to more desirable power supply voltages. In some cases, multiple inductors may be used. Other power supply systems may employ large numbers of capacitors to transform an available voltage level from a system power source, such as a battery, to more desirable power supply voltages. In addition, as the number of capacitors and inductors increase, the power supply systems may need to employ increased numbers of power switch and complex switching techniques to convert the voltage levels of an available system power source to more desirable power supply voltages.

Also, in some cases, components, sub-assemblies, and devices of these electronic devices and systems may require highly accurate voltage levels in order to properly function. In some cases where the system power source is provided by a battery, power supply systems that employ large numbers of capacitors or multiple inductors to transform a voltage level from an available system power source to a highly accurate voltage level may consume substantial amounts of energy, require substantially increased silicon areas or module areas, and be economically expensive.

Accordingly, there is a need to develop more efficient power management systems that may be reconfigured to provide a desired output voltage to each of the components, sub-assemblies, and devices of electronic devices and systems based upon the operational mode of the electronic devices and systems. In addition, there is also a need to develop power management systems that substantially reduce or eliminate the need for inductors and large numbers of capacitors to transform an available voltage level from a system power source, such as a battery, to more desirable power supply voltages. There is also a need to develop efficient power management systems that can flexibly provide highly accurate voltage levels that are substantially insensitive to a change in voltage level provided by a system power source, such as a battery.

SUMMARY

Embodiments disclosed in the detailed description relate to highly efficient power management systems configurable to simultaneously generate various output voltage levels for different components, sub-assemblies, and devices of electronic devices, sub-systems, and systems. In particular, the described embodiments include power management systems that substantially reduce or eliminate the need for inductors, large numbers of capacitors, and complex switching techniques to transform an available voltage level from a system power source, such as a battery, to more desirable power supply voltages. Some described embodiments include a charge pump that uses only two flying capacitors to simultaneously generate multiple supply outputs, where each of the multiple supply outputs may provide either the same or a different output voltage level. The described embodiments also include efficient power management systems that flexibly provide highly accurate voltage levels that are substantially insensitive to the voltage level provided by a system power source, such as a battery.

One embodiment of the efficient power management systems described here includes a method for simultaneously generating a first output voltage on a first charge pump output and a second output voltage on a second charge pump output of a charge pump, where the charge pump includes only a first flying capacitor and a second flying capacitor. The method may include a step of in a first phase of operation of the charge pump, configuring the first flying capacitor and the second flying capacitor to provide a first communication path between a supply voltage and a first charge pump output in order to store charge on a first output capacitor associated with the first charge pump output; The method may further include a step of establishing a first communication path through at least one of the first flying capacitor and the second flying capacitor to the first charge pump output. The method may further include a step of establishing a second communication path between the first charge pump output.

In another embodiment of the efficient power management systems described herein may include another method for simultaneously generating a first output voltage on a first charge pump output and a second output voltage on a second charge pump output of a charge pump from a supply voltage, where the charge pump includes only a first flying capacitor and a second flying capacitor. The method may include a step for establishing a first communication path from the supply voltage through at least one of the first flying capacitor and the second flying capacitor to a first charge pump output capacitor associated with the first charge pump output such that a charge is transferred from at least one of the supply voltage, the first flying capacitor, the second flying capacitor, and/or a combination thereof, to substantially establish the first output voltage on the first charge pump output capacitor. The method may further include a step of establishing a second communication path between the at least one of the first flying capacitor and the second flying capacitor to the first charge pump output capacitor associated with the first charge pump output such that the charge transferred from at least one of the at least one of the first flying capacitor and the second flying capacitor to the first charge pump output capacitor associated with the first charge pump output substantially maintains the first output voltage on the first charge pump output capacitor. In addition, the method may further include a step of establishing a third communication path from the supply voltage through the at least one of the first flying capacitor and the second flying capacitor to a second output capacitor associated with the second charge pump output such that the charge transferred from the at least one of the supply voltage, the first flying capacitor, the second flying capacitor, and/or a combination thereof, substantially generates the second output voltage on a second charge pump output capacitor associated with the second charge pump output.

Yet another embodiment of the efficient power management systems described herein may include another method for simultaneously generating with a charge pump a plurality of output voltages for a plurality of charge pump outputs, where charge pump derives each of the plurality of output voltages for each of the plurality of charge pump outputs from a supply voltage, wherein the charge pump includes only a first flying capacitor and a second flying capacitor. This method may include a step of establishing a first communication path from the supply voltage through at least one of the first flying capacitor and the second flying capacitor to a first charge pump output capacitor associated with a first charge pump output such that charge flows between the at least one of the supply voltage, the first flying capacitor, the second flying capacitor, and/or a combination thereof, and the first charge pump output capacitor associated with the first charge pump output to substantially generate a first output voltage on the first charge pump output capacitor, a step of establishing a second communication path from the at least one of the first flying capacitor and the second flying capacitor to the first charge pump output capacitor associated with the first charge pump output such that charge flows between the at least one of the first flying capacitor, the second flying capacitor, the supply voltage and/or a combination thereof, and the first charge pump output capacitor associated with the first charge pump output to substantially maintain generation of the first output voltage on the first charge pump output capacitor, and a further step of establishing a second charge pump output communication path from the supply voltage through the at least one of the first flying capacitor and the second flying capacitor to a second charge pump output capacitor associated with a second charge pump output such that charge flows between the at least one of the supply voltage, the first flying capacitor, the second flying capacitor, and/or the combination thereof, and the second charge pump output capacitor associated with the second charge pump output to substantially generate a second output voltage on the second charge pump output capacitor associated with the second charge pump output. In addition, the first flying capacitor includes a first positively charged terminal and a first negatively charged terminal, and wherein the second flying capacitor includes a second positively charged terminal and a second negatively charged terminal. Accordingly, where establishing the first communication path from the supply voltage through the at least one of the first flying capacitor and the second flying capacitor to the first charge pump output capacitor associated with the first charge pump output such that the charge flows between the at least one of the supply voltage, the first flying capacitor, the second flying capacitor, and/or the combination thereof, and the first charge pump output capacitor associated with the first charge pump output to substantially generate a first output voltage on the first charge pump output capacitor, the method may further include a step of coupling the first flying capacitor and the second flying capacitor in series between the supply voltage and the first charge pump output capacitor to generate the first output voltage on the first charge pump output capacitor. Likewise, where the method includes coupling the first flying capacitor and the second flying capacitor in series between the supply voltage and the first charge pump output capacitor the method may further include a step of coupling the first positively charged terminal of the first flying capacitor to the supply voltage and the second negatively charged terminal of the second flying capacitor to the first charge pump output capacitor. Also, where the method further includes coupling the first flying capacitor and the second flying capacitor in series between the supply voltage and the first charge pump output capacitor generate the first output voltage on the first charge pump output capacitor, the method may include the further step of coupling the second negatively charged terminal of the second flying capacitor to the supply voltage and the first negatively charged terminal of the first flying capacitor to the first charge pump output capacitor.

Likewise, where the method includes the step of coupling the first flying capacitor and the second flying capacitor in series between the supply voltage and the first charge pump output capacitor generate the first output voltage on the first charge pump output capacitor, the method may further include another step of establishing a communication path, which is included in the first communication path, from the first positively charged terminal of the first flying capacitor to the supply voltage. Moreover, in this case, the method may include another step of establishing a communication path, which is included in the first communication path, from the second positively charged terminal of the second flying capacitor to the supply voltage. In this case, the method may further include the addition step of coupling the first negatively charged terminal of the first flying capacitor to the second positively charged terminal of the second flying capacitor.

In some embodiments of the method, which include the step of coupling the first flying capacitor and the second flying capacitor in series from the supply voltage and the first charge pump output capacitor, the method may also include establishing a communication path, which is included in the first communication path, from the second negatively charged terminal of the second flying capacitor to the supply voltage. In this case, the method may also couple the first positively charged terminal of the first flying capacitor to the second positively charged terminal of the second flying capacitor.

In still other embodiments of this method, which include the step of coupling the first flying capacitor and the second flying capacitor in series from the supply voltage and the first charge pump output capacitor, the method may further establish a communication path, which is included in the first communication path, from the first negatively charged terminal of the first flying capacitor to the first charge pump output capacitor. In this case, the method may also establish a communication path, which is included in the first communication path, from the second negatively charged terminal of the second flying capacitor to the first charge pump output capacitor. Also in this case, the method may further coupled the first negatively charged terminal of the first flying capacitor to the second positively charged terminal of the second flying capacitor.

In still other embodiments of the me method that include the step of coupling the first flying capacitor and the second flying capacitor in series from the supply voltage and the first charge pump output capacitor, the method may further establish a communication path, which is included in the first communication path, from the second positively charged terminal of the second flying capacitor to the first charge pump output capacitor. In this case, the method may also couple the first positively charged terminal of the first flying capacitor to the second positively charged terminal of the second flying capacitor.

In still another embodiment of the method which includes the step of establishing the first communication path from the supply voltage through the at least one of the first flying capacitor and the second flying capacitor to the first charge pump output capacitor associated with the first charge pump output such that the charge flows between the at least one of the supply voltage, the first flying capacitor, the second flying capacitor, and/or the combination thereof, and the first charge pump output capacitor associated with the first charge pump output to substantially generate a first output voltage on the first charge pump output capacitor the method may further couple the first flying capacitor in parallel with the second flying capacitor between the supply voltage and the first charge pump output capacitor. In this case, the method may also couple the first positively charged terminal of the first flying capacitor to the second positively charged terminal of the second flying capacitor to the supply voltage.

In still another embodiment of this method, the method may establish the first communication path from the supply voltage through the at least one of the first flying capacitor and the second flying capacitor to the first charge pump output capacitor associated with the first charge pump output such that the charge flows between the at least one of the supply voltage, the first flying capacitor, the second flying capacitor, and/or the combination thereof, and the first charge pump output capacitor associated with the first charge pump output to substantially generate a first output voltage on the first charge pump output capacitor occurs during a first phase of operation of the charge pump. In this case, the method may also, during the first phase of operation of the charge pump, the second charge pump output capacitor associated with the second charge pump output is disconnected from the supply voltage, the first flying capacitor, and the second flying capacitor.

In another embodiment of this method which establishes the second communication path from the at least one of the first flying capacitor and the second flying capacitor to the first charge pump output capacitor associated with the first charge pump output such that charge flows between the at least one of the first flying capacitor, the second flying capacitor, the supply voltage and/or the combination thereof, and the first charge pump output capacitor associated with the first charge pump output to substantially maintain generation of the first output voltage on the first charge pump output capacitor, the method may further couple the first flying capacitor and the second flying capacitor in series between the first charge pump output capacitor and ground. In doing so, the method may also establish a communication path, which is included in the second communication path, from the first positively charged terminal of the first flying capacitor to the first charge pump output capacitor. In this case, the method may establish a communication path, which is included in the second communication path, from the second positively charged terminal of the second flying capacitor to the first charge pump output capacitor. Likewise, in this case, the method may couple the first positively charged terminal of the first flying capacitor to the second negatively charged terminal of the second flying capacitor. In addition, where the method couples the first flying capacitor and the second flying capacitor in series between the first charge pump output capacitor and ground, the method may further establish a communication path, which is included in the second communication path, from the first positively charged terminal of the first flying capacitor to the first charge pump output capacitor.

In another embodiment of this method, which includes the step of
coupling the first flying capacitor and the second flying capacitor in series between the first charge pump output capacitor and ground the method may further establish a communication path, which is included in the second communication path, from the second positively charged terminal of the second flying capacitor to the first charge pump output capacitor Accordingly, the method may also couple the first negatively charged terminal of the first flying capacitor to the second positively charged terminal of the second flying capacitor. Also, the method may couple the first positively charged terminal of the first flying capacitor to the second negatively charged terminal of the second flying capacitor.

Alternatively, where the method copies the first flying capacitor and the second flying capacitor in series between the first charge pump output capacitor and ground, the method may establish a communication path, which is included in the second communication path, from the second negatively charged terminal of the second flying capacitor to the first charge pump output capacitor. In this case, the method may establish a communication path, which is included in the second communication path, from the first positively charged terminal of the first flying capacitor to the first charge pump output capacitor. Accordingly, the method may also couple the first positively charged terminal of the first flying capacitor to the second negatively charged terminal of the second flying capacitor.

In still another embodiment of the method, when the method establishes the second communication path from the at least one of the first flying capacitor and the second flying capacitor to the first charge pump output capacitor associated with the first charge pump output such that charge flows between the at least one of the first flying capacitor, the second flying capacitor, the supply voltage and/or the combination thereof, and the first charge pump output capacitor associated with the first charge pump output to substantially maintain generation of the first output voltage on the first charge pump output capacitor, the method may further couple coupling the second flying capacitor between the first charge pump output capacitor and one of the supply voltage and ground. In this case, the method may also alternatively couple the second positively charged terminal of the second flying capacitor to the first charge pump output capacitor and the second negatively charged terminal of the second flying capacitor to ground. In this case, the method may could the first positively charged terminal of the first flying capacitor to the first charge pump output capacitor and the first negatively charged terminal of the second flying capacitor to ground. In the case where the method couples the second flying capacitor between the first charge pump output capacitor and one of the supply voltage and the ground, the method may further couple the second positively charged terminal of the second flying capacitor to the supply voltage and the second negatively charged terminal of the second flying capacitor to the first charge pump output capacitor.

In still other embodiments of the method may establish the second communication path from the at least one of the first flying capacitor and the second flying capacitor to the first charge pump output capacitor associated with the first charge pump output such that charge flows between the at least one of the first flying capacitor, the second flying capacitor, the supply voltage and/or the combination thereof, and the first charge pump output capacitor associated with the first charge pump output to substantially maintain generation of the first output voltage on the first charge pump output capacitor occurs during a second phase of operation of the charge pump. In this case, during the second phase of operation of the charge pump, the second charge pump output capacitor associated with the second charge pump output is disconnected from the supply voltage, the first flying capacitor, and the second flying capacitor. Also, when the method establishes the second charge pump output communication path from the supply voltage through the at least one of the first flying capacitor and the second flying capacitor to the second charge pump output capacitor associated with the second charge pump output such that the charge flows between the at least one of the supply voltage, the first flying capacitor, the second flying capacitor, and/or the combination thereof, and the second charge pump output capacitor associated with the second charge pump output to substantially generate the second output voltage, the method may further include coupling the first flying capacitor and the second flying capacitor in series between the supply voltage and the second charge pump output capacitor to generate the second output voltage on the second charge pump output capacitor. Also, in some cases, the method may further include coupling the first positively charged terminal of the first flying capacitor to the supply voltage and the second negatively charged terminal of the second flying capacitor to the second charge pump output capacitor. In still other cases, the method may couple the second negatively charged terminal of the second flying capacitor to the supply voltage and the first negatively charged terminal of the first flying capacitor to the second charge pump output capacitor. Likewise, when the method couples the first flying capacitor and the second flying capacitor in series between the supply voltage and the second charge pump output capacitor generate the first output voltage on the second charge pump output capacitor, the method may further establish a communication path, which is included in the second charge pump output communication path, from the first positively charged terminal of the first flying capacitor to the supply voltage.

Where the method includes the step of coupling the first flying capacitor and the second flying capacitor in series from the supply voltage and the second charge pump output capacitor, the method may further establish a communication path, which is included in the second charge pump output communication path, from the second positively charged terminal of the second flying capacitor to the supply voltage. In this case, the method may couple the first negatively charged terminal of the first flying capacitor to the second positively charged terminal of the second flying capacitor. Likewise, where the method couples the first flying capacitor and the second flying capacitor in series from the supply voltage and the second charge pump output capacitor, the method may establish a communication path, which is included in the second charge pump output communication path, from the second negatively charged terminal of the second flying capacitor to the supply voltage. In this case, the method may further include the step of coupling the first positively charged terminal of the first flying capacitor to the second positively charged terminal of the second flying capacitor. In the case where the method couples the first flying capacitor and the second flying capacitor in series from the supply voltage and the second charge pump output capacitor, the method may further establish a communication path, which is included in the second charge pump output communication path, from the first negatively charged terminal of the first flying capacitor to the second charge pump output capacitor. As a result, in some embodiments, the method may couple the first flying capacitor and the second flying capacitor in series from the supply voltage and the second charge pump output. This may further include establishing a communication path, which is included in the second charge pump output communication path, from the second negatively charged terminal of the second flying capacitor to the second charge pump output capacitor.

Accordingly, in some embodiments, the method may further couple the first negatively charged terminal of the first flying capacitor to the second positively charged terminal of the second flying capacitor.

In the case where the method couples the first flying capacitor and the second flying capacitor in series from the supply voltage and the second charge pump output capacitor, the method may further establish a communication path, which is included in the second charge pump output communication path, from the second positively charged terminal of the second flying capacitor to the second charge pump output capacitor. In this case, the method may couple coupling the first positively charged terminal of the first flying capacitor to the second positively charged terminal of the second flying capacitor.

In another embodiment of the method, which establishes the second charge pump output communication path from the supply voltage through the at least one of the first flying capacitor and the second flying capacitor to the second charge pump output capacitor associated with the second charge pump output such that the charge flows between the at least one of the supply voltage, the first flying capacitor, the second flying capacitor, and/or the combination thereof, and the second charge pump output capacitor associated with the second charge pump output to substantially generate the second output voltage, the method may also couple the first flying capacitor in parallel with the second flying capacitor between the supply voltage and the second charge pump output capacitor. In the where the method couples the first flying capacitor in parallel with the second flying capacitor between the supply voltage and the second charge pump output, the method may further couple the first positively charged terminal of the first flying capacitor to the second positively charged terminal of the second flying capacitor to the supply voltage.

In still other embodiments of the method, where establishing the second charge pump output communication path from the supply voltage through the at least one of the first flying capacitor and the second flying capacitor to the second charge pump output capacitor associated with the second charge pump output such that the charge flows between the at least one of the supply voltage, the first flying capacitor, the second flying capacitor, and/or the combination thereof, and the second charge pump output capacitor associated with the second charge pump output to substantially generate the second output voltage occurs during one of a third phase of operation of the charge pump and a fourth phase of operation of the charge pump. In this case, in some cases, during the fourth phase of operation of the charge pump the charge pump establishes the second charge pump output communication path from the supply voltage through the at least one of the first flying capacitor and the second flying capacitor to the second charge pump output capacitor associated with the second charge pump output in order to generate the second output voltage on the second charge pump output, the fourth phase of operation of the charge pump. Accordingly, the method may further include the step of disconnecting the first charge pump output capacitor associated with the first charge pump output from the supply voltage, the first flying capacitor, and the second flying capacitor. Likewise, in the case where the charge pump establishes the second charge pump output communication path from the supply voltage through the at least one of the first flying capacitor and the second flying capacitor to the second charge pump output capacitor associated with the second charge pump output in order to generate the second output voltage on the second charge pump output during the fourth phase of operation, the method may also, prior to establishing the second charge pump output communication path, establish a third communication path from the at least one of the first flying capacitor and the second flying capacitor to the first charge pump output capacitor associated with the first charge pump output such that charge flows between the at least one of the first flying capacitor, the second flying capacitor, and/or the combination thereof, and the first charge pump output capacitor associated with the first charge pump output to substantially maintain generation of the first output voltage on the first charge pump output capacitor. Accordingly, in this case, the method may further couple the first flying capacitor and the second flying capacitor in series between the first charge pump output capacitor and ground. In the case where the method couples the first flying capacitor and the second flying capacitor in series from the first charge pump output capacitor and ground by establishing a communication path, which is included in the third communication path, from the first positively charged terminal of the first flying capacitor to the first charge pump output capacitor. Otherwise, the method may, in some embodiments, establish a communication path, which is included in the third communication path, from the second positively charged terminal of the second flying capacitor to the first charge pump output capacitor. In these cases, the method may further couple the first positively charged terminal of the first flying capacitor to the second negatively charged terminal of the second flying capacitor. In the further case where the method couples the first flying capacitor and the second flying capacitor in series from the first charge pump output capacitor and ground, the method may further include the step of establishing a communication path, which is included in the third communication path, from the first positively charged terminal of the first flying capacitor to the first charge pump output capacitor. Also, when the method includes the step of coupling the first flying capacitor and the second flying capacitor in series from the first charge pump output capacitor and ground, the method may establishes a communication path, which is included in the third communication path, from the second positively charged terminal of the second flying capacitor to the first charge pump output capacitor. In some cases this permits the method to couple the first negatively charged terminal of the first flying capacitor to the second positively charged terminal of the second flying capacitor.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure. INSERT SUMMARY OF DRAWINGS HERE.

DETAILED DESCRIPTION

Figure 1A:
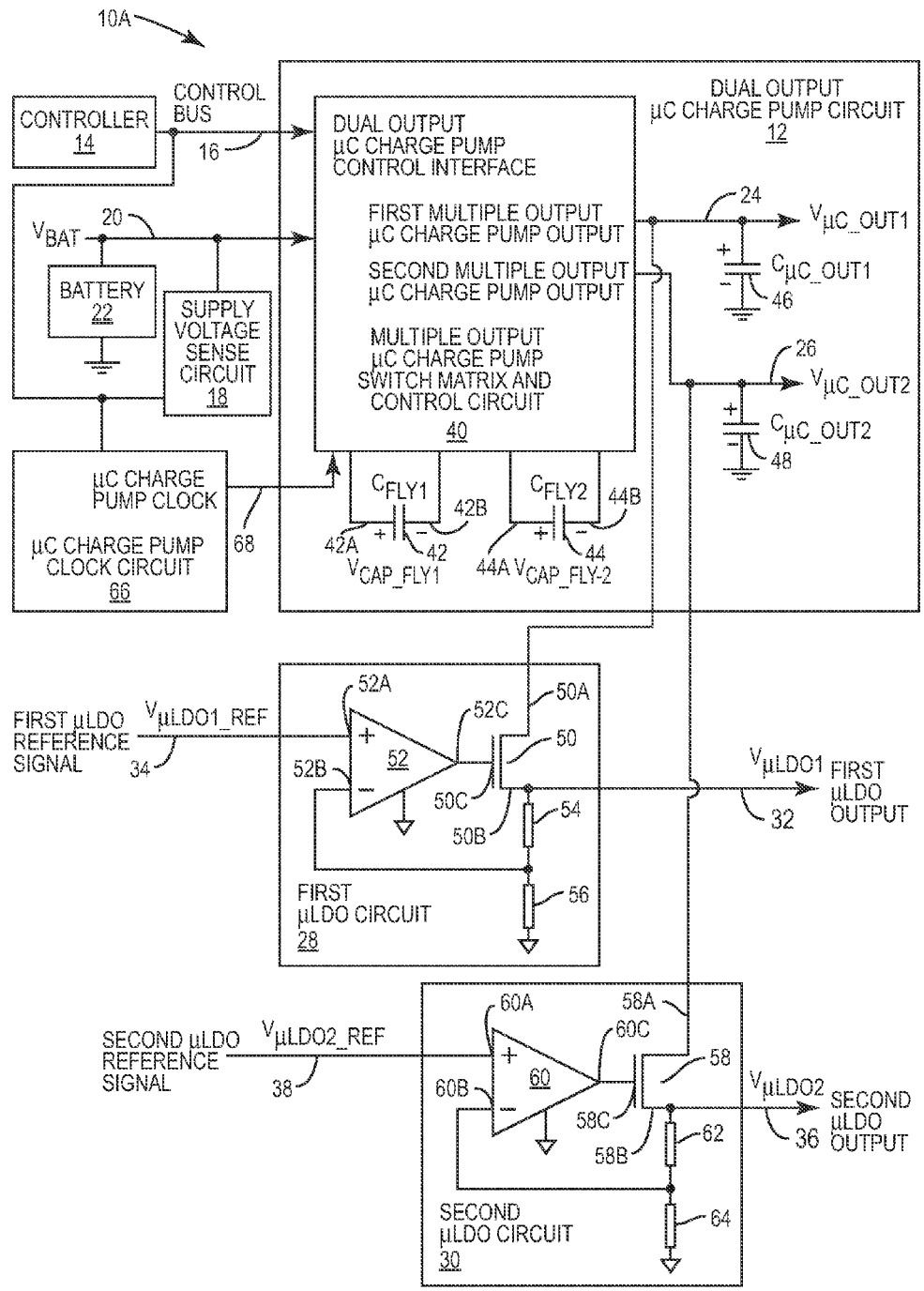
FIG. 1A depicts a first embodiment of a multiple output μC charge pump system 10A.

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

One embodiment of the efficient power management systems described here includes a method for simultaneously generating a first output voltage on a first charge pump output and a second output voltage on a second charge pump output of a charge pump, where the charge pump includes only a first flying capacitor and a second flying capacitor. The method may include a step of in a first phase of operation of the charge pump, configuring the first flying capacitor and the second flying capacitor to provide a first communication path between a supply voltage and a first charge pump output in order to store charge on a first output capacitor associated with the first charge pump output; The method may further include a step of establishing a first communication path through at least one of the first flying capacitor and the second flying capacitor to the first charge pump output. The method may further include a step of establishing a second communication path between the first charge pump output.

In another embodiment of the efficient power management systems described herein may include another method for simultaneously generating a first output voltage on a first charge pump output and a second output voltage on a second charge pump output of a charge pump from a supply voltage, where the charge pump includes only a first flying capacitor and a second flying capacitor. The method may include a step for establishing a first communication path from the supply voltage through at least one of the first flying capacitor and the second flying capacitor to a first charge pump output capacitor associated with the first charge pump output such that a charge is transferred from at least one of the supply voltage, the first flying capacitor, the second flying capacitor, and/or a combination thereof, to substantially establish the first output voltage on the first charge pump output capacitor. The method may further include a step of establishing a second communication path between the at least one of the first flying capacitor and the second flying capacitor to the first charge pump output capacitor associated with the first charge pump output such that the charge transferred from at least one of the at least one of the first flying capacitor and the second flying capacitor to the first charge pump output capacitor associated with the first charge pump output substantially maintains the first output voltage on the first charge pump output capacitor. In addition, the method may further include a step of establishing a third communication path from the supply voltage through the at least one of the first flying capacitor and the second flying capacitor to a second output capacitor associated with the second charge pump output such that the charge transferred from the at least one of the supply voltage, the first flying capacitor, the second flying capacitor, and/or a combination thereof, substantially generates the second output voltage on a second charge pump output capacitor associated with the second charge pump output.

Yet another embodiment of the efficient power management systems described herein may include another method for simultaneously generating with a charge pump a plurality of output voltages for a plurality of charge pump outputs, where charge pump derives each of the plurality of output voltages for each of the plurality of charge pump outputs from a supply voltage, wherein the charge pump includes only a first flying capacitor and a second flying capacitor. This method may include a step of establishing a first communication path from the supply voltage through at least one of the first flying capacitor and the second flying capacitor to a first charge pump output capacitor associated with a first charge pump output such that charge flows between the at least one of the supply voltage, the first flying capacitor, the second flying capacitor, and/or a combination thereof, and the first charge pump output capacitor associated with the first charge pump output to substantially generate a first output voltage on the first charge pump output capacitor, a step of establishing a second communication path from the at least one of the first flying capacitor and the second flying capacitor to the first charge pump output capacitor associated with the first charge pump output such that charge flows between the at least one of the first flying capacitor, the second flying capacitor, the supply voltage and/or a combination thereof, and the first charge pump output capacitor associated with the first charge pump output to substantially maintain generation of the first output voltage on the first charge pump output capacitor, and a further step of establishing a second charge pump output communication path from the supply voltage through the at least one of the first flying capacitor and the second flying capacitor to a second charge pump output capacitor associated with a second charge pump output such that charge flows between the at least one of the supply voltage, the first flying capacitor, the second flying capacitor, and/or the combination thereof, and the second charge pump output capacitor associated with the second charge pump output to substantially generate a second output voltage on the second charge pump output capacitor associated with the second charge pump output. In addition, the first flying capacitor includes a first positively charged terminal and a first negatively charged terminal, and wherein the second flying capacitor includes a second positively charged terminal and a second negatively charged terminal. Accordingly, where establishing the first communication path from the supply voltage through the at least one of the first flying capacitor and the second flying capacitor to the first charge pump output capacitor associated with the first charge pump output such that the charge flows between the at least one of the supply voltage, the first flying capacitor, the second flying capacitor, and/or the combination thereof, and the first charge pump output capacitor associated with the first charge pump output to substantially generate a first output voltage on the first charge pump output capacitor, the method may further include a step of coupling the first flying capacitor and the second flying capacitor in series between the supply voltage and the first charge pump output capacitor to generate the first output voltage on the first charge pump output capacitor. Likewise, where the method includes coupling the first flying capacitor and the second flying capacitor in series between the supply voltage and the first charge pump output capacitor the method may further include a step of coupling the first positively charged terminal of the first flying capacitor to the supply voltage and the second negatively charged terminal of the second flying capacitor to the first charge pump output capacitor. Also, where the method further includes coupling the first flying capacitor and the second flying capacitor in series between the supply voltage and the first charge pump output capacitor generate the first output voltage on the first charge pump output capacitor, the method may include the further step of coupling the second negatively charged terminal of the second flying capacitor to the supply voltage and the first negatively charged terminal of the first flying capacitor to the first charge pump output capacitor.

Likewise, where the method includes the step of coupling the first flying capacitor and the second flying capacitor in series between the supply voltage and the first charge pump output capacitor generate the first output voltage on the first charge pump output capacitor, the method may further include another step of establishing a communication path, which is included in the first communication path, from the first positively charged terminal of the first flying capacitor to the supply voltage. Moreover, in this case, the method may include another step of establishing a communication path, which is included in the first communication path, from the second positively charged terminal of the second flying capacitor to the supply voltage. In this case, the method may further include the addition step of coupling the first negatively charged terminal of the first flying capacitor to the second positively charged terminal of the second flying capacitor.

In some embodiments of the method, which include the step of coupling the first flying capacitor and the second flying capacitor in series from the supply voltage and the first charge pump output capacitor, the method may also include establishing a communication path, which is included in the first communication path, from the second negatively charged terminal of the second flying capacitor to the supply voltage. In this case, the method may also couple the first positively charged terminal of the first flying capacitor to the second positively charged terminal of the second flying capacitor.

In still other embodiments of this method, which include the step of coupling the first flying capacitor and the second flying capacitor in series from the supply voltage and the first charge pump output capacitor, the method may further establish a communication path, which is included in the first communication path, from the first negatively charged terminal of the first flying capacitor to the first charge pump output capacitor. In this case, the method may also establish a communication path, which is included in the first communication path, from the second negatively charged terminal of the second flying capacitor to the first charge pump output capacitor. Also in this case, the method may further coupled the first negatively charged terminal of the first flying capacitor to the second positively charged terminal of the second flying capacitor.

In still other embodiments of the me method that include the step of coupling the first flying capacitor and the second flying capacitor in series from the supply voltage and the first charge pump output capacitor, the method may further establish a communication path, which is included in the first communication path, from the second positively charged terminal of the second flying capacitor to the first charge pump output capacitor. In this case, the method may also couple the first positively charged terminal of the first flying capacitor to the second positively charged terminal of the second flying capacitor.

In still another embodiment of the method which includes the step of establishing the first communication path from the supply voltage through the at least one of the first flying capacitor and the second flying capacitor to the first charge pump output capacitor associated with the first charge pump output such that the charge flows between the at least one of the supply voltage, the first flying capacitor, the second flying capacitor, and/or the combination thereof, and the first charge pump output capacitor associated with the first charge pump output to substantially generate a first output voltage on the first charge pump output capacitor the method may further couple the first flying capacitor in parallel with the second flying capacitor between the supply voltage and the first charge pump output capacitor. In this case, the method may also couple the first positively charged terminal of the first flying capacitor to the second positively charged terminal of the second flying capacitor to the supply voltage.

In still another embodiment of this method, the method may establish the first communication path from the supply voltage through the at least one of the first flying capacitor and the second flying capacitor to the first charge pump output capacitor associated with the first charge pump output such that the charge flows between the at least one of the supply voltage, the first flying capacitor, the second flying capacitor, and/or the combination thereof, and the first charge pump output capacitor associated with the first charge pump output to substantially generate a first output voltage on the first charge pump output capacitor occurs during a first phase of operation of the charge pump. In this case, the method may also, during the first phase of operation of the charge pump, the second charge pump output capacitor associated with the second charge pump output is disconnected from the supply voltage, the first flying capacitor, and the second flying capacitor.

In another embodiment of this method which establishes the second communication path from the at least one of the first flying capacitor and the second flying capacitor to the first charge pump output capacitor associated with the first charge pump output such that charge flows between the at least one of the first flying capacitor, the second flying capacitor, the supply voltage and/or the combination thereof, and the first charge pump output capacitor associated with the first charge pump output to substantially maintain generation of the first output voltage on the first charge pump output capacitor, the method may further couple the first flying capacitor and the second flying capacitor in series between the first charge pump output capacitor and ground. In doing so, the method may also establish a communication path, which is included in the second communication path, from the first positively charged terminal of the first flying capacitor to the first charge pump output capacitor. In this case, the method may establish a communication path, which is included in the second communication path, from the second positively charged terminal of the second flying capacitor to the first charge pump output capacitor. Likewise, in this case, the method may couple the first positively charged terminal of the first flying capacitor to the second negatively charged terminal of the second flying capacitor. In addition, where the method couples the first flying capacitor and the second flying capacitor in series between the first charge pump output capacitor and ground, the method may further establish a communication path, which is included in the second communication path, from the first positively charged terminal of the first flying capacitor to the first charge pump output capacitor.

In another embodiment of this method, which includes the step of coupling the first flying capacitor and the second flying capacitor in series between the first charge pump output capacitor and ground the method may further establish a communication path, which is included in the second communication path, from the second positively charged terminal of the second flying capacitor to the first charge pump output capacitor Accordingly, the method may also couple the first negatively charged terminal of the first flying capacitor to the second positively charged terminal of the second flying capacitor. Also, the method may couple the first positively charged terminal of the first flying capacitor to the second negatively charged terminal of the second flying capacitor.

Alternatively, where the method copies the first flying capacitor and the second flying capacitor in series between the first charge pump output capacitor and ground, the method may establish a communication path, which is included in the second communication path, from the second negatively charged terminal of the second flying capacitor to the first charge pump output capacitor. In this case, the method may establish a communication path, which is included in the second communication path, from the first positively charged terminal of the first flying capacitor to the first charge pump output capacitor. Accordingly, the method may also couple the first positively charged terminal of the first flying capacitor to the second negatively charged terminal of the second flying capacitor.

In still another embodiment of the method, when the method establishes the second communication path from the at least one of the first flying capacitor and the second flying capacitor to the first charge pump output capacitor associated with the first charge pump output such that charge flows between the at least one of the first flying capacitor, the second flying capacitor, the supply voltage and/or the combination thereof, and the first charge pump output capacitor associated with the first charge pump output to substantially maintain generation of the first output voltage on the first charge pump output capacitor, the method may further couple coupling the second flying capacitor between the first charge pump output capacitor and one of the supply voltage and ground. In this case, the method may also alternatively couple the second positively charged terminal of the second flying capacitor to the first charge pump output capacitor and the second negatively charged terminal of the second flying capacitor to ground. In this case, the method may could the first positively charged terminal of the first flying capacitor to the first charge pump output capacitor and the first negatively charged terminal of the second flying capacitor to ground. In the case where the method couples the second flying capacitor between the first charge pump output capacitor and one of the supply voltage and the ground, the method may further couple the second positively charged terminal of the second flying capacitor to the supply voltage and the second negatively charged terminal of the second flying capacitor to the first charge pump output capacitor.

In still other embodiments of the method may establish the second communication path from the at least one of the first flying capacitor and the second flying capacitor to the first charge pump output capacitor associated with the first charge pump output such that charge flows between the at least one of the first flying capacitor, the second flying capacitor, the supply voltage and/or the combination thereof, and the first charge pump output capacitor associated with the first charge pump output to substantially maintain generation of the first output voltage on the first charge pump output capacitor occurs during a second phase of operation of the charge pump. In this case, during the second phase of operation of the charge pump, the second charge pump output capacitor associated with the second charge pump output is disconnected from the supply voltage, the first flying capacitor, and the second flying capacitor. Also, when the method establishes the second charge pump output communication path from the supply voltage through the at least one of the first flying capacitor and the second flying capacitor to the second charge pump output capacitor associated with the second charge pump output such that the charge flows between the at least one of the supply voltage, the first flying capacitor, the second flying capacitor, and/or the combination thereof, and the second charge pump output capacitor associated with the second charge pump output to substantially generate the second output voltage, the method may further include coupling the first flying capacitor and the second flying capacitor in series between the supply voltage and the second charge pump output capacitor to generate the second output voltage on the second charge pump output capacitor. Also, in some cases, the method may further include coupling the first positively charged terminal of the first flying capacitor to the supply voltage and the second negatively charged terminal of the second flying capacitor to the second charge pump output capacitor. In still other cases, the method may couple the second negatively charged terminal of the second flying capacitor to the supply voltage and the first negatively charged terminal of the first flying capacitor to the second charge pump output capacitor. Likewise, when the method couples the first flying capacitor and the second flying capacitor in series between the supply voltage and the second charge pump output capacitor generate the first output voltage on the second charge pump output capacitor, the method may further establish a communication path, which is included in the second charge pump output communication path, from the first positively charged terminal of the first flying capacitor to the supply voltage.

Where the method includes the step of coupling the first flying capacitor and the second flying capacitor in series from the supply voltage and the second charge pump output capacitor, the method may further establish a communication path, which is included in the second charge pump output communication path, from the second positively charged terminal of the second flying capacitor to the supply voltage. In this case, the method may couple the first negatively charged terminal of the first flying capacitor to the second positively charged terminal of the second flying capacitor. Likewise, where the method couples the first flying capacitor and the second flying capacitor in series from the supply voltage and the second charge pump output capacitor, the method may establish a communication path, which is included in the second charge pump output communication path, from the second negatively charged terminal of the second flying capacitor to the supply voltage. In this case, the method may further include the step of coupling the first positively charged terminal of the first flying capacitor to the second positively charged terminal of the second flying capacitor. In the case where the method couples the first flying capacitor and the second flying capacitor in series from the supply voltage and the second charge pump output capacitor, the method may further establish a communication path, which is included in the second charge pump output communication path, from the first negatively charged terminal of the first flying capacitor to the second charge pump output capacitor. As a result, in some embodiments, the method may couple the first flying capacitor and the second flying capacitor in series from the supply voltage and the second charge pump output. This may further include establishing a communication path, which is included in the second charge pump output communication path, from the second negatively charged terminal of the second flying capacitor to the second charge pump output capacitor.

Accordingly, in some embodiments, the method may further couple the first negatively charged terminal of the first flying capacitor to the second positively charged terminal of the second flying capacitor.

In the case where the method couples the first flying capacitor and the second flying capacitor in series from the supply voltage and the second charge pump output capacitor, the method may further establish a communication path, which is included in the second charge pump output communication path, from the second positively charged terminal of the second flying capacitor to the second charge pump output capacitor. In this case, the method may couple coupling the first positively charged terminal of the first flying capacitor to the second positively charged terminal of the second flying capacitor.

In another embodiment of the method, which establishes the second charge pump output communication path from the supply voltage through the at least one of the first flying capacitor and the second flying capacitor to the second charge pump output capacitor associated with the second charge pump output such that the charge flows between the at least one of the supply voltage, the first flying capacitor, the second flying capacitor, and/or the combination thereof, and the second charge pump output capacitor associated with the second charge pump output to substantially generate the second output voltage, the method may also couple the first flying capacitor in parallel with the second flying capacitor between the supply voltage and the second charge pump output capacitor. In the where the method couples the first flying capacitor in parallel with the second flying capacitor between the supply voltage and the second charge pump output, the method may further couple the first positively charged terminal of the first flying capacitor to the second positively charged terminal of the second flying capacitor to the supply voltage.

In still other embodiments of the method, where establishing the second charge pump output communication path from the supply voltage through the at least one of the first flying capacitor and the second flying capacitor to the second charge pump output capacitor associated with the second charge pump output such that the charge flows between the at least one of the supply voltage, the first flying capacitor, the second flying capacitor, and/or the combination thereof, and the second charge pump output capacitor associated with the second charge pump output to substantially generate the second output voltage occurs during one of a third phase of operation of the charge pump and a fourth phase of operation of the charge pump. In this case, in some cases, during the fourth phase of operation of the charge pump the charge pump establishes the second charge pump output communication path from the supply voltage through the at least one of the first flying capacitor and the second flying capacitor to the second charge pump output capacitor associated with the second charge pump output in order to generate the second output voltage on the second charge pump output, the fourth phase of operation of the charge pump. Accordingly, the method may further include the step of disconnecting the first charge pump output capacitor associated with the first charge pump output from the supply voltage, the first flying capacitor, and the second flying capacitor. Likewise, in the case where the charge pump establishes the second charge pump output communication path from the supply voltage through the at least one of the first flying capacitor and the second flying capacitor to the second charge pump output capacitor associated with the second charge pump output in order to generate the second output voltage on the second charge pump output during the fourth phase of operation, the method may also, prior to establishing the second charge pump output communication path, establish a third communication path from the at least one of the first flying capacitor and the second flying capacitor to the first charge pump output capacitor associated with the first charge pump output such that charge flows between the at least one of the first flying capacitor, the second flying capacitor, and/or the combination thereof, and the first charge pump output capacitor associated with the first charge pump output to substantially maintain generation of the first output voltage on the first charge pump output capacitor. Accordingly, in this case, the method may further couple the first flying capacitor and the second flying capacitor in series between the first charge pump output capacitor and ground. In the case where the method couples the first flying capacitor and the second flying capacitor in series from the first charge pump output capacitor and ground by establishing a communication path, which is included in the third communication path, from the first positively charged terminal of the first flying capacitor to the first charge pump output capacitor. Otherwise, the method may, in some embodiments, establish a communication path, which is included in the third communication path, from the second positively charged terminal of the second flying capacitor to the first charge pump output capacitor. In these cases, the method may further couple the first positively charged terminal of the first flying capacitor to the second negatively charged terminal of the second flying capacitor.

In the further case where the method couples the first flying capacitor and the second flying capacitor in series from the first charge pump output capacitor and ground, the method may further include the step of establishing a communication path, which is included in the third communication path, from the first positively charged terminal of the first flying capacitor to the first charge pump output capacitor. Also, when the method includes the step of coupling the first flying capacitor and the second flying capacitor in series from the first charge pump output capacitor and ground, the method may establishes a communication path, which is included in the third communication path, from the second positively charged terminal of the second flying capacitor to the first charge pump output capacitor. In some cases this permits the method to couple the first negatively charged terminal of the first flying capacitor to the second positively charged terminal of the second flying capacitor.

FIG. 1 depicts a first example embodiment of multiple output µC charge pump system 10A that uses two flyback capacitors to generate multiple output voltages. The multiple output µC charge pump system 10A may be configured to provide multiple supply voltages to various circuits of an electronic system.

As a first example, the multiple output µC charge pump system 10A may include a first example of a dual output µC charge pump circuit 12. The multiple output µC charge pump system 10A may include a controller 14 coupled to the dual output µC charge pump circuit 12 via a control bus 16. In some embodiments, the controller 14 may be coupled to a supply voltage sense circuit 18 via the control bus 16. The supply voltage sense circuit 18 may be configured to provide the controller 14 a measured or estimated voltage of the supply voltage 20. As an example, the supply voltage 20 may be derived from a battery 22 that provides the supply voltage 20. The supply voltage 20 provided by the battery 22 may be a battery voltage, $V_{BAT}$.

Advantageously, in some alternative embodiments, (not shown), the supply voltage sense circuit 18 may be directly coupled to controller 14. As an example, the supply voltage sense circuit 18 may be directly coupled to an interrupt input of the controller 14. As a result, this configuration may permit the controller 14 to more quickly respond to changes in the supply voltage 20.

The dual output µC charge pump circuit 12 may also be coupled to the supply voltage 20. The dual output µC charge pump circuit 12 may be configured to generate a first µC charge pump output 24 and a second µC charge pump output 26. As an example, the controller 14 may configure the dual output µC charge pump circuit 12 to generate a first µC charge pump output voltage, ($V_{\mu C\_OUT1}$), on the first µC charge pump output 24 and a second µC charge pump output voltage, ($V_{\mu C\_OUT2}$), on the second µC charge pump output 26.

In some embodiments of the multiple output µC charge pump system 10A, the controller 14 may configure the dual output µC charge pump circuit 12 such that the first µC charge pump output 24 operates in a "buck mode" of operation. In the case where the dual output µC charge pump circuit 12 operates the first µC charge pump output 24 in the buck mode of operation, the first µC charge pump output 24 provides a "bucked" output voltage level relative to the supply voltage 20 as the first µC charge pump output voltage, ($V_{\mu C\_OUT1}$). As an example, neglecting losses in the signal paths between the supply voltage 20 and the first µC charge pump output 24, when the dual output µC charge pump circuit 12 is configured by the controller 14 to operate the first µC charge pump output 24 in the buck mode of operation, the first µC charge pump output voltage, ($V_{\mu C\_OUT1}$), may have a magnitude that is equal to or less than the supply voltage 20. Illustratively, in the case where the supply voltage 20 is substantially equal to the battery voltage, $V_{BAT}$, and the first µC charge pump output 24 is configured to operate in the buck mode of operation, the first µC charge pump output voltage, ($V_{\mu C\_OUT1}$), may have a magnitude less than or equal to the battery voltage, $V_{BAT}$.

In a similar fashion, in some embodiments of the multiple output µC charge pump system 10A, the controller 14 may configure the dual output µC charge pump circuit 12 such that the second µC charge pump output 26 operates in a buck mode of operation. In the case where the dual output µC charge pump circuit 12 operates the second µC charge pump output 26 in the buck mode of operation, the second µC charge pump output 26 provides a bucked output voltage level relative to the supply voltage 20 as the second µC charge pump output voltage, ($V_{\mu C\_OUT2}$). As an example, neglecting losses in the signal paths between the supply voltage 20 and the second µC charge pump output 26, when the dual output µC charge pump circuit 12 is configured by the controller 14 to operate the second µC charge pump output 26 in the buck mode of operation, the second µC charge pump output voltage, ($V_{\mu C\_OUT2}$), may have a magnitude that is equal to or less than the supply voltage 20. Illustratively, in the case where the supply voltage 20 is substantially equal to the battery voltage, $V_{BAT}$, and the second µC charge pump output 26 is configured to operate in the buck mode of operation, the second µC charge pump output voltage, ($V_{\mu C\_OUT2}$), may have a magnitude less than or equal to the battery voltage, $V_{BAT}$.

In other embodiments of the multiple output µC charge pump system 10A, the controller 14 may configure the dual output µC charge pump circuit 12 such that the first µC charge pump output 24 operates in a "boost mode" of operation. In the case where the dual output µC charge pump circuit 12 operates the first µC charge pump output 24 in the boost mode of operation, the first µC charge pump output 24 provides a "boosted" output voltage level relative to the supply voltage 20 as the first µC charge pump output voltage, ($V_{\mu C\_OUT1}$). As an example, neglecting losses in the signal paths between the supply voltage 20 and the first µC charge pump output 24, when the dual output µC charge pump circuit 12 is configured by the controller 14 to operate the first µC charge pump output 24 in the boost mode of operation, the first µC charge pump output voltage, ($V_{\mu C\_OUT1}$), may have a magnitude that is greater than the supply voltage 20. Illustratively, in the case where the supply voltage 20 is substantially equal to the battery voltage, $V_{BAT}$, and the first µC charge pump output 24 is configured to operate in the boost mode of operation, the first µC charge pump output voltage, ($V_{\mu C\_OUT1}$), may have a magnitude that is greater than the battery voltage, $V_{BAT}$.

Likewise, in some embodiments of the multiple output µC charge pump system 10A, the controller 14 may configure the dual output µC charge pump circuit 12 such that the second µC charge pump output 26 operates in a boost mode of operation. In the case where the dual output µC charge pump circuit 12 operates the second µC charge pump output 26 in the boost mode of operation, the second µC charge pump output 26 provides the boosted output voltage level relative to the supply voltage 20 as the second µC charge pump output voltage, ($V_{\mu C\_OUT2}$). As an example, neglecting losses in the signal paths between the supply voltage 20 and the second µC charge pump output 26, when the dual output µC charge pump circuit 12 is configured by the controller 14 to operate the second µC charge pump output 26 in the boost mode of operation, the second μC charge pump output voltage, ($V_{\mu C\_OUT2}$), may have a magnitude that is greater than the supply voltage 20. Illustratively, in the case where the supply voltage 20 is substantially equal to the battery voltage, $V_{BAT}$, and the second μC charge pump output 26 is configured to operate in the boost mode of operation, the second μC charge pump output voltage, ($V_{\mu C\_OUT2}$), may have a magnitude that is greater than the battery voltage, $V_{BAT}$.

The controller 14 may configure the dual output μC charge pump circuit 12 to operate in various modes of operation. As a non-limiting example of these modes of operation, the controller 14 may configure the dual output μC charge pump circuit 12 to operate in a "buck/buck mode" of operation, a "buck/boost mode" of operation, and/or a "boost/buck mode" of operation. As one example, when the controller 14 configures the dual output μC charge pump circuit 12 to operate in the buck/buck mode of operation, the dual output μC charge pump circuit 12 operates the first μC charge pump output 24 in a buck mode of operation and the second μC charge pump output 26 in a buck mode of operation. As another example, when the controller 14 configures the dual output μC charge pump circuit 12 to operate in the buck/boost mode of operation, the dual output μC charge pump circuit 12 operates the first μC charge pump output 24 in a buck mode of operation and the second μC charge pump output 26 in a boost mode of operation. As yet another example, when the controller 14 configures the dual output μC charge pump circuit 12 to operate in the boost/buck mode of operation, the dual output μC charge pump circuit 12 operates the first μC charge pump output 24 in a boost mode of operation and the second μC charge pump output 26 in a buck mode of operation.

In some embodiments, the controller 14 may be configured to control the modes of operation of the dual output μC charge pump circuit 12 based upon the measured or estimated voltage of the supply voltage 20. Alternatively, controller 14 may be configured to control the operation of the dual output μC charge pump circuit 12 based upon an operational mode of a system or an integrated chip in which the multiple output μC charge pump system 10A is being used.

The first μC charge pump output 24 may be configured to provide the first μC charge pump output voltage, ($V_{\mu C\_OUT1}$), to a first μLDO circuit 28. The first μLDO circuit 28 may be a micro-low drop out regulator circuit. The second μC charge pump output 26 may be configured to provide the second μC charge pump output voltage, ($V_{\mu C\_OUT2}$), to a second μLDO circuit 30. The second μLDO circuit 30 may be a micro-low drop out regulator circuit.

The first μLDO circuit 28 may generate a first μLDO output 32 to provide a first μLDO output voltage, $V_{\mu LDO1}$, based upon a first μLDO reference signal 34. The first μLDO reference signal 34 may provide a first μLDO reference voltage, $V_{\mu LDO1\_REF}$, as an input to the first μLDO circuit 28. In some embodiments, the first μLDO reference voltage, $V_{\mu LDO1\_REF}$, may be based upon a first μLDO reference parameter provided by the controller 14. In other embodiments, the first μLDO reference voltage, $V_{\mu LDO1\_REF}$, may be based upon a first reference signal provided from a first external circuit (not shown).

Similarly, the second μLDO circuit 30 may generate a second μLDO output 36 to provide a second μLDO output voltage, $V_{\mu LDO2}$, based upon a second μLDO reference signal 38. The second μLDO reference signal 38 may provide a second μLDO reference voltage, $V_{\mu LDO2\_REF}$, as an input to the second μLDO circuit 30. In some embodiments, the second μLDO reference voltage, $V_{\mu LDO2\_REF}$, may be based upon a second μLDO reference parameter provided by the controller 14. In other embodiments, the second μLDO reference voltage, $V_{\mu LDO2\_REF}$, may be based upon a second reference signal provided from a second external circuit (not shown). Advantageously, this permits the first μLDO output voltage, $V_{\mu LDO1}$, and the second μLDO output voltage, $V_{\mu LDO2}$, to be independently set. In this case, the multiple output μC charge pump system 10A may optimize the voltage level provided to individual circuits.

In some embodiments, the first μLDO reference signal 34 provided as an input to the first μLDO circuit 28 and the second μLDO reference signal 38 provided as an input to the second μLDO circuit 30 may be the same. In this case, the first μLDO output voltage, $V_{\mu LDO1}$, and the second μLDO output voltage, $V_{\mu LDO2}$, may provide a substantially same output voltage level. In this case, the multiple output μC charge pump system 10A may ensure related circuits receive approximately the same supply voltage.

As further depicted in FIG. 1, the dual output μC charge pump circuit 12 includes a multiple output μC charge pump switch matrix and control circuit 40 operably coupled to a first flying capacitor 42, ($C_{FLY1}$), and a second flying capacitor 44, ($C_{FLY2}$). The first flying capacitor 42, ($C_{FLY1}$), and the second flying capacitor 44, ($C_{FLY2}$), may be either polarized or non-polarized capacitors. The first flying capacitor 42, ($C_{FLY1}$), includes a first terminal 42A and a second terminal 42B. The second flying capacitor 44, ($C_{FLY2}$), includes a first terminal 44A and a second terminal 44B. During operation of the dual output μC charge pump circuit 12, a first flying capacitor voltage, ($V_{CAP\_FLY1}$), may be developed across the first flying capacitor 42, ($C_{FLY1}$). Likewise, a second flying capacitor voltage, ($V_{CAP\_FLY2}$), may be developed across the second flying capacitor 44, ($C_{FLY2}$).

The multiple output μC charge pump switch matrix and control circuit 40 may include the first μC charge pump output 24 coupled to a first μC charge pump output capacitor 46, ($C_{\mu C\_OUT1}$). The multiple output μC charge pump switch matrix and control circuit 40 may further include the second μC charge pump output 26 coupled to a second μC charge pump output capacitor 48, ($C_{\mu C\_OUT2}$).

As will be described below, during operation of the dual output μC charge pump circuit 12, the multiple output μC charge pump switch matrix and control circuit 40 may operably couple the first flying capacitor 42, ($C_{FLY1}$), and the second flying capacitor 44, ($C_{FLY2}$), in various series and parallel configurations between the supply voltage 20, the first μC charge pump output 24, the second μC charge pump output 26, and ground to transfer charge from the supply voltage 20 to the first μC charge pump output capacitor 46, ($C_{\mu C\_OUT1}$), and the second μC charge pump output capacitor 48, ($C_{\mu C\_OUT2}$). The charge stored on the first μC charge pump output capacitor 46, ($C_{\mu C\_OUT1}$), may provide the first μLDO output voltage, $V_{\mu LDO1}$, on the first μC charge pump output 24. The charge stored on the second μC charge pump output capacitor 48, ($C_{\mu C\_OUT2}$), may provide the second μLDO output voltage, $V_{\mu LDO2}$, on the second μC charge pump output 26. In some embodiments of the dual output μC charge pump circuit 12, more than two flying capactiors may be used to generate the first μC charge pump output voltage, ($V_{\mu C\_OUT1}$), on the first μC charge pump output 24 and the second μC charge pump output voltage, ($V_{\mu C\_OUT2}$), on the second μC charge pump output 26. However, advantageously, as depicted in FIG. 1A, and to be described, the various embodiments of the dual output μC charge pump circuit 12 described herein may be configured to generate the desired output voltage levels, namely the first μC charge pump output voltage, ($V_{\mu C\_OUT1}$), on the first μC charge pump output 24 and the second μC charge pump output voltage, ($V_{\mu C\_OUT2}$), on the second μC charge pump output 26, using only the first flying capacitor 42, ($C_{FLY1}$), and the second flying capacitor 44, ($C_{FLY2}$). It may be appreciated that those embodiment of the dual output μC charge pump circuit 12 that only use the first flying capacitor 42, ($C_{FLY1}$), and the second flying capacitor 44, ($C_{FLY2}$), to generate the desired output voltage levels on the first μC charge pump output 24 and the second μC charge pump output 26 may provide improved technical performance due to reduced complexity and reduced response time verses those embodiments that include more than two flying capacitors.

In some embodiments, the first μLDO output voltage, $V_{\mu LDO1}$, on the first μC charge pump output 24, and the second μLDO output voltage, $V_{\mu LDO2}$, on the second μC charge pump output 26 are provided directly to one or more circuits. In alternative embodiments, the first μLDO output voltage, $V_{\mu LDO1}$, on the first μC charge pump output 24, and the second μLDO output voltage, $V_{\mu LDO2}$, may advantageously be further regulated by one or more micro-low drop out regulator circuits to provide separate supply outputs. Advantageously, the use of the one or more micro-low drop out regulator circuits permits a single μC charge pump output to provide multiple regulated voltage supplies to meet the needs of various circuits in an electronic integrated chip. As an example, one of the multiple regulated voltage supplies may be used to power a first digital logic circuit that uses a first supply voltage while another of the multiple regulated voltage supplies a second digital logic circuit or a microprocessor that uses a second supply voltage, where the magnitude of the first supply voltage differs from the magnitude of the second supply voltage.

As an example, the multiple output μC charge pump system 10A depicted in FIG. 1A further includes a first μLDO circuit 28, that provides a first μLDO output voltage, $V_{\mu LDO1}$, based on the first μC charge pump output voltage, ($V_{\mu C\_OUT1}$), as a first μLDO output 32. The multiple output μC charge pump system 10A depicted in FIG. 1A also includes a second μLDO circuit 30, that provides a second μLDO output voltage, $V_{\mu LDO2}$, based on the second μC charge pump output voltage, ($V_{\mu C\_OUT2}$), as a second μLDO output 36.

In still other embodiments, additional micro-low drop out regulator circuits may be coupled to the various μC charge pump outputs to generate additional post regulated output supply voltages. As an example, (not depicted in FIG. 10A), some embodiments may include two or more micro-low drop out regulator circuits providing independent output voltage levels based upon one of the μC charge pump outputs.

The first μLDO circuit 28 may include a first power field effect transistor 50, a first error amplifier 52, a first resistor 54, and a second resistor 56. The first power field effect transistor 50 may include a first terminal 50A, a second terminal 50B, and a control terminal 50C, The first error amplifier 52 may include a non-inverting error amplifier input 52A, an inverting error amplifier input 52B, and an error amplifier output 52C. The first resistor 54 may have a first resistance $R_1$. The second resistor 56 may have a second resistance $R_2$.

The first terminal 50A of the first power field effect transistor 50 may be coupled to the first μC charge pump output 24. The second terminal 50B of the first power field effect transistor 50 may be coupled to the first μLDO output 32 and a first resistor terminal of the first resistor 54. The control terminal 50C of the first power field effect transistor 50 may be coupled to the error amplifier output 52C of the first error amplifier 52. The non-inverting error amplifier input 52A of the first error amplifier 52 may be coupled to the first μLDO reference signal 34 and configured to receive the first μLDO reference voltage, $V_{\mu LDO1\_REF}$.

The second terminal of the first resistor 54 may be coupled to the non-inverting error amplifier input 52A of the first error amplifier 52 such that the first resistor 54 is coupled between the second terminal 50B of the first power field effect transistor 50 and the non-inverting error amplifier input 52A of the first error amplifier 52. The first terminal of the second resistor 56 may be coupled to the second terminal of the first resistor 54 and the non-inverting error amplifier input 52A of the first error amplifier 52. The second terminal of the second resistor 56 may be coupled to ground. As a result, the first resistor 54 and the second resistor 56 may form a first resistor divider network configured to provide a first feedback signal to the non-inverting error amplifier input 52A of the first error amplifier 52.

The magnitude of the first feedback signal may be based on the first μLDO output voltage, $V_{\mu LDO1}$, and a first ratio of the first resistor divider network created by the first resistor 54 and the second resistor 56. The first ratio of the first resistor divider network may be based on the ratio of the first resistance, $R_1$, of the first resistor 54 to the second resistance, $R_2$, of the second resistor 56.

Operationally, the first μLDO circuit 28 may regulate the first μLDO output voltage, $V_{\mu LDO1}$, provided as the first μLDO output 32 based on the first μLDO reference voltage, $V_{\mu LDO1\_REF}$, and the first feedback signal provided to the non-inverting error amplifier input 52A of the first error amplifier 52, where the first feedback signal is based on the ratio of the first resistance, $R_1$, of the first resistor 54 to the second resistance, $R_2$, of the second resistor 56.

The second μLDO circuit 30 may include a second power field effect transistor 58, a second error amplifier 60, a third resistor 62, and a fourth resistor 64. The second power field effect transistor 58 may include a first terminal 58A, a second terminal 58B, and a control terminal 58C, The second error amplifier 60 may include a non-inverting error amplifier input 60A, an inverting error amplifier input 60B, and an error amplifier output 60C. The third resistor 62 may have a third resistance $R_3$. The fourth resistor 64 may have a fourth resistance $R_4$.

The first terminal 58A of the second power field effect transistor 58 may be coupled to the second μC charge pump output 26. The second terminal 58B of the second power field effect transistor 58 may be coupled to the second μLDO output 36 and a first resistor terminal of the third resistor 62. The control terminal 58C of the second power field effect transistor 58 may be coupled to the error amplifier output 60C of the second error amplifier 60. The non-inverting error amplifier input 60A of the second error amplifier 60 may be coupled to the second μLDO reference signal 38 and configured to receive the second μLDO reference voltage, $V_{\mu LDO2\_REF}$.

The second terminal of the third resistor 62 may be coupled to the non-inverting error amplifier input 60A of the second error amplifier 60 such that the third resistor 62 is coupled between the second terminal 58B of the second power field effect transistor 58 and the non-inverting error amplifier input 60A of the second error amplifier 60. The first terminal of the fourth resistor 64 may be coupled to the second terminal of the third resistor 62 and the non-inverting error amplifier input 60A of the second error amplifier 60. The second terminal of the fourth resistor 64 may be coupled to ground. As a result, the third resistor 62 and the fourth resistor 64 may form a second resistor divider network configured to provide a second feedback signal to the non-inverting error amplifier input 60A of the second error amplifier 60.

The magnitude of the second feedback signal may be based on the second μLDO output voltage, $V_{\mu LDO2}$, and the second ratio of the second resistor divider network created by the third resistor 62 and the fourth resistor 64. The second ratio of the second resistor divider network may be based on the ratio of the third resistance, $R_3$, of the third resistor 62 to the fourth resistance, $R_4$, of the fourth resistor 64.

Operationally, the second μLDO circuit 30 operates similarly to the first μLDO circuit 28. The second μLDO circuit 30 may regulate the second μLDO output voltage, $V_{\mu LDO2}$, provided as the second μLDO output 36, based on the second μLDO reference voltage, $V_{\mu LDO2\_REF}$, and the second feedback signal provided to the non-inverting error amplifier input 60A of the second error amplifier 60, where the second feedback signal is based on the ratio of the third resistance, $R_3$, of the third resistor 62 to the fourth resistance, $R_4$, of the fourth resistor 64.

The multiple output μC charge pump system 10A may further include a μC charge pump clock circuit 66. The μC charge pump clock circuit 66 generates a μC charge pump clock 68, which is provided to the multiple output μC charge pump switch matrix and control circuit 40. The multiple output μC charge pump switch matrix and control circuit 40 uses the μC charge pump clock 68 to govern the operation of the dual output μC charge pump circuit 12. The controller 14 may be coupled to the μC charge pump clock circuit 66 via the control bus 16. The controller 14 may be configured to place the μC charge pump clock circuit 66 in various operational modes. In addition, the μC charge pump clock circuit 66 may be configured to generate the μC charge pump clock 68 based upon various reference clock sources. As a non-limiting list of examples, the various refence clock sources used to generate the μC charge pump clock 68 may include a frequency locked loop (FLL) circuit, a reference clock from a sub-system of an integrated chip, a power supply system or a power management system. In still other embodiments, the various refence clock sources may be derived from a fixed reference oscillator, a variable oscillator, a voltage controlled oscillator, a programmable controlled oscillator, and/or a clock divider circuit. As another example, in some embodiments, the various reference clock sources may be dividing, multiplying, or a combination there of, to generate the μC charge pump clock 68. In other embodiments, (not shown), the controller 14, may advantageously be directly coupled to the μC charge pump clock circuit 66 in order to allow the controller 14 to directly control the operation of the μC charge pump clock circuit 66. Advantageously, when the μC charge pump clock circuit 66 is directly coupled to the controller 14, the controller more directly controls the μC charge pump clock circuit 66 without the protocol overhead sometimes associated with a shared control bus.

Figure 2A:
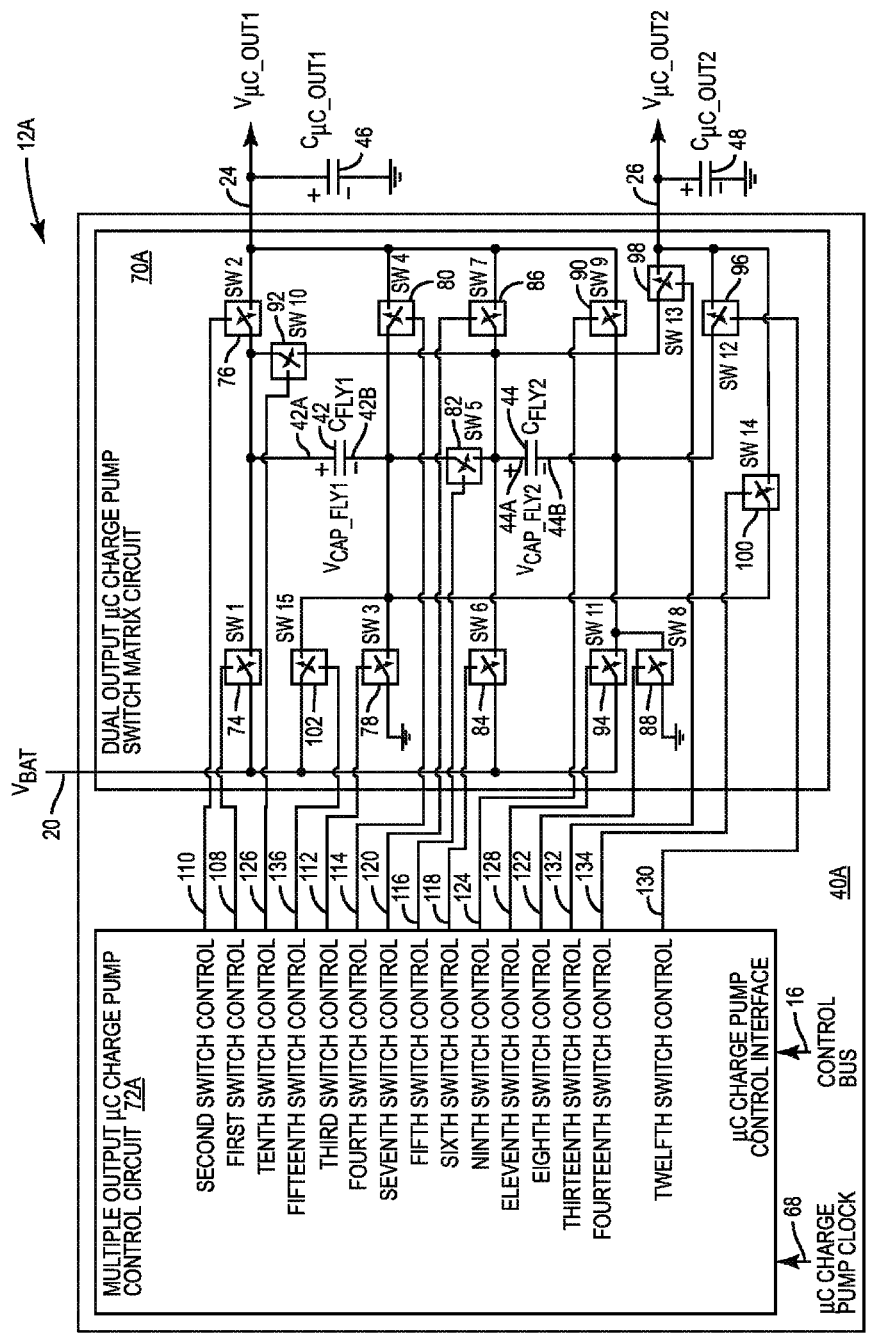
FIG. 2A depicts a first embodiment of a dual output μC charge pump circuit 12A.

FIG. 2A depicts a first embodiment of the dual output μC charge pump circuit 12 depicted in FIG. 1A as a dual output μC charge pump circuit 12A. For the sake of convenience, and not by way of limitation, the dual output μC charge pump circuit 12A is described with continuing reference to various elements of the first embodiment of the multiple output μC charge pump system 10A depicted in FIG. 1A including, but not limited to, the controller 14, control bus 16, the supply voltage sense circuit 18, the supply voltage 20, the battery 22, the μC charge pump clock circuit 66, the μC charge pump clock 68, the first μLDO circuit 28, the second μLDO circuit 30, the first flying capacitor 42, ($C_{FLY1}$), and the second flying capacitor 44, ($C_{FLY2}$).

The dual output μC charge pump circuit 12A includes a multiple output μC charge pump switch matrix and control circuit 40A. The multiple output μC charge pump switch matrix and control circuit 40A may include a dual output μC charge pump switch matrix circuit 70A and a multiple output μC charge pump control circuit 72A. The multiple output μC charge pump control circuit 72A may include a μC charge pump control interface operably coupled to the control bus 16. Similar to the dual output μC charge pump circuit 12 of FIG. 1A, the controller 14 may configure the dual output μC charge pump circuit 12A to operate in various modes of operation via the control bus 16. As a non-limiting example, similar to the dual output μC charge pump circuit 12 of FIG. 1A, the dual output μC charge pump circuit 12A of FIG. 2A may be configured by the controller 14 to operate in a "buck/buck mode" of operation, a "buck/boost mode" of operation, and/or a "boost/buck mode" of operation. In addition, multiple output μC charge pump control circuit 72A may be further configured to receive the μC charge pump clock 68 from the μC charge pump clock circuit 66.

The dual output μC charge pump switch matrix circuit 70A may be configured by the multiple output μC charge pump control circuit 72A to generate the first μC charge pump output voltage, ($V_{\mu C\_OUT1}$), on the first μC charge pump output 24 and the second μC charge pump output voltage, ($V_{\mu C\_OUT2}$), on the second μC charge pump output 26 based on a selected mode of operation of the dual output μC charge pump circuit 12A.

To simplify the description of the operation of the dual output μC charge pump circuit 12A and the operation of the dual output μC charge pump switch matrix circuit 70A, FIG. 2A depicts the first flying capacitor 42, ($C_{FLY1}$), the second flying capacitor 44, ($C_{FLY2}$), as being incorporated into the dual output μC charge pump switch matrix circuit 70A. In addition, as discussed above relative to the dual output μC charge pump circuit 12, depicted in FIG. 1A, some embodiments of dual output μC charge pump circuit 12 may include and use more than two flying capactiors to generate the first μC charge pump output voltage, ($V_{\mu C\_OUT1}$), on the first μC charge pump output 24 and the second μC charge pump output voltage, ($V_{\mu C\_OUT2}$), on the second μC charge pump output 26. However, advantageously, as depicted in FIG. 2A, and to be described with respect to the modes of operation of the dual output μC charge pump circuit 12A depicted in FIG. 2A and described below, some embodiments of the dual output μC charge pump circuit 12A may be configured to generate the desired output voltage levels, namely the first μC charge pump output voltage, ($V_{\mu C\_OUT1}$), on the first μC charge pump output 24 and the second μC charge pump output voltage, ($V_{\mu C\_OUT2}$), on the second μC charge pump output 26, using only the first flying capacitor 42, ($C_{FLY1}$), and the second flying capacitor 44, ($C_{FLY2}$). In other words, as will be described below, some embodiments of the dual output μC charge pump circuit 12A may be configured to generate the variously described output voltage levels corresponding to a "buck/buck mode" of operation, a "buck/boost mode" of operation, and/or a "boost/buck mode" of operation using only the first flying capacitor 42, ($C_{FLY1}$), and the second flying capacitor 44, ($C_{FLY2}$). It may be appreciated that those embodiment of the dual output μC charge pump circuit 12A that only use the first flying capacitor 42, ($C_{FLY1}$), and the second flying capacitor 44, ($C_{FLY2}$), to generate the desired output voltage levels on the first μC charge pump output 24 and the second µC charge pump output 26 may provide improved technical performance due to reduced complexity and reduced response time verses embodiments that include more than two flying capacitors.

The dual output µC charge pump switch matrix circuit 70A may include the first flying capacitor 42, ($C_{FLY1}$), the second flying capacitor 44, ($C_{FLY2}$), a first switch 74, (SW 1), a second switch 76, (SW 2), a third switch 78, (SW 3), a fourth switch 80, (SW 4), a fifth switch 82, (SW 5), a sixth switch 84, (SW 6), a seventh switch 86, (SW 7), an eighth switch 88, (SW 8), a ninth switch 90, (SW 9), a tenth switch 92, (SW 10), an eleventh switch 94, (SW 11), a twelfth switch 96, (SW 12), a thirteenth switch 98, (SW 13), a fourteenth switch 100, (SW 14), and a fifteenth switch 102, (SW 15).

In some embodiments of the dual output µC charge pump switch matrix circuit 70A, the first switch 74, (SW 1), the second switch 76, (SW 2), the third switch 78, (SW 3), the fourth switch 80, (SW 4), the fifth switch 82, (SW 5), the sixth switch 84, (SW 6), the seventh switch 86, (SW 7), the eighth switch 88, (SW 8), the ninth switch 90, (SW 9), the tenth switch 92, (SW 10), the eleventh switch 94, (SW 11), the twelfth switch 96, (SW 12), the thirteenth switch 98, (SW 13), the fourteenth switch 100, (SW 14), and the fifteenth switch 102, (SW 15), include solid state based switches, micro-electromechanical systems (MEMS) contact based switches, or combinations thereof. Illustratively, as a non-limiting example, solid state based switches may include field effect transistors, insulator-on-semiconductor based transistors, bipolar based transistors, and/or a combination thereof. The example solid state based switches may be fabricated using various semiconductor device fabrication processes, techniques, and materials. As an example, some solid state based switches may be based on a gallium nitride (GaN) process. In some embodiments, gallium nitride metal/oxide semiconductor field-effect transistors may be used to create the solid state switches. In still other embodiments, the gallium nitride metal/oxide semiconductor field-effect transistors may be a gallium nitride field effect transistor. As an example, the gallium nitride field effect transistor may be an enhancement mode gallium nitride metal-oxide-semiconductor field-effect transistor (MOSFET). [Nadim: what other processes could you invision being used?]

Returning to the description of the multiple output µC charge pump control circuit 72A, the multiple output µC charge pump control circuit 72A may further include a first switch control configured to provide a first switch control signal 108 to the first switch 74, (SW 1), to control the operation of the first switch 74, (SW 1), a second switch control configured to provide a second switch control signal 110 to the second switch 76, (SW 2), to control the operation of the second switch 76, (SW 2), a third switch control configured to provide a third switch control signal 112 to the third switch 78, (SW 3), to control the operation of the third switch 78, (SW 3), a fourth switch control configured to provide a fourth switch control signal 114 to the fourth switch 80, (SW 4), to control the operation of the fourth switch 80, (SW 4), a fifth switch control configured to provide a fifth switch control signal 116 to the fifth switch 82, (SW 5), to control the operation of the fifth switch 82, (SW 5), a sixth switch control configured to provide a sixth switch control signal 118 to the sixth switch 84, (SW 6), to control the operation of the sixth switch 84, (SW 6), a seventh switch control configured to provide a seventh switch control signal 120 to the seventh switch 86, (SW 7), to control the operation of the seventh switch 86, (SW 7), an eighth switch control configured to provide an eighth switch control signal 122 to the eighth switch 88, (SW 8), to control the operation of the eighth switch 88, (SW 8), a ninth switch control configured to provide a ninth switch control signal 124 to the ninth switch 90, (SW 9), to control the operation of the ninth switch 90, (SW 9), a tenth switch control configured to provide a tenth switch control signal 126 to the tenth switch 92, (SW 10), to control the operation of the tenth switch 92, (SW 10), an eleventh switch control configured to provide an eleventh switch control signal 128 to the eleventh switch 94, (SW 11), to control the operation of the eleventh switch 94, (SW 11), a twelfth switch control configured to provide a twelfth switch control signal 130 to the twelfth switch 96, (SW 12), to control the operation of the twelfth switch 96, (SW 12), a thirteenth switch control configured to provide a thirteenth switch control signal 132 to the thirteenth switch 98, (SW 13), to control the operation of the thirteenth switch 98, (SW 13), a fourteenth switch control configured to provide a fourteenth switch control signal 134 to the fourteenth switch 100, (SW 14), to control the operation of the fourteenth switch 100, (SW 14), and a fifteenth switch control configured to provide a fifteenth switch control signal 136 to the fifteenth switch 102, (SW 15), to control the operation of the fifteenth switch 102, (SW 15).

The first switch 74, (SW 1), may be coupled between the supply voltage 20 and the first terminal 42A of the first flying capacitor 42, ($C_{FLY1}$), The first switch 74, (SW 1), may include a first switch control input configured to receive the first switch control signal 108 from the multiple output µC charge pump control circuit 72A. The multiple output µC charge pump control circuit 72A may configure the first switch control signal 108 to operably open and close the first switch 74, (SW 1), based upon the various modes of operation of the dual output µC charge pump circuit 12A.

The second switch 76, (SW 2), may be coupled between the first terminal 42A of the first flying capacitor 42, ($C_{FLY1}$), and the first µC charge pump output 24. The second switch 76, (SW 2), may include a second switch control input configured to receive the second switch control signal 110 from the multiple output µC charge pump control circuit 72A. The multiple output µC charge pump control circuit 72A may configure the second switch control signal 110 to operably open and close the second switch 76, (SW 2), based upon the various modes of operation of the dual output µC charge pump circuit 12A.

The third switch 78, (SW 3), may be coupled between the second terminal 42B of the first flying capacitor 42, ($C_{FLY1}$), and ground. The third switch 78, (SW 3), may include a third switch control input configured to receive the third switch control signal 112 from the multiple output µC charge pump control circuit 72A. The multiple output µC charge pump control circuit 72A may configure the third switch control signal 112 to operably open and close the third switch 78, (SW 3), based upon the various modes of operation of the dual output µC charge pump circuit 12A.

The fourth switch 80, (SW 4), may be coupled between the second terminal 42B of the first flying capacitor 42, ($C_{FLY1}$), and the first µC charge pump output 24. The fourth switch 80, (SW 4), may include a fourth switch control input configured to receive the fourth switch control signal 114 from the multiple output µC charge pump control circuit 72A. The multiple output µC charge pump control circuit 72A may configure the fourth switch control signal 114 to operably open and close the fourth switch 80, (SW 4), based upon the various modes of operation of the dual output µC charge pump circuit 12A.

The fifth switch 82, (SW 5), may be coupled between the second terminal 42B of the first flying capacitor 42, ($C_{FLY1}$), and the first terminal 44A of the second flying capacitor 44, ($C_{FLY2}$), The fifth switch 82, (SW 5), may include a fifth switch control input configured to receive the fifth switch control signal 116 from the multiple output μC charge pump control circuit 72A. The multiple output μC charge pump control circuit 72A may configure the fifth switch control signal 116 to operably open and close the fifth switch 82, (SW 5), based upon the various modes of operation of the dual output μC charge pump circuit 12A.

The sixth switch 84, (SW 6), may be coupled between the first terminal 44A of the second flying capacitor 44, ($C_{FLY2}$), and the supply voltage 20. The sixth switch 84, (SW 6), may include a sixth switch control input configured to receive the sixth switch control signal 118 from the multiple output μC charge pump control circuit 72A. The multiple output μC charge pump control circuit 72A may configure the sixth switch control signal 118 to operably open and close the sixth switch 84, (SW 6), based upon the various modes of operation of the dual output μC charge pump circuit 12A.

The seventh switch 86, (SW 7), may be coupled between the first terminal 44A of the second flying capacitor 44, ($C_{FLY2}$), and the first μC charge pump output 24. The seventh switch 86, (SW 7), may include a seventh switch control input configured to receive the seventh switch control signal 120 from the multiple output μC charge pump control circuit 72A. The multiple output μC charge pump control circuit 72A may configure the seventh switch control signal 120 to operably open and close the seventh switch 86, (SW 7), based upon the various modes of operation of the dual output μC charge pump circuit 12A.

The eighth switch 88, (SW 8), may be coupled between the second terminal 44B of the second flying capacitor 44, ($C_{FLY2}$), and ground. The eighth switch 88, (SW 8), may include an eighth switch control input configured to receive the eighth switch control signal 122 from the multiple output μC charge pump control circuit 72A. The multiple output μC charge pump control circuit 72A may configure the eighth switch control signal 122 to operably open and close the eighth switch 88, (SW 8), based upon the various modes of operation of the dual output μC charge pump circuit 12A.

The ninth switch 90, (SW 9), may be coupled between the second terminal 44B of the second flying capacitor 44, ($C_{FLY2}$), and the first μC charge pump output 24. The ninth switch 90, (SW 9), may include a ninth switch control input configured to receive the ninth switch control signal 124 from the multiple output μC charge pump control circuit 72A. The multiple output μC charge pump control circuit 72A may configure the ninth switch control signal 124 to operably open and close the ninth switch 90, (SW 9), based upon the various modes of operation of the dual output μC charge pump circuit 12A.

The tenth switch 92, (SW 10), may be coupled between the first terminal 42A of the first flying capacitor 42, ($C_{FLY1}$), and the first terminal 44A of the second flying capacitor 44, ($C_{FLY2}$). The tenth switch 92, (SW 10), may include a tenth switch control input configured to receive the tenth switch control signal 126 from the multiple output μC charge pump control circuit 72A. The multiple output μC charge pump control circuit 72A may configure the tenth switch control signal 126 to operably open and close the tenth switch 92, (SW 10), based upon the various modes of operation of the dual output μC charge pump circuit 12A.

The eleventh switch 94, (SW 11), may be coupled between the second terminal 44B of the second flying capacitor 44, ($C_{FLY2}$), and the supply voltage 20. The eleventh switch 94, (SW 11), may include an eleventh switch control input configured to receive the eleventh switch control signal 128 from the multiple output μC charge pump control circuit 72A. The multiple output μC charge pump control circuit 72A may configure the eleventh switch control signal 128 to operably open and close the eleventh switch 94, (SW 11), based upon the various modes of operation of the dual output μC charge pump circuit 12A.

The twelfth switch 96, (SW 12), may be coupled between the second terminal 44B of the second flying capacitor 44, ($C_{FLY2}$), and the second μC charge pump output 26. The twelfth switch 96, (SW 12), may include a twelfth switch control input configured to receive the twelfth switch control signal 130 from the multiple output μC charge pump control circuit 72A. The multiple output μC charge pump control circuit 72A may configure the twelfth switch control signal 130 to operably open and close the twelfth switch 96, (SW 12), based upon the various modes of operation of the dual output μC charge pump circuit 12A.

The thirteenth switch 98, (SW 13), may be coupled between the first terminal 44A of the second flying capacitor 44, ($C_{FLY2}$), and the second μC charge pump output 26. The thirteenth switch 98, (SW 13), may include a thirteenth switch control input configured to receive the thirteenth switch control signal 132 from the multiple output μC charge pump control circuit 72A. The multiple output μC charge pump control circuit 72A may configure the thirteenth switch control signal 132 to operably open and close the thirteenth switch 98, (SW 13), based upon the various modes of operation of the dual output μC charge pump circuit 12A.

The fourteenth switch 100, (SW 14), may be coupled between the second terminal 42B of the first flying capacitor 42, ($C_{FLY1}$), and the second μC charge pump output 26. The fourteenth switch 100, (SW 14), may include a fourteenth switch control input configured to receive the fourteenth switch control signal 134 from the multiple output μC charge pump control circuit 72A. The multiple output μC charge pump control circuit 72A may configure the fourteenth switch control signal 134 to operably open and close the fourteenth switch 100, (SW 14), based upon the various modes of operation of the dual output μC charge pump circuit 12A.

The fifteenth switch 102, (SW 15), may be coupled between the second terminal 42B of the first flying capacitor 42, ($C_{FLY1}$), and the supply voltage 20. The fifteenth switch 102, (SW 15), may include a fifteenth switch control input configured to receive the fifteenth switch control signal 136 from the multiple output μC charge pump control circuit 72A. The multiple output μC charge pump control circuit 72A may configure the fifteenth switch control signal 136 to operably open and close the fifteenth switch 102, (SW 15), based upon the various modes of operation of the dual output μC charge pump circuit 12A.

Numerous example embodiments of the modes of operation of the dual output μC charge pump circuit 12A, depicted in FIG. 2A, will now be described. These example embodiments of the modes of operation of the dual output μC charge pump circuit 12A are by illustration and not by limitation. For example, various other modes of operation of the dual output μC charge pump circuit 12A may be used to generate different magnitudes of the first μC charge pump output voltage, ($V_{\mu C\_OUT1}$), on the first μC charge pump output 24 and the second μC charge pump output voltage, ($V_{\mu C\_OUT2}$), on the second μC charge pump output 26 are described herein. These additional various other modes of operation of the dual output μC charge pump circuit 12A, as would be evident to one of ordinary skill in the art, are thereby included herein. In addition, for the sake of clarity and brevity, the foregoing description of the modes of operation of the dual output µC charge pump circuit 12A, depicted in FIG. 2A, will be accomplished by describing a configuration where the supply voltage 20 is derived from the battery 22 and has a voltage level substantially equal to the battery voltage, $V_{BAT}$. The description of the modes of operation of the dual output µC charge pump circuit 12A based on a configuration where the supply voltage 20 is derived from the battery 22 is not by way of limitation and only meant to aid the understanding of the modes of operation of the dual output µC charge pump circuit 12A and the ratios between the first µC charge pump output voltage, ($V_{\mu C\_OUT1}$), generated on the first µC charge pump output 24 to voltage level of the supply voltage 20 and the ratios between the second µC charge pump output voltage, ($V_{\mu C\_OUT2}$), generated on the second µC charge pump output 26 to the voltage level of the supply voltage 20. Accordingly, it will be understood that the use of the battery voltage, $V_{BAT}$, as an example of the supply voltage 20, is for illustrative convenience and not by limitation.

A non-limiting set of example opererational modes of the dual output µC charge pump circuit 12A will now be discussed with reference to various tables, provided herein. Example operational modes of the dual output µC charge pump circuit 12A may include one or more buck/buck modes of operation, one or more buck/boost modes of operation, and/or one or more boost/buck modes of operation.

Illustratively, TABLE 1A, entitled "MODES OF OPERATION TABLE FOR BUCK/BUCK OPERATION OF A DUAL OUTPUT µC CHARGE PUMP CIRCUIT," describes, in tablulated form, several, non-limiting, example modes of operation of the dual output µC charge pump circuit 12A configured to operate in a buck/buck mode of operation. The described non-limiting example modes of Buck/Buck modes of operation include: a First ($1^{st}$) Buck/Buck Mode, a Second ($2^{nd}$) Buck/Buck Mode, a Third ($3^{rd}$) Buck/Buck Mode, a Fourth ($4^{th}$) Buck/Buck Mode, a Fifth ($5^{th}$) Buck/Buck Mode, and an OFF Mode. In addition, although not described in detail below, it will be understood that the dual output µC charge pump circuit 12A may be further configured to operate in addition buck/buck modes of operation, as described in TABLE 1B, entitled "MODES OF OPERATION TABLE FOR BUCK/BUCK OPERATION OF A DUAL OUTPUT µC CHARGE PUMP CIRCUIT." These addition, non-limiting examples, of Buck/Buck modes of operation may include: a Sixth ($6^{th}$) Buck/Buck Mode, a Seventh ($7^{th}$) Buck/Buck Mode, an Eighth ($8^{th}$) Buck/Buck Mode, a Ninth ($9^{th}$) Buck/Buck Mode, and a Tenth ($10^{th}$) Buck/Buck Mode.

As depicted in TABLE 1A, each example mode of operation corresponds to an operational ratio, ($x\mu BB_{RATIO}$), of the dual output µC charge pump circuit 12A, where the operational ratio, ($x\mu BB_{RATIO}$), may provide a relationship between the first µC charge pump output voltage, ($V_{\mu C\_OUT1}$), generated by the first µC charge pump output 24 and the second µC charge pump output voltage, ($V_{\mu C\_OUT2}$), generated by the second µC charge pump output 26. The operational ratio, ($x\mu BB_{RATIO}$), may be an operational ratio parameter that is configured by the controller 14 and stored locally in the multiple output µC charge pump control circuit 72A.

As described in Table 1A, the dual output µC charge pump circuit 12A is configured to generate a first µC charge Pump output, ($V_{\mu C\_OUT1}$) such that $V_{\mu C\_OUT1}=(x\mu BB_{RATIO})\times V_{BAT}$, where $V_{BAT}$ is used to represent the magnitude of the voltage on the supply voltage 20. In addition, the dual output µC charge pump circuit 12A is further configured to generate a second µC charge Pump output, ($V_{\mu C\_OUT2}$) such that $V_{\mu C\_OUT2}=(1-x\mu BB_{RATIO})\times V_{BAT}$, where $V_{BAT}$ is used to represent the magnitude of the voltage on the supply voltage 20

Accordingly, in the First Buck/Buck Mode of operation of the dual output µC charge pump circuit 12A, the controller 14 configures the multiple output µC charge pump control circuit 72A to use an operational ratio, ($x\mu BB_{RATIO}$), set to 1/4. As a result, the first µC charge pump output 24 generates a first µC charge pump output voltage, ($V_{\mu C\_OUT1}$), substantially equal to $1/4\times V_{BAT}$, and the second µC charge pump output 26 generates a second µC charge pump output voltage, ($V_{\mu C\_OUT2}$), substantially equal to $3/4\times V_{BAT}$. In the Second Buck/Buck Mode of operation of the dual output µC charge pump circuit 12A, the controller 14 configures the multiple output µC charge pump control circuit 72A to use an operational ratio, ($x\mu BB_{RATIO}$), set to 1/3. As a result, the first µC charge pump output 24 generates a first µC charge pump output voltage, ($V_{\mu C\_OUT1}$), substantially equal to $1/3\times V_{SAT}$, and the second µC charge pump output 26 generates a second µC charge pump output voltage, ($V_{\mu C\_OUT2}$), substantially equal to $2/3\times V_{BAT}$. In the Third Buck/Buck Mode of operation of the dual output µC charge pump circuit 12A, the controller 14 configures the multiple output µC charge pump control circuit 72A to use an operational ratio, ($x\mu BB_{RATIO}$), set to 1/2. As a result, the first µC charge pump output 24 generates a first µC charge pump output voltage, ($V_{\mu C\_OUT1}$), substantially equal to $1/2\times V_{SAT}$, and the second µC charge pump output 26 generates a second µC charge pump output voltage, ($V_{\mu C\_OUT2}$), substantially equal to $1/2\times V_{BAT}$. In the Fourth Buck/Buck Mode of operation of the dual output µC charge pump circuit 12A, the controller 14 configures the multiple output µC charge pump control circuit 72A to use an operational ratio, ($x\mu BB_{RATIO}$), set to 2/3. As a result, the first µC charge pump output 24 generates a first µC charge pump output voltage, ($V_{\mu C\_OUT1}$), substantially equal to $2/3\times V_{BAT}$, and the second µC charge pump output 26 generates a second µC charge pump output voltage, ($V_{\mu C\_OUT2}$), substantially equal to $1/3\times V_{BAT}$. In the Fifth Buck/Buck Mode of operation of the dual output µC charge pump circuit 12A, the controller 14 configures the multiple output µC charge pump control circuit 72A to use an operational ratio, ($x\mu BB_{RATIO}$), set to 3/4. As a result, the first µC charge pump output 24 generates a first µC charge pump output voltage, ($V_{\mu C\_OUT1}$), substantially equal to $3/4\times V_{BAT}$, and the second µC charge pump output 26 generates a second µC charge pump output voltage, ($V_{\mu C\_OUT2}$), substantially equal to $1/4\times V_{BAT}$. In the OFF Mode of operation of the dual output µC charge pump circuit 12A, the controller 14 configures the first µC charge pump output 24 to float and the second µC charge pump output 26 to float.

TABLE 1A

MODES OF OPERATION TABLE FOR BUCK/BUCK OPERATION
OF A DUAL OUTPUT µC CHARGE PUMP CIRCUIT

| MODES OF OPERATION | OPERATIONAL RATIOS, $(x\mu BB_{RATIO})$ | FIRST µC CHARGE PUMP OUTPUT, $(V_{\mu C\_OUT1})$, where $V_{\mu C\_OUT1} = (x\mu BB_{RATIO}) \times V_{BAT}$ | SECOND µC CHARGE PUMP OUTPUT, $(V_{\mu C\_OUT2})$, where $V_{\mu C\_OUT2} = (1 - x\mu BB_{RATIO}) \times V_{BAT}$ |
|---|---|---|---|
| First Buck/Buck Mode | 1/4 | $1/4 \times V_{BAT}$ | $3/4 \times V_{BAT}$ |
| Second Buck/Buck Mode | 1/3 | $1/3 \times V_{BAT}$ | $2/3 \times V_{BAT}$ |
| Third Buck/Buck Mode | 1/2 | $1/2 \times V_{BAT}$ | $1/2 \times V_{BAT}$ |
| Fourth Buck/Buck Mode | 2/3 | $2/3 \times V_{BAT}$ | $1/3 \times V_{BAT}$ |
| Fifth Buck/Buck Mode | 3/4 | $3/4 \times V_{BAT}$ | $1/4 \times V_{BAT}$ |
| OFF Mode | OFF | FLOATING | FLOATING |

TABLE 1B

MODES OF OPERATION TABLE FOR BUCK/BUCK OPERATION
OF A DUAL OUTPUT µC CHARGE PUMP CIRCUIT

| MODES OF OPERATION | OPERATIONAL RATIOS, $(x\mu BB_{RATIO})$ | FIRST µC CHARGE PUMP OUTPUT, $(V_{\mu C\_OUT1})$, where $V_{\mu C\_OUT1} = (x\mu BB_{RATIO}) \times V_{BAT}$ | SECOND µC CHARGE PUMP OUTPUT, $(V_{\mu C\_OUT2})$, where $V_{\mu C\_OUT2} = (1 - x\mu BB_{RATIO}) \times V_{BAT}$ |
|---|---|---|---|
| Sixth Buck/Buck Mode | 1/4 | $3/4 \times V_{BAT}$ | $1/4 \times V_{BAT}$ |
| Seventh Buck/Buck Mode | 1/3 | $2/3 \times V_{BAT}$ | $1/3 \times V_{BAT}$ |
| Eighth Buck/Buck Mode | 1/2 | $1/2 \times V_{BAT}$ | $1/2 \times V_{BAT}$ |
| Ninth Buck/Buck Mode | 2/3 | $1/3 \times V_{BAT}$ | $2/3 \times V_{BAT}$ |
| Tenth Buck/Buck Mode | 3/4 | $1/4 \times V_{BAT}$ | $3/4 \times V_{BAT}$ |

Based on the mode of operation of the dual output µC charge pump circuit 12A, the controller 14 may configure the multiple output µC charge pump control circuit 72A to control the switch state (open or closed) of each of the first switch 74, (SW 1), the second switch 76, (SW 2), the third switch 78, (SW 3), the fourth switch 80, (SW 4), the fifth switch 82, (SW 5), the sixth switch 84, (SW 6), the seventh switch 86, (SW 7), the eighth switch 88, (SW 8), the ninth switch 90, (SW 9), the tenth switch 92, (SW 10), the eleventh switch 94, (SW 11), the twelfth switch 96, (SW 12), the thirteenth switch 98, (SW 13), the fourteenth switch 100, (SW 14), and the fifteenth switch 102, (SW 15), based upon the µC charge pump clock 68.

For example, in some embodiments of the dual output µC charge pump circuit 12A, the multiple output µC charge pump control circuit 72A may be configured to divide the operation of the dual output µC charge pump circuit 12A into phases of operation. For example, multiple output µC charge pump control circuit 72A may be configured to operate in a first phase, a second phase, a third phase, a fourth phase, and so forth. During each phase of operation of the dual output µC charge pump circuit 12A, the multiple output µC charge pump control circuit 72A may be configured to change the switch state (open or closed) of the first switch 74, (SW 1), the second switch 76, (SW 2), the third switch 78, (SW 3), the fourth switch 80, (SW 4), the fifth switch 82, (SW 5), the sixth switch 84, (SW 6), the seventh switch 86, (SW 7), the eighth switch 88, (SW 8), the ninth switch 90, (SW 9), the tenth switch 92, (SW 10), the eleventh switch 94, (SW 11), the twelfth switch 96, (SW 12), the thirteenth switch 98, (SW 13), the fourteenth switch 100, (SW 14), and the fifteenth switch 102, (SW 15), for a period of time.

In some embodiments of the dual output µC charge pump circuit 12A, depicted in FIG. 2A, the multiple output µC charge pump control circuit 72A may configure the period of time for each phase of operation of the dual output µC charge pump circuit 12A to be substantially equal. For example, the dual output µC charge pump circuit 12A may remain in each phase of operation for the same number of clock cycles of the µC charge pump clock 68.

In other embodiments of the dual output µC charge pump circuit 12A, depicted in FIG. 2A, the multiple output µC charge pump control circuit 72A may configure the period of time for each phase of operation of the dual output µC charge pump circuit 12A to be different to optimize the effeciency of the dual output µC charge pump circuit 12A when operating in a particular mode of operation. For example, in some modes of operation, the multiple output µC charge pump control circuit 72A may configure the dual output µC charge pump circuit 12A to remain in a first phase of operation for a first number of clock cycles of the µC charge pump clock 68 and remain in a second phase of operation for a second number of clock cycles of the µC charge pump clock 68. The period of time for each phase of operation may be based upon one or more of the various factors including, but not limited to, the size of each of the µC charge pump switches, the current load associated with each of the first µC charge pump output 24 and the second µC charge pump output 26, the combination of the first µC charge pump output voltage, ($V_{\mu C\_OUT1}$), and the second μC charge pump output voltage, ($V_{\mu C\_OUT2}$), generated at the respective first μC charge pump output 24 and the second μC charge pump output 26, the capacitance values of each of the first flying capacitor 42, ($C_{FLY1}$), and the second flying capacitor 44, ($C_{FLY2}$), the capacitance values of the first μC charge pump output capacitor 46, ($C_{\mu C\_OUT1}$), and the second μC charge pump output capacitor 48, ($C_{\mu C\_OUT2}$), and or combinations thereof.

The maximum switching frequency between the phases of operation may a function of the setting times of the first μC charge pump output voltage, ($V_{\mu C\_OUT1}$), and the second μC charge pump output voltage, ($V_{\mu C\_OUT2}$), generated at the respective first μC charge pump output 24 and the second μC charge pump output 26. The settling times may be a function of the series resistance of the μC charge pump switches used to generate each of the first μC charge pump output voltage, ($V_{\mu C\_OUT1}$), and the second μC charge pump output voltage, ($V_{\mu C\_OUT2}$), and the associated capacitance values of the first μC charge pump output capacitor 46, ($C_{\mu C\_OUT1}$), and the second μC charge pump output capacitor 48, ($C_{\mu C\_OUT2}$).

In addition, to minimize switching noise and interference signals, in some embodiments of the dual output μC charge pump circuit 12A, the multiple output μC charge pump control circuit 72A may align the phases of operation of the dual output μC charge pump circuit 12A such that the μC charge pump circuit switchs (the first switch 74, (SW 1), the second switch 76, (SW 2), the third switch 78, (SW 3), the fourth switch 80, (SW 4), the fifth switch 82, (SW 5), the sixth switch 84, (SW 6), the seventh switch 86, (SW 7), the eighth switch 88, (SW 8), the ninth switch 90, (SW 9), the tenth switch 92, (SW 10), the eleventh switch 94, (SW 11), the twelfth switch 96, (SW 12), the thirteenth switch 98, (SW 13), the fourteenth switch 100, (SW 14), and the fifteenth switch 102, (SW 15)) are temporally aligned with the switching of other power switches used to generate other power supply voltages used by various portions of an integrated chip that include the multiple output μC charge pump system 10A.

Continuing with the description of the various example embodiments of the modes of operation of the dual output μC charge pump circuit 12A described in TABLE 1A, TABLE 1B-1 and TABLE 1B-2, entitled "SWITCH OPERATION TABLES FOR BUCK/BUCK OPERATION OF DUAL OUTPUT μC CHARGE PUMP," describe, in tabular form, the switch state (open or closed) of each of the first switch 74, (SW 1), the second switch 76, (SW 2), the third switch 78, (SW 3), the fourth switch 80, (SW 4), the fifth switch 82, (SW 5), the sixth switch 84, (SW 6), the seventh switch 86, (SW 7), the eighth switch 88, (SW 8), the ninth switch 90, (SW 9), the tenth switch 92, (SW 10), the eleventh switch 94, (SW 11), the twelfth switch 96, (SW 12), the thirteenth switch 98, (SW 13), the fourteenth switch 100, (SW 14), and the fifteenth switch 102, (SW 15), of the dual output μC charge pump circuit 12A when the dual output μC charge pump circuit 12A is configured to operate in an identified buck/buck mode of operation. In addition, TABLE 1B-1 and TABLE 1B-2 also provide the corresponding operational ratio, ($x\mu BB_{RATIO}$), of the dual output μC charge pump circuit 12A, used in the identified buck/buck mode of operation. Also, TABLE 1B-1 and TABLE 1B-2, describe the switch state of each of the first switch 74, (SW 1), the second switch 76, (SW 2), the third switch 78, (SW 3), the fourth switch 80, (SW 4), the fifth switch 82, (SW 5), the sixth switch 84, (SW 6), the seventh switch 86, (SW 7), the eighth switch 88, (SW 8), the ninth switch 90, (SW 9), the tenth switch 92, (SW 10), the eleventh switch 94, (SW 11), the twelfth switch 96, (SW 12), the thirteenth switch 98, (SW 13), the fourteenth switch 100, (SW 14), and the fifteenth switch 102, (SW 15), relative to a particular phase of operation of the dual output μC charge pump circuit 12A.

As used in TABLE 1B-1 and TABLE 1B-2, "PHASE 1" indicates that the dual output μC charge pump circuit 12A is configured to operate in a first phase of operation, where the multiple output μC charge pump control circuit 72A configures the switch state (open or closed) of the identified μC charge pump switch to be closed during the time period of the first phase of operation. "PHASE 2" indicates that the dual output μC charge pump circuit 12A is configured to operate in a second phase of operation, where the multiple output μC charge pump control circuit 72A configures the switch state (open or closed) of the identified μC charge pump switch to be closed during the time period of the second phase of operation. "PHASE 3" indicates that the dual output μC charge pump circuit 12A is configured to operate in a third phase of operation, where the multiple output μC charge pump control circuit 72A configures the switch state (open or closed) of the identified μC charge pump switch to be closed during the time period of the third phase of operation. "PHASE 4" indicates that the dual output μC charge pump circuit 12A is configured to operate in a fourth phase of operation, where the multiple output μC charge pump control circuit 72A configures the switch state (open or closed) of the identified μC charge pump switch to be closed during the time period of the fourth phase of operation. "OPEN" indicates that the multiple output μC charge pump control circuit 72A configures the switch state (open or closed) of the identified switch to be closed during all the phases of operation of the dual output μC charge pump circuit 12A.

TABLE 1B-1

| | | | |
|---|---|---|---|
| SWITCH OPERATION TABLE FOR BUCK/BUCK MODE OF OPERATION OF DUAL OUTPUT μC CHARGE PUMP | | | |
| MODES OF OPERATION FOR BUCK/BUCK OPERATION OF DUAL OUTPUT μC CHARGE PUMP WITH CORRESPONDING OPERATIONAL RATIOS, ($x\mu BB_{RATIO}$) | | | |
| See, TABLE 1A μC CHARGE PUMP SWITCHES | First Buck/Buck Mode, ($x\mu BB_{RATIO} = 1/4$), where $V_{\mu C\_OUT1} = 1/4 \times V_{BAT}$ and $V_{\mu C\_OUT2} = 3/4 \times V_{BAT}$ | Second Buck/Buck Mode, ($x\mu BB_{RATIO} = 1/3$), where $V_{\mu C\_OUT1} = 1/3 \times V_{BAT}$ and $V_{\mu C\_OUT2} = 2/3 \times V_{BAT}$ | Third Buck/Buck Mode, ($x\mu BB_{RATIO} = 1/2$), where $V_{\mu C\_OUT1} = 1/2 \times V_{BAT}$ and $V_{\mu C\_OUT2} = 1/2 \times V_{BAT}$ |
| SW 1 | Phase 1 | Phase 1 and Phase 3 | Phase 1 and Phase 3 |
| SW 2 | OPEN | Phase 2 | Phase 2 |
| SW 3 | Phase 3 | Phase 2 | Phase 2 |
| SW 4 | OPEN | OPEN | Phase 1 |
| SW 5 | Phase 1 | Phase 1 | OPEN |
| SW 6 | OPEN | Phase 3 | Phase 1 |

TABLE 1B-1-continued

SWITCH OPERATION TABLE FOR BUCK/BUCK MODE
OF OPERATION OF DUAL OUTPUT μC CHARGE PUMP

MODES OF OPERATION FOR BUCK/BUCK OPERATION OF DUAL OUTPUT μC
CHARGE PUMP WITH CORRESPONDING OPERATIONAL RATIOS, (xμBB$_{RATIO}$)

| See, TABLE 1A μC CHARGE PUMP SWITCHES | First Buck/Buck Mode, (xμBB$_{RATIO}$ = 1/4), where $V_{\mu C\_OUT1}$ = 1/4 × $V_{BAT}$ and $V_{\mu C\_OUT2}$ = 3/4 × $V_{BAT}$ | Second Buck/Buck Mode, (xμBB$_{RATIO}$ = 1/3), where $V_{\mu C\_OUT1}$ = 1/3 × $V_{BAT}$, and $V_{\mu C\_OUT2}$ = 2/3 × $V_{BAT}$ | Third Buck/Buck Mode, (xμBB$_{RATIO}$ = 1/2), where $V_{\mu C\_OUT1}$ = 1/2 × $V_{BAT}$, and $V_{\mu C\_OUT2}$ = 1/2 × $V_{BAT}$ |
|---|---|---|---|
| SW 7 | Phase 2 | Phase 2 | Phase 2 |
| SW 8 | Phase 2 | Phase 2 | Phase 2 |
| SW 9 | Phase 1 and Phase 3 | Phase 1 | Phase 1 |
| SW 10 | Phase 3 and Phase 4 | OPEN | Phase 3 |
| SW 11 | Phase 4 | OPEN | OPEN |
| SW 12 | OPEN | Phase 3 | Phase 3 |
| SW 13 | OPEN | OPEN | OPEN |
| SW 14 | Phase 4 | Phase 3 | Phase 3 |
| SW 15 | OPEN | OPEN | OPEN |

TABLE 1B-2

SWITCH OPERATION TABLE FOR BUCK/BUCK MODE
OF OPERATION OF DUAL OUTPUT μC CHARGE PUMP

MODES OF OPERATION FOR BUCK/BUCK OPERATION OF DUAL OUTPUT μC
CHARGE PUMP WITH CORRESPONDING OPERATIONAL RATIOS, (xμBB$_{RATIO}$)

| See, TABLE 1A μC CHARGE PUMP SWITCHES | Fourth Buck/Buck Mode, (xμBB$_{RATIO}$ = 2/3), where $V_{\mu C\_OUT1}$ = 2/3 × $V_{BAT}$, and $V_{\mu C\_OUT2}$ = 1/3 × $V_{BAT}$ | Fifth Buck/Buck Mode, (xμBB$_{RATIO}$ = 3/4), where $V_{\mu C\_OUT1}$ = 3/4 × $V_{BAT}$, and $V_{\mu C\_OUT2}$ = 1/4 × $V_{BAT}$ | OFF Mode where $V_{\mu C\_OUT1}$ = FLOAT $V_{\mu C\_OUT2}$ = FLOAT |
|---|---|---|---|
| SW 1 | Phase 1 and Phase 3 | Phase 4 | OPEN |
| SW 2 | Phase 2 | Phase 3 | OPEN |
| SW 3 | OPEN | OPEN | OPEN |
| SW 4 | Phase 1 | Phase 1 | OPEN |
| SW 5 | Phase 2 and Phase 3 | Phase 3 and Phase 4 | OPEN |
| SW 6 | Phase 1 | Phase 2 | OPEN |
| SW 7 | OPEN | OPEN | OPEN |
| SW 8 | Phase 2 | Phase 3 | OPEN |
| SW 9 | Phase 1 | Phase 2 | OPEN |
| SW 10 | OPEN | Phase 1 | OPEN |
| SW 11 | OPEN | Phase 1 | OPEN |
| SW 12 | Phase 3 | Phase 4 | OPEN |
| SW 13 | OPEN | OPEN | OPEN |
| SW 14 | OPEN | OPEN | OPEN |
| SW 15 | OPEN | OPEN | OPEN |

Figure 3A:
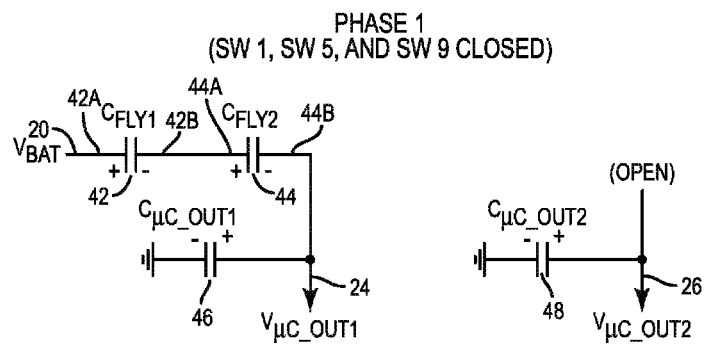
FIGS. 3A-B depict a mode of operation of an embodiment of a dual output μC charge pump configured to operate in a first buck/buck mode.
Figure 3A:
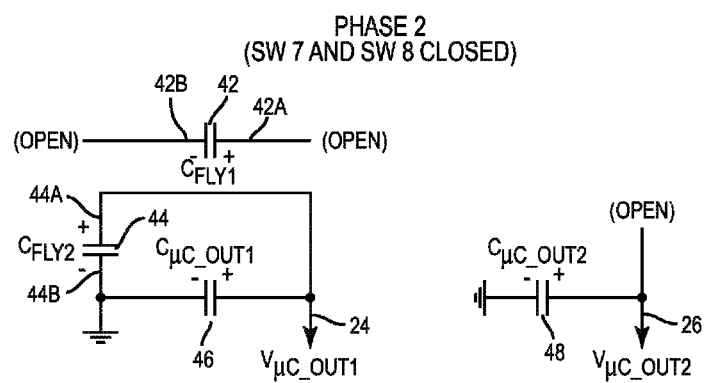
Figure 3B:
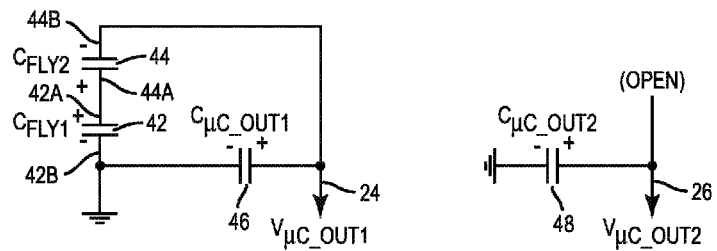
Figure 3B:
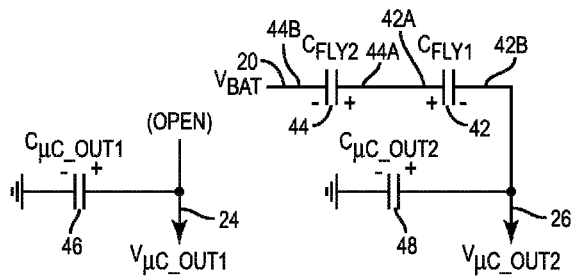

TABLE 1B-1 describes, and FIGS. 3A-B depict, the operation of the dual output μC charge pump circuit 12A when the controller 14 configures the dual output μC charge pump circuit 12A to operate in the First (1$^{st}$) Buck/Buck Mode. The controller 14 configures the multiple output μC charge pump control circuit 72A to use an operational ratio, (xμBB$_{RATIO}$), set to 1/4. The multiple output μC charge pump control circuit 72A operably divides the operation of the dual output μC charge pump circuit 12A into four phases of operation. The multiple output μC charge pump control circuit 72A operably configures the dual output μC charge pump switch matrix circuit 70A such that first μC charge pump output 24 generates a first μC charge pump output voltage, ($V_{\mu C\_OUT1}$), substantially equal to 1/4×$V_{BAT}$, and the second μC charge pump output 26 generates a second μC charge pump output voltage, ($V_{\mu C\_OUT2}$), substantially equal to 3/4×$V_{BAT}$.

In the first phase of operation, (Phase 1), the multiple output μC charge pump control circuit 72A operably closes the first switch 74, (SW 1), the fifth switch 82, (SW 5), and the ninth switch 90, (SW 9), to place the first flying capacitor 42, ($C_{FLY1}$), and the second flying capacitor 44, ($C_{FLY2}$), in series between the supply voltage 20 and the first μC charge pump output 24. Charge is transferred from the supply voltage 20, ($V_{BAT}$), to the first μC charge pump output capacitor 46, ($C_{\mu C\_OUT1}$), via the first flying capacitor 42, ($C_{FLY1}$), and the second flying capacitor 44, ($C_{FLY2}$). The first flying capacitor voltage, ($V_{CAP\_FLY1}$), and the second flying capacitor voltage, ($V_{CAP\_FLY2}$), are subtracted from the supply voltage 20, ($V_{BAT}$), to provide a first μC charge pump output voltage, ($V_{\mu C\_OUT1}$), substantially equal to 1/4×$V_{BAT}$, on the first μC charge pump output 24. Also, during the first phase of operation, (Phase 1), the multiple output μC charge pump control circuit 72A configures the remaining μC charge pump switches to be open, which disconnects the second μC charge pump output 26 from the first flying capacitor 42, ($C_{FLY1}$), and the second flying capacitor 44, ($C_{FLY2}$). In this case, the second μC charge pump output 26 provides a second µC charge pump output voltage, ($V_{\mu C\_OUT2}$), substantially equal to $3/4 \times V_{BAT}$, from the charge already stored on the second µC charge pump output capacitor 48, ($C_{\mu C\_OUT2}$).

In the second phase of operation, (Phase 2), the multiple output µC charge pump control circuit 72A operably closes the seventh switch 86, (SW 7), and the eighth switch 88, (SW 8), to place the second flying capacitor 44, ($C_{FLY2}$), between the first µC charge pump output 24 and ground. The charge stored on the second flying capacitor 44, ($C_{FLY2}$), and first µC charge pump output capacitor 46, ($C_{\mu C\_OUT1}$), is sourced to the first µC charge pump output 24 to provide the first µC charge pump output voltage, ($V_{\mu C\_OUT1}$), substantially equal to $1/4 \times V_{BAT}$. Similar to the first phase of operation, (Phase 1), the second µC charge pump output 26 continues to provide the second µC charge pump output voltage, ($V_{\mu C\_OUT2}$), substantially equal to $3/4 \times V_{BAT}$, from the charge already stored on the second µC charge pump output capacitor 48, ($C_{\mu C\_OUT2}$).

In the third phase of operation, (Phase 3), the multiple output µC charge pump control circuit 72A operably closes the third switch 78, (SW 3), the ninth switch 90, (SW 9), and the tenth switch 92, (SW 10). As a result, the second terminal 42B of the first flying capacitor 42, ($C_{FLY1}$), is tied to ground, the first terminal 42A of the first flying capacitor 42, ($C_{FLY1}$), is coupled to the first terminal 44A of the second flying capacitor 44, ($C_{FLY2}$), and the second terminal 44B of the second flying capacitor 44, ($C_{FLY2}$), is coupled to the first µC charge pump output 24.

Accordingly, charge stored on the first flying capacitor 42, ($C_{FLY1}$), and the second flying capacitor 44, ($C_{FLY2}$), is sourced to the first µC charge pump output 24 to maintain the first µC charge pump output voltage, ($V_{\mu C\_OUT1}$), at a voltage level substantially equal to $1/4 \times V_{BAT}$. The first µC charge pump output voltage, ($V_{\mu C\_OUT1}$), remains substantially equal to $1/4 \times V_{BAT}$, where the magnitude of the first µC charge pump output voltage, ($V_{\mu C\_OUT1}$), is determined by subtracting the second flying capacitor voltage, ($V_{CAP\_FLY2}$), from the first flying capacitor voltage, ($V_{CAP\_FLY1}$). Similar to the first phase of operation, (Phase 1), and the second phase of operation, (Phase 2), the second µC charge pump output 26 continues to provide the second µC charge pump output voltage, ($V_{\mu C\_OUT2}$), substantially equal to $3/4 \times V_{BAT}$, from the charge previously stored on the second µC charge pump output capacitor 48, ($C_{\mu C\_OUT2}$).

In the fourth phase of operation, (Phase 4), the multiple output µC charge pump control circuit 72A operably closes the tenth switch 92, (SW 10), the eleventh switch 94, (SW 11), and the fourteenth switch 100, (SW 14). During the fourth phase of operation, (Phase 4), charge is transferred from the supply voltage 20, ($V_{BAT}$), to the second µC charge pump output capacitor 48, ($C_{\mu C\_OUT2}$), via the first flying capacitor 42, ($C_{FLY1}$), and the second flying capacitor 44, ($C_{FLY2}$). The magnitude of the second µC charge pump output voltage, ($V_{\mu C\_OUT2}$), is determined by subtracting the second flying capacitor voltage, ($V_{CAP\_FLY2}$), from the first flying capacitor voltage, ($V_{CAP\_FLY1}$), and the supply voltage 20, ($V_{BAT}$). Accordingly, the second µC charge pump output 26 provides a second µC charge pump output voltage, ($V_{\mu C\_OUT2}$), substantially equal to $3/4 \times V_{BAT}$. During the fourth phase of operation, (Phase 4), the multiple output µC charge pump control circuit 72A configures the remaining µC charge pump switches to be open, which disconnects the first µC charge pump output 24 from the first flying capacitor 42, ($C_{FLY1}$), and the second flying capacitor 44, ($C_{FLY2}$). As a result, the first µC charge pump output 24 provides the first µC charge pump output voltage, ($V_{\mu C\_OUT1}$), substantially equal to $1/4 \times V_{BAT}$, from the charge stored on the first µC charge pump output capacitor 46, ($C_{\mu C\_OUT1}$), during the other phases of operation.

Otherwise, the first switch 74, (SW 1), the second switch 76, (SW 2), the third switch 78, (SW 3), the fourth switch 80, (SW 4), the fifth switch 82, (SW 5), the sixth switch 84, (SW 6), the seventh switch 86, (SW 7), the eighth switch 88, (SW 8), the ninth switch 90, (SW 9), the tenth switch 92, (SW 10), the eleventh switch 94, (SW 11), the twelfth switch 96, (SW 12), the thirteenth switch 98, (SW 13), the fourteenth switch 100, (SW 14), and the fifteenth switch 102, (SW 15), remain open while the dual output µC charge pump circuit 12A is configured to operate in the First ($1^{st}$) Buck/Buck Mode.

Having described the basic operation of the multiple output µC charge pump control circuit 72A and the phases of operation of the dual output µC charge pump circuit 12A in detail with respect to the case where the dual output µC charge pump circuit 12A is configured to operate in the First (1st) Buck/Buck Mode, the remaining modes of operation of the dual output µC charge pump circuit 12A will now be briefly described.

Figure 4:
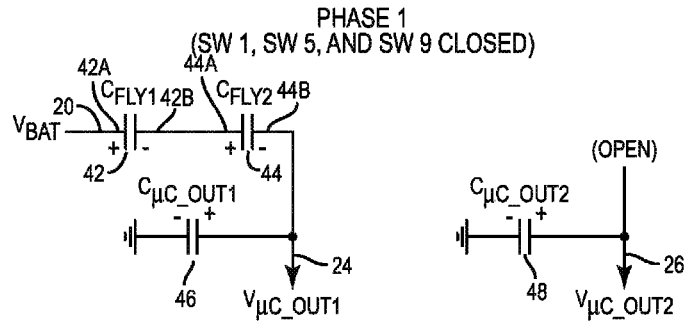
FIG. 4 depicts a mode of operation of an embodiment of a dual output μC charge pump configured to operate in a second buck/buck mode.
Figure 4:
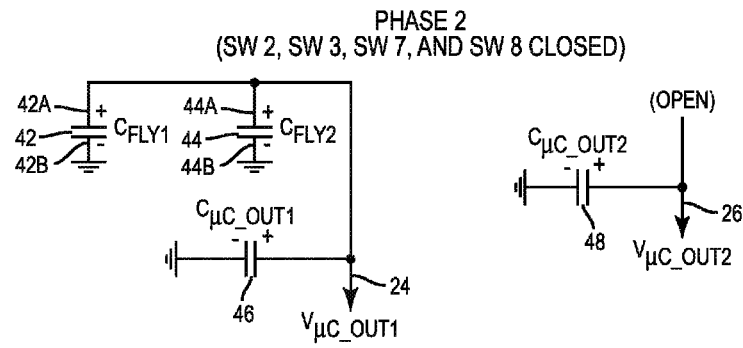
Figure 4:
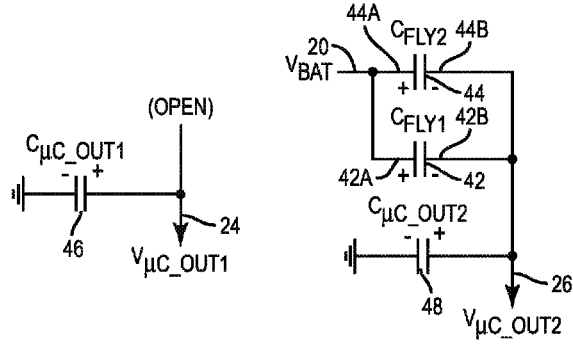

TABLE 1B-1 describes, and FIG. 4 depicts, the operation of the dual output µC charge pump circuit 12A when the controller 14 configures the dual output µC charge pump circuit 12A to operate in the Second ($2^{nd}$) Buck/Buck Mode. The controller 14 configures the multiple output µC charge pump control circuit 72A to use an operational ratio, ($x\mu BB_{RATIO}$), set to 1/3. The multiple output µC charge pump control circuit 72A operably divides the operation of the dual output µC charge pump circuit 12A into three phases of operation. The multiple output µC charge pump control circuit 72A operably configures the dual output µC charge pump switch matrix circuit 70A such that first µC charge pump output 24 generates a first µC charge pump output voltage, ($V_{\mu C\_OUT1}$), substantially equal to $1/3 \times V_{BAT}$, and the second µC charge pump output 26 generates a second µC charge pump output voltage, ($V_{\mu C\_OUT2}$), substantially equal to $2/3 \times V_{BAT}$.

As described in TABLE 1B-1 and depicted in FIG. 4, in the first phase of operation, (Phase 1), the multiple output µC charge pump control circuit 72A operably closes the first switch 74, (SW 1), the fifth switch 82, (SW 5), and the ninth switch 90, (SW 9). In the second phase of operation, (Phase 2), the multiple output µC charge pump control circuit 72A operably closes the second switch 76, (SW 2), the third switch 78, (SW 3), the seventh switch 86, (SW 7), and the eighth switch 88, (SW 8). In the third phase of operation, (Phase 3), the multiple output µC charge pump control circuit 72A operably closes the first switch 74, (SW 1), the sixth switch 84, (SW 6), the twelfth switch 96, (SW 12), and the fourteenth switch 100, (SW 14). Otherwise, the first switch 74, (SW 1), the second switch 76, (SW 2), the third switch 78, (SW 3), the fourth switch 80, (SW 4), the fifth switch 82, (SW 5), the sixth switch 84, (SW 6), the seventh switch 86, (SW 7), the eighth switch 88, (SW 8), the ninth switch 90, (SW 9), the tenth switch 92, (SW 10), the eleventh switch 94, (SW 11), the twelfth switch 96, (SW 12), the thirteenth switch 98, (SW 13), the fourteenth switch 100, (SW 14), and the fifteenth switch 102, (SW 15), remain closed while the dual output µC charge pump circuit 12A is configured to operate in the Second ($2^{nd}$) Buck/Buck Mode.

As a result, the first flying capacitor 42, ($C_{FLY1}$), develops a first flying capacitor voltage, ($V_{CAP\_FLY1}$), substantially equal to $1/3 \times V_{BAT}$, and the second flying capacitor 44, ($C_{FLY2}$), develops a second flying capacitor voltage, ($V_{CAP\_FLY2}$), substantially equal to $1/3 \times V_{BAT}$. Accordingly, first µC charge pump output 24 generates a first µC charge pump output voltage, ($V_{\mu C\_OUT1}$), substantially equal to $1/3 \times V_{BAT}$, and the second μC charge pump output 26 generates a second μC charge pump output voltage, ($V_{\mu C\_OUT2}$), substantially equal to $2/3 \times V_{BAT}$.

Figure 5:
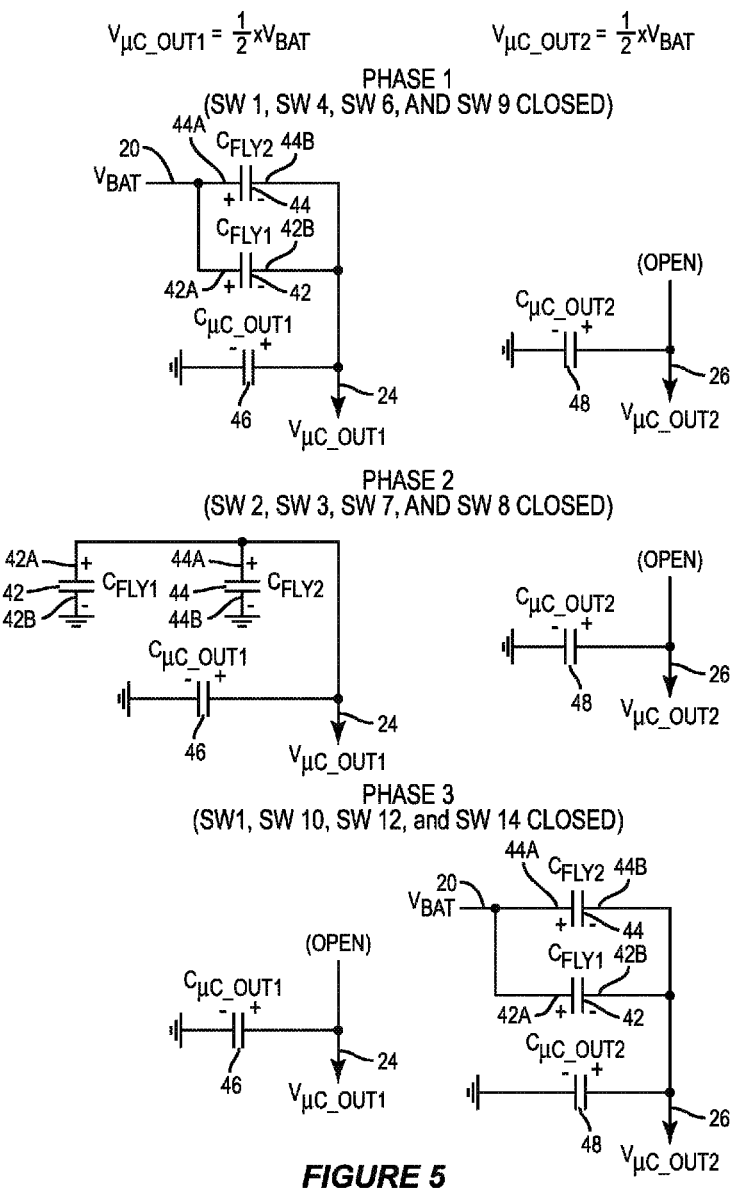
FIG. 5 depicts a mode of operation of an embodiment of a dual output μC charge pump configured to operate in a third buck/buck mode.

TABLE 1B-1 describes, and FIG. 5 depicts, the operation of the dual output μC charge pump circuit 12A when the controller 14 configures the dual output μC charge pump circuit 12A to operate in the Third ($3^{rd}$) Buck/Buck Mode. The controller 14 configures the multiple output μC charge pump control circuit 72A to use an operational ratio, ($x\mu BB_{RATIO}$), set to 1/2. The multiple output μC charge pump control circuit 72A operably divides the operation of the dual output μC charge pump circuit 12A into three phases of operation. The multiple output μC charge pump control circuit 72A operably configures the dual output μC charge pump switch matrix circuit 70A such that first μC charge pump output 24 generates a first μC charge pump output voltage, ($V_{\mu C\_OUT1}$), substantially equal to $1/2 \times V_{BAT}$, and the second μC charge pump output 26 generates a second μC charge pump output voltage, ($V_{\mu C\_OUT2}$), substantially equal to $1/2 \times V_{BAT}$.

As described in TABLE 1B-1 and depicted in FIG. 5, in the first phase of operation, (Phase 1), the multiple output μC charge pump control circuit 72A operably closes the first switch 74, (SW 1), the fourth switch 80, (SW 4), the sixth switch 84, (SW 6), and the ninth switch 90, (SW 9). In the second phase of operation, (Phase 2), the multiple output μC charge pump control circuit 72A operably closes the second switch 76, (SW 2), the third switch 78, (SW 3), the seventh switch 86, (SW 7), and the eighth switch 88, (SW 8). In the third phase of operation, (Phase 3), the multiple output μC charge pump control circuit 72A operably closes the first switch 74, (SW 1), tenth switch 92, (SW 10), the twelfth switch 96, (SW 12), and the fourteenth switch 100, (SW 14). As a result, the first flying capacitor 42, ($C_{FLY1}$), develops a first flying capacitor voltage, ($V_{CAP\_FLY1}$), substantially equal to $1/2 \times V_{BAT}$, and the second flying capacitor 44, ($C_{FLY2}$), develops a second flying capacitor voltage, ($V_{CAP\_FLY2}$), substantially equal to $1/2 \times V_{BAT}$. Accordingly, first μC charge pump output 24 generates a first μC charge pump output voltage, ($V_{\mu C\_OUT1}$), substantially equal to $1/2 \times V_{BAT}$, on the first μC charge pump output capacitor 46, ($C_{\mu C\_OUT1}$), and the second μC charge pump output 26 generates a second μC charge pump output voltage, ($V_{\mu C\_OUT2}$), substantially equal to $1/2 \times V_{BAT}$ on the second μC charge pump output capacitor 48, ($C_{\mu C\_OUT2}$).

Figure 6:
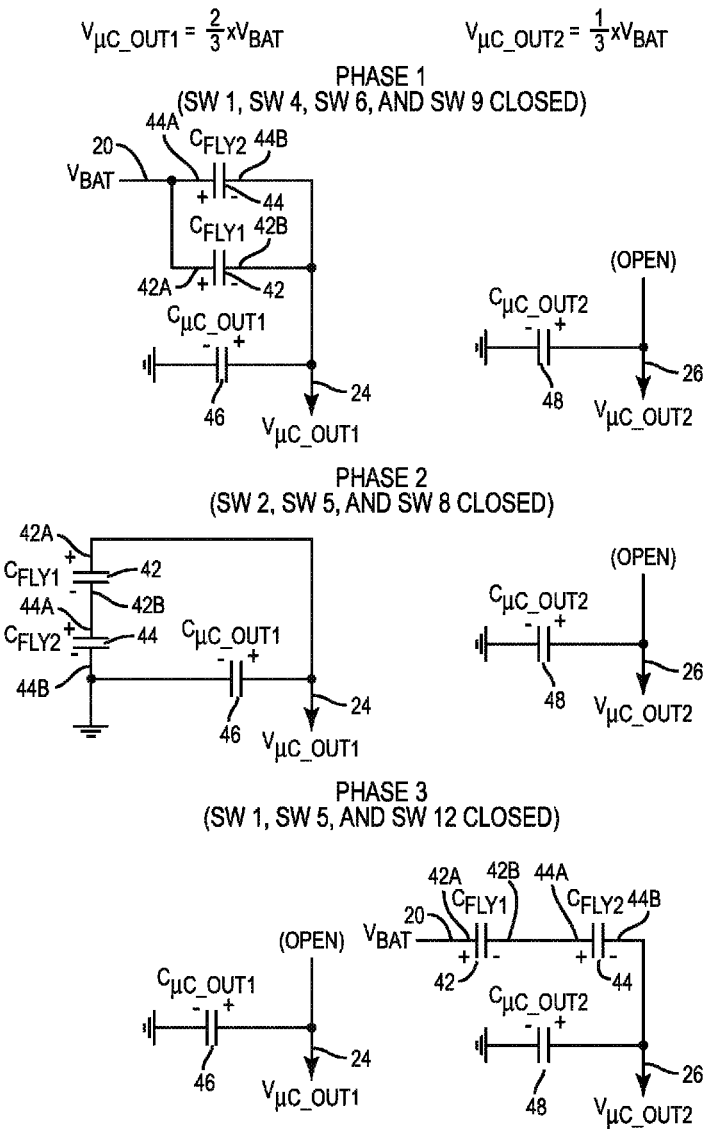
FIG. 6 depicts a mode of operation of an embodiment of a dual output μC charge pump configured to operate in a fourth buck/buck mode.

TABLE 1B-2 describes, and FIG. 6 depicts, the operation of the dual output μC charge pump circuit 12A when the controller 14 configures the dual output μC charge pump circuit 12A to operate in the Fourth ($4^{th}$) Buck/Buck Mode. The controller 14 configures the multiple output μC charge pump control circuit 72A to use an operational ratio, ($x\mu BB_{RATIO}$), set to 2/3. The multiple output μC charge pump control circuit 72A operably divides the operation of the dual output μC charge pump circuit 12A into three phases of operation. The multiple output μC charge pump control circuit 72A operably configures the dual output μC charge pump switch matrix circuit 70A such that first μC charge pump output 24 generates a first μC charge pump output voltage, ($V_{\mu C\_OUT1}$), substantially equal to $2/3 \times V_{BAT}$, and the second μC charge pump output 26 generates a second μC charge pump output voltage, ($V_{\mu C\_OUT2}$), substantially equal to $1/3 \times V_{BAT}$.

As described in TABLE 1B-2 and depicted in FIG. 6, in the first phase of operation, (Phase 1), the multiple output μC charge pump control circuit 72A operably closes the first switch 74, (SW 1), the fourth switch 80, (SW 4), the sixth switch 84, (SW 6), and the ninth switch 90, (SW 9). In the second phase of operation, (Phase 2), the multiple output μC charge pump control circuit 72A operably closes the second switch 76, (SW 2), the fifth switch 82, (SW 5), and the eighth switch 88, (SW 8). In the third phase of operation, (Phase 3), the multiple output μC charge pump control circuit 72A operably closes the first switch 74, (SW 1), the fifth switch 82, (SW 5), and the twelfth switch 96, (SW 12).

As a result, the first flying capacitor 42, ($C_{FLY1}$), develops a first flying capacitor voltage, ($V_{CAP\_FLY1}$), substantially equal to $1/3 \times V_{BAT}$, and the second flying capacitor 44, ($C_{FLY2}$), develops a second flying capacitor voltage, ($V_{CAP\_FLY2}$), substantially equal to $1/3 \times V_{BAT}$. Accordingly, first μC charge pump output 24 generates a first μC charge pump output voltage, ($V_{\mu C\_OUT1}$), substantially equal to $2/3 \times V_{BAT}$, on the first μC charge pump output capacitor 46, ($C_{\mu C\_OUT1}$), and the second μC charge pump output 26 generates a second μC charge pump output voltage, ($V_{\mu C\_OUT2}$), substantially equal to $1/3 \times V_{BAT}$ on the second μC charge pump output capacitor 48, ($C_{\mu C\_OUT2}$).

Figure 7A:
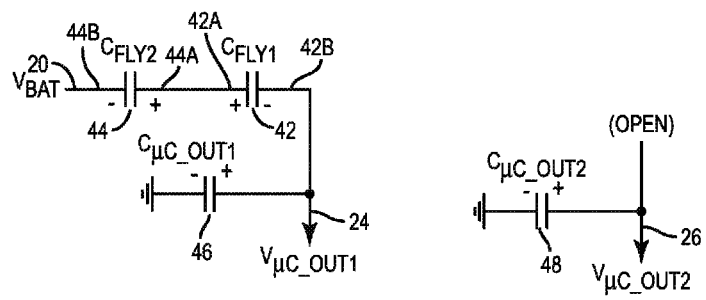
FIGS. 7A-B depict a mode of operation of an embodiment of a dual output μC charge pump configured to operate in a fifth buck/buck mode.
Figure 7A:
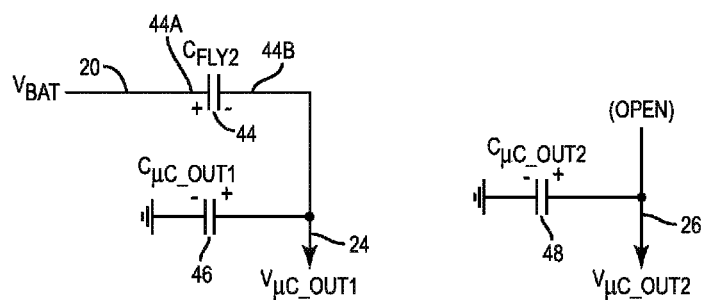
Figure 7B:
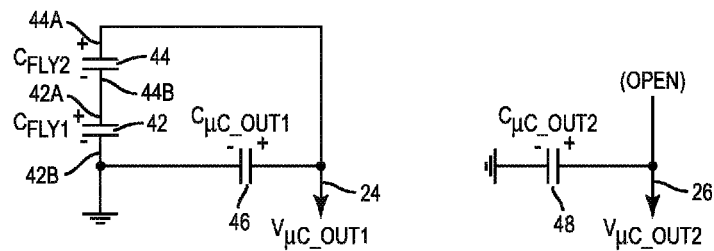
Figure 7B:
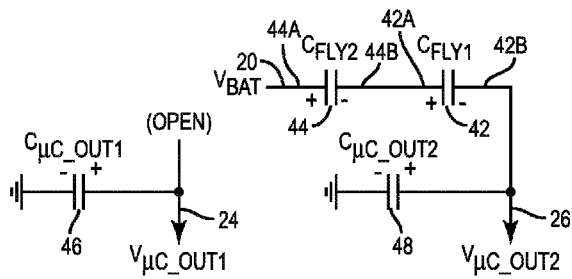

TABLE 1B-2 describes, and FIGS. 7A-B depicts, the operation of the dual output μC charge pump circuit 12A when the controller 14 configures the dual output μC charge pump circuit 12A to operate in the Fifth ($5^{th}$) Buck/Buck Mode. The controller 14 configures the multiple output μC charge pump control circuit 72A to use an operational ratio, ($x\mu BB_{RATIO}$), set to 3/4. The multiple output μC charge pump control circuit 72A operably divides the operation of the dual output μC charge pump circuit 12A into four phases of operation. The multiple output μC charge pump control circuit 72A operably configures the dual output μC charge pump switch matrix circuit 70A such that first μC charge pump output 24 generates a first μC charge pump output voltage, ($V_{\mu C\_OUT1}$), substantially equal to $3/4 \times V_{BAT}$, and the second μC charge pump output 26 generates a second μC charge pump output voltage, ($V_{\mu C\_OUT2}$), substantially equal to $1/4 \times V_{BAT}$.

As described in TABLE 1B-2 and depicted in FIG. 7A, in the first phase of operation, (Phase 1), the multiple output μC charge pump control circuit 72A operably closes the fourth switch 80, (SW 4), the tenth switch 92, (SW 10), and the eleventh switch 94, (SW 11). In the second phase of operation, (Phase 2), the multiple output μC charge pump control circuit 72A operably closes the sixth switch 84, (SW 6), and the ninth switch 90, (SW 9). As further described in TABLE 1B-2 and depicted in FIG. 7B, in the third phase of operation, (Phase 3), the multiple output μC charge pump control circuit 72A operably closes the second switch 76, (SW 2), the fifth switch 82, (SW 5), and the eighth switch 88, (SW 8). In the fourth phase of operation, (Phase 4), the multiple output μC charge pump control circuit 72A operably closes the first switch 74, (SW 1), the fifth switch 82, (SW 5), and the twelfth switch 96, (SW 12).

As a result, the first flying capacitor 42, ($C_{FLY1}$), develops a first flying capacitor voltage, ($V_{CAP\_FLY1}$), substantially equal to $3/4 \times V_{BAT}$, and the second flying capacitor 44, ($C_{FLY2}$), develops a second flying capacitor voltage, ($V_{CAP\_FLY2}$), substantially equal to $1/4 \times V_{BAT}$. Accordingly, first μC charge pump output 24 generates a first μC charge pump output voltage, ($V_{\mu C\_OUT1}$), substantially equal to $3/4 \times V_{BAT}$, on the first μC charge pump output capacitor 46, ($C_{\mu C\_OUT1}$), and the second μC charge pump output 26 generates a second μC charge pump output voltage, ($V_{\mu C\_OUT2}$), substantially equal to $1/4 \times V_{BAT}$ on the second μC charge pump output capacitor 48, ($C_{\mu C\_OUT2}$).

As further described in TABLE 1B-2, the controller 14 may also configure the dual output μC charge pump circuit 12A to operate in the OFF Mode of operation. As described in Table 1A, when the dual output µC charge pump circuit 12A is configured in the OFF Mode of operation, both the first µC charge pump output 24 and second µC charge pump output 26 float. As described in TABLE 1B-2, when the controller 14 configures the dual output µC charge pump circuit 12A to be in the OFF Mode of operation, the multiple output µC charge pump control circuit 72A may operably open the first switch 74, (SW 1), the second switch 76, (SW 2), the third switch 78, (SW 3), the fourth switch 80, (SW 4), the fifth switch 82, (SW 5), the sixth switch 84, (SW 6), the seventh switch 86, (SW 7), the eighth switch 88, (SW 8), the ninth switch 90, (SW 9), the tenth switch 92, (SW 10), the eleventh switch 94, (SW 11), the twelfth switch 96, (SW 12), the thirteenth switch 98, (SW 13), the fourteenth switch 100, (SW 14), and the fifteenth switch 102, (SW 15). As a result, the first µC charge pump output voltage, ($V_{\mu C\_OUT1}$), on the first µC charge pump output 24 floats relative to ground. Likewise, the second µC charge pump output voltage, ($V_{\mu C\_OUT2}$), on the second µC charge pump output 26 floats relative to ground. It will be appreciated, by those skilled in the art, that the configurations and phases of operation of the dual output µC charge pump circuit 12A to achive the additional buck/buck modes of operation, as described in TABLE 1B, including the Sixth ($6^{th}$) Buck/Buck Mode, the Seventh ($7^{th}$) Buck/Buck Mode, the Eighth ($8^{th}$) Buck/Buck Mode, the Ninth ($9^{th}$) Buck/Buck Mode, and the Tenth ($10^{th}$) Buck/Buck Mode, may be understood based on the foregoing description of the operation of the dual output µC charge pump circuit 12A to operate in either a buck/boost mode of operation or a boost/buck mode of operation, as described below. Accordingly, a detailed description of the configurations and phases of operation of the dual output µC charge pump circuit 12A to achive the additional buck/buck modes of operation, as described in TABLE 1B, are omitted for the sake of brevity and not by way of limitation.

A non-limiting set of example operational modes of the dual output µC charge pump circuit 12A configured to operate in a buck/boost mode of operation will now be discussed. As an example, TABLE 2A-1 and TABLE 2A-2, entitled "MODES OF OPERATION TABLE FOR BUCK/BOOST OPERATION OF A DUAL OUTPUT µC CHARGE PUMP CIRCUIT," describe, in tablulated form, several, non-limiting, example modes of operation of the dual output µC charge pump circuit 12A configured to operate in a buck/boost mode of operation. As an example, the non-limiting example modes of buck/boost modes of operation described in TABLE 2A-1 include: a First ($1^{st}$) Buck/Boost Mode, a Second ($2^{nd}$) Buck/Boost Mode, a Third ($3^{rd}$) Buck/Boost Mode, a Fourth ($4^{th}$) Buck/Boost Mode, a Fifth ($5^{th}$) Buck/Boost Mode, and an OFF Mode. As another example, the non-limiting example modes of buck/boost modes of operation described in TABLE 2A-2 include: a Sixth ($6^{th}$) Buck/Boost Mode, a Seventh ($7^{th}$) Buck/Boost Mode, an Eighth ($8^{th}$) Buck/Boost Mode, a Ninth ($9^{th}$) Buck/Boost Mode, a Tenth ($10^{th}$) Buck/Boost Mode, and an OFF Mode.

As depicted in TABLE 2A-1 and TABLE 2A-2, each example buck/boost mode of operation of the dual output µC charge pump circuit 12A corresponds to an operational ratio, ($x\mu BB_{RATIO}$), where the operational ratio, ($x\mu BB_{RATIO}$), may provide a relationship between the first µC charge pump output voltage, ($V_{\mu C\_OUT1}$), generated by the first µC charge pump output 24 and the second µC charge pump output voltage, ($V_{\mu C\_OUT2}$), generated by the second µC charge pump output 26. The operational ratio, ($x\mu BB_{RATIO}$), may be an operational ratio parameter that is configured by the controller 14 and stored locally in the multiple output µC charge pump control circuit 72A.

For example, TABLE 2A-1 describes example buck/boost modes of operation of the dual output µC charge pump circuit 12A where the first µC charge pump output 24 is configured to generate a first µC charge pump output voltage, ($V_{\mu C\_OUT1}$) such that $V_{\mu C\_OUT1} = (x\mu BB_{RATIO}) \times V_{BAT}$. For the sake of convenience, and without limitation, the battery voltage, ($V_{BAT}$), is used to represent the magnitude of the voltage on the supply voltage 20. The second µC charge pump output 26 is configured to generate a second µC charge pump output voltage, ($V_{\mu C\_OUT2}$) such that $V_{\mu C\_OUT2} = (1 + x\mu BB_{RATIO}) \times V_{BAT}$, where $V_{BAT}$ is used to represent the magnitude of the voltage on the supply voltage 20.

Accordingly, as described in TABLE 2A-1, in the First Buck/Boost Mode of operation of the dual output µC charge pump circuit 12A, the controller 14 configures the multiple output µC charge pump control circuit 72A to use an operational ratio, ($x\mu BB_{RATIO}$), set to 1/4. As a result, the first µC charge pump output 24 generates a first µC charge pump output voltage, ($V_{\mu C\_OUT1}$), substantially equal to $1/4 \times V_{BAT}$, and the second µC charge pump output 26 generates a second µC charge pump output voltage, ($V_{\mu C\_OUT2}$), substantially equal to $5/4 \times V_{BAT}$. In the Second Buck/Boost Mode of operation of the dual output µC charge pump circuit 12A, the controller 14 configures the multiple output µC charge pump control circuit 72A to use an operational ratio, ($x\mu BB_{RATIO}$), set to 1/3. As a result, the first µC charge pump output 24 generates a first µC charge pump output voltage, ($V_{\mu C\_OUT1}$), substantially equal to $1/3 \times V_{BAT}$, and the second µC charge pump output 26 generates a second µC charge pump output voltage, ($V_{\mu C\_OUT2}$), substantially equal to $4/3 \times V_{BAT}$. In the Third Buck/Boost Mode of operation of the dual output µC charge pump circuit 12A, the controller 14 configures the multiple output µC charge pump control circuit 72A to use an operational ratio, ($x\mu BB_{RATIO}$), set to 1/2. As a result, the first µC charge pump output 24 generates a first µC charge pump output voltage, ($V_{\mu C\_OUT1}$), substantially equal to $1/2 \times V_{BAT}$, and the second µC charge pump output 26 generates a second µC charge pump output voltage, ($V_{\mu C\_OUT2}$), substantially equal to $3/2 \times V_{BAT}$. In the Fourth Buck/Boost Mode of operation of the dual output µC charge pump circuit 12A, the controller 14 configures the multiple output µC charge pump control circuit 72A to use an operational ratio, ($x\mu BB_{RATIO}$), set to 2/3. As a result, the first µC charge pump output 24 generates a first µC charge pump output voltage, ($V_{\mu C\_OUT1}$), substantially equal to $2/3 \times V_{BAT}$, and the second µC charge pump output 26 generates a second µC charge pump output voltage, ($V_{\mu C\_OUT2}$), substantially equal to $5/3 \times V_{BAT}$. In the Fifth Buck/Boost Mode of operation of the dual output µC charge pump circuit 12A, the controller 14 configures the multiple output µC charge pump control circuit 72A to use an operational ratio, ($x\mu BB_{RATIO}$), set to 3/4. As a result, the first µC charge pump output 24 generates a first µC charge pump output voltage, ($V_{\mu C\_OUT1}$), substantially equal to $3/4 \times V_{BAT}$) and the second µC charge pump output 26 generates a second µC charge pump output voltage, ($V_{\mu C\_OUT2}$), substantially equal to $7/4 \times V_{BAT}$. In the OFF Mode of operation of the dual output µC charge pump circuit 12A, the controller 14 configures the first µC charge pump output 24 to float and the second µC charge pump output 26 to float.

In contrast, TABLE 2A-2 describes other example buck/boost modes of operation of the dual output µC charge pump circuit 12A where the first μC charge pump output 24 is configured to generate a first μC charge pump output voltage, ($V_{\mu C\_OUT1}$) such that $V_{\mu C\_OUT1}=(1-x\mu BB_{RATIO})\times V_{BAT}$. For the sake of convenience, and without limitation, the battery voltage, ($V_{BAT}$), is used to represent the magnitude of the voltage on the supply voltage 20. The second μC charge pump output 26 is configured generates a second μC charge pump output voltage, ($V_{\mu C\_OUT2}$) such that $V_{\mu C\_OUT2}=(1+x\mu BB_{RATIO})\times V_{BAT}$, where $V_{BAT}$ is used to represent the magnitude of the voltage on the supply voltage 20.

Accordingly, as described in TABLE 2A-2, in the Sixth Buck/Boost Mode of operation of the dual output μC charge pump circuit 12A, the controller 14 configures the multiple output μC charge pump control circuit 72A to use an operational ratio, ($x\mu BB_{RATIO}$), set to 1/4. As a result, the first μC charge pump output 24 generates a first μC charge pump output voltage, ($V_{\mu C\_OUT1}$), substantially equal to $3/4\times V_{BAT}$, and the second μC charge pump output 26 generates a second μC charge pump output voltage, ($V_{\mu C\_OUT2}$), substantially equal to $5/4\times V_{BAT}$. In the Seventh Buck/Boost Mode of operation of the dual output μC charge pump circuit 12A, the controller 14 configures the multiple output μC charge pump control circuit 72A to use an operational ratio, ($x\mu BB_{RATIO}$), set to 1/3. As a result, the first μC charge pump output 24 generates a first μC charge pump output voltage, ($V_{\mu C\_OUT1}$), substantially equal to $2/3\times V_{BAT}$, and the second μC charge pump output 26 generates a second μC charge pump output voltage, ($V_{\mu C\_OUT2}$), substantially equal to $4/3\times V_{BAT}$. In the Eighth Buck/Boost Mode of operation of the dual output μC charge pump circuit 12A, the controller 14 configures the multiple output μC charge pump control circuit 72A to use an operational ratio, ($x\mu BB_{RATIO}$), set to 1/2. As a result, the first μC charge pump output 24 generates a first μC charge pump output voltage, ($V_{\mu C\_OUT1}$), substantially equal to $1/2\times V_{BAT}$, and the second μC charge pump output 26 generates a second μC charge pump output voltage, ($V_{\mu C\_OUT2}$), substantially equal to $3/2\times V_{BAT}$. In the Ninth Buck/Boost Mode of operation of the dual output μC charge pump circuit 12A, the controller 14 configures the multiple output μC charge pump control circuit 72A to use an operational ratio, ($x\mu BB_{RATIO}$), set to 2/3. As a result, the first μC charge pump output 24 generates a first μC charge pump output voltage, ($V_{\mu C\_OUT1}$), substantially equal to $1/3\times V_{BAT}$, and the second μC charge pump output 26 generates a second μC charge pump output voltage, ($V_{\mu C\_OUT2}$), substantially equal to $5/3\times V_{BAT}$. In the Tenth Buck/Boost Mode of operation of the dual output μC charge pump circuit 12A, the controller 14 configures the multiple output μC charge pump control circuit 72A to use an operational ratio, ($x\mu BB_{RATIO}$), set to 3/4. As a result, the first μC charge pump output 24 generates a first μC charge pump output voltage, ($V_{\mu C\_OUT1}$), substantially equal to $1/4\times V_{BAT}$, and the second μC charge pump output 26 generates a second μC charge pump output voltage, ($V_{\mu C\_OUT2}$), substantially equal to $7/4\times V_{BAT}$. In the OFF Mode of operation of the dual output μC charge pump circuit 12A, the controller 14 configures the first μC charge pump output 24 to float and the second μC charge pump output 26 to float.

TABLE 2B-1A and TABLE 2B-1B, entitled "SWITCH OPERATION TABLES FOR BUCK/BOOST OPERATION OF DUAL OUTPUT μC CHARGE PUMP," describe, in tabular form, the switch state (open or closed) of each of the first switch 74, (SW 1), the second switch 76, (SW 2), the third switch 78, (SW 3), the fourth switch 80, (SW 4), the fifth switch 82, (SW 5), the sixth switch 84, (SW 6), the seventh switch 86, (SW 7), the eighth switch 88, (SW 8), the ninth switch 90, (SW 9), the tenth switch 92, (SW 10), the eleventh switch 94, (SW 11), the twelfth switch 96, (SW 12), the thirteenth switch 98, (SW 13), the fourteenth switch 100, (SW 14), and the fifteenth switch 102, (SW 15), of the dual output μC charge pump circuit 12A when the dual output μC charge pump circuit 12A is configured to operate in the buck/boost modes of operation described in TABLE 2A-1. In addition, TABLE 2B-1A and TABLE 2B-1B also provide the corresponding operational ratio, ($x\mu BB_{RATIO}$), used by the dual output μC charge pump circuit 12A when operating in the buck/boost modes of operation described in TABLE 2A-1. TABLE 2B-1A and TABLE 2B-1B further describe the switch state of each of the first switch 74, (SW 1), the second switch 76, (SW 2), the third switch 78, (SW 3), the fourth switch 80, (SW 4), the fifth switch 82, (SW 5), the sixth switch 84, (SW 6), the seventh switch 86, (SW 7), the eighth switch 88, (SW 8), the ninth switch 90, (SW 9), the tenth switch 92, (SW 10), the eleventh switch 94, (SW 11), the twelfth switch 96, (SW 12), the thirteenth switch 98, (SW 13), the fourteenth switch 100, (SW 14), and the fifteenth switch 102, (SW 15), relative to the particular phases of operation used by the dual output μC charge pump circuit 12A when operating in the buck/boost modes of operation described in TABLE 2A-1.

TABLE 2B-2A and TABLE 2B-2B, also entitled "SWITCH OPERATION TABLES FOR BUCK/BOOST OPERATION OF DUAL OUTPUT μC CHARGE PUMP," describe, in tabular form, the switch state (open or closed) of each of the first switch 74, (SW 1), the second switch 76, (SW 2), the third switch 78, (SW 3), the fourth switch 80, (SW 4), the fifth switch 82, (SW 5), the sixth switch 84, (SW 6), the seventh switch 86, (SW 7), the eighth switch 88, (SW 8), the ninth switch 90, (SW 9), the tenth switch 92, (SW 10), the eleventh switch 94, (SW 11), the twelfth switch 96, (SW 12), the thirteenth switch 98, (SW 13), the fourteenth switch 100, (SW 14), and the fifteenth switch 102, (SW 15), of the dual output μC charge pump circuit 12A when the dual output μC charge pump circuit 12A is configured to operate in the buck/boost modes of operation described in TABLE 2A-2. In addition, TABLE 2B-2A and TABLE 2B-2B also provide the corresponding operational ratio, ($x\mu BB_{RATIO}$), used by the dual output μC charge pump circuit 12A when operating in the buck/boost modes of operation described in TABLE 2A-2. TABLE 2B-2A and TABLE 2B-2B further describe the switch state of each of the first switch 74, (SW 1), the second switch 76, (SW 2), the third switch 78, (SW 3), the fourth switch 80, (SW 4), the fifth switch 82, (SW 5), the sixth switch 84, (SW 6), the seventh switch 86, (SW 7), the eighth switch 88, (SW 8), the ninth switch 90, (SW 9), the tenth switch 92, (SW 10), the eleventh switch 94, (SW 11), the twelfth switch 96, (SW 12), the thirteenth switch 98, (SW 13), the fourteenth switch 100, (SW 14), and the fifteenth switch 102, (SW 15), relative to the particular phases of operation used by the dual output μC charge pump circuit 12A when operating in the buck/boost modes of operation described in TABLE 2A-2.

As used in TABLE 2B-1A, TABLE 2B-1B, TABLE 2B-2A, and TABLE 2B-2A, "PHASE 1" indicates that the dual output μC charge pump circuit 12A is configured to operate in a first phase of operation, where the multiple output μC charge pump control circuit 72A configures the switch state (open or closed) of the identified μC charge pump switch to be closed during the time period of the first phase of operation. "PHASE 2" indicates that the dual output μC charge pump circuit 12A is configured to operate in a second phase of operation, where the multiple output μC charge pump control circuit 72A configures the switch state (open or closed) of the identified μC charge pump switch to be closed during the time period of the second phase of operation. "PHASE 3" indicates that the dual output μC charge pump circuit 12A is configured to operate in a third phase of operation, where the multiple output μC charge pump control circuit 72A configures the switch state (open or closed) of the identified μC charge pump switch to be closed during the time period of the third phase of operation.

"PHASE 4" indicates that the dual output μC charge pump circuit 12A is configured to operate in a fourth phase of operation, where the multiple output μC charge pump control circuit 72A configures the switch state (open or closed) of the identified μC charge pump switch to be closed during the time period of the fourth phase of operation. "OPEN" indicates that the multiple output μC charge pump control circuit 72A configures the switch state (open or closed) of the identified switch to be closed during all the phases of operation of the dual output μC charge pump circuit 12A.

TABLE 2A-1

MODES OF OPERATION TABLE FOR BUCK/BOOST OPERATION OF A DUAL OUTPUT μC CHARGE PUMP CIRCUIT

| MODES OF OPERATION | OPERATIONAL RATIOS, $(x\mu BB_{RATIO})$ | FIRST μC CHARGE PUMP OUTPUT, $(V_{\mu C\_OUT1})$, where $V_{\mu C\_OUT1} = (x\mu BB_{RATIO}) \times V_{BAT}$ | SECOND μC CHARGE PUMP OUTPUT, $(V_{\mu C\_OUT2})$, where $V_{\mu C\_OUT2} = (1 + x\mu BB_{RATIO}) \times V_{BAT}$ |
|---|---|---|---|
| First Buck/Boost Mode | 1/4 | $1/4 \times V_{BAT}$ | $5/4 \times V_{BAT}$ |
| Second Buck/Boost Mode | 1/3 | $1/3 \times V_{BAT}$ | $4/3 \times V_{BAT}$ |
| Third Buck/Boost Mode | 1/2 | $1/2 \times V_{BAT}$ | $3/2 \times V_{BAT}$ |
| Fourth Buck/Boost Mode | 2/3 | $2/3 \times V_{BAT}$ | $5/3 \times V_{BAT}$ |
| Fifth Buck/Boost Mode | 3/4 | $3/4 \times V_{BAT}$ | $7/4 \times V_{BAT}$ |
| OFF Mode | OFF | FLOATING | FLOATING |

TABLE 2A-2

MODES OF OPERATION TABLE FOR BUCK/BOOST OPERATION OF A DUAL OUTPUT μC CHARGE PUMP CIRCUIT

| MODES OF OPERATION | OPERATIONAL RATIOS, $(x\mu BB_{RATIO})$ | FIRST μC CHARGE PUMP OUTPUT, $(V_{\mu C\_OUT1})$, where $V_{\mu C\_OUT1} = (1 - x\mu BB_{RATIO}) \times V_{BAT}$ | SECOND μC CHARGE PUMP OUTPUT, $(V_{\mu C\_OUT2})$, where $V_{\mu C\_OUT2} = (1 + x\mu BB_{RATIO}) \times V_{BAT}$ |
|---|---|---|---|
| Sixth Buck/Boost Mode | 1/4 | $3/4 \times V_{BAT}$ | $5/4 \times V_{BAT}$ |
| Seventh Buck/Boost Mode | 1/3 | $2/3 \times V_{BAT}$ | $4/3 \times V_{BAT}$ |
| Eigth Buck/Boost Mode | 1/2 | $1/2 \times V_{BAT}$ | $3/2 \times V_{BAT}$ |
| Ninth Buck/Boost Mode | 2/3 | $1/3 \times V_{BAT}$ | $5/3 \times V_{BAT}$ |
| Tenth Buck/Boost Mode | 3/4 | $1/4 \times V_{BAT}$ | $7/4 \times V_{BAT}$ |
| OFF Mode | OFF | FLOATING | FLOATING |

TABLE 2B-1A

SWITCH OPERATION TABLE FOR BUCK/BOOST MODE OF OPERATION OF DUAL OUTPUT μC CHARGE PUMP

MODES OF OPERATION FOR BUCK/BOOST OPERATION OF DUAL OUTPUT μC CHARGE PUMP WITH CORRESPONDING OPERATIONAL RATIOS, $(x\mu BB_{RATIO})$

| See, TABLE 2A-1 μC CHARGE PUMP SWITCHES | First Buck/Boost Mode, $(x\mu BB_{RATIO} = 1/4)$, where $V_{\mu C\_OUT1} = 1/4 \times V_{BAT}$ and $V_{\mu C\_OUT2} = 5/4 \times V_{BAT}$ | Second Buck/Boost Mode, $(x\mu BB_{RATIO} = 1/3)$, where $V_{\mu C\_OUT1} = 1/3 \times V_{BAT}$, and $V_{\mu C\_OUT2} = 4/3 \times V_{BAT}$ | Third Buck/Boost Mode, $(x\mu BB_{RATIO} = 1/2)$, where $V_{\mu C\_OUT1} = 1/2 \times V_{BAT}$, and $V_{\mu C\_OUT2} = 3/2 \times V_{BAT}$ |
|---|---|---|---|
| SW 1 | Phase 1 | Phase 1 | Phase 1 |
| SW 2 | OPEN | Phase 2 | Phase 2 |
| SW 3 | Phase 3 | Phase 2 | Phase 2 |
| SW 4 | OPEN | OPEN | Phase 1 |
| SW 5 | Phase 1 | Phase 1 | OPEN |

TABLE 2B-1A-continued

SWITCH OPERATION TABLE FOR BUCK/BOOST MODE
OF OPERATION OF DUAL OUTPUT µC CHARGE PUMP

MODES OF OPERATION FOR BUCK/BOOST OPERATION OF DUAL OUTPUT µC
CHARGE PUMP WITH CORRESPONDING OPERATIONAL RATIOS, $(x\mu BB_{RATIO})$

| See, TABLE 2A-1 µC CHARGE PUMP SWITCHES | First Buck/Boost Mode, $(x\mu BB_{RATIO} = 1/4)$, where $V_{\mu C\_OUT1} = 1/4 \times V_{BAT}$ and $V_{\mu C\_OUT2} = 5/4 \times V_{BAT}$ | Second Buck/Boost Mode, $(x\mu BB_{RATIO} = 1/3)$, where $V_{\mu C\_OUT1} = 1/3 \times V_{BAT}$, and $V_{\mu C\_OUT2} = 4/3 \times V_{BAT}$ | Third Buck/Boost Mode, $(x\mu BB_{RATIO} = 1/2)$, where $V_{\mu C\_OUT1} = 1/2 \times V_{BAT}$, and $V_{\mu C\_OUT2} = 3/2 \times V_{BAT}$ |
|---|---|---|---|
| SW 6 | OPEN | OPEN | Phase 1 |
| SW 7 | Phase 2 | Phase 2 | Phase 2 |
| SW 8 | Phase 2 | Phase 2 | Phase 2 |
| SW 9 | Phase 1 and Phase 3 | Phase 1 | Phase 1 |
| SW 10 | Phase 3 and Phase 4 | Phase 3 | Phase 3 |
| SW 11 | OPEN | Phase 3 | Phase 3 |
| SW 12 | Phase 4 | OPEN | OPEN |
| SW 13 | OPEN | Phase 3 | Phase 3 |
| SW 14 | OPEN | OPEN | OPEN |
| SW 15 | Phase 4 | Phase 3 | Phase 3 |

TABLE 2B-1B

SWITCH OPERATION TABLE FOR BUCK/BOOST MODE
OF OPERATION OF DUAL OUTPUT µC CHARGE PUMP

MODES OF OPERATION FOR BUCK/BOOST OPERATION OF DUAL OUTPUT µC
CHARGE PUMP WITH CORRESPONDING OPERATIONAL RATIOS, $(x\mu BB_{RATIO})$

| See, TABLE 2A-1 µC CHARGE PUMP SWITCHES | Fourth Buck/Boost Mode, $(x\mu BB_{RATIO} = 2/3)$, where $V_{\mu C\_OUT1} = 2/3 \times V_{BAT}$ and $V_{\mu C\_OUT2} = 5/3 \times V_{BAT}$ | Fifth Buck/Boost Mode, $(x\mu BB_{RATIO} = 3/4)$, where $V_{\mu C\_OUT1} = 3/4 \times V_{BAT}$, and $V_{\mu C\_OUT2} = 7/4 \times V_{BAT}$ | OFF Mode where $V_{\mu C\_OUT1}$ = FLOAT $V_{\mu C\_OUT2}$ = FLOAT |
|---|---|---|---|
| SW 1 | Phase 1 | OPEN | OPEN |
| SW 2 | Phase 2 | Phase 3 | OPEN |
| SW 3 | OPEN | OPEN | OPEN |
| SW 4 | Phase 1 | Phase 1 | OPEN |
| SW 5 | Phase 2 and Phase 3 | Phase 3 and Phase 4 | OPEN |
| SW 6 | Phase 1 | Phase 2 | OPEN |
| SW 7 | OPEN | OPEN | OPEN |
| SW 8 | Phase 2 | Phase 3 | OPEN |
| SW 9 | Phase 1 | Phase 2 | OPEN |
| SW 10 | Phase 3 | Phase 1 and Phase 4 | OPEN |
| SW 11 | Phase 3 | Phase 1 and Phase 4 | OPEN |
| SW 12 | OPEN | OPEN | OPEN |
| SW 13 | Phase 3 | Phase 4 | OPEN |
| SW 14 | OPEN | OPEN | OPEN |
| SW 15 | OPEN | OPEN | OPEN |

TABLE 2B-2A

SWITCH OPERATION TABLE FOR BUCK/BOOST MODE
OF OPERATION OF DUAL OUTPUT µC CHARGE PUMP

MODES OF OPERATION FOR BUCK/BOOST OPERATION OF DUAL OUTPUT µC
CHARGE PUMP WITH CORRESPONDING OPERATIONAL RATIOS, $(x\mu BB_{RATIO})$

| See, TABLE 2A-2 µC CHARGE PUMP SWITCHES | Sixth Buck/Boost Mode, $(x\mu BB_{RATIO} = 1/4)$, where $V_{\mu C\_OUT1} = 3/4 \times V_{BAT}$ and $V_{\mu C\_OUT2} = 5/4 \times V_{BAT}$ | Seventh Buck/Boost Mode, $(x\mu BB_{RATIO} = 1/3)$, where $V_{\mu C\_OUT1} = 2/3 \times V_{BAT}$, and $V_{\mu C\_OUT2} = 4/3 \times V_{BAT}$ | Eighth Buck/Boost Mode, $(x\mu BB_{RATIO} = 1/2)$, where $V_{\mu C\_OUT1} = 1/2 \times V_{BAT}$, and $V_{\mu C\_OUT2} = 3/2 \times V_{BAT}$ |
|---|---|---|---|
| SW 1 | OPEN | Phase 1 | Phase 1 |
| SW 2 | Phase 3 | Phase 2 | Phase 2 |
| SW 3 | OPEN | OPEN | Phase 2 |
| SW 4 | Phase 1 | Phase 1 | Phase 1 |
| SW 5 | Phase 3 | Phase 2 | OPEN |
| SW 6 | Phase 2 | Phase 1 | Phase 1 |
| SW 7 | OPEN | OPEN | Phase 2 |

TABLE 2B-2A-continued

SWITCH OPERATION TABLE FOR BUCK/BOOST MODE
OF OPERATION OF DUAL OUTPUT μC CHARGE PUMP

MODES OF OPERATION FOR BUCK/BOOST OPERATION OF DUAL OUTPUT μC
CHARGE PUMP WITH CORRESPONDING OPERATIONAL RATIOS, (xμBB$_{RATIO}$)

| See,<br>TABLE 2A-2<br>μC CHARGE PUMP<br>SWITCHES | Sixth Buck/Boost Mode,<br>(xμBB$_{RATIO}$ = 1/4), where<br>V$_{μC\_OUT1}$ = 3/4 × V$_{BAT}$ and<br>V$_{μC\_OUT2}$ = 5/4 × V$_{BAT}$ | Seventh Buck/Boost Mode,<br>(xμBB$_{RATIO}$ = 1/3), where<br>V$_{μC\_OUT1}$ = 2/3 × V$_{BAT}$, and<br>V$_{μC\_OUT2}$ = 4/3 × V$_{BAT}$ | Eighth Buck/Boost Mode,<br>(xμBB$_{RATIO}$ = 1/2), where<br>V$_{μC\_OUT1}$ = 1/2 × V$_{BAT}$, and<br>V$_{μC\_OUT2}$ = 3/2 × V$_{BAT}$ |
|---|---|---|---|
| SW 8 | Phase 3 | Phase 2 | Phase 2 |
| SW 9 | Phase 2 | Phase 1 | Phase 1 |
| SW 10 | Phase 1 and Phase 4 | Phase 3 | Phase 3 |
| SW 11 | Phase 1 | Phase 3 | Phase 3 |
| SW 12 | Phase 4 | OPEN | OPEN |
| SW 13 | OPEN | Phase 3 | Phase 3 |
| SW 14 | OPEN | OPEN | OPEN |
| SW 15 | Phase 4 | Phase 3 | Phase 3 |

TABLE 2B-2B

SWITCH OPERATION TABLE FOR BUCK/BOOST MODE
OF OPERATION OF DUAL OUTPUT μC CHARGE PUMP

MODES OF OPERATION FOR BUCK/BOOST OPERATION OF DUAL OUTPUT μC
CHARGE PUMP WITH CORRESPONDING OPERATIONAL RATIOS, (xμBB$_{RATIO}$)

| See,<br>TABLE 2A-2<br>μC CHARGE PUMP<br>SWITCHES | Ninth Buck/Boost Mode,<br>(xμBB$_{RATIO}$ = 2/3), where<br>V$_{μC\_OUT1}$ = 1/3 × V$_{BAT}$ and<br>V$_{μC\_OUT2}$ = 5/3 × V$_{BAT}$ | Tenth Buck/Boost Mode,<br>(xμBB$_{RATIO}$ = 3/4), where<br>V$_{μC\_OUT1}$ = 1/4 × V$_{BAT}$, and<br>V$_{μC\_OUT2}$ = 7/4 × V$_{BAT}$ | OFF Mode<br>where<br>V$_{μC\_OUT1}$ = FLOAT<br>V$_{μC\_OUT2}$ = FLOAT |
|---|---|---|---|
| SW 1 | Phase 1 | Phase 1 | OPEN |
| SW 2 | Phase 2 | OPEN | OPEN |
| SW 3 | Phase 2 | Phase 3 | OPEN |
| SW 4 | OPEN | OPEN | OPEN |
| SW 5 | Phase 1 and Phase 3 | Phase 1 and Phase 4 | OPEN |
| SW 6 | OPEN | OPEN | OPEN |
| SW 7 | Phase 2 | Phase 2 | OPEN |
| SW 8 | Phase 2 | Phase 2 | OPEN |
| SW 9 | Phase 1 | Phase 1 and Phase 3 | OPEN |
| SW 10 | Phase 3 | Phase 3 and Phase 4 | OPEN |
| SW 11 | Phase 3 | Phase 4 | OPEN |
| SW 12 | OPEN | OPEN | OPEN |
| SW 13 | Phase 3 | Phase 4 | OPEN |
| SW 14 | OPEN | OPEN | OPEN |
| SW 15 | OPEN | OPEN | OPEN |

The configurations and operations of the dual output μC charge pump circuit 12A when the dual output μC charge pump circuit 12A operates in the various buck/boost modes, described in the TABLE 2A-1 and the TABLE 2A-2, will now be discussed with reference to the TABLE 2B-1A, the TABLE 2B-1B, the TABLE 2B-2A, and the TABLE 2B-2B.

Figure 8A:
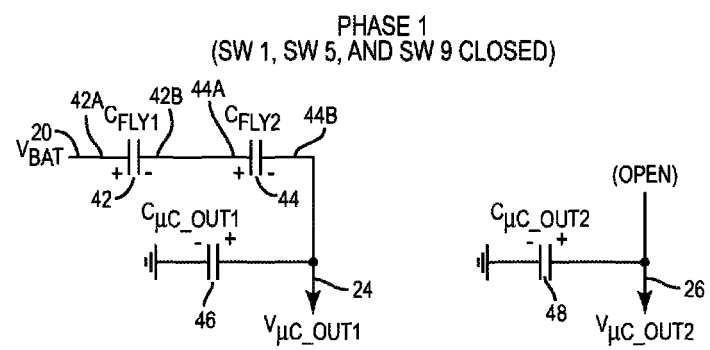
FIGS. 8A-B depict a mode of operation of an embodiment of a dual output μC charge pump configured to operate in a first buck/boost mode.
Figure 8A:
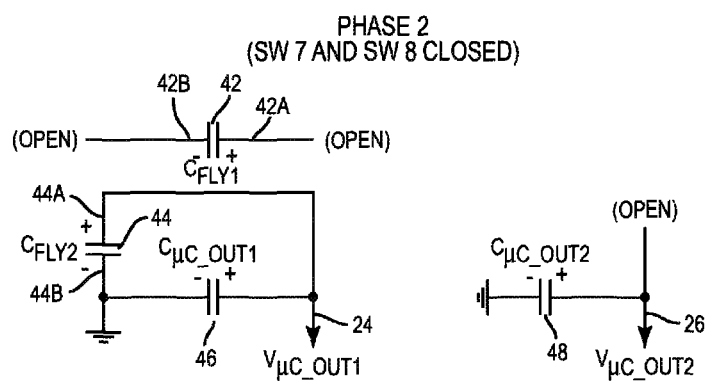
Figure 8B:
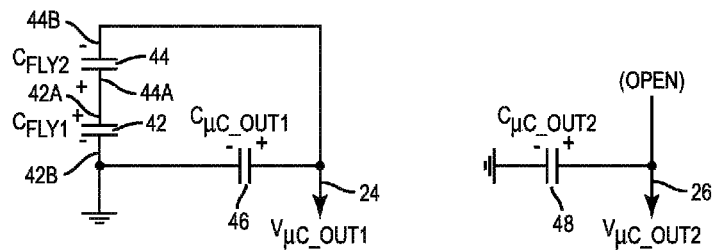
Figure 8B:
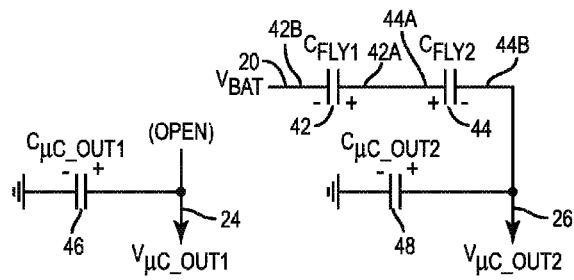

TABLE 2B-1A describes, and FIGS. 8A-B depicts, the operation of the dual output μC charge pump circuit 12A when the controller 14 configures the dual output μC charge pump circuit 12A to operate in the First Buck/Boost Mode. The controller 14 configures the multiple output μC charge pump control circuit 72A to use an operational ratio, (xμB$_{BRATIO}$), set to 1/4. The multiple output μC charge pump control circuit 72A operably divides the operation of the dual output μC charge pump circuit 12A into four phases of operation. The multiple output μC charge pump control circuit 72A operably configures the dual output μC charge pump switch matrix circuit 70A such that first μC charge pump output 24 generates a first μC charge pump output voltage, (V$_{μC\_OUT1}$), substantially equal to 1/4×V$_{SAT}$, and the second μC charge pump output 26 generates a second μC charge pump output voltage, (V$_{μC\_OUT2}$), substantially equal to 5/4×V$_{BAT}$.

As described in TABLE 2B-1A and depicted in FIG. 8A, in the first phase of operation, (Phase 1), the multiple output μC charge pump control circuit 72A operably closes the first switch 74, (SW 1), the fifth switch 82, (SW 5), and the ninth switch 90, (SW 9). In the second phase of operation, (Phase 2), the multiple output μC charge pump control circuit 72A operably closes the seventh switch 86, (SW 7), and the eighth switch 88, (SW 8). As further depicted in FIG. 8B, in the third phase of operation, (Phase 3), the multiple output μC charge pump control circuit 72A operably closes the third switch 78, (SW 3), the ninth switch 90, (SW 9), and the tenth switch 92, (SW 10). In the fourth phase of operation, (Phase 4), the multiple output μC charge pump control circuit 72A operably closes the tenth switch 92, (SW 10), the twelfth switch 96, (SW 12), and the fifteenth switch 102, (SW 15).

As a result, the first flying capacitor 42, (C$_{FLY1}$), develops a first flying capacitor voltage, (V$_{CAP\_FLY1}$), substantially equal to 1/2×V$_{BAT}$, and the second flying capacitor 44, ($C_{FLY2}$), develops a second flying capacitor voltage, ($V_{CAP\_FLY2}$), substantially equal to $1/4 \times V_{BAT}$. Accordingly, first μC charge pump output 24 generates a first μC charge pump output voltage, ($V_{\mu C\_OUT1}$), substantially equal to $1/4 \times V_{BAT}$, on the first μC charge pump output capacitor 46, ($C_{\mu C\_OUT1}$), and the second μC charge pump output 26 generates a second μC charge pump output voltage, ($V_{\mu C\_OUT2}$), substantially equal to $5/4 \times V_{BAT}$ on the second μC charge pump output capacitor 48, ($C_{\mu C\_OUT2}$).

Figure 9:
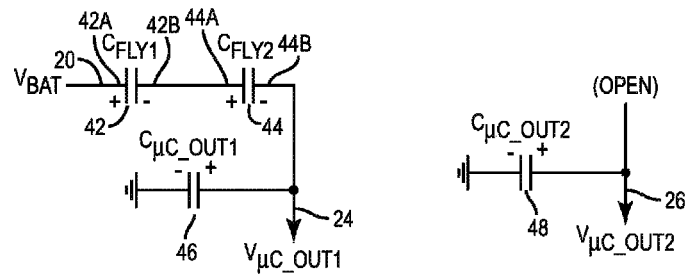
FIG. 9 depicts a mode of operation of an embodiment of a dual output μC charge pump configured to operate in a second buck/boost mode.
Figure 9:
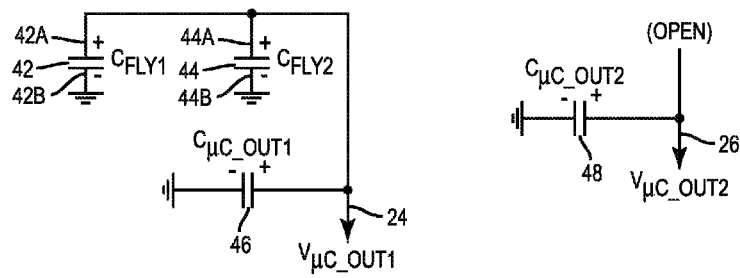
Figure 9:
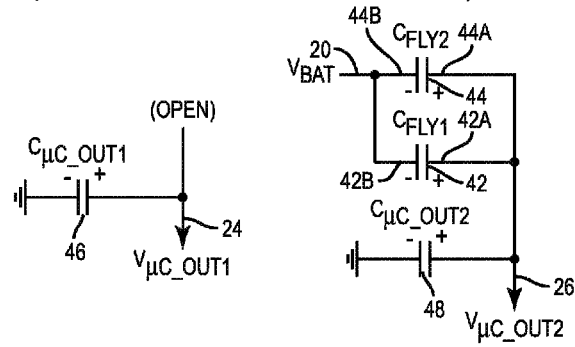

TABLE 2B-1A describes, and FIG. 9 depicts, the operation of the dual output μC charge pump circuit 12A when the controller 14 configures the dual output μC charge pump circuit 12A to operate in the Second Buck/Boost Mode. The controller 14 configures the multiple output μC charge pump control circuit 72A to use an operational ratio, (xμBB$_{RATIO}$), set to 1/3. The multiple output μC charge pump control circuit 72A operably divides the operation of the dual output μC charge pump circuit 12A into three phases of operation. The multiple output μC charge pump control circuit 72A operably configures the dual output μC charge pump switch matrix circuit 70A such that first μC charge pump output 24 generates a first μC charge pump output voltage, ($V_{\mu C\_OUT1}$), substantially equal to $1/3 \times V_{BAT}$, and the second μC charge pump output 26 generates a second μC charge pump output voltage, ($V_{\mu C\_OUT2}$), substantially equal to $4/3 \times V_{BAT}$.

As described in TABLE 2B-1A and depicted in FIG. 9, in the first phase of operation, (Phase 1), the multiple output μC charge pump control circuit 72A operably closes the first switch 74, (SW 1), the fifth switch 82, (SW 5), and the ninth switch 90, (SW 9). In the second phase of operation, (Phase 2), the multiple output μC charge pump control circuit 72A operably closes the second switch 76, (SW 2), the third switch 78, (SW 3), the seventh switch 86, (SW 7), and the eighth switch 88, (SW 8). In the third phase of operation, (Phase 3), the multiple output μC charge pump control circuit 72A operably closes the tenth switch 92, (SW 10), the eleventh switch 94, (SW 11), the thirteenth switch 98, (SW 13), and the fifteenth switch 102, (SW 15).

As a result, the first flying capacitor 42, ($C_{FLY1}$), develops a first flying capacitor voltage, ($V_{CAP\_FLY1}$), substantially equal to $1/3 \times V_{BAT}$, and the second flying capacitor 44, ($C_{FLY2}$), develops a second flying capacitor voltage, ($V_{CAP\_FLY2}$), substantially equal to $1/3 \times V_{BAT}$. Accordingly, first μC charge pump output 24 generates a first μC charge pump output voltage, ($V_{\mu C\_OUT1}$), substantially equal to $1/3 \times V_{BAT}$, on the first μC charge pump output capacitor 46, ($C_{\mu C\_OUT1}$), and the second μC charge pump output 26 generates a second μC charge pump output voltage, ($V_{\mu C\_OUT2}$), substantially equal to $4/3 \times V_{BAT}$ on the second μC charge pump output capacitor 48, ($C_{\mu C\_OUT2}$).

Figure 10:
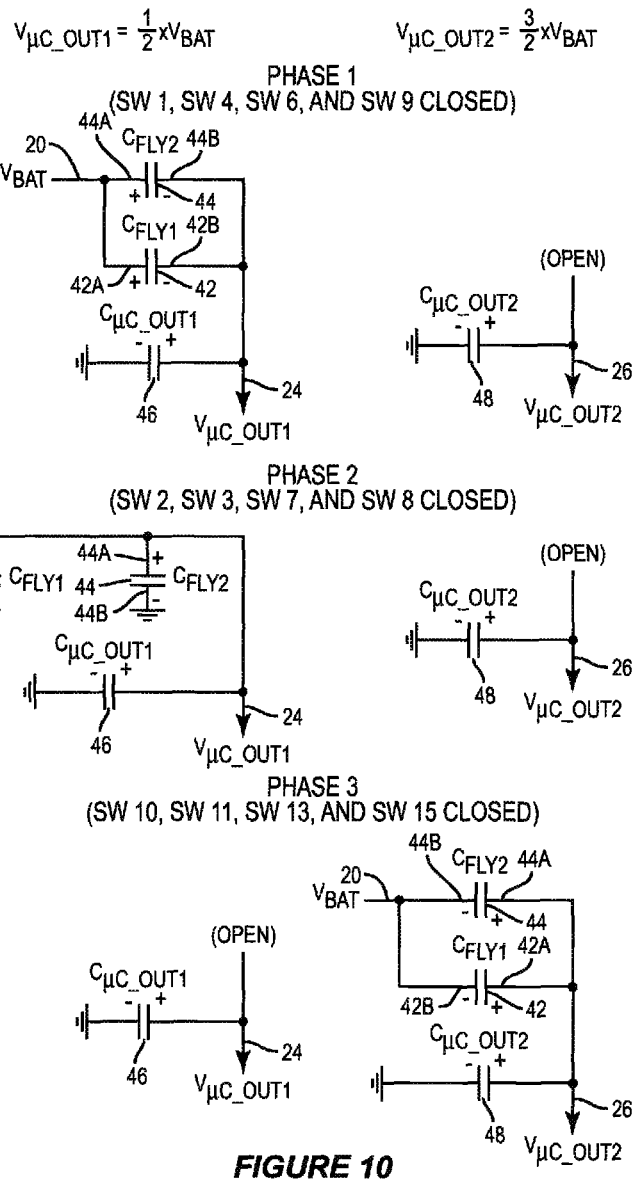
FIG. 10 depicts a mode of operation of an embodiment of a dual output μC charge pump configured to operate in a third buck/boost mode.

TABLE 2B-1A describes, and FIG. 10 depicts, the operation of the dual output μC charge pump circuit 12A when the controller 14 configures the dual output μC charge pump circuit 12A to operate in the Third Buck/Boost Mode. The controller 14 configures the multiple output μC charge pump control circuit 72A to use an operational ratio, (xμBB$_{RATIO}$), set to 1/2. The multiple output μC charge pump control circuit 72A operably divides the operation of the dual output μC charge pump circuit 12A into three phases of operation. The multiple output μC charge pump control circuit 72A operably configures the dual output μC charge pump switch matrix circuit 70A such that first μC charge pump output 24 generates a first μC charge pump output voltage, ($V_{\mu C\_OUT1}$), substantially equal to $1/2 \times V_{BAT}$, and the second μC charge pump output 26 generates a second μC charge pump output voltage, ($V_{\mu C\_OUT2}$), substantially equal to $3/2 \times V_{BAT}$.

As further described in TABLE 2B-1A and depicted in FIG. 10, in the first phase of operation, (Phase 1), the multiple output μC charge pump control circuit 72A operably closes the first switch 74, (SW 1), the fourth switch 80, (SW 4), the fifth switch 82, (SW 5), the sixth switch 84, (SW 6), and the ninth switch 90, (SW 9). In the second phase of operation, (Phase 2), the multiple output μC charge pump control circuit 72A operably closes the second switch 76, (SW 2), the third switch 78, (SW 3), the seventh switch 86, (SW 7), and the eighth switch 88, (SW 8). In the third phase of operation, (Phase 3), the multiple output μC charge pump control circuit 72A operably closes the tenth switch 92, (SW 10), the eleventh switch 94, (SW 11), the thirteenth switch 98, (SW 13), and the fifteenth switch 102, (SW 15).

As a result, the first flying capacitor 42, ($C_{FLY1}$), develops a first flying capacitor voltage, ($V_{CAP\_FLY1}$), substantially equal to $1/2 \times V_{BAT}$, and the second flying capacitor 44, ($C_{FLY2}$), develops a second flying capacitor voltage, ($V_{CAP\_FLY2}$), substantially equal to $1/2 \times V_{BAT}$. Accordingly, first μC charge pump output 24 generates a first μC charge pump output voltage, ($V_{\mu C\_OUT1}$), substantially equal to $1/2 \times V_{BAT}$, on the first μC charge pump output capacitor 46, ($C_{\mu C\_OUT1}$), and the second μC charge pump output 26 generates a second μC charge pump output voltage, ($V_{\mu C\_OUT2}$), substantially equal to $3/2 \times V_{BAT}$ on the second μC charge pump output capacitor 48, ($C_{\mu C\_OUT2}$).

Figure 11:
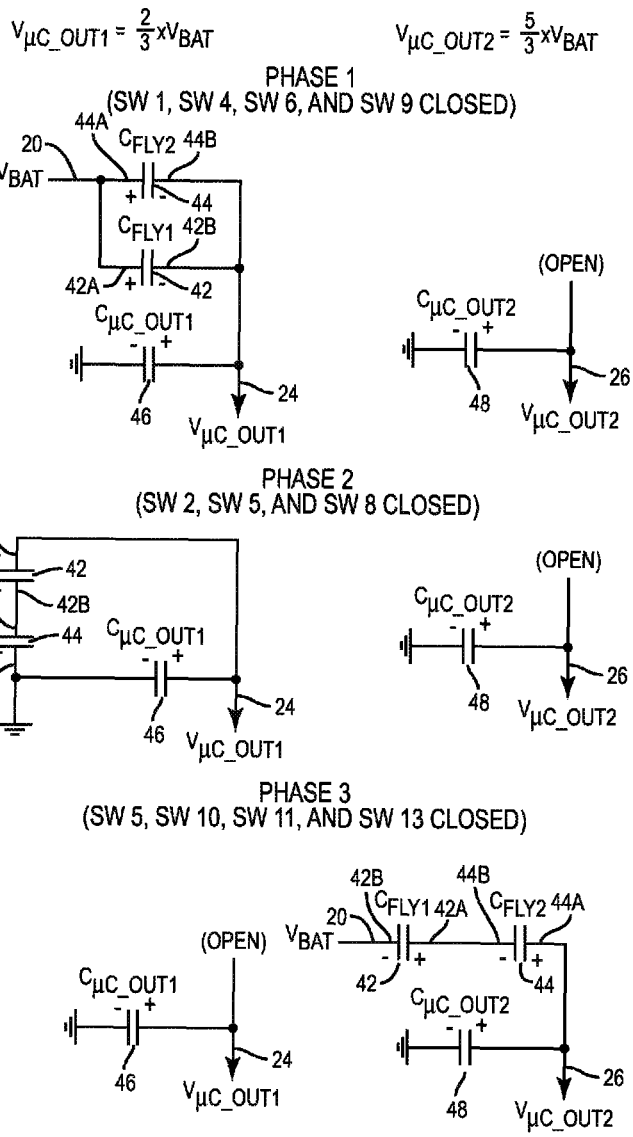
FIG. 11 depicts a mode of operation of an embodiment of a dual output μC charge pump configured to operate in a fourth buck/boost mode.

TABLE 2B-1B describes, and FIG. 11 depicts, the operation of the dual output μC charge pump circuit 12A when the controller 14 configures the dual output μC charge pump circuit 12A to operate in the Fourth Buck/Boost Mode. The controller 14 configures the multiple output μC charge pump control circuit 72A to use an operational ratio, (xμBB$_{RATIO}$), set to 2/3. The multiple output μC charge pump control circuit 72A operably divides the operation of the dual output μC charge pump circuit 12A into three phases of operation. The multiple output μC charge pump control circuit 72A operably configures the dual output μC charge pump switch matrix circuit 70A such that first μC charge pump output 24 generates a first μC charge pump output voltage, ($V_{\mu C\_OUT1}$), substantially equal to $2/3 \times V_{BAT}$, and the second μC charge pump output 26 generates a second μC charge pump output voltage, ($V_{\mu C\_OUT2}$), substantially equal to $5/3 \times V_{BAT}$.

As further described in TABLE 2B-1B and depicted in FIG. 11, in the first phase of operation, (Phase 1), the multiple output μC charge pump control circuit 72A operably closes the first switch 74, (SW 1), the fourth switch 80, (SW 4), the sixth switch 84, (SW 6), and the ninth switch 90, (SW 9). In the second phase of operation, (Phase 2), the multiple output μC charge pump control circuit 72A operably closes the second switch 76, (SW 2), the fifth switch 82, (SW 5), and the eighth switch 88, (SW 8). In the third phase of operation, (Phase 3), the multiple output μC charge pump control circuit 72A operably closes the fifth switch 82, (SW 5), the tenth switch 92, (SW 10), the eleventh switch 94, (SW 11), and the thirteenth switch 98, (SW 13).

As a result, the first flying capacitor 42, ($C_{FLY1}$), develops a first flying capacitor voltage, ($V_{CAP\_FLY1}$), substantially equal to $1/3 \times V_{BAT}$, and the second flying capacitor 44, ($C_{FLY2}$), develops a second flying capacitor voltage, ($V_{CAP\_FLY2}$), substantially equal to $1/3 \times V_{BAT}$. Accordingly, first μC charge pump output 24 generates a first μC charge pump output voltage, ($V_{\mu C\_OUT1}$), substantially equal to $2/3 \times V_{BAT}$, on the first μC charge pump output capacitor 46, ($C_{\mu C\_OUT1}$), and the second µC charge pump output 26 generates a second µC charge pump output voltage, ($V_{\mu C\_OUT2}$), substantially equal to $5/3 \times V_{BAT}$ on the second µC charge pump output capacitor 48, ($C_{\mu C\_OUT2}$).

Figure 12A:
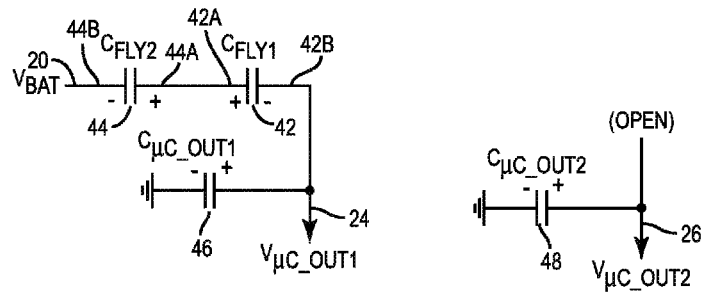
FIGS. 12A-B depict a mode of operation of an embodiment of a dual output μC charge pump configured to operate in a fifth buck/boost mode.
Figure 12A:
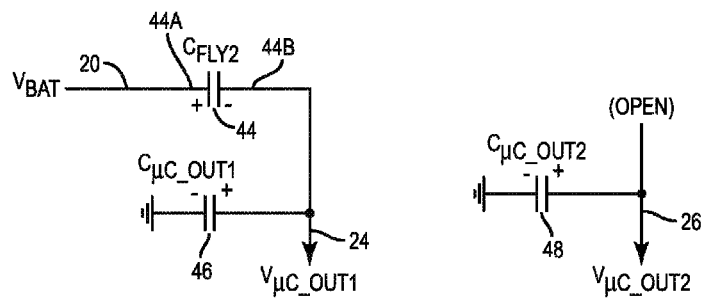
Figure 12B:
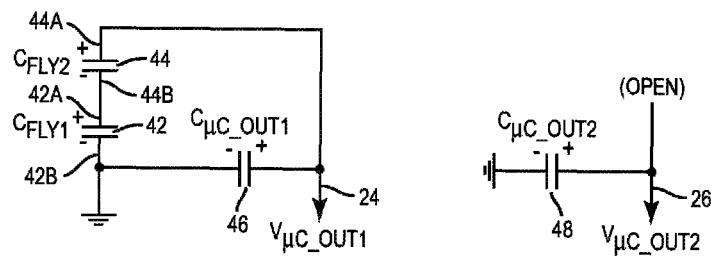
Figure 12B:
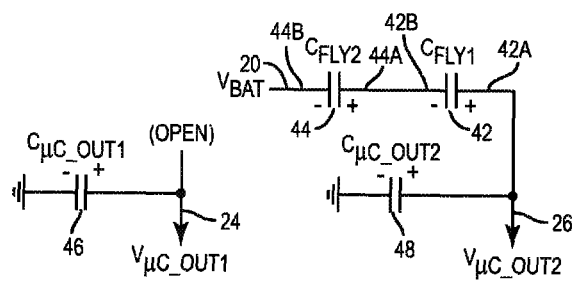

TABLE 2B-1B describes, and FIGS. 12A-B depicts, the operation of the dual output µC charge pump circuit 12A when the controller 14 configures the dual output µC charge pump circuit 12A to operate in the Fifth Buck/Boost Mode. The controller 14 configures the multiple output µC charge pump control circuit 72A to use an operational ratio, ($x\mu BB_{RATIO}$), set to 3/4. The multiple output µC charge pump control circuit 72A operably divides the operation of the dual output µC charge pump circuit 12A into four phases of operation. The multiple output µC charge pump control circuit 72A operably configures the dual output µC charge pump switch matrix circuit 70A such that first µC charge pump output 24 generates a first µC charge pump output voltage, ($V_{\mu C\_OUT1}$), substantially equal to $3/4 \times V_{BAT}$, and the second µC charge pump output 26 generates a second µC charge pump output voltage, ($V_{\mu C\_OUT2}$), substantially equal to $7/4 \times V_{BAT}$.

As further described in TABLE 2B-1B and depicted in FIG. 12A, in the first phase of operation, (Phase 1), the multiple output µC charge pump control circuit 72A operably closes the fourth switch 80, (SW 4), the tenth switch 92, (SW 10), and the eleventh switch 94, (SW 11). In the second phase of operation, (Phase 2), the multiple output µC charge pump control circuit 72A operably closes the sixth switch 84, (SW 6), and the ninth switch 90, (SW 9). As further depicted in FIG. 12B, in the third phase of operation, (Phase 3), the multiple output µC charge pump control circuit 72A operably closes the second switch 76, (SW 2), the fifth switch 82, (SW 5), and the eighth switch 88, (SW 8). In the fourth phase of operation, (Phase 4), the multiple output µC charge pump control circuit 72A operably closes the fifth switch 82, (SW 5), the tenth switch 92, (SW 10), the eleventh switch 94, (SW 11), and the thirteenth switch 98, (SW 13).

As a result, the first flying capacitor 42, ($C_{FLY1}$), develops a first flying capacitor voltage, ($V_{CAP\_FLY1}$), substantially equal to $1/2 \times V_{BAT}$, and the second flying capacitor 44, ($C_{FLY2}$), develops a second flying capacitor voltage, ($V_{CAP\_FLY2}$), substantially equal to $1/4 \times V_{BAT}$. Accordingly, first µC charge pump output 24 generates a first µC charge pump output voltage, ($V_{\mu C\_OUT1}$), substantially equal to $3/4 \times V_{BAT}$, on the first µC charge pump output capacitor 46, ($C_{\mu C\_OUT1}$), and the second µC charge pump output 26 generates a second µC charge pump output voltage, ($V_{\mu C\_OUT2}$), substantially equal to $7/4 \times V_{BAT}$ on the second µC charge pump output capacitor 48, ($C_{\mu C\_OUT2}$).

Figure 13A:
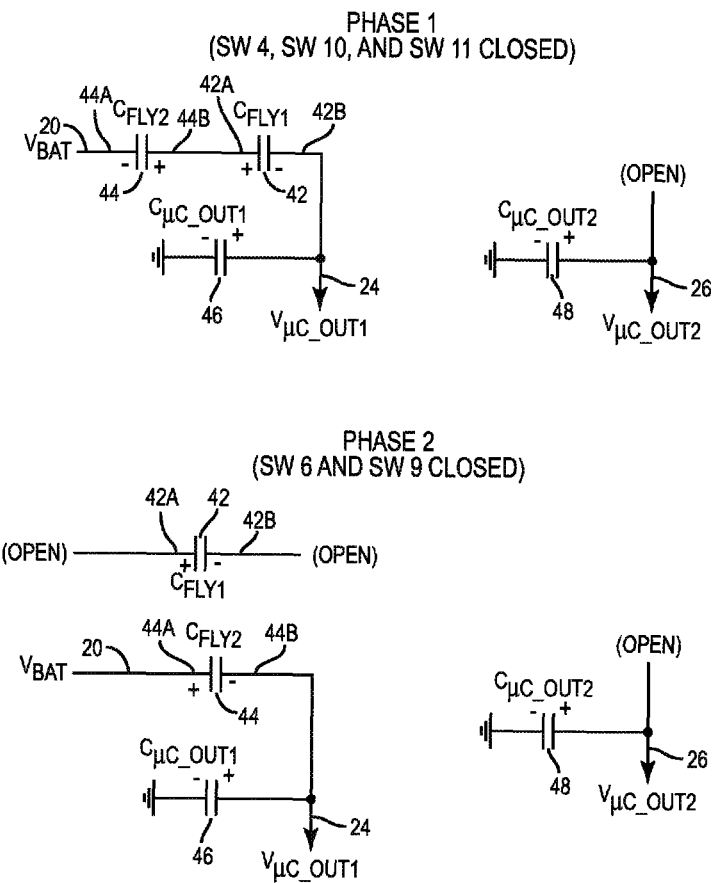
FIGS. 13A-B depict a mode of operation of an embodiment of a dual output μC charge pump configured to operate in a sixth buck/boost mode.
Figure 13B:
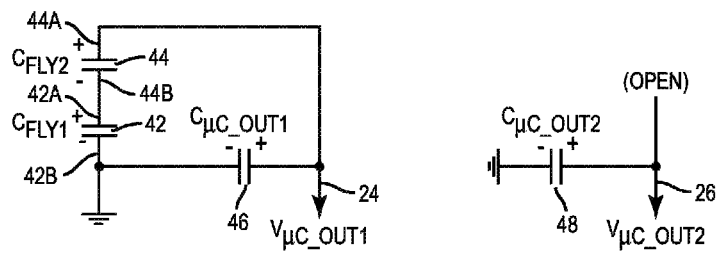
Figure 13B:
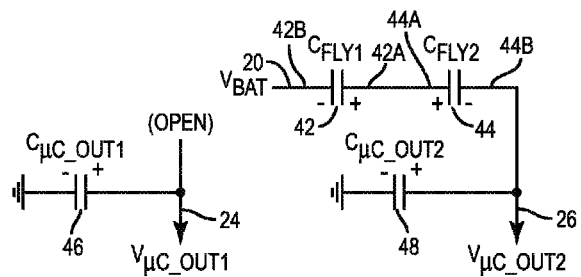

TABLE 2B-2A describes, and FIGS. 13A-B depicts, the operation of the dual output µC charge pump circuit 12A when the controller 14 configures the dual output µC charge pump circuit 12A to operate in the Sixth Buck/Boost Mode. The controller 14 configures the multiple output µC charge pump control circuit 72A to use an operational ratio, ($x\mu BB_{RATIO}$), set to 1/4. The multiple output µC charge pump control circuit 72A operably divides the operation of the dual output µC charge pump circuit 12A into four phases of operation. The multiple output µC charge pump control circuit 72A operably configures the dual output µC charge pump switch matrix circuit 70A such that first µC charge pump output 24 generates a first µC charge pump output voltage, ($V_{\mu C\_OUT1}$), substantially equal to $3/4 \times V_{BAT}$, and the second µC charge pump output 26 generates a second µC charge pump output voltage, ($V_{\mu C\_OUT2}$), substantially equal to $5/4 \times V_{BAT}$.

As described in TABLE 2B-2A and depicted in FIG. 13A, in the first phase of operation, (Phase 1), the multiple output µC charge pump control circuit 72A operably closes the fourth switch 80, (SW 4), the tenth switch 92, (SW 10), and the eleventh switch 94, (SW 11). In the second phase of operation, (Phase 2), the multiple output µC charge pump control circuit 72A operably closes the sixth switch 84, (SW 6), and the ninth switch 90, (SW 9). As further depicted in FIG. 13B, in the third phase of operation, (Phase 3), the multiple output µC charge pump control circuit 72A operably closes the second switch 76, (SW 2), the fifth switch 82, (SW 5), and the eighth switch 88, (SW 8). In the fourth phase of operation, (Phase 4), the multiple output µC charge pump control circuit 72A operably closes the tenth switch 92, (SW 10), the twelfth switch 96, (SW 12), and the fifteenth switch 102, (SW 15).

As a result, the first flying capacitor 42, ($C_{FLY1}$), develops a first flying capacitor voltage, ($V_{CAP\_FLY1}$), substantially equal to $1/2 \times V_{BAT}$, and the second flying capacitor 44, ($C_{FLY2}$), develops a second flying capacitor voltage, ($V_{CAP\_FLY2}$), substantially equal to $1/4 \times V_{BAT}$. Accordingly, first µC charge pump output 24 generates a first µC charge pump output voltage, ($V_{\mu C\_OUT1}$), substantially equal to $3/4 \times V_{BAT}$, on the first µC charge pump output capacitor 46, ($C_{\mu C\_OUT1}$), and the second µC charge pump output 26 generates a second µC charge pump output voltage, ($V_{\mu C\_OUT2}$), substantially equal to $5/4 \times V_{BAT}$ on the second µC charge pump output capacitor 48, ($C_{\mu C\_OUT2}$).

Figure 14:
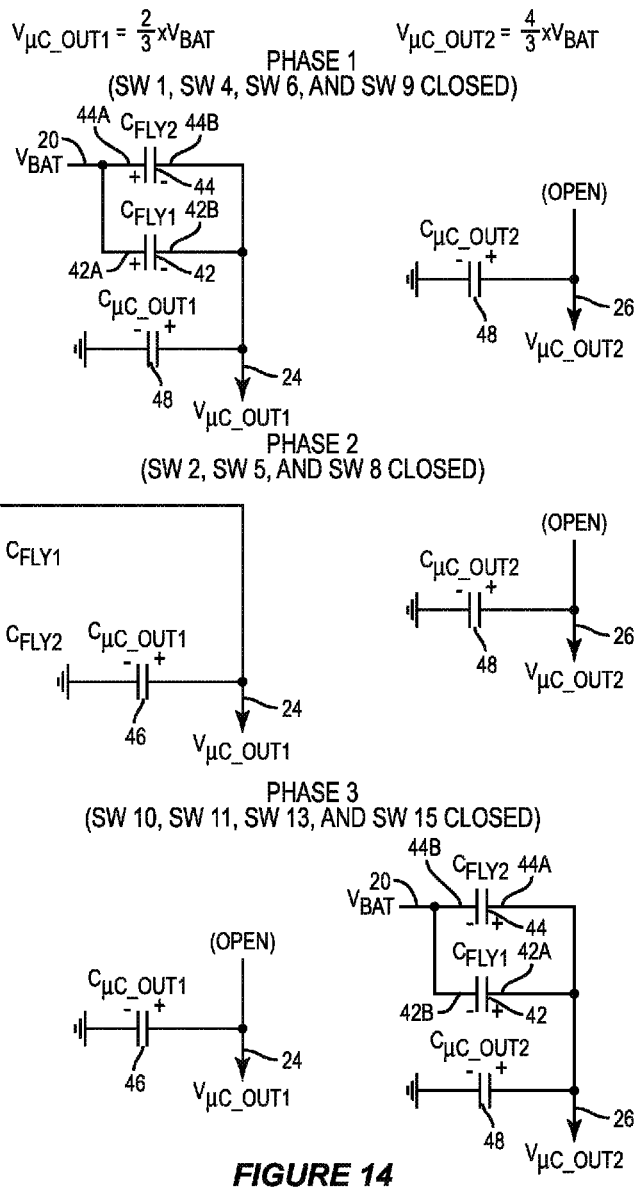
FIG. 14 depicts a mode of operation of an embodiment of a dual output μC charge pump configured to operate in a seventh buck/boost mode.

TABLE 2B-2A describes, and FIG. 14 depicts, the operation of the dual output µC charge pump circuit 12A when the controller 14 configures the dual output µC charge pump circuit 12A to operate in the Seventh Buck/Boost Mode. The controller 14 configures the multiple output µC charge pump control circuit 72A to use an operational ratio, ($x\mu BB_{RATIO}$), set to 1/3. The multiple output µC charge pump control circuit 72A operably divides the operation of the dual output µC charge pump circuit 12A into three phases of operation. The multiple output µC charge pump control circuit 72A operably configures the dual output µC charge pump switch matrix circuit 70A such that first µC charge pump output 24 generates a first µC charge pump output voltage, ($V_{\mu C\_OUT1}$), substantially equal to $2/3 \times V_{BAT}$, and the second µC charge pump output 26 generates a second µC charge pump output voltage, ($V_{\mu C\_OUT2}$), substantially equal to $4/3 \times V_{BAT}$.

As described in TABLE 2B-2A and depicted in FIG. 14, in the first phase of operation, (Phase 1), the multiple output µC charge pump control circuit 72A operably closes the first switch 74, (SW 1), the fourth switch 80, (SW 4), the sixth switch 84, (SW 6), and the ninth switch 90, (SW 9). In the second phase of operation, (Phase 2), the multiple output µC charge pump control circuit 72A operably closes the second switch 76, (SW 2), the fifth switch 82, (SW 5), and the eighth switch 88, (SW 8). In the third phase of operation, (Phase 3), the multiple output µC charge pump control circuit 72A operably closes the tenth switch 92, (SW 10), the eleventh switch 94, (SW 11), the thirteenth switch 98, (SW 13), and the fifteenth switch 102, (SW 15).

As a result, the first flying capacitor 42, ($C_{FLY1}$), develops a first flying capacitor voltage, ($V_{CAP\_FLY1}$), substantially equal to $1/3 \times V_{BAT}$, and the second flying capacitor 44, ($C_{FLY2}$), develops a second flying capacitor voltage, ($V_{CAP\_FLY2}$), substantially equal to $1/3 \times V_{BAT}$. Accordingly, first µC charge pump output 24 generates a first µC charge pump output voltage, ($V_{\mu C\_OUT1}$), substantially equal to $2/3 \times V_{BAT}$, on the first µC charge pump output capacitor 46, ($C_{\mu C\_OUT1}$), and the second µC charge pump output 26 generates a second μC charge pump output voltage, ($V_{\mu C\_OUT2}$), substantially equal to $4/3 \times V_{BAT}$ on the second μC charge pump output capacitor 48, ($C_{\mu C\_OUT2}$).

TABLE 2B-2A describes the operation of the dual output μC charge pump circuit 12A when the controller 14 configures the dual output μC charge pump circuit 12A to operate in the Eighth Buck/Boost Mode. The controller 14 configures the multiple output μC charge pump control circuit 72A to use an operational ratio, ($x\mu BB_{RATIO}$), set to 1/2. The multiple output μC charge pump control circuit 72A operably divides the operation of the dual output μC charge pump circuit 12A into three phases of operation. The multiple output μC charge pump control circuit 72A operably configures the dual output μC charge pump switch matrix circuit 70A such that first μC charge pump output 24 generates a first μC charge pump output voltage, ($V_{\mu C\_OUT1}$), substantially equal to $1/2 \times V_{BAT}$, and the second μC charge pump output 26 generates a second μC charge pump output voltage, ($V_{\mu C\_OUT2}$), substantially equal to $3/2 \times V_{BAT}$.

As further described in TABLE 2B-2A, in the first phase of operation, (Phase 1), the multiple output μC charge pump control circuit 72A operably closes the first switch 74, (SW 1), the fourth switch 80, (SW 4), the fifth switch 82, (SW 5), the sixth switch 84, (SW 6), and the ninth switch 90, (SW 9). In the second phase of operation, (Phase 2), the multiple output μC charge pump control circuit 72A operably closes the second switch 76, (SW 2), the third switch 78, (SW 3), the seventh switch 86, (SW 7), and the eighth switch 88, (SW 8). In the third phase of operation, (Phase 3), the multiple output μC charge pump control circuit 72A operably closes the tenth switch 92, (SW 10), the eleventh switch 94, (SW 11), the thirteenth switch 98, (SW 13), and the fifteenth switch 102, (SW 15).

As a result, the first flying capacitor 42, ($C_{FLY1}$), develops a first flying capacitor voltage, ($V_{CAP\_FLY1}$), substantially equal to $1/2 \times V_{BAT}$, and the second flying capacitor 44, ($C_{FLY2}$), develops a second flying capacitor voltage, ($V_{CAP\_FLY2}$), substantially equal to $1/2 \times V_{BAT}$. Accordingly, first μC charge pump output 24 generates a first μC charge pump output voltage, ($V_{\mu C\_OUT1}$), substantially equal to $1/2 \times V_{BAT}$, on the first μC charge pump output capacitor 46, ($C_{\mu C\_OUT1}$), and the second μC charge pump output 26 generates a second μC charge pump output voltage, ($V_{\mu C\_OUT2}$), substantially equal to $3/2 \times V_{BAT}$ on the second μC charge pump output capacitor 48, ($C_{\mu C\_OUT2}$).

Figure 15:
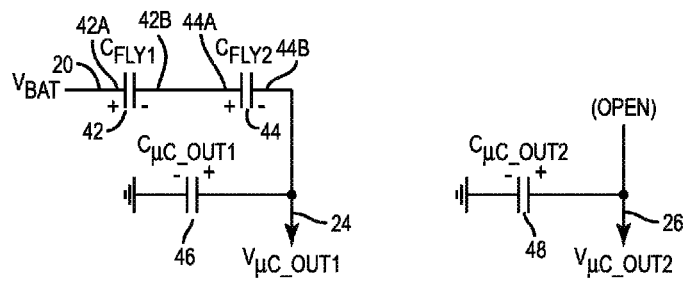
FIG. 15 depicts a mode of operation of an embodiment of a dual output μC charge pump configured to operate in a ninth buck/boost mode.
Figure 15:
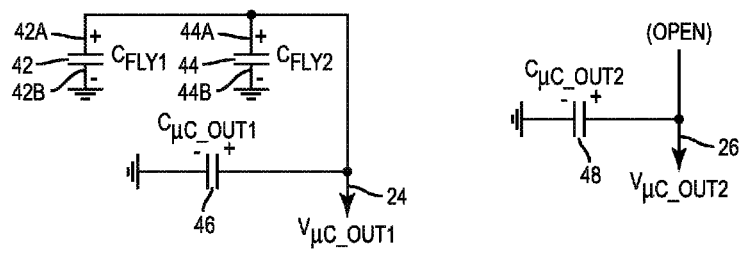
Figure 15:
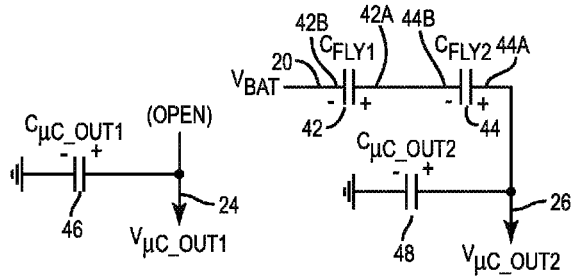

TABLE 2B-2B describes, and FIG. 15 depicts, the operation of the dual output μC charge pump circuit 12A when the controller 14 configures the dual output μC charge pump circuit 12A to operate in the Ninth Buck/Boost Mode. The controller 14 configures the multiple output μC charge pump control circuit 72A to use an operational ratio, ($x\mu BB_{RATIO}$), set to 2/3. The multiple output μC charge pump control circuit 72A operably divides the operation of the dual output μC charge pump circuit 12A into three phases of operation. The multiple output μC charge pump control circuit 72A operably configures the dual output μC charge pump switch matrix circuit 70A such that first μC charge pump output 24 generates a first μC charge pump output voltage, ($V_{\mu C\_OUT1}$), substantially equal to $1/3 \times V_{BAT}$, and the second μC charge pump output 26 generates a second μC charge pump output voltage, ($V_{\mu C\_OUT2}$), substantially equal to $5/3 \times V_{BAT}$.

As further described in TABLE 2B-2B and depicted in FIG. 15, in the first phase of operation, (Phase 1), the multiple output μC charge pump control circuit 72A operably closes the first switch 74, (SW 1), the fifth switch 82, (SW 5), and the ninth switch 90, (SW 9). In the second phase of operation, (Phase 2), the multiple output μC charge pump control circuit 72A operably closes the second switch 76, (SW 2), the third switch 78, (SW 3), the seventh switch 86, (SW 7), and the eighth switch 88, (SW 8). In the third phase of operation, (Phase 3), the multiple output μC charge pump control circuit 72A operably closes the fifth switch 82, (SW 5), the tenth switch 92, (SW 10), the eleventh switch 94, (SW 11), and the thirteenth switch 98, (SW 13).

As a result, the first flying capacitor 42, ($C_{FLY1}$), develops a first flying capacitor voltage, ($V_{CAP\_FLY1}$), substantially equal to $1/3 \times V_{BAT}$, and the second flying capacitor 44, ($C_{FLY2}$), develops a second flying capacitor voltage, ($V_{CAP\_FLY2}$), substantially equal to $1/3 \times V_{BAT}$. Accordingly, first μC charge pump output 24 generates a first μC charge pump output voltage, ($V_{\mu C\_OUT1}$), substantially equal to $1/3 \times V_{BAT}$, on the first μC charge pump output capacitor 46, ($C_{\mu C\_OUT1}$), and the second μC charge pump output 26 generates a second μC charge pump output voltage, ($V_{\mu C\_OUT2}$), substantially equal to $5/3 \times V_{BAT}$ on the second μC charge pump output capacitor 48, ($C_{\mu C\_OUT2}$).

Figure 16A:
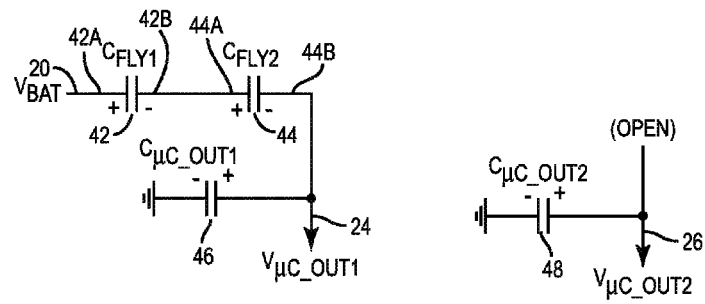
FIGS. 16A-B depict a mode of operation of an embodiment of a dual output μC charge pump configured to operate in a tenth buck/boost mode.
Figure 16A:
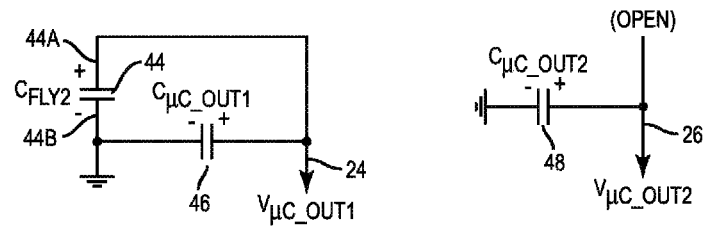
Figure 16B:
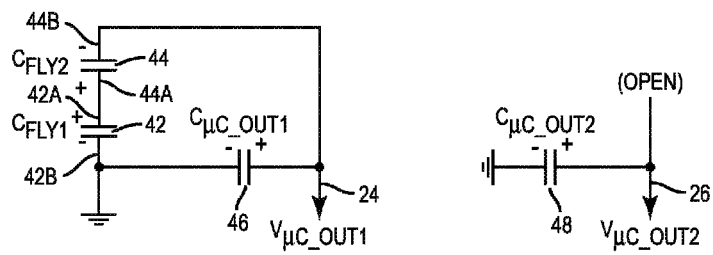
Figure 16B:
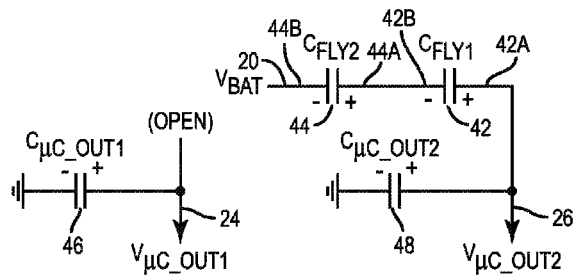

TABLE 2B-2B describes, and FIGS. 16A-B depicts, the operation of the dual output μC charge pump circuit 12A when the controller 14 configures the dual output μC charge pump circuit 12A to operate in the Tenth Buck/Boost Mode. The controller 14 configures the multiple output μC charge pump control circuit 72A to use an operational ratio, ($x\mu BB_{RATIO}$), set to 3/4. The multiple output μC charge pump control circuit 72A operably divides the operation of the dual output μC charge pump circuit 12A into four phases of operation. The multiple output μC charge pump control circuit 72A operably configures the dual output μC charge pump switch matrix circuit 70A such that first μC charge pump output 24 generates a first μC charge pump output voltage, ($V_{\mu C\_OUT1}$), substantially equal to $1/4 \times V_{BAT}$, and the second μC charge pump output 26 generates a second μC charge pump output voltage, ($V_{\mu C\_OUT2}$), substantially equal to $7/4 \times V_{BAT}$.

As further described in TABLE 2B-2B and depicted in FIG. 16A, in the first phase of operation, (Phase 1), the multiple output μC charge pump control circuit 72A operably closes the first switch 74, (SW 1), the fifth switch 82, (SW 5), and the ninth switch 90, (SW 9). In the second phase of operation, (Phase 2), the multiple output μC charge pump control circuit 72A operably closes the seventh switch 86, (SW 7), and the eighth switch 88, (SW 8). As further depicted in FIG. 16B, in the third phase of operation, (Phase 3), the multiple output μC charge pump control circuit 72A operably closes the third switch 78, (SW 3), the ninth switch 90, (SW 9), and the tenth switch 92, (SW 10). In the fourth phase of operation, (Phase 4), the multiple output μC charge pump control circuit 72A operably closes the fifth switch 82, (SW 5), the tenth switch 92, (SW 10), the eleventh switch 94, (SW 11), and the thirteenth switch 98, (SW 13).

As a result, the first flying capacitor 42, ($C_{FLY1}$), develops a first flying capacitor voltage, ($V_{CAP\_FLY1}$), substantially equal to $1/2 \times V_{BAT}$, and the second flying capacitor 44, ($C_{FLY2}$), develops a second flying capacitor voltage, ($V_{CAP\_FLY2}$), substantially equal to $1/4 \times V_{BAT}$. Accordingly, first μC charge pump output 24 generates a first μC charge pump output voltage, ($V_{\mu C\_OUT1}$), substantially equal to $1/4 \times V_{BAT}$, on the first μC charge pump output capacitor 46, ($C_{\mu C\_OUT1}$), and the second μC charge pump output 26 generates a second μC charge pump output voltage, ($V_{\mu C\_OUT2}$), substantially equal to $7/4 \times V_{BAT}$ on the second μC charge pump output capacitor 48, ($C_{\mu C\_OUT2}$).

Both the TABLE 2B-1B and the TABLE 2B-2B describe the operation of the dual output µC charge pump circuit 12A when the controller 14 configures the dual output µC charge pump circuit 12A to operate in the OFF Mode. As described in both the TABLE 2B-1B and the TABLE 2B-2B, when the controller 14 configures the dual output µC charge pump circuit 12A to be in the OFF Mode of operation, the multiple output µC charge pump control circuit 72A may operablely open the first switch 74, (SW 1), the second switch 76, (SW 2), the third switch 78, (SW 3), the fourth switch 80, (SW 4), the fifth switch 82, (SW 5), the sixth switch 84, (SW 6), the seventh switch 86, (SW 7), the eighth switch 88, (SW 8), the ninth switch 90, (SW 9), the tenth switch 92, (SW 10), the eleventh switch 94, (SW 11), the twelfth switch 96, (SW 12), the thirteenth switch 98, (SW 13), the fourteenth switch 100, (SW 14), and the fifteenth switch 102, (SW 15). As a result, the first µC charge pump output voltage, ($V_{\mu C\_OUT1}$), on the first µC charge pump output 24 floats relative to ground. Likewise, the second µC charge pump output voltage, ($V_{\mu C\_OUT2}$), on the second µC charge pump output 26 floats relative to ground.

A non-limiting set of example operational modes of the dual output µC charge pump circuit 12A configured to operate in a boost/buck mode of operation will now be discussed. As an example, TABLE 3A-1 and TABLE 3A-2, entitled "MODES OF OPERATION TABLE FOR BOOST/BUCK OPERATION OF A DUAL OUTPUT µC CHARGE PUMP CIRCUIT," describe, in tablulated form, several, non-limiting, example modes of operation of the dual output µC charge pump circuit 12A configured to operate in a boost/buck mode of operation. As an example, the non-limiting example modes of boost/buck modes of operation described in TABLE 3A-1 include: a First ($1^{st}$) Boost/Buck Mode, a Second ($2^{nd}$) Boost/Buck Mode, a Third ($3^{rd}$) Boost/Buck Mode, a Fourth ($4^{th}$) Boost/Buck Mode, a Fifth ($5^{th}$) Boost/Buck Mode, and an OFF Mode. As another example, the non-limiting example modes of boost/buck modes of operation described in TABLE 3A-2 include: a Sixth ($6^{th}$) Boost/Buck Mode, a Seventh ($7^{th}$) Boost/Buck Mode, an Eighth ($8^{th}$) Boost/Buck Mode, a Ninth ($9^{th}$) Boost/Buck Mode, a Tenth ($10^{th}$) Boost/Buck Mode, and an OFF Mode.

As depicted in TABLE 3A-1 and TABLE 3A-2, each example boost/buck mode of operation of the dual output µC charge pump circuit 12A corresponds to an operational ratio, ($x\mu BB_{RATIO}$), where the operational ratio, ($x\mu BB_{RATIO}$), may provide a relationship between the first µC charge pump output voltage, ($V_{\mu C\_OUT1}$), generated by the first µC charge pump output 24 and the second µC charge pump output voltage, ($V_{\mu C\_OUT2}$), generated by the second µC charge pump output 26. The operational ratio, ($x\mu BB_{RATIO}$), may be an operational ratio parameter that is configured by the controller 14 and stored locally in the multiple output µC charge pump control circuit 72A.

For example, TABLE 3A-1 describes example boost/buck modes of operation of the dual output µC charge pump circuit 12A where the first µC charge pump output 24 is configured to generate a first µC charge pump output voltage, ($V_{\mu C\_OUT1}$) such that $V_{\mu C\_OUT1}=(1+x\mu BB_{RATIO})\times V_{BAT}$. For the sake of convenience, and without limitation, the battery voltage, ($V_{BAT}$), is used to represent the magnitude of the voltage on the supply voltage 20. The second µC charge pump output 26 is configured to generate a second µC charge pump output voltage, ($V_{\mu C\_OUT2}$) such that $V_{\mu C\_OUT2}=(x\mu BB_{RATIO})\times V_{BAT}$, where $V_{BAT}$ is used to represent the magnitude of the voltage on the supply voltage 20.

Accordingly, as described in TABLE 3A-1, in the First Boost/Buck Mode of operation of the dual output µC charge pump circuit 12A, the controller 14 configures the multiple output µC charge pump control circuit 72A to use an operational ratio, ($x\mu BB_{RATIO}$), set to 1/4. As a result, the first µC charge pump output 24 generates a first µC charge pump output voltage, ($V_{\mu C\_OUT1}$), substantially equal to $5/4\times V_{BAT}$, and the second µC charge pump output 26 generates a second µC charge pump output voltage, ($V_{\mu C\_OUT2}$), substantially equal to $1/4\times V_{BAT}$. In the Second Boost/Buck Mode of operation of the dual output µC charge pump circuit 12A, the controller 14 configures the multiple output µC charge pump control circuit 72A to use an operational ratio, ($x\mu BB_{RATIO}$), set to 1/3. As a result, the first µC charge pump output 24 generates a first µC charge pump output voltage, ($V_{\mu C\_OUT1}$), substantially equal to $4/3\times V_{BAT}$, and the second µC charge pump output 26 generates a second µC charge pump output voltage, ($V_{\mu C\_OUT2}$), substantially equal to $1/3\times V_{BAT}$. In the Third Boost/Buck Mode of operation of the dual output µC charge pump circuit 12A, the controller 14 configures the multiple output µC charge pump control circuit 72A to use an operational ratio, ($x\mu BB_{RATIO}$), set to 1/2. As a result, the first µC charge pump output 24 generates a first µC charge pump output voltage, ($V_{\mu C\_OUT1}$), substantially equal to $3/2\times V_{BAT}$, and the second µC charge pump output 26 generates a second µC charge pump output voltage, ($V_{\mu C\_OUT2}$), substantially equal to $1/2\times V_{BAT}$. In the Fourth Boost/Buck Mode of operation of the dual output µC charge pump circuit 12A, the controller 14 configures the multiple output µC charge pump control circuit 72A to use an operational ratio, ($x\mu BB_{RATIO}$), set to 2/3. As a result, the first µC charge pump output 24 generates a first µC charge pump output voltage, ($V_{\mu C\_OUT1}$), substantially equal to $5/3\times V_{BAT}$, and the second µC charge pump output 26 generates a second µC charge pump output voltage, ($V_{\mu C\_OUT2}$), substantially equal to $2/3\times V_{BAT}$. In the Fifth Boost/Buck Mode of operation of the dual output µC charge pump circuit 12A, the controller 14 configures the multiple output µC charge pump control circuit 72A to use an operational ratio, ($x\mu BB_{RATIO}$), set to 3/4. As a result, the first µC charge pump output 24 generates a first µC charge pump output voltage, ($V_{\mu C\_OUT1}$), substantially equal to $7/4\times V_{BAT}$, and the second µC charge pump output 26 generates a second µC charge pump output voltage, ($V_{\mu C\_OUT2}$), substantially equal to $3/4\times V_{BAT}$. In the OFF Mode of operation of the dual output µC charge pump circuit 12A, the controller 14 configures the first µC charge pump output 24 to float and the second µC charge pump output 26 to float.

In contrast, TABLE 3A-2 describes other example boost/buck modes of operation of the dual output µC charge pump circuit 12A where the first µC charge pump output 24 is configured to generate a first µC charge pump output voltage, ($V_{\mu C\_OUT1}$) such that $V_{\mu C\_OUT1}=(1+x\mu BB_{RATIO})\times V_{BAT}$. For the sake of convenience, and without limitation, the battery voltage, ($V_{BAT}$), is used to represent the magnitude of the voltage on the supply voltage 20. The second µC charge pump output 26 is configured to generate a second µC charge pump output voltage, ($V_{\mu C\_OUT2}$) such that $V_{\mu C\_OUT2}=(1-x\mu BB_{RATIO})\times V_{BAT}$, where $V_{BAT}$ is used to represent the magnitude of the voltage on the supply voltage 20.

Accordingly, as described in TABLE 3A-2, in the Sixth Boost/Buck Mode of operation of the dual output µC charge pump circuit 12A, the controller 14 configures the multiple output µC charge pump control circuit 72A to use an operational ratio, (xμBB$_{RATIO}$), set to 1/4. As a result, the first μC charge pump output 24 generates a first μC charge pump output voltage, (V$_{μC\_OUT1}$), substantially equal to 5/4×V$_{BAT}$, and the second μC charge pump output 26 generates a second μC charge pump output voltage, (V$_{μC\_OUT2}$), substantially equal to 3/4×V$_{BAT}$. In the Seventh Boost/Buck Mode of operation of the dual output μC charge pump circuit 12A, the controller 14 configures the multiple output μC charge pump control circuit 72A to use an operational ratio, (xμBB$_{RATIO}$), set to 1/3. As a result, the first μC charge pump output 24 generates a first μC charge pump output voltage, (V$_{μC\_OUT1}$), substantially equal to 4/3×V$_{BAT}$, and the second μC charge pump output 26 generates a second μC charge pump output voltage, (V$_{μC\_OUT2}$), substantially equal to 2/3×V$_{BAT}$. In the Eighth Boost/Buck Mode of operation of the dual output μC charge pump circuit 12A, the controller 14 configures the multiple output μC charge pump control circuit 72A to use an operational ratio, (xμBB$_{RATIO}$), set to 1/2. As a result, the first μC charge pump output 24 generates a first μC charge pump output voltage, (V$_{μC\_OUT1}$), substantially equal to 3/2×V$_{BAT}$, and the second μC charge pump output 26 generates a second μC charge pump output voltage, (V$_{μC\_OUT2}$), substantially equal to 1/2×V$_{BAT}$. In the Ninth Boost/Buck Mode of operation of the dual output μC charge pump circuit 12A, the controller 14 configures the multiple output μC charge pump control circuit 72A to use an operational ratio, (xμBB$_{RATIO}$), set to 2/3. As a result, the first μC charge pump output 24 generates a first μC charge pump output voltage, (V$_{μC\_OUT1}$), substantially equal to 5/3×V$_{BAT}$, and the second μC charge pump output 26 generates a second μC charge pump output voltage, (V$_{μC\_OUT2}$), substantially equal to 1/3×V$_{BAT}$. In the Tenth Boost/Buck Mode of operation of the dual output μC charge pump circuit 12A, the controller 14 configures the multiple output μC charge pump control circuit 72A to use an operational ratio, (xμBB$_{RATIO}$), set to 3/4. As a result, the first μC charge pump output 24 generates a first μC charge pump output voltage, (V$_{μC\_OUT1}$), substantially equal to 7/4×V$_{BAT}$, and the second μC charge pump output 26 generates a second μC charge pump output voltage, (V$_{μC\_OUT2}$), substantially equal to 1/4×V$_{BAT}$. In the OFF Mode of operation of the dual output μC charge pump circuit 12A, the controller 14 configures the first μC charge pump output 24 to float and the second μC charge pump output 26 to float.

TABLE 3B-1A and TABLE 3B-1B, entitled "SWITCH OPERATION TABLE FOR BUCK/BOOST OPERATION OF DUAL OUTPUT μC CHARGE PUMP," describe, in tabular form, the switch state (open or closed) of each of the first switch 74, (SW 1), the second switch 76, (SW 2), the third switch 78, (SW 3), the fourth switch 80, (SW 4), the fifth switch 82, (SW 5), the sixth switch 84, (SW 6), the seventh switch 86, (SW 7), the eighth switch 88, (SW 8), the ninth switch 90, (SW 9), the tenth switch 92, (SW 10), the eleventh switch 94, (SW 11), the twelfth switch 96, (SW 12), the thirteenth switch 98, (SW 13), the fourteenth switch 100, (SW 14), and the fifteenth switch 102, (SW 15), of the dual output μC charge pump circuit 12A when the dual output μC charge pump circuit 12A is configured to operate in the boost/buck modes of operation described in TABLE 3A-1. In addition, TABLE 3B-1A and TABLE 3B-1B also provide the corresponding operational ratio, (xμBB$_{RATIO}$), used by the dual output μC charge pump circuit 12A when operating in the boost/buck modes of operation described in TABLE 3A-1. TABLE 3B-1A and TABLE 3B-1B further describe the switch state of each of the first switch 74, (SW 1), the second switch 76, (SW 2), the third switch 78, (SW 3), the fourth switch 80, (SW 4), the fifth switch 82, (SW 5), the sixth switch 84, (SW 6), the seventh switch 86, (SW 7), the eighth switch 88, (SW 8), the ninth switch 90, (SW 9), the tenth switch 92, (SW 10), the eleventh switch 94, (SW 11), the twelfth switch 96, (SW 12), the thirteenth switch 98, (SW 13), the fourteenth switch 100, (SW 14), and the fifteenth switch 102, (SW 15), relative to the particular phases of operation used by the dual output μC charge pump circuit 12A when operating in the boost/buck modes of operation described in TABLE 3A-1.

TABLE 3B-2A and TABLE 3B-2B, also entitled "SWITCH OPERATION TABLE FOR BUCK/BOOST OPERATION OF DUAL OUTPUT μC CHARGE PUMP," describe, in tabular form, the switch state (open or closed) of each of the first switch 74, (SW 1), the second switch 76, (SW 2), the third switch 78, (SW 3), the fourth switch 80, (SW 4), the fifth switch 82, (SW 5), the sixth switch 84, (SW 6), the seventh switch 86, (SW 7), the eighth switch 88, (SW 8), the ninth switch 90, (SW 9), the tenth switch 92, (SW 10), the eleventh switch 94, (SW 11), the twelfth switch 96, (SW 12), the thirteenth switch 98, (SW 13), the fourteenth switch 100, (SW 14), and the fifteenth switch 102, (SW 15), of the dual output μC charge pump circuit 12A when the dual output μC charge pump circuit 12A is configured to operate in the boost/buck modes of operation described in TABLE 3A-2. In addition, TABLE 3B-2A and TABLE 3B-2B also provide the corresponding operational ratio, (xμBB$_{RATIO}$), used by the dual output μC charge pump circuit 12A when operating in the boost/buck modes of operation described in TABLE 3A-2. TABLE 3B-2A and TABLE 3B-2B further describe the switch state of each of the first switch 74, (SW 1), the second switch 76, (SW 2), the third switch 78, (SW 3), the fourth switch 80, (SW 4), the fifth switch 82, (SW 5), the sixth switch 84, (SW 6), the seventh switch 86, (SW 7), the eighth switch 88, (SW 8), the ninth switch 90, (SW 9), the tenth switch 92, (SW 10), the eleventh switch 94, (SW 11), the twelfth switch 96, (SW 12), the thirteenth switch 98, (SW 13), the fourteenth switch 100, (SW 14), and the fifteenth switch 102, (SW 15), relative to the particular phases of operation used by the dual output μC charge pump circuit 12A when operating in the boost/buck modes of operation described in TABLE 3A-2.

As used in TABLE 3B-1A, TABLE 3B-1B, TABLE 3B-2A, and TABLE 3B-2A, "PHASE 1" indicates that the dual output μC charge pump circuit 12A is configured to operate in a first phase of operation, where the multiple output μC charge pump control circuit 72A configures the switch state (open or closed) of the identified μC charge pump switch to be closed during the time period of the first phase of operation. "PHASE 2" indicates that the dual output μC charge pump circuit 12A is configured to operate in a second phase of operation, where the multiple output μC charge pump control circuit 72A configures the switch state (open or closed) of the identified μC charge pump switch to be closed during the time period of the second phase of operation. "PHASE 3" indicates that the dual output μC charge pump circuit 12A is configured to operate in a third phase of operation, where the multiple output μC charge pump control circuit 72A configures the switch state (open or closed) of the identified μC charge pump switch to be closed during the time period of the third phase of operation. "PHASE 4" indicates that the dual output μC charge pump circuit 12A is configured to operate in a fourth phase of operation, where the multiple output μC charge pump control circuit 72A configures the switch state (open or closed)

of the identified µC charge pump switch to be closed during the time period of the fourth phase of operation. "OPEN" indicates that the multiple output µC charge pump control circuit 72A configures the switch state (open or closed) of the identified switch to be closed during all the phases of operation of the dual output µC charge pump circuit 12A.

TABLE 3A-1

MODES OF OPERATION TABLE FOR BOOST/BUCK OPERATION OF A DUAL OUTPUT µC CHARGE PUMP CIRCUIT

| MODES OF OPERATION | OPERATIONAL RATIOS, (xµBB$_{RATIO}$) | FIRST µC CHARGE PUMP OUTPUT, (V$_{µC\_OUT1}$), where V$_{µC\_OUT1}$ = (1 + xµBB$_{RATIO}$) × V$_{BAT}$ | SECOND µC CHARGE PUMP OUTPUT, (V$_{µC\_OUT2}$), where V$_{µC\_OUT2}$ = (xµBB$_{RATIO}$) × V$_{BAT}$ |
|---|---|---|---|
| First Boost/Buck Mode | 1/4 | 5/4 × V$_{BAT}$ | 1/4 × V$_{BAT}$ |
| Second Boost/Buck Mode | 1/3 | 4/3 × V$_{BAT}$ | 1/3 × V$_{BAT}$ |
| Third Boost/Buck Mode | 1/2 | 3/2 × V$_{BAT}$ | 1/2 × V$_{BAT}$ |
| Fourth Boost/Buck Mode | 2/3 | 5/3 × V$_{BAT}$ | 2/3 × V$_{BAT}$ |
| Fifth Boost/Buck Mode | 3/4 | 7/4 × V$_{BAT}$ | 3/4 × V$_{BAT}$ |
| OFF Mode | OFF | FLOATING | FLOATING |

TABLE 3A-2

MODES OF OPERATION TABLE FOR BOOST/BUCK OPERATION OF A DUAL OUTPUT µC CHARGE PUMP CIRCUIT

| MODES OF OPERATION | OPERATIONAL RATIOS, (xµBB$_{RATIO}$) | FIRST µC CHARGE PUMP OUTPUT, (V$_{µC\_OUT1}$), where V$_{µC\_OUT1}$ = (1 + xµBB$_{RATIO}$) × V$_{BAT}$ | SECOND µC CHARGE PUMP OUTPUT, (V$_{µC\_OUT2}$), where V$_{µC\_OUT2}$ = (1 − xµBB$_{RATIO}$) × V$_{BAT}$ |
|---|---|---|---|
| Sixth Boost/Buck Mode | 1/4 | 5/4 × V$_{BAT}$ | 3/4 × V$_{BAT}$ |
| Seventh Boost/Buck Mode | 1/3 | 4/3 × V$_{BAT}$ | 2/3 × V$_{BAT}$ |
| Eighth Boost/Buck Mode | 1/2 | 3/2 × V$_{BAT}$ | 1/2 × V$_{BAT}$ |
| Ninth Boost/Buck Mode | 2/3 | 5/3 × V$_{BAT}$ | 1/3 × V$_{BAT}$ |
| Tenth Boost/Buck Mode | 3/4 | 7/4 × V$_{BAT}$ | 1/4 × V$_{BAT}$ |
| OFF Mode | OFF | FLOATING | FLOATING |

TABLE 3B-1A

SWITCH OPERATION TABLE FOR BOOST/BUCK MODE OF OPERATION OF DUAL OUTPUT µC CHARGE PUMP

MODES OF OPERATION FOR BOOST/BUCK OPERATION OF DUAL OUTPUT µC CHARGE PUMP WITH CORRESPONDING OPERATIONAL RATIOS, (xµBB$_{RATIO}$)

| See, TABLE 3A-1 µC CHARGE PUMP SWITCHES | First Boost/Buck Mode, (xµBB$_{RATIO}$ = 1/4), where V$_{µC\_OUT1}$ = 5/4 × V$_{BAT}$ and V$_{µC\_OUT2}$ = 1/4 × V$_{BAT}$ | Second Boost/Buck Mode, (xµBB$_{RATIO}$ = 1/3), where V$_{µC\_OUT1}$ = 4/3 × V$_{BAT}$, and V$_{µC\_OUT2}$ = 1/3 × V$_{BAT}$ | Third Boost/Buck Mode, (xµBB$_{RATIO}$ = 1/2), where V$_{µC\_OUT1}$ = 3/2 × V$_{BAT}$, and V$_{µC\_OUT2}$ = 1/2 × V$_{BAT}$ |
|---|---|---|---|
| SW 1 | Phase 1 | Phase 1 | Phase 1 |
| SW 2 | OPEN | Phase 3 | Phase 3 |
| SW 3 | Phase 3 | Phase 2 | Phase 2 |
| SW 4 | OPEN | OPEN | OPEN |
| SW 5 | Phase 1 | Phase 1 | OPEN |
| SW 6 | OPEN | OPEN | Phase 1 |
| SW 7 | OPEN | Phase 3 | Phase 3 |
| SW 8 | Phase 2 | Phase 2 | Phase 2 |
| SW 9 | Phase 4 | OPEN | OPEN |
| SW 10 | Phase 3 and Phase 4 | Phase 2 | Phase 2 |
| SW 11 | OPEN | Phase 3 | Phase 3 |
| SW 12 | Phase 1 and Phase 3 | Phase 1 | Phase 1 |

TABLE 3B-1A-continued

SWITCH OPERATION TABLE FOR BOOST/BUCK MODE
OF OPERATION OF DUAL OUTPUT μC CHARGE PUMP

MODES OF OPERATION FOR BOOST/BUCK OPERATION OF DUAL OUTPUT μC
CHARGE PUMP WITH CORRESPONDING OPERATIONAL RATIOS, (xμBB$_{RATIO}$)

| See, TABLE 3A-1 μC CHARGE PUMP SWITCHES | First Boost/Buck Mode, (xμBB$_{RATIO}$ = 1/4), where $V_{\mu C\_OUT1} = 5/4 \times V_{BAT}$ and $V_{\mu C\_OUT2} = 1/4 \times V_{BAT}$ | Second Boost/Buck Mode, (xμBB$_{RATIO}$ = 1/3), where $V_{\mu C\_OUT1} = 4/3 \times V_{BAT}$, and $V_{\mu C\_OUT2} = 1/3 \times V_{BAT}$ | Third Boost/Buck Mode, (xμBB$_{RATIO}$ = 1/2), where $V_{\mu C\_OUT1} = 3/2 \times V_{BAT}$, and $V_{\mu C\_OUT2} = 1/2 \times V_{BAT}$ |
|---|---|---|---|
| SW 13 | Phase 2 | Phase 2 | Phase 2 |
| SW 14 | OPEN | OPEN | Phase 1 |
| SW 15 | Phase 4 | Phase 3 | Phase 3 |

TABLE 3B-1B

SWITCH OPERATION TABLE FOR BOOST/BUCK MODE
OF OPERATION OF DUAL OUTPUT μC CHARGE PUMP

MODES OF OPERATION FOR BOOST/BUCK OPERATION OF DUAL OUTPUT μC
CHARGE PUMP WITH CORRESPONDING OPERATIONAL RATIOS, (xμBB$_{RATIO}$)

| See, TABLE 3A-1 μC CHARGE PUMP SWITCHES | Fourth Boost/Buck Mode, (xμBB$_{RATIO}$ = 2/3), where $V_{\mu C\_OUT1} = 5/3 \times V_{BAT}$ and $V_{\mu C\_OUT2} = 2/3 \times V_{BAT}$ | Fifth Boost/Buck Mode, (xμBB$_{RATIO}$ = 3/4), where $V_{\mu C\_OUT1} = 7/4 \times V_{BAT}$, and $V_{\mu C\_OUT2} = 3/4 \times V_{BAT}$ | OFF Mode where $V_{\mu C\_OUT1}$ = FLOAT $V_{\mu C\_OUT2}$ = FLOAT |
|---|---|---|---|
| SW 1 | Phase 1 | OPEN | OPEN |
| SW 2 | Phase 3 | Phase 4 | OPEN |
| SW 3 | OPEN | OPEN | OPEN |
| SW 4 | OPEN | OPEN | OPEN |
| SW 5 | Phase 2 and Phase 3 | Phase 3 and Phase 4 | OPEN |
| SW 6 | Phase 1 | Phase 2 | OPEN |
| SW 7 | OPEN | OPEN | OPEN |
| SW 8 | Phase 2 | Phase 3 | OPEN |
| SW 9 | OPEN | OPEN | OPEN |
| SW 10 | Phase 2 | Phase 1 and Phase 3 | OPEN |
| SW 11 | Phase 3 | Phase 1 and Phase 4 | OPEN |
| SW 12 | Phase 1 | Phase 2 | OPEN |
| SW 13 | Phase 2 | Phase 3 | OPEN |
| SW 14 | Phase 1 | Phase 1 | OPEN |
| SW 15 | OPEN | OPEN | OPEN |

TABLE 3B-2A

SWITCH OPERATION TABLE FOR BOOST/BUCK MODE
OF OPERATION OF DUAL OUTPUT μC CHARGE PUMP

MODES OF OPERATION FOR BOOST/BUCK OPERATION OF DUAL OUTPUT μC
CHARGE PUMP WITH CORRESPONDING OPERATIONAL RATIOS, (xμBB$_{RATIO}$)

| See, TABLE 3A-2 μC CHARGE PUMP SWITCHES | Sixth Boost/Buck Mode, (xμBB$_{RATIO}$ = 1/4), where $V_{\mu C\_OUT1} = 5/4 \times V_{BAT}$ and $V_{\mu C\_OUT2} = 3/4 \times V_{BAT}$ | Seventh Boost/Buck Mode, (xμBB$_{RATIO}$ = 1/3), where $V_{\mu C\_OUT1} = 4/3 \times V_{BAT}$, and $V_{\mu C\_OUT2} = 2/3 \times V_{BAT}$ | Eighth Boost/Buck Mode, (xμBB$_{RATIO}$ = 1/2), where $V_{\mu C\_OUT1} = 1/2 \times V_{BAT}$, and $V_{\mu C\_OUT2} = 3/2 \times V_{BAT}$ |
|---|---|---|---|
| SW 1 | OPEN | Phase 1 | Phase 1 |
| SW 2 | OPEN | Phase 3 | Phase 3 |
| SW 3 | OPEN | OPEN | Phase 2 |
| SW 4 | OPEN | OPEN | OPEN |
| SW 5 | Phase 3 | Phase 2 | OPEN |
| SW 6 | Phase 2 | Phase 1 | Phase 1 |
| SW 7 | OPEN | Phase 3 | Phase 3 |
| SW 8 | Phase 3 | Phase 2 | Phase 2 |
| SW 9 | Phase 4 | OPEN | OPEN |
| SW 10 | Phase 1, Phase 3 and Phase 4 | Phase 2 | Phase 2 |
| SW 11 | Phase1 | Phase 3 | Phase 3 |
| SW 12 | Phase 2 | Phase 1 | Phase 1 |

TABLE 3B-2A-continued

SWITCH OPERATION TABLE FOR BOOST/BUCK MODE
OF OPERATION OF DUAL OUTPUT μC CHARGE PUMP

MODES OF OPERATION FOR BOOST/BUCK OPERATION OF DUAL OUTPUT μC
CHARGE PUMP WITH CORRESPONDING OPERATIONAL RATIOS, (xμBB$_{RATIO}$)

| See, TABLE 3A-2 μC CHARGE PUMP SWITCHES | Sixth Boost/Buck Mode, (xμBB$_{RATIO}$ = 1/4), where $V_{\mu C\_OUT1}$ = 5/4 × $V_{BAT}$ and $V_{\mu C\_OUT2}$ = 3/4 × $V_{BAT}$ | Seventh Boost/Buck Mode, (xμBB$_{RATIO}$ = 1/3), where $V_{\mu C\_OUT1}$ = 4/3 × $V_{BAT}$, and $V_{\mu C\_OUT2}$ = 2/3 × $V_{BAT}$ | Eighth Boost/Buck Mode, (xμBB$_{RATIO}$ = 1/2), where $V_{\mu C\_OUT1}$ = 1/2 × $V_{BAT}$, and $V_{\mu C\_OUT2}$ = 3/2 × $V_{BAT}$ |
|---|---|---|---|
| SW 13 | Phase 3 | Phase 2 | Phase 2 |
| SW 14 | Phase 1 | Phase 1 | Phase 1 |
| SW 15 | Phase 4 | Phase 3 | Phase 3 |

TABLE 3B-2B

SWITCH OPERATION TABLE FOR BOOST/BUCK MODE
OF OPERATION OF DUAL OUTPUT μC CHARGE PUMP

MODES OF OPERATION FOR BOOST/BUCK OPERATION OF DUAL OUTPUT μC
CHARGE PUMP WITH CORRESPONDING OPERATIONAL RATIOS, (xμBB$_{RATIO}$)

| See, TABLE 3A-2 μC CHARGE PUMP SWITCHES | Ninth Boost/Buck Mode, (xμBB$_{RATIO}$ = 2/3), where $V_{\mu C\_OUT1}$ = 5/3 × $V_{BAT}$ and $V_{\mu C\_OUT2}$ = 1/3 × $V_{BAT}$ | Tenth Boost/Buck Mode, (xμBB$_{RATIO}$ = 3/4), where $V_{\mu C\_OUT1}$ = 7/4 × $V_{BAT}$, and $V_{\mu C\_OUT2}$ = 1/4 × $V_{BAT}$ | OFF Mode where $V_{\mu C\_OUT1}$ = FLOAT $V_{\mu C\_OUT2}$ = FLOAT |
|---|---|---|---|
| SW 1 | Phase 1 | Phase 1 | OPEN |
| SW 2 | Phase 3 | Phase 4 | OPEN |
| SW 3 | Phase 2 | Phase 3 | OPEN |
| SW 4 | OPEN | OPEN | OPEN |
| SW 5 | Phase 1 and Phase 3 | Phase 1 and Phase 4 | OPEN |
| SW 6 | OPEN | OPEN | OPEN |
| SW 7 | OPEN | OPEN | OPEN |
| SW 8 | Phase 2 | Phase 2 | OPEN |
| SW 9 | OPEN | OPEN | OPEN |
| SW 10 | Phase 2 | Phase 3 | OPEN |
| SW 11 | Phase 3 | Phase 4 | OPEN |
| SW 12 | Phase 1 | Phase 1 and Phase 3 | OPEN |
| SW 13 | Phase 2 | Phase 2 | OPEN |
| SW 14 | OPEN | OPEN | OPEN |
| SW 15 | OPEN | OPEN | OPEN |

The configurations and operations of the dual output μC charge pump circuit 12A when the dual output μC charge pump circuit 12A operates in the various boost/buck modes, described in the TABLE 3A-1 and the TABLE 3A-2, will now be discussed with reference to the TABLE 3B-1A, the TABLE 3B-1B, the TABLE 3B-2A, and the TABLE 3B-2B.

Figure 17A:
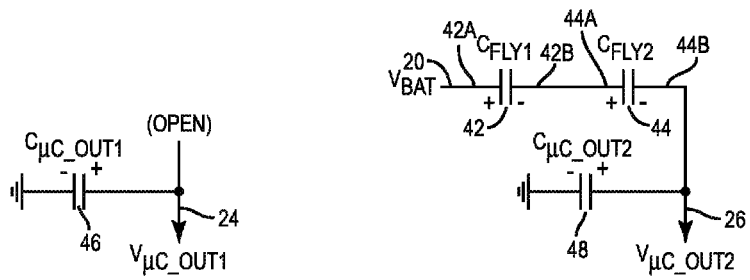
FIGS. 17A-B depict a mode of operation of an embodiment of a dual output μC charge pump configured to operate in a first boost/buck mode.
Figure 17A:
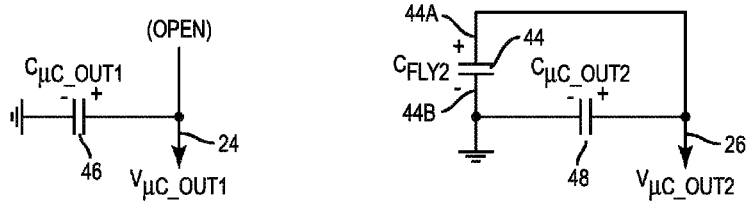
Figure 17B:
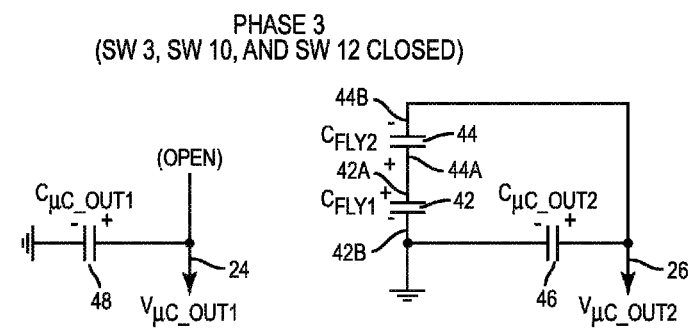
Figure 17B:
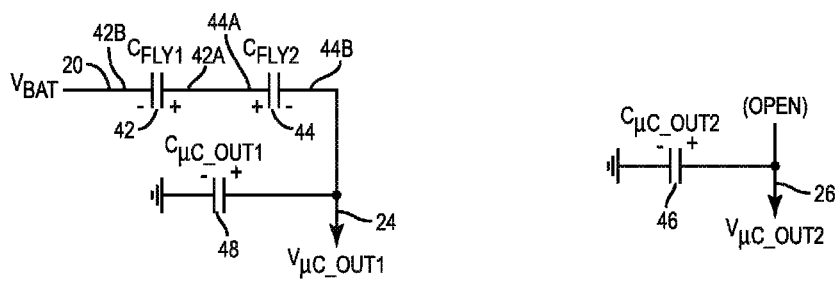

TABLE 3B-1A describes, and FIGS. 17A-B depicts, the operation of the dual output μC charge pump circuit 12A when the controller 14 configures the dual output μC charge pump circuit 12A to operate in the First Boost/Buck Mode. The controller 14 configures the multiple output μC charge pump control circuit 72A to use an operational ratio, (xμB$_{BRATIO}$), set to 1/4. The multiple output μC charge pump control circuit 72A operably divides the operation of the dual output μC charge pump circuit 12A into four phases of operation. The multiple output μC charge pump control circuit 72A operably configures the dual output μC charge pump switch matrix circuit 70A such that first μC charge pump output 24 generates a first μC charge pump output voltage, ($V_{\mu C\_OUT1}$), substantially equal to 5/4×$V_{BAT}$, and the second μC charge pump output 26 generates a second μC charge pump output voltage, ($V_{\mu C\_OUT2}$), substantially equal to 1/4×$V_{BAT}$.

As described in TABLE 3B-1A and depicted in FIG. 17A, in the first phase of operation, (Phase 1), the multiple output μC charge pump control circuit 72A operably closes the first switch 74, (SW 1), the fifth switch 82, (SW 5), and the twelfth switch 96, (SW 12). In the second phase of operation, (Phase 2), the multiple output μC charge pump control circuit 72A operably closes the eighth switch 88, (SW 8) and the thirteenth switch 98, (SW 13). As further depicted in FIG. 17B, in the third phase of operation, (Phase 3), the multiple output μC charge pump control circuit 72A operably closes the third switch 78, (SW 3), the tenth switch 92, (SW 10), and the twelfth switch 96, (SW 12). In the fourth phase of operation, (Phase 4), the multiple output μC charge pump control circuit 72A operably closes the ninth switch 90, (SW 9), the tenth switch 92, (SW 10), and the fifteenth switch 102, (SW 15).

As a result, the first flying capacitor 42, ($C_{FLY1}$), develops a first flying capacitor voltage, ($V_{CAP\_FLY1}$), substantially equal to 1/2×$V_{BAT}$, and the second flying capacitor 44, ($C_{FLY2}$), develops a second flying capacitor voltage, ($V_{CAP\_FLY2}$), substantially equal to 1/4×$V_{BAT}$. Accordingly, first μC charge pump output 24 generates a first μC charge pump output voltage, ($V_{\mu C\_OUT1}$), substantially equal to 5/4×$V_{BAT}$, on the first μC charge pump output capacitor 46, ($C_{\mu C\_OUT1}$), and the second μC charge pump output 26 generates a second μC charge pump output voltage, ($V_{\mu C\_OUT2}$), substantially equal to $1/4 \times V_{BAT}$ on the second μC charge pump output capacitor 48, ($C_{\mu C\_OUT2}$).

Figure 18:
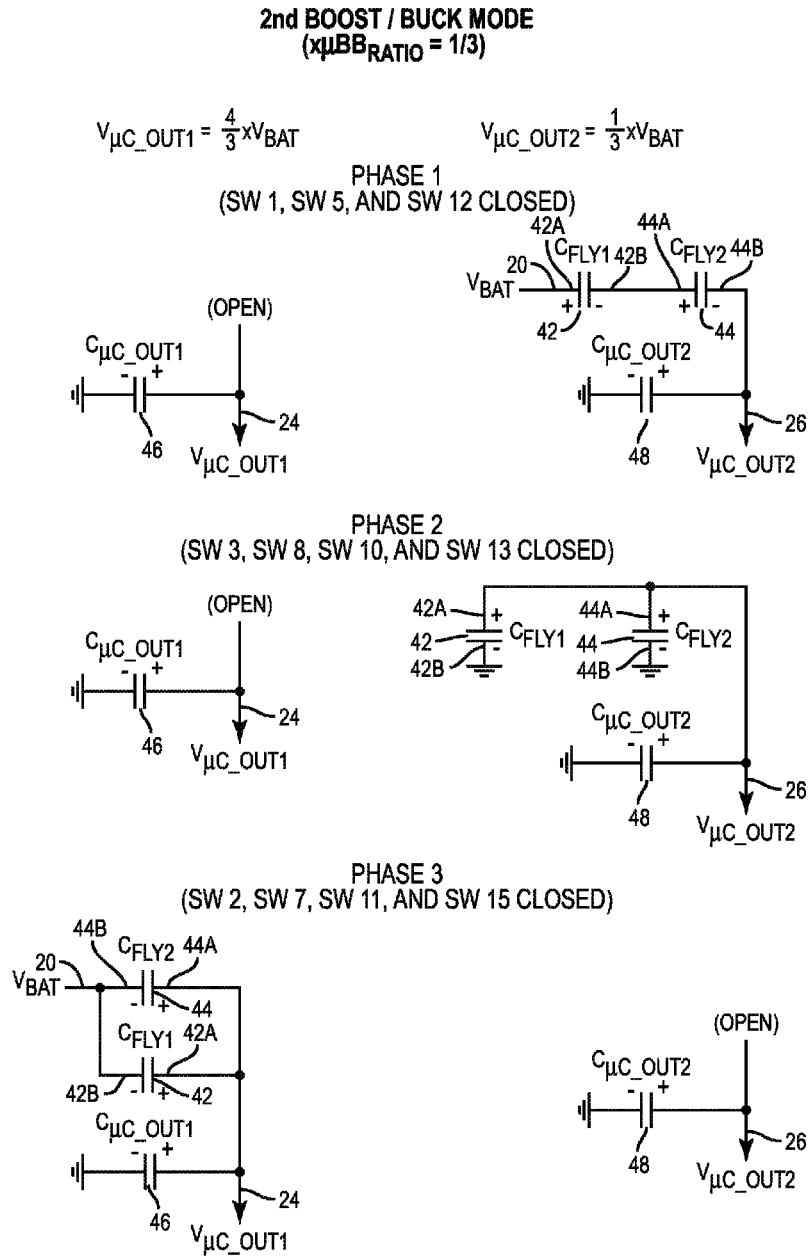
FIG. 18 depicts a mode of operation of an embodiment of a dual output μC charge pump configured to operate in a second boost/buck mode.

TABLE 3B-1A describes, and FIG. 18 depicts, the operation of the dual output μC charge pump circuit 12A when the controller 14 configures the dual output μC charge pump circuit 12A to operate in the Second Boost/Buck Mode. The controller 14 configures the multiple output μC charge pump control circuit 72A to use an operational ratio, ($x\mu BB_{RATIO}$), set to 1/3. The multiple output μC charge pump control circuit 72A operably divides the operation of the dual output μC charge pump circuit 12A into three phases of operation. The multiple output μC charge pump control circuit 72A operably configures the dual output μC charge pump switch matrix circuit 70A such that first μC charge pump output 24 generates a first μC charge pump output voltage, ($V_{\mu C\_OUT1}$), substantially equal to $4/3 \times V_{BAT}$, and the second μC charge pump output 26 generates a second μC charge pump output voltage, ($V_{\mu C\_OUT2}$), substantially equal to $1/3 \times V_{BAT}$.

As described in TABLE 3B-1A and depicted in FIG. 18, in the first phase of operation, (Phase 1), the multiple output μC charge pump control circuit 72A operably closes the first switch 74, (SW 1), the fifth switch 82, (SW 5), and the tenth switch 92, (SW 10). In the second phase of operation, (Phase 2), the multiple output μC charge pump control circuit 72A operably closes the third switch 78, (SW 3), the eighth switch 88, (SW 8), the tenth switch 92, (SW 10), and the thirteenth switch 98, (SW 13). In the third phase of operation, (Phase 3), the multiple output μC charge pump control circuit 72A operably closes the second switch 76, (SW 2), the seventh switch 86, (SW 7), the eleventh switch 94, (SW 11), and the fifteenth switch 102, (SW 15).

As a result, the first flying capacitor 42, ($C_{FLY1}$), develops a first flying capacitor voltage, ($V_{CAP\_FLY1}$), substantially equal to $1/3 \times V_{BAT}$, and the second flying capacitor 44, ($C_{FLY2}$), develops a second flying capacitor voltage, ($V_{CAP\_FLY2}$), substantially equal to $1/3 \times V_{BAT}$. Accordingly, first μC charge pump output 24 generates a first μC charge pump output voltage, ($V_{\mu C\_OUT1}$), substantially equal to $4/3 \times V_{BAT}$, on the first μC charge pump output capacitor 46, ($C_{\mu C\_OUT1}$), and the second μC charge pump output 26 generates a second μC charge pump output voltage, ($V_{\mu C\_OUT2}$), substantially equal to $1/3 \times V_{BAT}$ on the second μC charge pump output capacitor 48, ($C_{\mu C\_OUT2}$).

Figure 19:
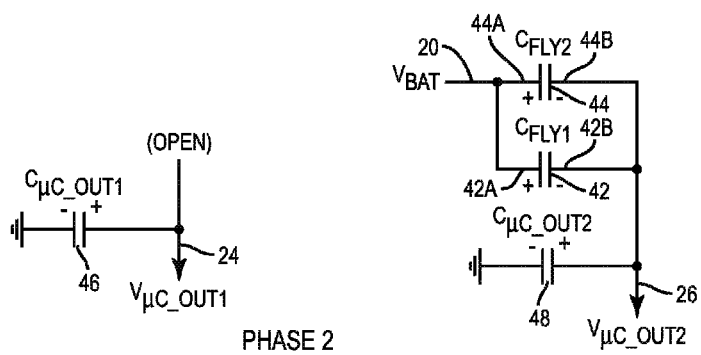
FIG. 19 depicts a mode of operation of an embodiment of a dual output μC charge pump configured to operate in a third boost/buck mode.
Figure 19:
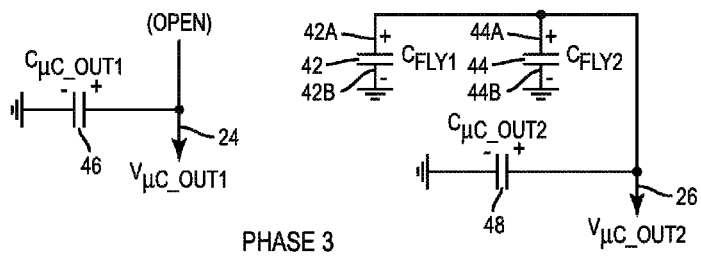
Figure 19:
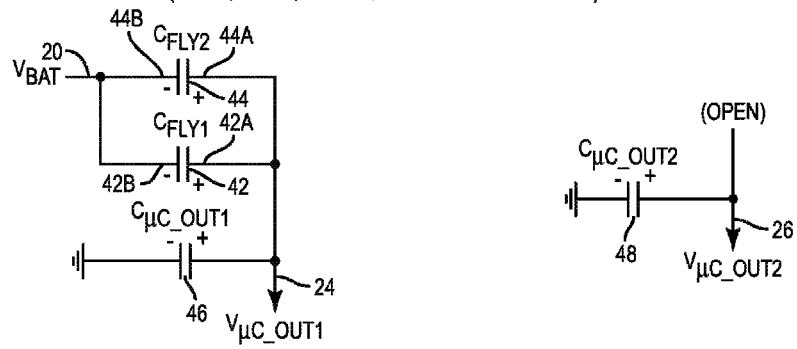

TABLE 3B-1A describes, and FIG. 19 depicts, the operation of the dual output μC charge pump circuit 12A when the controller 14 configures the dual output μC charge pump circuit 12A to operate in the Third Boost/Buck Mode. The controller 14 configures the multiple output μC charge pump control circuit 72A to use an operational ratio, ($x\mu BB_{RATIO}$), set to 1/2. The multiple output μC charge pump control circuit 72A operably divides the operation of the dual output μC charge pump circuit 12A into three phases of operation. The multiple output μC charge pump control circuit 72A operably configures the dual output μC charge pump switch matrix circuit 70A such that first μC charge pump output 24 generates a first μC charge pump output voltage, ($V_{\mu C\_OUT1}$), substantially equal to $3/2 \times V_{BAT}$, and the second μC charge pump output 26 generates a second μC charge pump output voltage, ($V_{\mu C\_OUT2}$), substantially equal to $1/2 \times V_{BAT}$.

As further described in TABLE 3B-1A and depicted in FIG. 19, in the first phase of operation, (Phase 1), the multiple output μC charge pump control circuit 72A operably closes the first switch 74, (SW 1), the sixth switch 84, (SW 6), the twelfth switch 96, (SW 12), and the fourteenth switch 100, (SW 14). In the second phase of operation, (Phase 2), the multiple output μC charge pump control circuit 72A operably closes the third switch 78, (SW 3), the eighth switch 88, (SW 8), the tenth switch 92, (SW 10), and the thirteenth switch 98, (SW 13). In the third phase of operation, (Phase 3), the multiple output μC charge pump control circuit 72A operably closes the second switch 76, (SW 2), the seventh switch 86, (SW 7), the eleventh switch 94, (SW 11), and the fifteenth switch 102, (SW 15).

As a result, the first flying capacitor 42, ($C_{FLY1}$), develops a first flying capacitor voltage, ($V_{CAP\_FLY1}$), substantially equal to $1/2 \times V_{BAT}$, and the second flying capacitor 44, ($C_{FLY2}$), develops a second flying capacitor voltage, ($V_{CAP\_FLY2}$), substantially equal to $1/2 \times V_{BAT}$. Accordingly, first μC charge pump output 24 generates a first μC charge pump output voltage, ($V_{\mu C\_OUT1}$), substantially equal to $3/2 \times V_{BAT}$, on the first μC charge pump output capacitor 46, ($C_{\mu C\_OUT1}$), and the second μC charge pump output 26 generates a second μC charge pump output voltage, ($V_{\mu C\_OUT2}$), substantially equal to $1/2 \times V_{BAT}$ on the second μC charge pump output capacitor 48, ($C_{\mu C\_OUT2}$).

Figure 20:
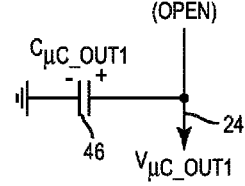
FIG. 20 depicts a mode of operation of an embodiment of a dual output μC charge pump configured to operate in a fourth boost/buck mode.
Figure 20:
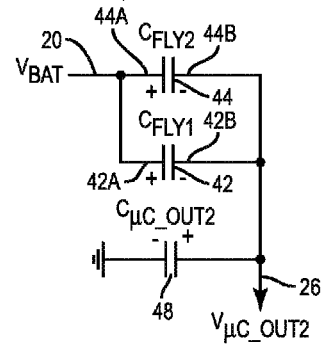
Figure 20:
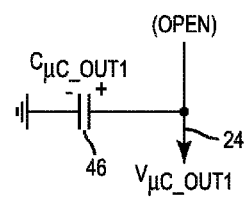
Figure 20:
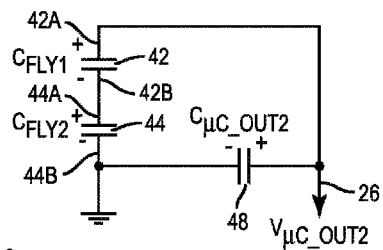
Figure 20:
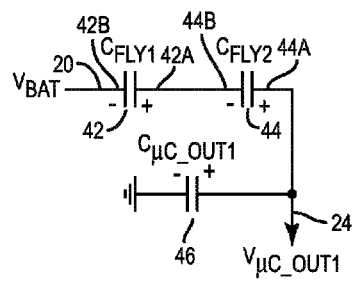
Figure 20:
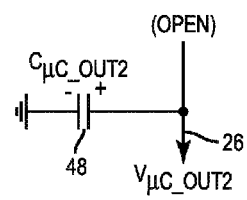

TABLE 3B-1B describes, and FIG. 20 depicts, the operation of the dual output μC charge pump circuit 12A when the controller 14 configures the dual output μC charge pump circuit 12A to operate in the Fourth Boost/Buck Mode. The controller 14 configures the multiple output μC charge pump control circuit 72A to use an operational ratio, ($x\mu BB_{RATIO}$), set to 2/3. The multiple output μC charge pump control circuit 72A operably divides the operation of the dual output μC charge pump circuit 12A into three phases of operation. The multiple output μC charge pump control circuit 72A operably configures the dual output μC charge pump switch matrix circuit 70A such that first μC charge pump output 24 generates a first μC charge pump output voltage, ($V_{\mu C\_OUT1}$), substantially equal to $5/3 \times V_{BAT}$) and the second μC charge pump output 26 generates a second μC charge pump output voltage, ($V_{\mu C\_OUT2}$), substantially equal to $2/3 \times V_{BAT}$.

As further described in TABLE 3B-1B and depicted in FIG. 20, in the first phase of operation, (Phase 1), the multiple output μC charge pump control circuit 72A operably closes the first switch 74, (SW 1), the sixth switch 84, (SW 6), the twelfth switch 96, (SW 12), and the fourteenth switch 100, (SW 14). In the second phase of operation, (Phase 2), the multiple output μC charge pump control circuit 72A operably closes the fifth switch 82, (SW 5), the eighth switch 88, (SW 8), the tenth switch 92, (SW 10), and the thirteenth switch 98, (SW 13). In the third phase of operation, (Phase 3), the multiple output μC charge pump control circuit 72A operably closes the second switch 76, (SW 2), the fifth switch 82, (SW 5), and the eleventh switch 94, (SW 11).

As a result, the first flying capacitor 42, ($C_{FLY1}$), develops a first flying capacitor voltage, ($V_{CAP\_FLY1}$), substantially equal to $1/3 \times V_{BAT}$, and the second flying capacitor 44, ($C_{FLY2}$), develops a second flying capacitor voltage, ($V_{CAP\_FLY2}$), substantially equal to $1/3 \times V_{BAT}$. Accordingly, first μC charge pump output 24 generates a first μC charge pump output voltage, ($V_{\mu C\_OUT1}$), substantially equal to $5/3 \times V_{BAT}$, on the first μC charge pump output capacitor 46, ($C_{\mu C\_OUT1}$), and the second μC charge pump output 26 generates a second μC charge pump output voltage, ($V_{\mu C\_OUT2}$), substantially equal to $2/3 \times V_{BAT}$ on the second μC charge pump output capacitor 48, ($C_{\mu C\_OUT2}$).

Figure 21A:
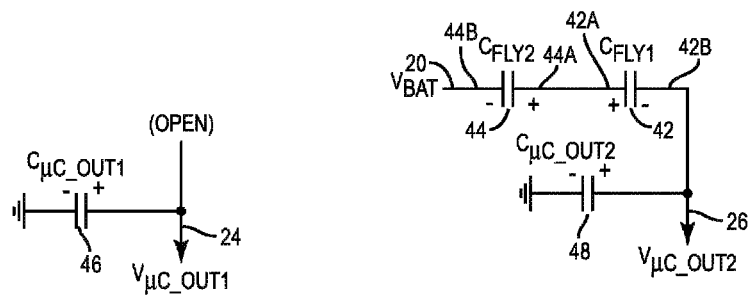
FIGS. 21A-B depict a mode of operation of an embodiment of a dual output μC charge pump configured to operate in a fifth boost/buck mode.
Figure 21A:
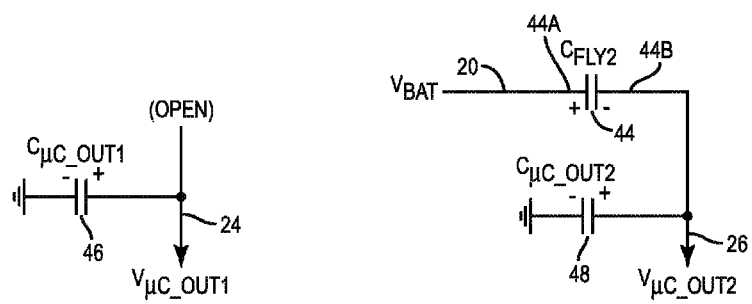
Figure 21B:
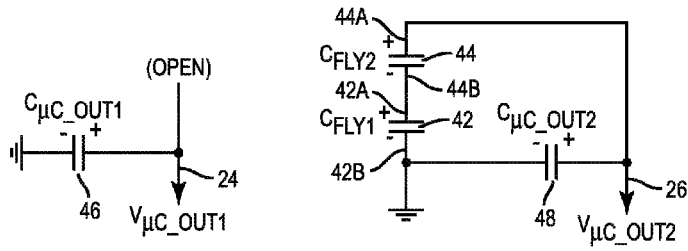
Figure 21B:
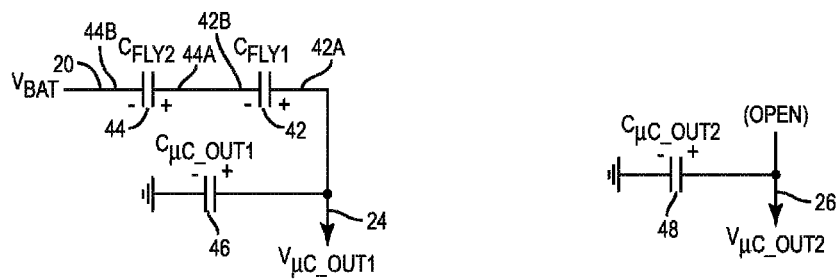

TABLE 3B-1B describes, and FIGS. 21A-B depicts, the operation of the dual output μC charge pump circuit 12A when the controller 14 configures the dual output μC charge pump circuit 12A to operate in the Fifth Boost/Buck Mode. The controller 14 configures the multiple output μC charge pump control circuit 72A to use an operational ratio, (xμBB$_{RATIO}$), set to 3/4. The multiple output μC charge pump control circuit 72A operably divides the operation of the dual output μC charge pump circuit 12A into four phases of operation. The multiple output μC charge pump control circuit 72A operably configures the dual output μC charge pump switch matrix circuit 70A such that first μC charge pump output 24 generates a first μC charge pump output voltage, (V$_{μC\_OUT1}$), substantially equal to 7/4×V$_{BAT}$, and the second μC charge pump output 26 generates a second μC charge pump output voltage, (V$_{μC\_OUT2}$), substantially equal to 3/4×V$_{BAT}$.

As further described in TABLE 3B-1B and depicted in FIG. 21A, in the first phase of operation, (Phase 1), the multiple output μC charge pump control circuit 72A operably closes the tenth switch 92, (SW 10), the eleventh switch 94, (SW 11), and the fourteenth switch 100, (SW 14). In the second phase of operation, (Phase 2), the multiple output μC charge pump control circuit 72A operably closes the sixth switch 84, (SW 6), and the twelfth switch 96, (SW 12). As further depicted in FIG. 21B, in the third phase of operation, (Phase 3), the multiple output μC charge pump control circuit 72A operably closes the fifth switch 82, (SW 5), the eighth switch 88, (SW 8), the tenth switch 92, (SW 10), and the thirteenth switch 98, (SW 13). In the fourth phase of operation, (Phase 4), the multiple output μC charge pump control circuit 72A operably closes the second switch 76, (SW 2), the fifth switch 82, (SW 5), and the eleventh switch 94, (SW 11).

As a result, the first flying capacitor 42, (C$_{FLY1}$), develops a first flying capacitor voltage, (V$_{CAP\_FLY1}$), substantially equal to 1/2×V$_{BAT}$, and the second flying capacitor 44, (C$_{FLY2}$), develops a second flying capacitor voltage, (V$_{CAP\_FLY2}$), substantially equal to 1/4×V$_{BAT}$. Accordingly, first μC charge pump output 24 generates a first μC charge pump output voltage, (V$_{μC\_OUT1}$), substantially equal to 7/4×V$_{BAT}$, on the first μC charge pump output capacitor 46, (C$_{μC\_OUT1}$), and the second μC charge pump output 26 generates a second μC charge pump output voltage, (V$_{μC\_OUT2}$), substantially equal to 3/4×V$_{BAT}$ on the second μC charge pump output capacitor 48, (C$_{μC\_OUT2}$).

Figure 22A:
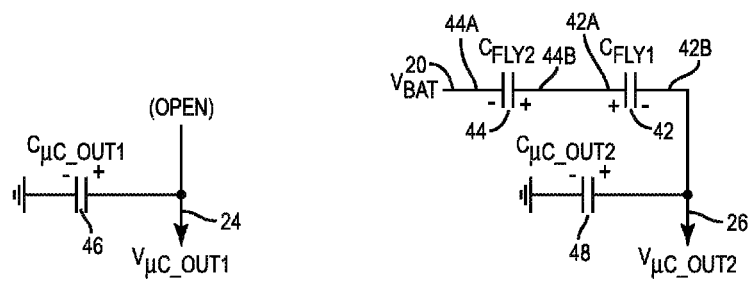
FIGS. 22A-B depict a mode of operation of an embodiment of a dual output μC charge pump configured to operate in a sixth boost/buck mode.
Figure 22A:
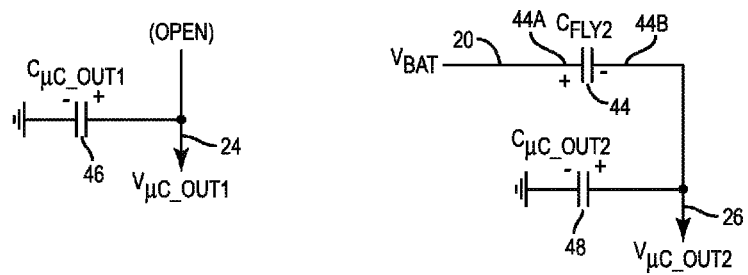
Figure 22B:
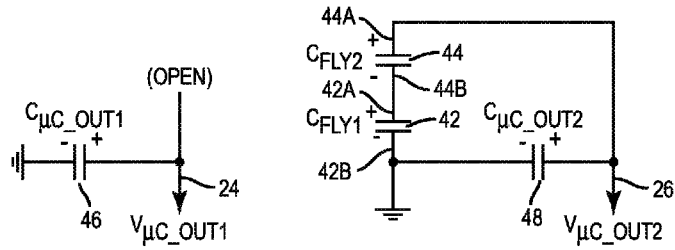
Figure 22B:
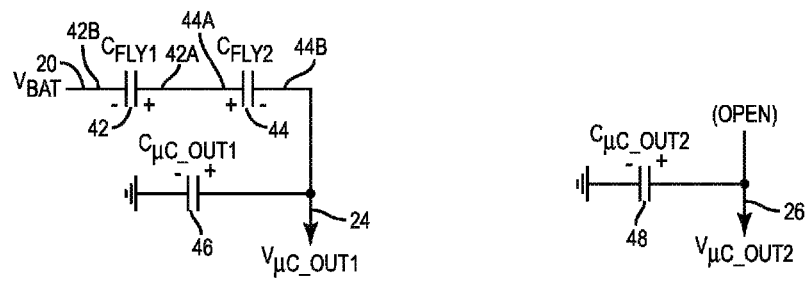

TABLE 3B-2A describes, and FIGS. 22A-B depicts, the operation of the dual output μC charge pump circuit 12A when the controller 14 configures the dual output μC charge pump circuit 12A to operate in the Sixth Boost/Buck Mode. The controller 14 configures the multiple output μC charge pump control circuit 72A to use an operational ratio, (xμB$_{BRATIO}$), set to 1/4. The multiple output μC charge pump control circuit 72A operably divides the operation of the dual output μC charge pump circuit 12A into four phases of operation. The multiple output μC charge pump control circuit 72A operably configures the dual output μC charge pump switch matrix circuit 70A such that first μC charge pump output 24 generates a first μC charge pump output voltage, (V$_{μC\_OUT1}$), substantially equal to 5/4×V$_{BAT}$, and the second μC charge pump output 26 generates a second μC charge pump output voltage, (V$_{μC\_OUT2}$), substantially equal to 3/4×V$_{BAT}$.

As described in TABLE 3B-2A and depicted in FIG. 22A, in the first phase of operation, (Phase 1), the multiple output μC charge pump control circuit 72A operably closes the tenth switch 92, (SW 10), the eleventh switch 94, (SW 11), and the fourteenth switch 100, (SW 14). In the second phase of operation, (Phase 2), the multiple output μC charge pump control circuit 72A operably closes the sixth switch 84, (SW 6), and the twelfth switch 96, (SW 12). As further depicted in FIG. 22B, in the third phase of operation, (Phase 3), the multiple output μC charge pump control circuit 72A operably closes the fifth switch 82, (SW 5), the eighth switch 88, (SW 8), the tenth switch 92, (SW 10), and the thirteenth switch 98, (SW 13). In the fourth phase of operation, (Phase 4), the multiple output μC charge pump control circuit 72A operably closes the ninth switch 90, (SW 9), the tenth switch 92, (SW 10), and the fifteenth switch 102, (SW 15).

As a result, the first flying capacitor 42, (C$_{FLY1}$), develops a first flying capacitor voltage, (V$_{CAP\_FLY1}$), substantially equal to 1/2×V$_{BAT}$, and the second flying capacitor 44, (C$_{FLY2}$), develops a second flying capacitor voltage, (V$_{CAP\_FLY2}$), substantially equal to 1/4×V$_{BAT}$. Accordingly, first μC charge pump output 24 generates a first μC charge pump output voltage, (V$_{μC\_OUT1}$), substantially equal to 5/4×V$_{BAT}$, on the first μC charge pump output capacitor 46, (C$_{μC\_OUT1}$), and the second μC charge pump output 26 generates a second μC charge pump output voltage, (V$_{μC\_OUT2}$), substantially equal to 3/4×V$_{BAT}$ on the second μC charge pump output capacitor 48, (C$_{μC\_OUT2}$).

Figure 23:
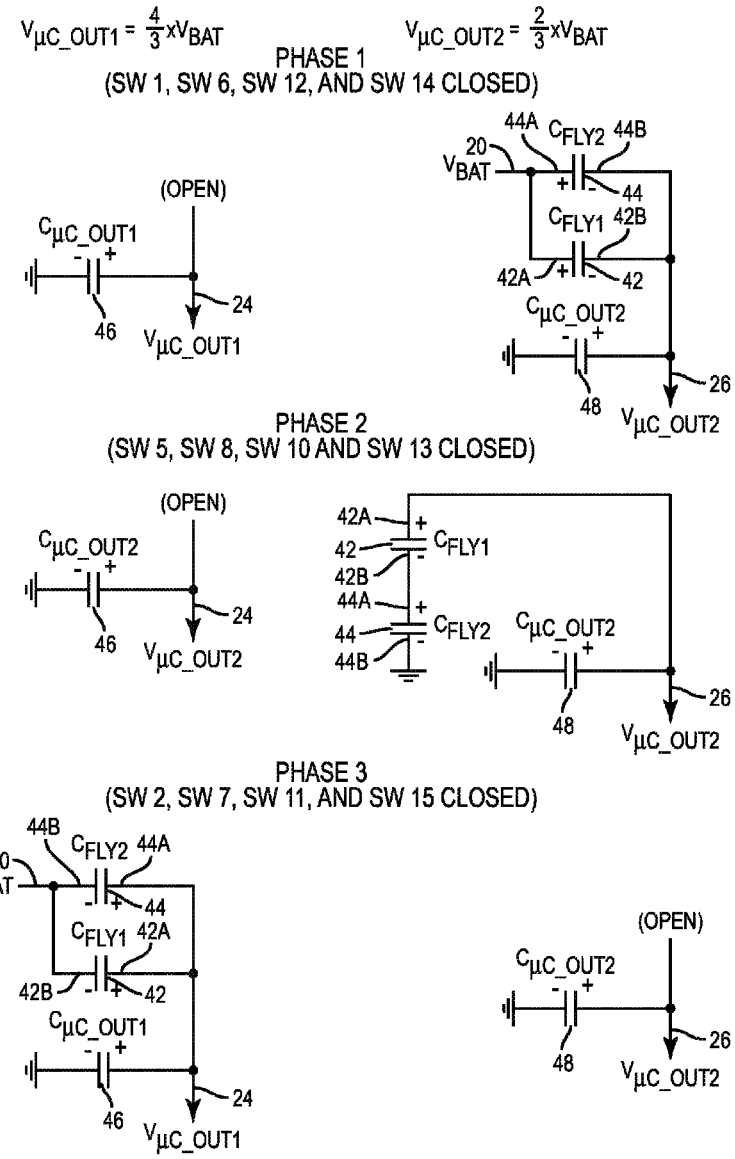
FIG. 23 depicts a mode of operation of an embodiment of a dual output μC charge pump configured to operate in a seventh boost/buck mode.

TABLE 3B-2A describes, and FIG. 23 depicts, the operation of the dual output μC charge pump circuit 12A when the controller 14 configures the dual output μC charge pump circuit 12A to operate in the Seventh Boost/Buck Mode. The controller 14 configures the multiple output μC charge pump control circuit 72A to use an operational ratio, (xμBB$_{RATIO}$), set to 1/3. The multiple output μC charge pump control circuit 72A operably divides the operation of the dual output μC charge pump circuit 12A into three phases of operation. The multiple output μC charge pump control circuit 72A operably configures the dual output μC charge pump switch matrix circuit 70A such that first μC charge pump output 24 generates a first μC charge pump output voltage, (V$_{μC\_OUT1}$), substantially equal to 4/3×V$_{BAT}$, and the second μC charge pump output 26 generates a second μC charge pump output voltage, (V$_{μC\_OUT2}$), substantially equal to 2/3×V$_{BAT}$.

As described in TABLE 3B-2A and depicted in FIG. 23, in the first phase of operation, (Phase 1), the multiple output μC charge pump control circuit 72A operably closes the first switch 74, (SW 1), the sixth switch 84, (SW 6), the twelfth switch 96, (SW 12), and the fourteenth switch 100, (SW 14). In the second phase of operation, (Phase 2), the multiple output μC charge pump control circuit 72A operably closes the fifth switch 82, (SW 5), the eighth switch 88, (SW 8), the tenth switch 92, (SW 10), and the thirteenth switch 98, (SW 13). In the third phase of operation, (Phase 3), the multiple output μC charge pump control circuit 72A operably closes the second switch 76, (SW 2), the seventh switch 86, (SW 7), the eleventh switch 94, (SW 11), and the fifteenth switch 102, (SW 15).

As a result, the first flying capacitor 42, (C$_{FLY1}$), develops a first flying capacitor voltage, (V$_{CAP\_FLY1}$), substantially equal to 1/3×V$_{BAT}$, and the second flying capacitor 44, (C$_{FLY2}$), develops a second flying capacitor voltage, (V$_{CAP\_FLY2}$), substantially equal to 1/3×V$_{BAT}$. Accordingly, first μC charge pump output 24 generates a first μC charge pump output voltage, (V$_{μC\_OUT1}$), substantially equal to 4/3×V$_{BAT}$, on the first μC charge pump output capacitor 46, (C$_{μC\_OUT1}$), and the second μC charge pump output 26 generates a second μC charge pump output voltage, (V$_{μC\_OUT2}$), substantially equal to 2/3×V$_{BAT}$ on the second μC charge pump output capacitor 48, (C$_{μC\_OUT2}$).

TABLE 3B-2A describes the operation of the dual output μC charge pump circuit 12A when the controller 14 configures the dual output µC charge pump circuit 12A to operate in the Eighth Boost/Buck Mode. The controller 14 configures the multiple output µC charge pump control circuit 72A to use an operational ratio, (xµBB$_{RATIO}$), set to 1/2. The multiple output µC charge pump control circuit 72A operably divides the operation of the dual output µC charge pump circuit 12A into three phases of operation. The multiple output µC charge pump control circuit 72A operably configures the dual output µC charge pump switch matrix circuit 70A such that first µC charge pump output 24 generates a first µC charge pump output voltage, (V$_{µC\_OUT1}$), substantially equal to 3/2×V$_{BAT}$, and the second µC charge pump output 26 generates a second µC charge pump output voltage, (V$_{µC\_OUT2}$), substantially equal to 1/2×V$_{BAT}$.

As further described in TABLE 3B-2A, in the first phase of operation, (Phase 1), the multiple output µC charge pump control circuit 72A operably closes the first switch 74, (SW 1), the sixth switch 84, (SW 6), the twelfth switch 96, (SW 12), and the fourteenth switch 100, (SW 14). In the second phase of operation, (Phase 2), the multiple output µC charge pump control circuit 72A operably closes the third switch 78, (SW 3), the eighth switch 88, (SW 8), the tenth switch 92, (SW 10), and the thirteenth switch 98, (SW 13). In the third phase of operation, (Phase 3), the multiple output µC charge pump control circuit 72A operably closes the second switch 76, (SW 2), the seventh switch 86, (SW 7), the eleventh switch 94, (SW 11), and the fifteenth switch 102, (SW 15).

As a result, the first flying capacitor 42, (C$_{FLY1}$), develops a first flying capacitor voltage, (V$_{CAP\_FLY1}$), substantially equal to 1/2×V$_{BAT}$, and the second flying capacitor 44, (C$_{FLY2}$), develops a second flying capacitor voltage, (V$_{CAP\_FLY2}$), substantially equal to 1/2×V$_{BAT}$. Accordingly, first µC charge pump output 24 generates a first µC charge pump output voltage, (V$_{µC\_OUT1}$), substantially equal to 3/2×V$_{BAT}$, on the first µC charge pump output capacitor 46, (C$_{µC\_OUT1}$), and the second µC charge pump output 26 generates a second µC charge pump output voltage, (V$_{µC\_OUT2}$), substantially equal to 1/2×V$_{BAT}$ on the second µC charge pump output capacitor 48, (C$_{µC\_OUT2}$).

Figure 24:
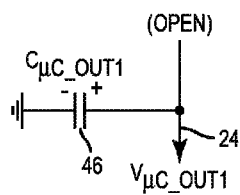
FIG. 24 depicts a mode of operation of an embodiment of a dual output μC charge pump configured to operate in a ninth boost/buck mode.
Figure 24:
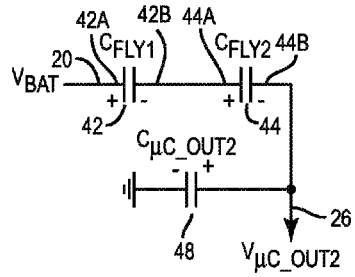
Figure 24:
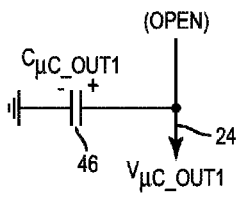
Figure 24:
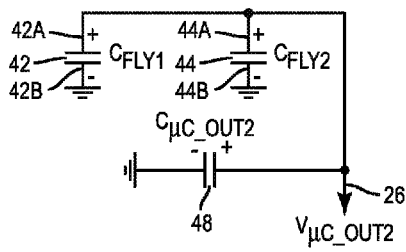
Figure 24:
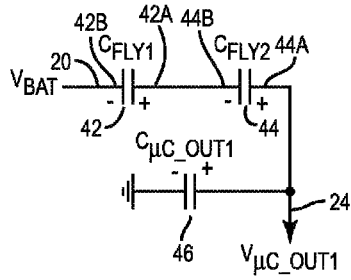
Figure 24:
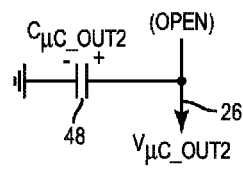

TABLE 3B-2B describes, and FIG. 24 depicts, the operation of the dual output µC charge pump circuit 12A when the controller 14 configures the dual output µC charge pump circuit 12A to operate in the Ninth Boost/Buck Mode. The controller 14 configures the multiple output µC charge pump control circuit 72A to use an operational ratio, (xµBB$_{RATIO}$), set to 2/3. The multiple output µC charge pump control circuit 72A operably divides the operation of the dual output µC charge pump circuit 12A into three phases of operation. The multiple output µC charge pump control circuit 72A operably configures the dual output µC charge pump switch matrix circuit 70A such that first µC charge pump output 24 generates a first µC charge pump output voltage, (V$_{µC\_OUT1}$), substantially equal to 5/3×V$_{BAT}$, and the second µC charge pump output 26 generates a second µC charge pump output voltage, (V$_{µC\_OUT2}$), substantially equal to 1/3×V$_{BAT}$.

As further described in TABLE 3B-2B and depicted in FIG. 24, in the first phase of operation, (Phase 1), the multiple output µC charge pump control circuit 72A operably closes the first switch 74, (SW 1), the fifth switch 82, (SW 5), and the twelfth switch 96, (SW 12). In the second phase of operation, (Phase 2), the multiple output µC charge pump control circuit 72A operably closes the third switch 78, (SW 3), the eighth switch 88, (SW 8), the tenth switch 92, (SW 10), and the thirteenth switch 98, (SW 13). In the third phase of operation, (Phase 3), the multiple output µC charge pump control circuit 72A operably closes the second switch 76, (SW 2), the fifth switch 82, (SW 5), and the eleventh switch 94, (SW 11).

As a result, the first flying capacitor 42, (C$_{FLY1}$), develops a first flying capacitor voltage, (V$_{CAP\_FLY1}$), substantially equal to 1/3×V$_{BAT}$, and the second flying capacitor 44, (C$_{FLY2}$), develops a second flying capacitor voltage, (V$_{CAP\_FLY2}$), substantially equal to 1/3×V$_{BAT}$. Accordingly, first µC charge pump output 24 generates a first µC charge pump output voltage, (V$_{µC\_OUT1}$), substantially equal to 5/3×V$_{BAT}$, on the first µC charge pump output capacitor 46, (C$_{µC\_OUT1}$), and the second µC charge pump output 26 generates a second µC charge pump output voltage, (V$_{µC\_OUT2}$), substantially equal to 1/3×V$_{BAT}$ on the second µC charge pump output capacitor 48, (C$_{µC\_OUT2}$).

Figure 25A:
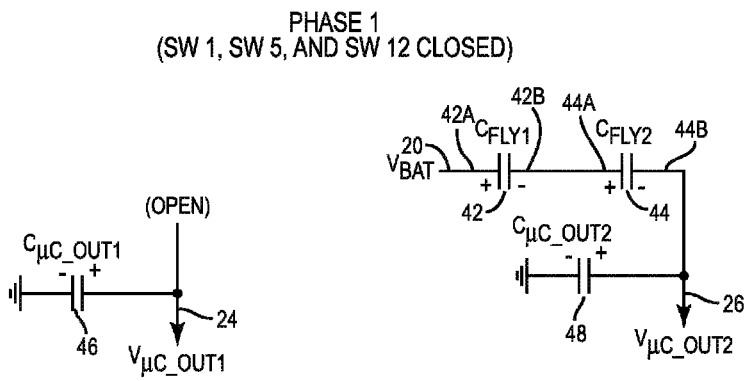
FIGS. 25A-B depict a mode of operation of an embodiment of a dual output μC charge pump configured to operate in a tenth boost/buck mode.
Figure 25A:
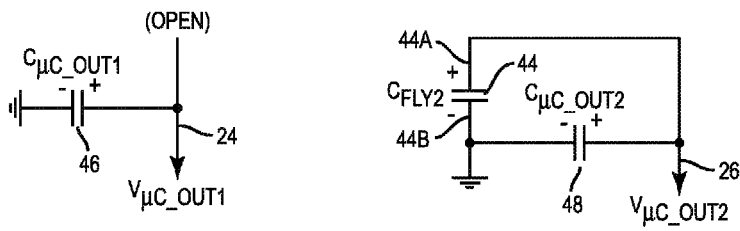
Figure 25B:
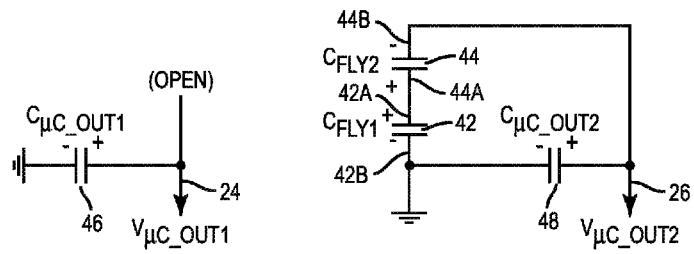
Figure 25B:
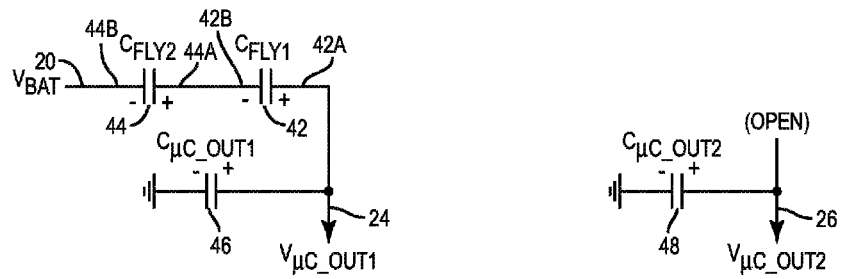

TABLE 3B-2B describes, and FIGS. 25A-B depicts, the operation of the dual output µC charge pump circuit 12A when the controller 14 configures the dual output µC charge pump circuit 12A to operate in the Tenth Boost/Buck Mode. The controller 14 configures the multiple output µC charge pump control circuit 72A to use an operational ratio, (xµBB$_{RATIO}$), set to 3/4. The multiple output µC charge pump control circuit 72A operably divides the operation of the dual output µC charge pump circuit 12A into four phases of operation. The multiple output µC charge pump control circuit 72A operably configures the dual output µC charge pump switch matrix circuit 70A such that first µC charge pump output 24 generates a first µC charge pump output voltage, (V$_{µC\_OUT1}$), substantially equal to 7/4×V$_{BAT}$, and the second µC charge pump output 26 generates a second µC charge pump output voltage, (V$_{µC\_OUT2}$), substantially equal to 1/4×V$_{BAT}$.

As further described in TABLE 3B-2B and depicted in FIG. 25A, in the first phase of operation, (Phase 1), the multiple output µC charge pump control circuit 72A operably closes the first switch 74, (SW 1), the fifth switch 82, (SW 5), and the twelfth switch 96, (SW 12). In the second phase of operation, (Phase 2), the multiple output µC charge pump control circuit 72A operably closes the eighth switch 88, (SW 8), and the thirteenth switch 98, (SW 13). As further depicted in FIG. 25B, in the third phase of operation, (Phase 3), the multiple output µC charge pump control circuit 72A operably closes the third switch 78, (SW 3), the tenth switch 92, (SW 10), and the twelfth switch 96, (SW 12). In the fourth phase of operation, (Phase 4), the multiple output µC charge pump control circuit 72A operably closes the second switch 76, (SW 2), the fifth switch 82, (SW 5), and the eleventh switch 94, (SW 11).

As a result, the first flying capacitor 42, (C$_{FLY1}$), develops a first flying capacitor voltage, (V$_{CAP\_FLY1}$), substantially equal to 1/2×V$_{BAT}$, and the second flying capacitor 44, (C$_{FLY2}$), develops a second flying capacitor voltage, (V$_{CAP\_FLY2}$), substantially equal to 1/4×V$_{BAT}$. Accordingly, first µC charge pump output 24 generates a first µC charge pump output voltage, (V$_{µC\_OUT1}$), substantially equal to 7/4×V$_{BAT}$, on the first µC charge pump output capacitor 46, (C$_{µC\_OUT1}$), and the second µC charge pump output 26 generates a second µC charge pump output voltage, (V$_{µC\_OUT2}$), substantially equal to 1/4×V$_{BAT}$ on the second µC charge pump output capacitor 48, (C$_{µC\_OUT2}$).

Both the TABLE 3B-1B and the TABLE 3B-2B describe the operation of the dual output µC charge pump circuit 12A when the controller 14 configures the dual output µC charge pump circuit 12A to operate in the OFF Mode. As described in both the TABLE 3B-1B and the TABLE 3B-2B, when the controller 14 configures the dual output µC charge pump circuit 12A to be in the OFF Mode of operation, the multiple output μC charge pump control circuit 72A may operably open the first switch 74, (SW 1), the second switch 76, (SW 2), the third switch 78, (SW 3), the fourth switch 80, (SW 4), the fifth switch 82, (SW 5), the sixth switch 84, (SW 6), the seventh switch 86, (SW 7), the eighth switch 88, (SW 8), the ninth switch 90, (SW 9), the tenth switch 92, (SW 10), the eleventh switch 94, (SW 11), the twelfth switch 96, (SW 12), the thirteenth switch 98, (SW 13), the fourteenth switch 100, (SW 14), and the fifteenth switch 102, (SW 15). As a result, the first μC charge pump output voltage, ($V_{\mu C\_OUT1}$), on the first μC charge pump output 24 floats relative to ground. Likewise, the second μC charge pump output voltage, ($V_{\mu C\_OUT2}$), on the second μC charge pump output 26 floats relative to ground.

Figure 2B:
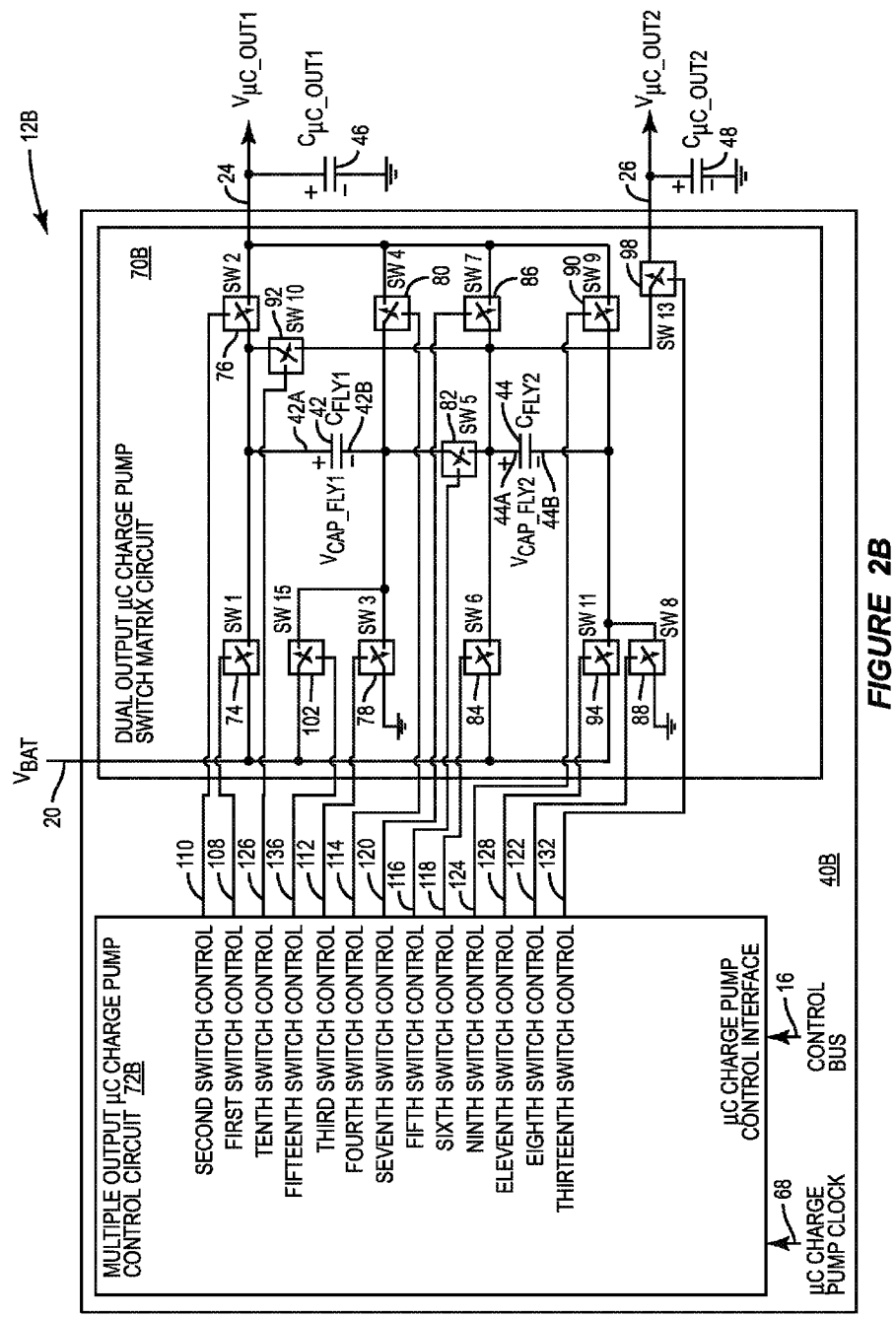
FIG. 2B depicts a second embodiment of the dual output μC charge pump circuit 12A.

FIG. 2B depicts another embodiment of the dual output μC charge pump circuit 12, depicted in FIG. 1A, as a dual output μC charge pump circuit 12B. The dual output μC charge pump circuit 12B is similar in form and function to the dual output μC charge pump circuit 12A depicted in FIG. 2A except as described as follows: (1) the dual output μC charge pump circuit 12B includes a multiple output μC charge pump switch matrix and control circuit 40B instead of the multiple output μC charge pump switch matrix and control circuit 40A; (2) the dual output μC charge pump circuit 12B includes the dual output μC charge pump switch matrix circuit 70B instead of the dual output μC charge pump switch matrix circuit 70A; and (3) the dual output μC charge pump circuit 12B includes a multiple output μC charge pump control circuit 72B instead of a the multiple output μC charge pump control circuit 72A.

Unlike the dual output μC charge pump switch matrix circuit 70A of the multiple output μC charge pump switch matrix and control circuit 40A, the dual output μC charge pump switch matrix circuit 70B omits the twelfth switch 96, (SW 12), and the fourteenth switch 100, (SW 14), as depicted in FIG. 2A. Accordingly, the multiple output μC charge pump control circuit 72B of the dual output μC charge pump circuit 12B, depicted in FIG. 2B, omits both a twelfth switch control configured to provide a twelfth switch control signal 130 to control the twelfth switch 96, (SW 12) and a fourteenth switch control configured to provide a twelfth switch control signal 130 to control the fourteenth switch 100, (SW 14), as depicted in FIG. 2A.

Even so, because the dual output μC charge pump circuit 12B is otherwise similar in form and function to the dual output μC charge pump circuit 12A depicted in FIG. 2A, the controller 14 may configure the dual output μC charge pump circuit 12B to operate in any of the modes of operation that may be performed by the dual output μC charge pump circuit 12A, as described above, that do not require either the twelfth switch 96, (SW 12), the fourteenth switch 100, (SW 14), or a combination thereof, to be closed. Accordingly, for the sake of brevity, the specific operational modes of the dual output μC charge pump circuit 12B will not be discussed in detail. Although the specific operational modes of the dual output μC charge pump circuit 12B are not specifically discussed in detail, the modes of operation of the dual output μC charge pump circuit 12B, as would be evident to one of ordinary skill in the art, are thereby considered to be within the scope of the concepts disclosed with respect to the modes of operation of the dual output μC charge pump circuit 12B.

Accordingly, the dual output μC charge pump circuit 12B provides an advantage of being able to perform many of the numerous modes of operation of the dual output μC charge pump circuit 12A without the added complexity of including the twelfth switch 96, (SW 12), the fourteenth switch 100, (SW 14), or a combination thereof. As a result, in come embodiments, the dual output μC charge pump circuit 12B may be used to reduce both silicon foot print and power requirement of the multiple output μC charge pump system 10A. This advantage is particularly useful in cases where the supply voltage 20 may be derived from a battery 22, as depicted in FIG. 1A. In addition, as discussed above relative to the embodiments of the dual output μC charge pump circuit 12, depicted in FIG. 1A, and the dual output μC charge pump circuit 12A, depicted in FIG. 2A, some embodiments of dual output μC charge pump circuit 12B may include and use more than two flying capactiors to generate the first μC charge pump output voltage, ($V_{\mu C\_OUT1}$), on the first μC charge pump output 24 and the second μC charge pump output voltage, ($V_{\mu C\_OUT2}$), on the second μC charge pump output 26. However, advantageously, as depicted in FIG. 2B, and previously described with respect to the various modes of operation of the dual output μC charge pump circuit 12, depicted in FIG. 1A, and the dual output μC charge pump circuit 12A, depicted in FIG. 2A, some embodiments of the dual output μC charge pump circuit 12B may be configured to generate the desired output voltage levels, namely the first μC charge pump output voltage, ($V_{\mu C\_OUT1}$), on the first μC charge pump output 24 and the second μC charge pump output voltage, ($V_{\mu C\_OUT2}$), on the second μC charge pump output 26, using only the first flying capacitor 42, ($C_{FLY1}$), and the second flying capacitor 44, ($C_{FLY2}$). In other words, some embodiments of the dual output μC charge pump circuit 12B may be configured to generate the variously described output voltage levels corresponding to a "buck/buck mode" of operation, a "buck/boost mode" of operation, and/or a "boost/buck mode" of operation using only the first flying capacitor 42, ($C_{FLY1}$), and the second flying capacitor 44, ($C_{FLY2}$). It may be appreciated that those embodiment of the dual output μC charge pump circuit 12B that only use the first flying capacitor 42, ($C_{FLY1}$), and the second flying capacitor 44, ($C_{FLY2}$), to generate the desired output voltage levels on the first μC charge pump output 24 and the second μC charge pump output 26 may provide improved technical performance due to reduced complexity and reduced response time verses those embodiments of the dual output μC charge pump circuit that include more than two flying capacitors.

Figure 2C:
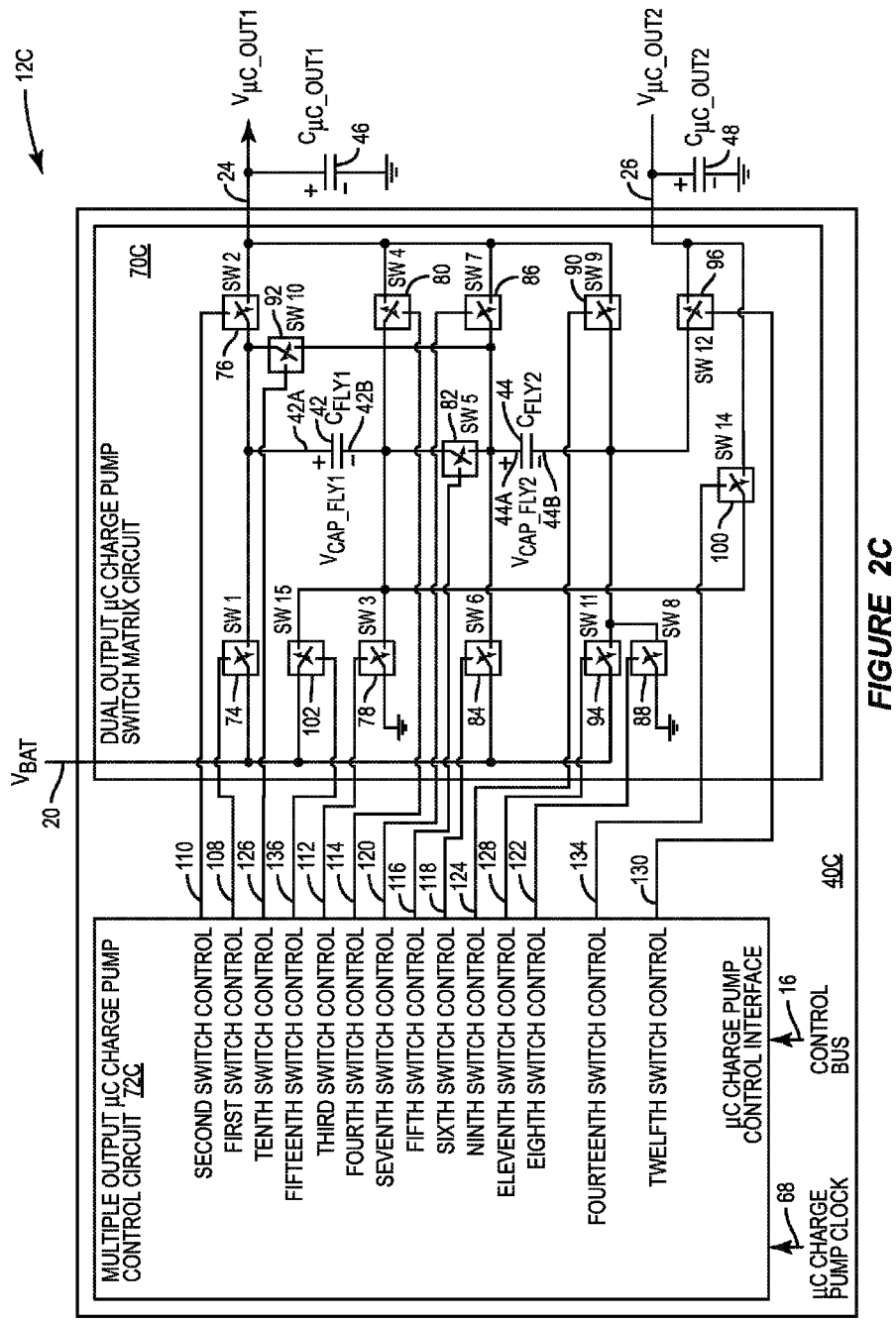
FIG. 2C depicts a third embodiment of the dual output μC charge pump circuit 12A.

FIG. 2C depicts another embodiment of the dual output μC charge pump circuit 12, depicted in FIG. 1A, as a dual output μC charge pump circuit 12C. The dual output μC charge pump circuit 12C is similar in form and function to the dual output μC charge pump circuit 12A depicted in FIG. 2A except as described as follows: (1) the dual output μC charge pump circuit 12C includes a multiple output μC charge pump switch matrix and control circuit 40C instead of the multiple output μC charge pump switch matrix and control circuit 40A; (2) the dual output μC charge pump circuit 12C includes the dual output μC charge pump switch matrix circuit 70C instead of the dual output μC charge pump switch matrix circuit 70A; and (3) the dual output μC charge pump circuit 12C includes a multiple output μC charge pump control circuit 72C instead of a the multiple output μC charge pump control circuit 72A.

Unlike the dual output μC charge pump switch matrix circuit 70A of the multiple output μC charge pump switch matrix and control circuit 40A, the dual output μC charge pump switch matrix circuit 70C omits the thirteenth switch 98, (SW 13), as depicted in FIG. 2A. Accordingly, the multiple output μC charge pump control circuit 72C of the dual output μC charge pump circuit 12C, depicted in FIG. 2C, omits a thirteenth switch control configured to provide a thirteenth switch control signal 132 to control the thirteenth switch 98, (SW 13), as depicted in FIG. 2A.

Even so, because the dual output μC charge pump circuit 12C is otherwise similar in form and function to the dual output μC charge pump circuit 12A depicted in FIG. 2A, the controller 14 may configure the dual output μC charge pump circuit 12C to operate in any of the modes of operation that may be performed by the dual output μC charge pump circuit 12A, as described above, except those modes of operation that require the thirteenth switch 98, (SW 13), as depicted in FIG. 2A, to be closed. Accordingly, for the sake of brevity, the specific operational modes of the dual output μC charge pump circuit 12C will not be discussed in detail. Although the specific operational modes of the dual output μC charge pump circuit 12C are not specifically discussed in detail, the modes of operation of the dual output μC charge pump circuit 12C, as would be evident to one of ordinary skill in the art, are thereby consider to be within the scope of the concepts disclosed with respect to the modes of operation of the dual output μC charge pump circuit 12C.

Accordingly, the dual output μC charge pump circuit 12C may provide an advantage of being able to perform may of the numerous modes of operation of the dual output μC charge pump circuit 12A without the added complexity of including a thirteenth switch 98, (SW 13), as depicted in FIG. 2A. As a result, in come embodiments, the dual output μC charge pump circuit 12C may be used to reduce both silicon foot print and power requirement of the multiple output μC charge pump system 10A. This advantage is particularly useful in cases where the supply voltage 20 may be derived from a battery 22, as depicted in FIG. 1A. In addition, as discussed above relative to the embodiments of the dual output μC charge pump circuit 12, depicted in FIG. 1A, the dual output μC charge pump circuit 12A, depicted in FIG. 2A, and the dual output μC charge pump circuit 12B, depicted in FIG. 2B, some embodiments of dual output μC charge pump circuit 12C, depicted in FIG. 2C, may include and use more than two flying capactiors to generate the first μC charge pump output voltage, ($V_{\mu C\_OUT1}$), on the first μC charge pump output 24 and the second μC charge pump output voltage, ($V_{\mu C\_OUT2}$), on the second μC charge pump output 26. However, advantageously, as depicted in FIG. 2C, and previously described with respect to the various modes of operation of the dual output μC charge pump circuit 12, depicted in FIG. 1A, the dual output μC charge pump circuit 12A, depicted in FIG. 2A, and the dual output μC charge pump circuit 12B, depicted in FIG. 2B, some embodiments of the dual output μC charge pump circuit 12C may be configured to generate the desired output voltage levels, namely the first μC charge pump output voltage, ($V_{\mu C\_OUT1}$), on the first μC charge pump output 24 and the second μC charge pump output voltage, ($V_{\mu C\_OUT2}$), on the second μC charge pump output 26, using only the first flying capacitor 42, ($C_{FLY1}$), and the second flying capacitor 44, ($C_{FLY2}$). In other words, some embodiments of the dual output μC charge pump circuit 12C may be configured to generate the variously described output voltage levels corresponding to a "buck/buck mode" of operation, a "buck/boost mode" of operation, and/or a "boost/buck mode" of operation using only the first flying capacitor 42, ($C_{FLY1}$), and the second flying capacitor 44, ($C_{FLY2}$). It may be appreciated that those embodiment of the dual output μC charge pump circuit 12C that only use the first flying capacitor 42, ($C_{FLY1}$), and the second flying capacitor 44, ($C_{FLY2}$), to generate the desired output voltage levels on the first μC charge pump output 24 and the second μC charge pump output 26 may provide improved technical performance due to reduced complexity and reduced response time verses those embodiments of the dual output μC charge pump circuit that include more than two flying capacitors.

Figure 2D:
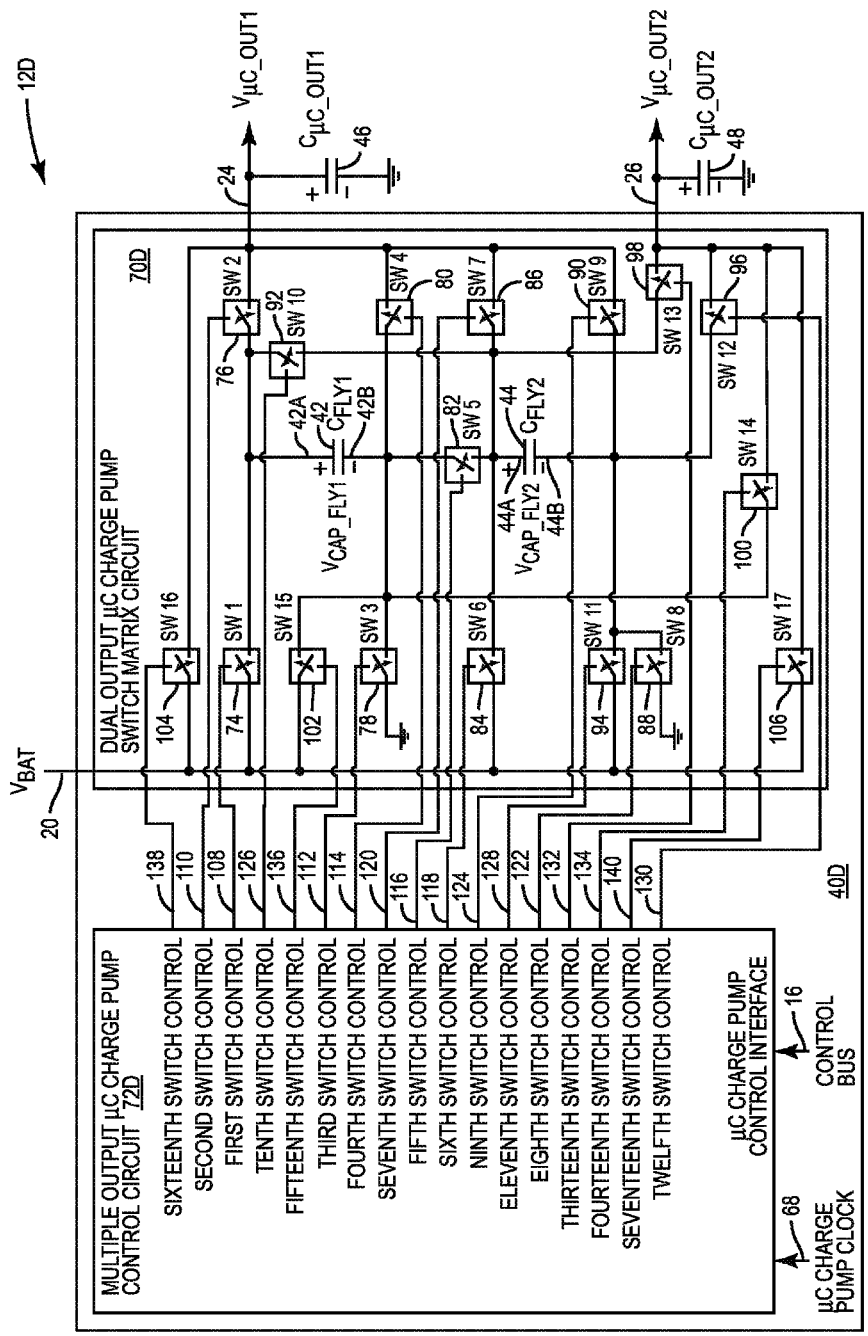
FIG. 2D depicts a fourth embodiment of the dual output μC charge pump circuit 12A.

FIG. 2D depicts another embodiment of the dual output μC charge pump circuit 12, depicted in FIG. 1A, as a dual output μC charge pump circuit 12D. The dual output μC charge pump circuit 12D, depicted in FIG. 2D, is operationally similar to the dual output μC charge pump circuit 12A. Unlike the dual output μC charge pump circuit 12A, the dual output μC charge pump circuit 12D replaces the multiple output μC charge pump switch matrix and control circuit 40A with a multiple output μC charge pump switch matrix and control circuit 40D. Unlike the multiple output μC charge pump switch matrix and control circuit 40A, the multiple output μC charge pump switch matrix and control circuit 40D replaces the dual output μC charge pump switch matrix circuit 70A with the dual output μC charge pump switch matrix circuit 70D. Likewise, the multiple output μC charge pump switch matrix and control circuit 40D replaces the multiple output μC charge pump control circuit 72A with a multiple output μC charge pump control circuit 72D.

The dual output μC charge pump switch matrix circuit 70D is operationally similar to the dual output μC charge pump switch matrix circuit 70A, depicted in FIG. 2A. However, unlike the dual output μC charge pump switch matrix circuit 70A, the dual output μC charge pump switch matrix circuit 70D further includes a sixteenth switch 104, (SW 16), and a seventeenth switch 106, (SW 17).

Similarly, the multiple output μC charge pump control circuit 72D is operationally similar to the multiple output μC charge pump control circuit 72A, depicted in FIG. 2A. However, unlike the multiple output μC charge pump control circuit 72A, the multiple output μC charge pump control circuit 72D further includes a sixteenth switch control configured to provide a sixteenth switch control signal 138 to the sixteenth switch 104, (SW 16), to control the operation of the sixteenth switch 104, (SW 16). In addition, unlike the multiple output μC charge pump control circuit 72A, the multiple output μC charge pump control circuit 72D further includes a seventeenth switch control configured to provide a seventeenth switch control signal 140 to the seventeenth switch 106, (SW 17), to control the operation of the seventeenth switch 106, (SW 17).

Advantageously, the sixteenth switch 104, (SW 16), may be coupled between the supply voltage 20 and the first μC charge pump output 24 to provide a "bypass path" for current to flow directly from the supply voltage 20 to the first μC charge pump output 24. The sixteenth switch 104, (SW 16), may include a sixteenth switch control input configured to receive the sixteenth switch control signal 138 from the multiple output μC charge pump control circuit 72D. The multiple output μC charge pump control circuit 72D may configure the sixteenth switch control signal 138 to operably open and close the sixteenth switch 104, (SW 16), based upon the various modes of operation of the dual output μC charge pump circuit 12D.

In a similarly advantageous fashion, the seventeenth switch 106, (SW 17), may be coupled between the supply voltage 20 and the second μC charge pump output 26 to provide a "bypass path" for current to flow directly from the supply voltage 20 to the second μC charge pump output 26. The seventeenth switch 106, (SW 17), may include a seventeenth switch control input configured to receive the seventeenth switch control signal 140 from the multiple output μC charge pump control circuit 72D. The multiple output μC charge pump control circuit 72D may configure the seventeenth switch control signal 140 to operably open and close the seventeenth switch 106, (SW 17), based upon the various modes of operation of the dual output μC charge pump circuit 12D.

Accordingly, as an example advantage, when the multiple output μC charge pump control circuit 72D configures the sixteenth switch control signal 138 to operably open the sixteenth switch 104, (SW 16), and the seventeenth switch control signal 140 to operably open the seventeenth switch 106, (SW 17), controller 14 may configure the dual output μC charge pump circuit 12D to operate similarly to the operational modes previously described with respect to dual output μC charge pump circuit 12A in TABLES 1A, 1B-1, 1B-2, 2A-1, 2A-2, 2B-1A, 2B-1B, 2B-2A, 2B-2B, 3A-1, 3A-2, 3B-1A, 3B-1B, 3B-2A, and 3B-2B and depicted in FIGS. 3A through 25B.

Otherwise, advantageously, the dual output μC charge pump circuit 12D may configure the multiple output μC charge pump control circuit 72D to operate in various bypass modes of operation.

As an example of one of the various bypass modes of operation of the dual output μC charge pump circuit 12D, unlike the dual output μC charge pump circuit 12A, the controller 14 may advantageously configure the dual output μC charge pump circuit 12D to operate in a first μC charge pump output bypass mode of operation. The controller 14 may configure the multiple output μC charge pump control circuit 72D to operate in a first μC charge pump output bypass mode of operation by configuring the multiple output μC charge pump control circuit 72D to operably close the sixteenth switch 104, (SW 16), while also opening the second switch 76, (SW 2), the fourth switch 80, (SW 4), the seventh switch 86, (SW 7), and ninth switch 90, (SW 9). As a result, the first μC charge pump output 24 is operably coupled to the supply voltage 20 and disconnected from both the first flying capacitor 42, ($C_{FLY1}$), and the second flying capacitor 44, ($C_{FLY2}$). When the multiple output μC charge pump control circuit 72D is configured to operate in a first μC charge pump output bypass mode of operation, the multiple output μC charge pump control circuit 72D may operably change the switch state (open or closed) of the first switch 74, (SW 1), the third switch 78, (SW 3), the fifth switch 82, (SW 5), the sixth switch 84, (SW 6), the eighth switch 88, (SW 8), the tenth switch 92, (SW 10), the eleventh switch 94, (SW 11), the twelfth switch 96, (SW 12), the thirteenth switch 98, (SW 13), the fourteenth switch 100, (SW 14), the fifteenth switch 102, (SW 15), and the seventeenth switch 106, (SW 17), to generate a desired buck or boost voltage level on the second μC charge pump output 26 in a fashion similar to the previously described operations of the dual output μC charge pump circuit 12A of FIG. 2A.

Notably, because the sixteenth switch 104, (SW 16), is operably closed when the controller 14 configures the multiple output μC charge pump control circuit 72D to operate in a first μC charge pump output bypass mode of operation, the first μC charge pump output 24 may be directly coupled to the supply voltage 20 during all phases of operation of the dual output μC charge pump circuit 12D. As a result, when the multiple output μC charge pump control circuit 72D is configured to operate in a first μC charge pump output bypass mode of operation, the first μC charge pump output capacitor 46, ($C_{\mu C\_OUT1}$), may be continuously charged from the supply voltage 20 during all phases of operation of the dual output μC charge pump circuit 12D. Accordingly, the phases of operation dedicated to transferring charge from the supply voltage 20, first flying capacitor 42, ($C_{FLY1}$), the second flying capacitor 44, ($C_{FLY2}$), or a combination thereof, to the first μC charge pump output capacitor 46, ($C_{\mu C\_OUT1}$), may be omitted.

As another example of one of the various bypass modes of operation of the dual output μC charge pump circuit 12D, unlike the dual output μC charge pump circuit 12A, the controller 14 may advantageously configure the dual output μC charge pump circuit 12D to operate in a second μC charge pump output bypass mode of operation. The controller 14 may configure the multiple output μC charge pump control circuit 72D to operate in a second μC charge pump output bypass mode of operation by configuring the multiple output μC charge pump control circuit 72D to operably close the seventeenth switch 106, (SW 17), while operably opening the twelfth switch 96, (SW 12), the thirteenth switch 98, (SW 13), and the fourteenth switch 100, (SW 14). As a result, the second μC charge pump output 26 is operably coupled to the supply voltage 20 and disconnected from both the first flying capacitor 42, ($C_{FLY1}$), and the second flying capacitor 44, ($C_{FLY2}$). Because the second μC charge pump output 26 is operably disconnected from both the first flying capacitor 42, ($C_{FLY1}$), and the second flying capacitor 44, ($C_{FLY2}$), the multiple output μC charge pump control circuit 72D is free to change the switch state (open or closed) of the first switch 74, (SW 1), the third switch 78, (SW 3), the fifth switch 82, (SW 5), the sixth switch 84, (SW 6), the eighth switch 88, (SW 8), the tenth switch 92, (SW 10), the eleventh switch 94, (SW 11), the fifteenth switch 102, (SW 15), and the sixteenth switch 104, (SW 16), to generate a desired buck or boost voltage level on the first μC charge pump output 24 in a fashion similar to the previously described operations of the dual output μC charge pump circuit 12A of FIG. 2A.

Also notably, because the seventeenth switch 106, (SW 17), is operably closed when the controller 14 configures the multiple output μC charge pump control circuit 72D to operate in a second μC charge pump output bypass mode of operation, the second μC charge pump output 26 may be directly coupled to the supply voltage 20 during all phases of operation of the dual output μC charge pump circuit 12D. As a result, when the multiple output μC charge pump control circuit 72D is configured to operate in a first μC charge pump output bypass mode of operation, the second μC charge pump output capacitor 48, ($C_{\mu C\_OUT2}$), may be continuously charged from the supply voltage 20 during all phases of operation of the dual output μC charge pump circuit 12D. Accordingly, the phases of operation dedicated to transferring charge from the supply voltage 20, first flying capacitor 42, ($C_{FLY1}$), the second flying capacitor 44, ($C_{FLY2}$), or a combination thereof, to the second μC charge pump output capacitor 48, ($C_{\mu C\_OUT2}$), may be omitted.

As another example of one of the various bypass modes of operation of the dual output μC charge pump circuit 12D, unlike the dual output μC charge pump circuit 12A, the controller 14 may advantageously configure the dual output μC charge pump circuit 12D to simultaneously operate in both the first μC charge pump output bypass mode of operation and the second μC charge pump output bypass mode of operation, which may also be referred to as a Bypass/Bypass Mode of operation. To configure the dual output μC charge pump circuit 12D to operate in Bypass/Bypass Mode of operation, the controller 14 may configure the multiple output μC charge pump control circuit 72D to simultaneously close both the sixteenth switch 104, (SW 16), and the seventeenth switch 106, (SW 17), while operably opening the first switch 74, (SW 1), the second switch 76, (SW 2), the third switch 78, (SW 3), the fourth switch 80, (SW 4), the fifth switch 82, (SW 5), the sixth switch 84, (SW 6), the seventh switch 86, (SW 7), the eighth switch 88, (SW 8), the ninth switch 90, (SW 9), the tenth switch 92, (SW 10), the eleventh switch 94, (SW 11), the twelfth switch 96, (SW 12), the thirteenth switch 98, (SW 13), the fourteenth switch 100, (SW 14), and the fifteenth switch 102, (SW 15) of the dual output μC charge pump switch matrix circuit 70D. When the dual output μC charge pump circuit 12D is set to operate in Bypass/Bypass Mode of operation, both the first flying capacitor 42, ($C_{FLY1}$), and the second flying capacitor 44, ($C_{FLY2}$), are decoupled, respectively, from the first μC charge pump output 24 and the second μC charge pump output 26. As a result, the first μC charge pump output voltage, ($V_{\mu C\_OUT1}$), provided on the first μC charge pump output 24 and the second μC charge pump output voltage, ($V_{\mu C\_OUT2}$), provided on the second μC charge pump output 26 are substantially equal to the voltage level present on the supply voltage 20. As an example, if the supply voltage 20 is provided by the battery 22, the first μC charge pump output voltage, ($V_{\mu C\_OUT1}$), and the second μC charge pump output voltage, ($V_{\mu C\_OUT2}$), will be substantially equal to the battery voltage, ($V_{BAT}$).

As discussed above, the dual output μC charge pump circuit 12D may configure the multiple output μC charge pump control circuit 72D to operate in various bypass modes of operation. Various, non-limiting, examples of first μC charge pump output bypass modes of operation of the dual output μC charge pump circuit 12D are described in TABLE 4A. Example first μC charge pump output bypass modes described in TABLE 4A include: a First Bypass/Buck Mode, a Second Bypass/Buck Mode, a Third Bypass/Buck Mode, a Fourth Bypass/Buck Mode, a Fifth Bypass/Buck Mode, a Sixth Bypass/Buck Mode, a Seventh Bypass/Buck Mode, an Eighth Bypass/Buck Mode, a Ninth Bypass/Buck Mode, a Tenth Bypass/Buck Mode, a First Bypass/Boost Mode, a Second Bypass/Boost Mode, a Third Bypass/Boost Mode, a Fourth Bypass/Boost Mode, and a Fifth Bypass/Boost Mode.

Additional, non-limiting, examples of second μC charge pump output bypass modes of operation of the dual output μC charge pump circuit 12D are described in TABLE 4B. Example second μC charge pump output bypass modes described in TABLE 4B include: a First Buck/Bypass Mode, a Second Buck/Bypass Mode, a Third Buck/Bypass Mode, a Fourth Buck/Bypass Mode, a Fifth Buck/Bypass Mode, a Sixth Buck/Bypass Mode, a Seventh Buck/Bypass Mode, an Eighth Buck/Bypass Mode, a Ninth Buck/Bypass Mode, a Tenth Buck/Bypass Mode, a First Boost/Bypass Mode, a Second Boost/Bypass Mode, a Third Boost/Bypass Mode, a Fourth Boost/Bypass Mode, and a Fifth Boost/Bypass Mode.

Accordingly, as described in TABLE 4A, in the First Bypass/Buck Mode of operation of the dual output μC charge pump circuit 12D, the controller 14 configures the multiple output μC charge pump control circuit 72D to use an operational ratio, ($x\mu BB_{RATIO}$), set to 1/4 to generate a second μC charge pump output voltage, ($V_{\mu C\_OUT2}$), substantially equal to $1/4 \times V_{BAT}$ on the second μC charge pump output 26 and operate in the first μC charge pump output bypass mode. As a result, the first μC charge pump output 24 generates a first μC charge pump output voltage, ($V_{\mu C\_OUT1}$), substantially equal to $V_{BAT}$ and the second μC charge pump output 26 generates a second μC charge pump output voltage, ($V_{\mu C\_OUT2}$), substantially equal to $1/4 \times V_{BAT}$. In the Second Bypass/Buck Mode of operation of the dual output μC charge pump circuit 12D, the controller 14 configures the multiple output μC charge pump control circuit 72D to use an operational ratio, ($x\mu BB_{RATIO}$), set to 1/3 to generate a second μC charge pump output voltage, ($V_{\mu C\_OUT2}$), substantially equal to $1/3 \times V_{BAT}$ on the second μC charge pump output 26 and operate in the first μC charge pump output bypass mode. As a result, the first μC charge pump output 24 generates a first μC charge pump output voltage, ($V_{\mu C\_OUT1}$), substantially equal to $V_{BAT}$ and the second μC charge pump output 26 generates a second μC charge pump output voltage, ($V_{\mu C\_OUT2}$), substantially equal to $1/3 \times V_{BAT}$. In the Third Bypass/Buck Mode of operation of the dual output μC charge pump circuit 12D, the controller 14 configures the multiple output μC charge pump control circuit 72D to use an operational ratio, ($x\mu BB_{RATIO}$), set to 1/2 to generate a second μC charge pump output voltage, ($V_{\mu C\_OUT2}$), substantially equal to $1/2 \times V_{BAT}$ on the second μC charge pump output 26 and operate in a first μC charge pump output bypass mode. As a result, the first μC charge pump output 24 generates a first μC charge pump output voltage, ($V_{\mu C\_OUT1}$), substantially equal to $V_{BAT}$ and the second μC charge pump output 26 generates a second μC charge pump output voltage, ($V_{\mu C\_OUT2}$), substantially equal to $1/2 \times V_{BAT}$. In the Fourth Bypass/Buck Mode of operation of the dual output μC charge pump circuit 12D, the controller 14 configures the multiple output μC charge pump control circuit 72D to use an operational ratio, ($x\mu BB_{RATIO}$), set to 2/3 to generate a second μC charge pump output voltage, ($V_{\mu C\_OUT2}$), substantially equal to $2/3 \times V_{BAT}$ on the second μC charge pump output 26 and operate in the first μC charge pump output bypass mode. As a result, the first μC charge pump output 24 generates a first μC charge pump output voltage, ($V_{\mu C\_OUT1}$), substantially equal to $V_{BAT}$ and the second μC charge pump output 26 generates a second μC charge pump output voltage, ($V_{\mu C\_OUT2}$), substantially equal to $2/3 \times V_{BAT}$. In the Fifth Bypass/Buck Mode of operation of the dual output μC charge pump circuit 12D, the controller 14 configures the multiple output μC charge pump control circuit 72D to use an operational ratio, ($x\mu BB_{RATIO}$), set to 3/4 to generate a second μC charge pump output voltage, ($V_{\mu C\_OUT2}$), substantially equal to $3/4 \times V_{BAT}$ on the second μC charge pump output 26 and operate in the first μC charge pump output bypass mode. As a result, the first μC charge pump output 24 generates a first μC charge pump output voltage, ($V_{\mu C\_OUT1}$), substantially equal to $V_{BAT}$ and the second μC charge pump output 26 generates a second μC charge pump output voltage, ($V_{\mu C\_OUT2}$), substantially equal to $3/4 \times V_{BAT}$. In the Sixth Bypass/Buck Mode of operation of the dual output μC charge pump circuit 12D, the controller 14 configures the multiple output μC charge pump control circuit 72D to use an operational ratio, ($x\mu BB_{RATIO}$), set to 1/4 to generate a second μC charge pump output voltage, ($V_{\mu C\_OUT2}$), substantially equal to $3/4 \times V_{BAT}$ on the second μC charge pump output 26 and operate in the first μC charge pump output bypass mode. As a result, the first μC charge pump output 24 generates a first μC charge pump output voltage, ($V_{\mu C\_OUT1}$), substantially equal to $V_{BAT}$ and the second μC charge pump output 26 generates a second μC charge pump output voltage, ($V_{\mu C\_OUT2}$), substantially equal to $3/4 \times V_{BAT}$. In the Seventh Bypass/Buck Mode of operation of the dual output μC charge pump circuit 12D, the controller 14 configures the multiple output μC charge pump control circuit 72D to use an operational ratio, ($x\mu BB_{RATIO}$), set to 1/3 to generate a second μC charge pump output voltage, ($V_{\mu C\_OUT2}$), substantially equal to $2/3 \times V_{BAT}$ on the second μC charge pump output 26 and operate in the first μC charge pump output bypass mode. As a result, the first μC charge pump output 24 generates a first μC charge pump output voltage, ($V_{\mu C\_OUT1}$), substantially equal to $V_{BAT}$ and the second μC charge pump output 26 generates a second μC charge pump output voltage, ($V_{\mu C\_OUT2}$), substantially equal to 2/3×$V_{BAT}$. In the Eighth Bypass/Buck Mode of operation of the dual output μC charge pump circuit 12D, the controller 14 configures the multiple output μC charge pump control circuit 72D to use an operational ratio, (xμBB$_{RATIO}$), set to 1/2 to generate a second μC charge pump output voltage, ($V_{\mu C\_OUT2}$), substantially equal to 1/2×$V_{BAT}$ on the second μC charge pump output 26 and operate in the first μC charge pump output bypass mode. As a result, the first μC charge pump output 24 generates a first μC charge pump output voltage, ($V_{\mu C\_OUT1}$), substantially equal to $V_{BAT}$ and the second μC charge pump output 26 generates a second μC charge pump output voltage, ($V_{\mu C\_OUT2}$), substantially equal to 1/2×$V_{BAT}$. In the Ninth Bypass/Buck Mode of operation of the dual output μC charge pump circuit 12D, the controller 14 configures the multiple output μC charge pump control circuit 72D to use an operational ratio, (xμBB$_{RATIO}$), set to 2/3 to generate a second μC charge pump output voltage, ($V_{\mu C\_OUT2}$), substantially equal to 1/3×$V_{BAT}$ on the second μC charge pump output 26 and operate in the first μC charge pump output bypass mode. As a result, the first μC charge pump output 24 generates a first μC charge pump output voltage, ($V_{\mu C\_OUT1}$), substantially equal to $V_{BAT}$ and the second μC charge pump output 26 generates a second μC charge pump output voltage, ($V_{\mu C\_OUT2}$), substantially equal to 1/3×$V_{BAT}$. In the Tenth Bypass/Buck Mode of operation of the dual output μC charge pump circuit 12D, the controller 14 configures the multiple output μC charge pump control circuit 72D to use an operational ratio, (xμBB$_{RATIO}$), set to 3/4 to generate a second μC charge pump output voltage, ($V_{\mu C\_OUT2}$), substantially equal to 1/4×$V_{BAT}$ on the second μC charge pump output 26 and operate in the first μC charge pump output bypass mode. As a result, the first μC charge pump output 24 generates a first μC charge pump output voltage, ($V_{\mu C\_OUT1}$), substantially equal to $V_{BAT}$ and the second μC charge pump output 26 generates a second μC charge pump output voltage, ($V_{\mu C\_OUT2}$), substantially equal to 1/4×$V_{BAT}$. In the First Bypass/Boost Mode of operation of the dual output μC charge pump circuit 12D, the controller 14 configures the multiple output μC charge pump control circuit 72D to use an operational ratio, (xμBB$_{RATIO}$), set to 1/4 to generate a second μC charge pump output voltage, ($V_{\mu C\_OUT2}$), substantially equal to 5/4×$V_{BAT}$ on the second μC charge pump output 26 and operate in the first μC charge pump output bypass mode. As a result, the first μC charge pump output 24 generates a first μC charge pump output voltage, ($V_{\mu C\_OUT1}$), substantially equal to $V_{BAT}$ and the second μC charge pump output 26 generates a second μC charge pump output voltage, ($V_{\mu C\_OUT2}$), substantially equal to 5/4×$V_{BAT}$. In the Second Bypass/Boost Mode of operation of the dual output μC charge pump circuit 12D, the controller 14 configures the multiple output μC charge pump control circuit 72D to use an operational ratio, (xμBB$_{RATIO}$), set to 1/3 to generate a second μC charge pump output voltage, ($V_{\mu C\_OUT2}$), substantially equal to 4/3×$V_{BAT}$ on the second μC charge pump output 26 and operate in the first μC charge pump output bypass mode. As a result, the first μC charge pump output 24 generates a first μC charge pump output voltage, ($V_{\mu C\_OUT1}$), substantially equal to $V_{BAT}$ and the second μC charge pump output 26 generates a second μC charge pump output voltage, ($V_{\mu C\_OUT2}$), substantially equal to 4/3×$V_{BAT}$. In the Third Bypass/Boost Mode of operation of the dual output μC charge pump circuit 12D, the controller 14 configures the multiple output μC charge pump control circuit 72D to use an operational ratio, (xμBB$_{RATIO}$), set to 1/2 to generate a second μC charge pump output voltage, ($V_{\mu C\_OUT2}$), substantially equal to 3/2×$V_{BAT}$ on the second μC charge pump output 26 and operate in a first μC charge pump output bypass mode. As a result, the first μC charge pump output 24 generates a first μC charge pump output voltage, ($V_{\mu C\_OUT1}$), substantially equal to $V_{BAT}$ and the second μC charge pump output 26 generates a second μC charge pump output voltage, ($V_{\mu C\_OUT2}$), substantially equal to 3/2×$V_{BAT}$. In the Fourth Bypass/Boost Mode of operation of the dual output μC charge pump circuit 12D, the controller 14 configures the multiple output μC charge pump control circuit 72D to use an operational ratio, (xμBB$_{RATIO}$), set to 2/3 to generate a second μC charge pump output voltage, ($V_{\mu C\_OUT2}$), substantially equal to 5/3×$V_{BAT}$ on the second μC charge pump output 26 and operate in the first μC charge pump output bypass mode. As a result, the first μC charge pump output 24 generates a first μC charge pump output voltage, ($V_{\mu C\_OUT1}$), substantially equal to $V_{BAT}$ and the second μC charge pump output 26 generates a second μC charge pump output voltage, ($V_{\mu C\_OUT2}$), substantially equal to 5/3×$V_{BAT}$. In the Fifth Bypass/Boost Mode of operation of the dual output μC charge pump circuit 12D, the controller 14 configures the multiple output μC charge pump control circuit 72D to use an operational ratio, (xμBB$_{RATIO}$), set to 3/4 to generate a second μC charge pump output voltage, ($V_{\mu C\_OUT2}$), substantially equal to 7/4×$V_{BAT}$ on the second μC charge pump output 26 and operate in the first μC charge pump output bypass mode. As a result, the first μC charge pump output 24 generates a first μC charge pump output voltage, ($V_{\mu C\_OUT1}$), substantially equal to $V_{BAT}$ and the second μC charge pump output 26 generates a second μC charge pump output voltage, ($V_{\mu C\_OUT2}$), substantially equal to 7/4×$V_{BAT}$.

Accordingly, as described in TABLE 4B, in the First Buck/Bypass Mode of operation of the dual output μC charge pump circuit 12D, the controller 14 configures the multiple output μC charge pump control circuit 72D to use an operational ratio, (xμBB$_{RATIO}$), set to 1/4 to generate a first μC charge pump output voltage, ($V_{\mu C\_OUT1}$), substantially equal to 1/4×$V_{BAT}$ on the first μC charge pump output 24 and operate in the second μC charge pump output bypass mode. As a result, the first μC charge pump output 24 generates a first μC charge pump output voltage, ($V_{\mu C\_OUT1}$), substantially equal to 1/4×$V_{BAT}$ and the second μC charge pump output 26 generates a second μC charge pump output voltage, ($V_{\mu C\_OUT2}$), substantially equal to $V_{BAT}$. In the Second Buck/Bypass Mode of operation of the dual output μC charge pump circuit 12D, the controller 14 configures the multiple output μC charge pump control circuit 72D to use an operational ratio, (xμBB$_{RATIO}$), set to 1/3 to generate a first μC charge pump output voltage, ($V_{\mu C\_OUT1}$), substantially equal to 1/3×$V_{BAT}$ on the first μC charge pump output 24 and operate in the second μC charge pump output bypass mode. As a result, the first μC charge pump output 24 generates a first μC charge pump output voltage, ($V_{\mu C\_OUT1}$), substantially equal to 1/3×$V_{BAT}$ and the second μC charge pump output 26 generates a second μC charge pump output voltage, ($V_{\mu C\_OUT2}$), substantially equal to $V_{BAT}$. In the Third Buck/Bypass Mode of operation of the dual output μC charge pump circuit 12D, the controller 14 configures the multiple output μC charge pump control circuit 72D to use an operational ratio, (xμBB$_{RATIO}$), set to 1/2 to generate a first μC charge pump output voltage, ($V_{\mu C\_OUT1}$), substantially equal to 1/2×$V_{BAT}$ on the first μC charge pump output 24 and operate in the second μC charge pump output bypass mode. As a result, the first μC charge pump output 24 generates a first μC charge pump output voltage, ($V_{\mu C\_OUT1}$), substantially equal to 1/2×$V_{BAT}$ and the second µC charge pump output 26 generates a second µC charge pump output voltage, ($V_{\mu C\_OUT2}$), substantially equal to $V_{BAT}$. In the Fourth Buck/Bypass Mode of operation of the dual output µC charge pump circuit 12D, the controller 14 configures the multiple output µC charge pump control circuit 72D to use an operational ratio, (xµBB$_{RATIO}$), set to 2/3 to generate a first µC charge pump output voltage, ($V_{\mu C\_OUT1}$), substantially equal to 2/3×$V_{BAT}$ on the first µC charge pump output 24 and operate in the second µC charge pump output bypass mode. As a result, the first µC charge pump output 24 generates a first µC charge pump output voltage, ($V_{\mu C\_OUT1}$), substantially equal to 2/3×$V_{BAT}$ and the second µC charge pump output 26 generates a second µC charge pump output voltage, ($V_{\mu C\_OUT2}$), substantially equal to $V_{BAT}$. In the Fifth Buck/Bypass Mode of operation of the dual output µC charge pump circuit 12D, the controller 14 configures the multiple output µC charge pump control circuit 72D to use an operational ratio, (xµBB$_{RATIO}$), set to 3/4 to generate a first µC charge pump output voltage, ($V_{\mu C\_OUT1}$), substantially equal to 3/4×$V_{BAT}$ on the first µC charge pump output 24 and operate in the second µC charge pump output bypass mode. As a result, the first µC charge pump output 24 generates a first µC charge pump output voltage, ($V_{\mu C\_OUT1}$), substantially equal to 3/4×$V_{BAT}$ and the second µC charge pump output 26 generates a second µC charge pump output voltage, ($V_{\mu C\_OUT2}$), substantially equal to $V_{BAT}$. In the Sixth Buck/Bypass Mode of operation of the dual output µC charge pump circuit 12D, the controller 14 configures the multiple output µC charge pump control circuit 72D to use an operational ratio, (xµBB$_{RATIO}$), set to 1/4 to generate a first µC charge pump output voltage, ($V_{\mu C\_OUT1}$), substantially equal to 3/4×$V_{BAT}$ on the first µC charge pump output 24 and operate in the second µC charge pump output bypass mode. As a result, the first µC charge pump output 24 generates a first µC charge pump output voltage, ($V_{\mu C\_OUT1}$), substantially equal to 3/4×$V_{BAT}$ and the second µC charge pump output 26 generates a second µC charge pump output voltage, ($V_{\mu C\_OUT2}$), substantially equal to $V_{BAT}$. In the Seventh Buck/Bypass Mode of operation of the dual output µC charge pump circuit 12D, the controller 14 configures the multiple output µC charge pump control circuit 72D to use an operational ratio, (xµBB$_{RATIO}$), set to 1/3 to generate a first µC charge pump output voltage, ($V_{\mu C\_OUT1}$), substantially equal to 2/3×$V_{BAT}$ on the first µC charge pump output 24 and operate in the second µC charge pump output bypass mode. As a result, the first µC charge pump output 24 generates a first µC charge pump output voltage, ($V_{\mu C\_OUT1}$), substantially equal to 2/3×$V_{BAT}$ and the second µC charge pump output 26 generates a second µC charge pump output voltage, ($V_{\mu C\_OUT2}$), substantially equal to $V_{BAT}$. In the Eighth Buck/Bypass Mode of operation of the dual output µC charge pump circuit 12D, the controller 14 configures the multiple output µC charge pump control circuit 72D to use an operational ratio, (xµBB$_{RATIO}$), set to 1/2 to generate a first µC charge pump output voltage, ($V_{\mu C\_OUT1}$), substantially equal to 1/2×$V_{BAT}$ on the first µC charge pump output 24 and operate in the second µC charge pump output bypass mode. As a result, the first µC charge pump output 24 generates a first µC charge pump output voltage, ($V_{\mu C\_OUT1}$), substantially equal to 1/2×$V_{BAT}$ and the second µC charge pump output 26 generates a second µC charge pump output voltage, ($V_{\mu C\_OUT2}$), substantially equal to $V_{BAT}$. In the Ninth Buck/Bypass Mode of operation of the dual output µC charge pump circuit 12D, the controller 14 configures the multiple output µC charge pump control circuit 72D to use an operational ratio, (xµBB$_{RATIO}$), set to 2/3 to generate a first µC charge pump output voltage, ($V_{\mu C\_OUT1}$), substantially equal to 1/3×$V_{BAT}$ on the first µC charge pump output 24 and operate in the second µC charge pump output bypass mode. As a result, the first µC charge pump output 24 generates a first µC charge pump output voltage, ($V_{\mu C\_OUT1}$), substantially equal to 1/3×$V_{BAT}$ and the second µC charge pump output 26 generates a second µC charge pump output voltage, ($V_{\mu C\_OUT2}$), substantially equal to $V_{BAT}$. In the Tenth Buck/Bypass Mode of operation of the dual output µC charge pump circuit 12D, the controller 14 configures the multiple output µC charge pump control circuit 72D to use an operational ratio, (xµBB$_{RATIO}$), set to 3/4 to generate a first µC charge pump output voltage, ($V_{\mu C\_OUT1}$), substantially equal to 1/4×$V_{BAT}$ on the first µC charge pump output 24 and operate in the second µC charge pump output bypass mode. As a result, the first µC charge pump output 24 generates a first µC charge pump output voltage, ($V_{\mu C\_OUT1}$), substantially equal to 1/4×$V_{BAT}$ and the second µC charge pump output 26 generates a second µC charge pump output voltage, ($V_{\mu C\_OUT2}$), substantially equal to $V_{BAT}$. In the First Boost/Bypass Mode of operation of the dual output µC charge pump circuit 12D, the controller 14 configures the multiple output µC charge pump control circuit 72D to use an operational ratio, (xµBB$_{RATIO}$), set to 1/4 to generate a first µC charge pump output voltage, ($V_{\mu C\_OUT1}$), substantially equal to 5/4×$V_{BAT}$ on the first µC charge pump output 24 and operate in the second µC charge pump output bypass mode. As a result, the first µC charge pump output 24 generates a first µC charge pump output voltage, ($V_{\mu C\_OUT1}$), substantially equal to 5/4×$V_{BAT}$ and the second µC charge pump output 26 generates a second µC charge pump output voltage, ($V_{\mu C\_OUT2}$), substantially equal to $V_{BAT}$. In the Second Boost/Bypass Mode of operation of the dual output µC charge pump circuit 12D, the controller 14 configures the multiple output µC charge pump control circuit 72D to use an operational ratio, (xµBB$_{RATIO}$), set to 1/3 to generate a first µC charge pump output voltage, ($V_{\mu C\_OUT1}$), substantially equal to 4/3×$V_{BAT}$ on the first µC charge pump output 24 and operate in the second µC charge pump output bypass mode. As a result, the first µC charge pump output 24 generates a first µC charge pump output voltage, ($V_{\mu C\_OUT1}$), substantially equal to 4/3×$V_{BAT}$ and the second µC charge pump output 26 generates a second µC charge pump output voltage, ($V_{\mu C\_OUT2}$), substantially equal to $V_{BAT}$. In the Third Boost/Bypass Mode of operation of the dual output µC charge pump circuit 12D, the controller 14 configures the multiple output µC charge pump control circuit 72D to use an operational ratio, (xµBB$_{RATIO}$), set to 1/2 to generate a first µC charge pump output voltage, ($V_{\mu C\_OUT1}$), substantially equal to 3/2×$V_{BAT}$ on the first µC charge pump output 24 and operate in the second µC charge pump output bypass mode. As a result, the first µC charge pump output 24 generates a first µC charge pump output voltage, ($V_{\mu C\_OUT1}$), substantially equal to 3/2×$V_{BAT}$ and the second µC charge pump output 26 generates a second µC charge pump output voltage, ($V_{\mu C\_OUT2}$), substantially equal to $V_{BAT}$. In the Fourth Boost/Bypass Mode of operation of the dual output µC charge pump circuit 12D, the controller 14 configures the multiple output µC charge pump control circuit 72D to use an operational ratio, (xµBB$_{RATIO}$), set to 2/3 to generate a first µC charge pump output voltage, ($V_{\mu C\_OUT1}$), substantially equal to 5/3×$V_{BAT}$ on the first µC charge pump output 24 and operate in the second µC charge pump output bypass mode. As a result, the first µC charge pump output 24 generates a first µC charge pump output voltage, ($V_{\mu C\_OUT1}$), substantially equal to 5/3×$V_{BAT}$ and the second µC charge pump output 26 generates a second µC charge pump output voltage, ($V_{\mu C\_OUT2}$), substantially equal to $V_{BAT}$. In the Fifth Boost/Bypass Mode of operation of the dual output μC charge pump circuit 12D, the controller 14 configures the multiple output μC charge pump control circuit 72D to use an operational ratio, (xμBB$_{RATIO}$), set to 3/4 to generate a first μC charge pump output voltage, ($V_{μC\_OUT1}$), substantially equal to 7/4×$V_{BAT}$ on the first μC charge pump output 24 and operate in the second μC charge pump output bypass mode. As a result, the first μC charge pump output 24 generates a first μC charge pump output voltage, ($V_{μC\_OUT1}$), substantially equal to 7/4×$V_{BAT}$ and the second μC charge pump output 26 generates a second μC charge pump output voltage, ($V_{μC\_OUT2}$), substantially equal to $V_{BAT}$. In the Bypass/Bypass Mode of operation, the controller 14 configures the multiple output μC charge pump control circuit 72D to directly couple both the first μC charge pump output 24 and the second μC charge pump output 26 to the supply voltage. As a result, the first μC charge pump output 24 generates a first μC charge pump output voltage, ($V_{μC\_OUT1}$), substantially equal to $V_{BAT}$ and the second μC charge pump output 26 generates a second μC charge pump output voltage, ($V_{μC\_OUT2}$), substantially equal to $V_{BAT}$. In addition, as discussed above relative to the embodiments of the dual output μC charge pump circuit 12, depicted in FIG. 1A, the dual output μC charge pump circuit 12A, depicted in FIG. 2A, and the dual output μC charge pump circuit 12B, depicted in FIG. 2B, and embodiments of dual output μC charge pump circuit 12C, depicted in FIG. 2C, some embodiments of dual output μC charge pump circuit 12D, depicted in FIG. 2d, may include and use more than two flying capactiors to generate the first μC charge pump output voltage, ($V_{μC\_OUT1}$), on the first μC charge pump output 24 and the second μC charge pump output voltage, ($V_{μC\_OUT2}$), on the second μC charge pump output 26. However, advantageously, as depicted in FIG. 2D, and previously described with respect to the various modes of operation of the dual output μC charge pump circuit 12, depicted in FIG. 1A, the dual output μC charge pump circuit 12A, depicted in FIG. 2A, and the dual output μC charge pump circuit 12B, depicted in FIG. 2B, and the embodiments of dual output μC charge pump circuit 12C, depicted in FIG. 2C, some embodiments of the dual output μC charge pump circuit 12D may be configured to generate the desired output voltage levels, namely the first μC charge pump output voltage, ($V_{μC\_OUT1}$), on the first μC charge pump output 24 and the second μC charge pump output voltage, ($V_{μC\_OUT2}$), on the second μC charge pump output 26, using only the first flying capacitor 42, ($C_{FLY1}$), and the second flying capacitor 44, ($C_{FLY2}$). In other words, some embodiments of the dual output μC charge pump circuit 12D may be configured to generate the variously described output voltage levels corresponding to a "buck/buck mode" of operation, a "buck/boost mode" of operation, and/or a "boost/buck mode" of operation using only the first flying capacitor 42, ($C_{FLY1}$), and the second flying capacitor 44, ($C_{FLY2}$). It may be appreciated that those embodiments of the dual output μC charge pump circuit 12D that only use the first flying capacitor 42, ($C_{FLY1}$), and the second flying capacitor 44, ($C_{FLY2}$), to generate the desired output voltage levels on the first μC charge pump output 24 and the second μC charge pump output 26 may provide improved technical performance due to reduced complexity and reduced response time verses those embodiments of the dual output μC charge pump circuit that include more than two flying capacitors.

TABLE 4A

FIRST μC CHARGE PUMP OUTPUT BYPASS MODES OF OPERATION
TABLE FOR A DUAL OUTPUT μC CHARGE PUMP CIRCUIT

| FIRST μC CHARGE PUMP OUTPUT BYPASS MODE OF OPERATION | OPERATIONAL RATIOS, (xμBB$_{RATIO}$) | FIRST μC CHARGE PUMP OUTPUT, ($V_{μC\_OUT1}$), $V_{μC\_OUT1} = V_{BAT}$ | SECOND μC CHARGE PUMP OUTPUT, ($V_{μC\_OUT2}$) |
|---|---|---|---|
| First Bypass/Buck Mode | 1/4 | $V_{BAT}$ | 1/4 × $V_{BAT}$ |
| Second Bypass/Buck Mode | 1/3 | $V_{BAT}$ | 1/3 × $V_{BAT}$ |
| Third Bypass/Buck Mode | 1/2 | $V_{BAT}$ | 1/2 × $V_{BAT}$ |
| Fourth Bypass/Buck Mode | 2/3 | $V_{BAT}$ | 2/3 × $V_{BAT}$ |
| Fifth Bypass/Buck Mode | 3/4 | $V_{BAT}$ | 3/4 × $V_{BAT}$ |
| Sixth Bypass/Buck Mode | 1/4 | $V_{BAT}$ | 3/4 × $V_{BAT}$ |
| Seventh Bypass/Buck Mode | 1/3 | $V_{BAT}$ | 2/3 × $V_{BAT}$ |
| Eighth Bypass/Buck Mode | 1/2 | $V_{BAT}$ | 1/2 × $V_{BAT}$ |
| Ninth Bypass/Buck Mode | 2/3 | $V_{BAT}$ | 1/3 × $V_{BAT}$ |
| Tenth Bypass/Buck Mode | 3/4 | $V_{BAT}$ | 1/4 × $V_{BAT}$ |
| First Bypass/Boost Mode | 1/4 | $V_{BAT}$ | 5/4 × $V_{BAT}$ |
| Second Bypass/Boost Mode | 1/3 | $V_{BAT}$ | 4/3 × $V_{BAT}$ |
| Third Bypass/Boost Mode | 1/2 | $V_{BAT}$ | 3/2 × $V_{BAT}$ |
| Fourth Bypass/Boost Mode | 2/3 | $V_{BAT}$ | 5/3 × $V_{BAT}$ |
| Fifth Bypass/Boost Mode | 3/4 | $V_{BAT}$ | 7/4 × $V_{BAT}$ |

TABLE 4B

SECOND μC CHARGE PUMP OUTPUT BYPASS MODES OF OPERATION
TABLE FOR A DUAL OUTPUT μC CHARGE PUMP CIRCUIT

| SECOND μC CHARGE PUMP OUTPUT BYPASS MODE OF OPERATION | OPERATIONAL RATIOS, (xμBB$_{RATIO}$) | FIRST μC CHARGE PUMP OUTPUT, ($V_{μC\_OUT1}$) | SECOND μC CHARGE PUMP OUTPUT, ($V_{μC\_OUT2}$), $V_{μC\_OUT2} = V_{BAT}$ |
|---|---|---|---|
| First Buck/Bypass Mode | 1/4 | 1/4 × $V_{BAT}$ | $V_{BAT}$ |
| Second Buck/Bypass Mode | 1/3 | 1/3 × $V_{BAT}$ | $V_{BAT}$ |
| Third Buck/Bypass Mode | 1/2 | 1/2 × $V_{BAT}$ | $V_{BAT}$ |

TABLE 4B-continued

SECOND μC CHARGE PUMP OUTPUT BYPASS MODES OF OPERATION
TABLE FOR A DUAL OUTPUT μC CHARGE PUMP CIRCUIT

| SECOND μC CHARGE PUMP OUTPUT BYPASS MODE OF OPERATION | OPERATIONAL RATIOS, (xμBB$_{RATIO}$) | FIRST μC CHARGE PUMP OUTPUT, (V$_{μC\_OUT1}$) | SECOND μC CHARGE PUMP OUTPUT, (V$_{μC\_OUT2}$), V$_{μC\_OUT2}$ = V$_{BAT}$ |
|---|---|---|---|
| Fourth Buck/Bypass Mode | 2/3 | 2/3 × V$_{BAT}$ | V$_{BAT}$ |
| Fifth Buck/Bypass Mode | 3/4 | 3/4 × V$_{BAT}$ | V$_{BAT}$ |
| Sixth Buck/Bypass Mode | 1/4 | 3/4 × V$_{BAT}$ | V$_{BAT}$ |
| Seventh Buck/Bypass Mode | 1/3 | 2/3 × V$_{BAT}$ | V$_{BAT}$ |
| Eighth Buck/Bypass Mode | 1/2 | 1/2 × V$_{BAT}$ | V$_{BAT}$ |
| Ninth Buck/Bypass Mode | 2/3 | 1/3 × V$_{BAT}$ | V$_{BAT}$ |
| Tenth Buck/Bypass Mode | 3/4 | 1/4 × V$_{BAT}$ | V$_{BAT}$ |
| First Boost/Bypass Mode | 1/4 | 5/4 × V$_{BAT}$ | V$_{BAT}$ |
| Second Boost/Bypass Mode | 1/3 | 4/3 × V$_{BAT}$ | V$_{BAT}$ |
| Third Boost/Bypass Mode | 1/2 | 3/2 × V$_{BAT}$ | V$_{BAT}$ |
| Fourth Boost/Bypass Mode | 2/3 | 5/3 × V$_{BAT}$ | V$_{BAT}$ |
| Fifth Boost/Bypass Mode | 3/4 | 7/4 × V$_{BAT}$ | V$_{BAT}$ |
| Bypass/Bypass Mode | N/A | V$_{BAT}$ | V$_{BAT}$ |

Returning briefly to FIG. 1A, in some operational modes of the multiple output μC charge pump system 10A, the dual output μC charge pump circuit 12 may be configured to provide various "floating" modes of operation, as depicted in TABLE 5.

TABLE 5

FLOATING MODES OF OPERATION FOR A MULTIPLE OUTPUT μC CHARGE PUMP

| MODES OF OPERATION | First Multiple Output μC CHARGE PUMP OUTPUT, (V$_{μC\_OUT1}$) | Second Multiple Output μC CHARGE PUMP OUTPUT, (V$_{μC\_OUT2}$) |
|---|---|---|
| OFF Mode | V$_{μC\_OUT1}$ = FLOATING | V$_{μC\_OUT2}$ = FLOATING |
| 1$^{st}$ Floating Mode | V$_{μC\_OUT1}$ = FLOATING | Permissible Modes of Operation |
| 2$^{nd}$ Floating Mode | Permissible Mode of Operation | V$_{μC\_OUT2}$ = FLOATING |

Referring to the various example embodiments of the dual output μC charge pump circuit 12 of FIG. 1A, depicted in FIGS. 2A, 2B, and 2C, first μC charge pump output 24 of the dual output μC charge pump circuit 12A, the dual output μC charge pump circuit 12B, and the dual output μC charge pump circuit 12C may be placed in a float mode of operation by configuring the second switch 76, (SW 2), the fourth switch 80, (SW 4), the seventh switch 86, (SW 7), and the ninth switch 90, (SW 9), to remain operably open in all the modes of operation of the respective embodiments of the dual output μC charge pump circuit 12A, first μC charge pump output 24 of the dual output μC charge pump circuit 12B, and the dual output μC charge pump circuit 12C.

In the case of the embodiment of the dual output μC charge pump circuit 12 of FIG. 1A is the dual output μC charge pump circuit 12D, depicted in FIG. 2D, first μC charge pump output 24 of the dual output μC charge pump circuit 12D may be placed in a float mode of operation by configuring the second switch 76, (SW 2), the fourth switch 80, (SW 4), the seventh switch 86, (SW 7), the ninth switch 90, (SW 9), and the sixteenth switch 104, (SW 16) to remain operably open in all the permissible modes of operation of the dual output μC charge pump circuit 12D.

In similar fashion, referring to the dual output μC charge pump circuit 12A, depicted in FIG. 2A, the second μC charge pump output 26 of the dual output μC charge pump circuit 12A may placed in a float mode of operation by configuring the twelfth switch 96, (SW 12), the thirteenth switch 98, (SW 13), and the fourteenth switch 100, (SW 14) to remain operably open in all the permissible modes of operation of the dual output μC charge pump circuit 12A.

In addition, referring to the dual output μC charge pump circuit 12B, depicted in FIG. 2B, the second μC charge pump output 26 of the dual output μC charge pump circuit 12B may placed in a float mode of operation by configuring the thirteenth switch 98, (SW 13) to remain operably open in all the permissible modes of operation of the dual output μC charge pump circuit 12B.

Similarly, referring to the dual output μC charge pump circuit 12C, depicted in FIG. 2C, the second μC charge pump output 26 of the dual output μC charge pump circuit 12C may placed in a float mode of operation by configuring the twelfth switch 96, (SW 12), and the fourteenth switch 100, (SW 14) to remain operably open in all the permissible modes of operation of the dual output μC charge pump circuit 12C.

Similarly, referring to the dual output μC charge pump circuit 12D, depicted in FIG. 2D, the second μC charge pump output 26 of the dual output μC charge pump circuit 12D may placed in a float mode of operation by configuring the twelfth switch 96, (SW 12), the thirteenth switch 98, (SW 13), the fourteenth switch 100, (SW 14), and the seventeenth switch 106, (SW 17), to remain operably open in all the permissible modes of operation of the dual output μC charge pump circuit 12D.

Advantageously, the ability to independently and selectively place the first μC charge pump output 24, the second μC charge pump output 26, and/or a combination thereof, may permit the controller 14 to save battery power or conserve energy consumption by a device by powering down various portions of an integrated chip that include the multiple output μC charge pump system 10A. As an additional benefit, the ability to independently and selectively place the first μC charge pump output 24, the second μC charge pump output 26, and/or a combination thereof in a floating mode of operation may provide integrated chip designers increased flexibility with respect to overall system configurations and re-configurations without impacting core system features.

Figure 1B:
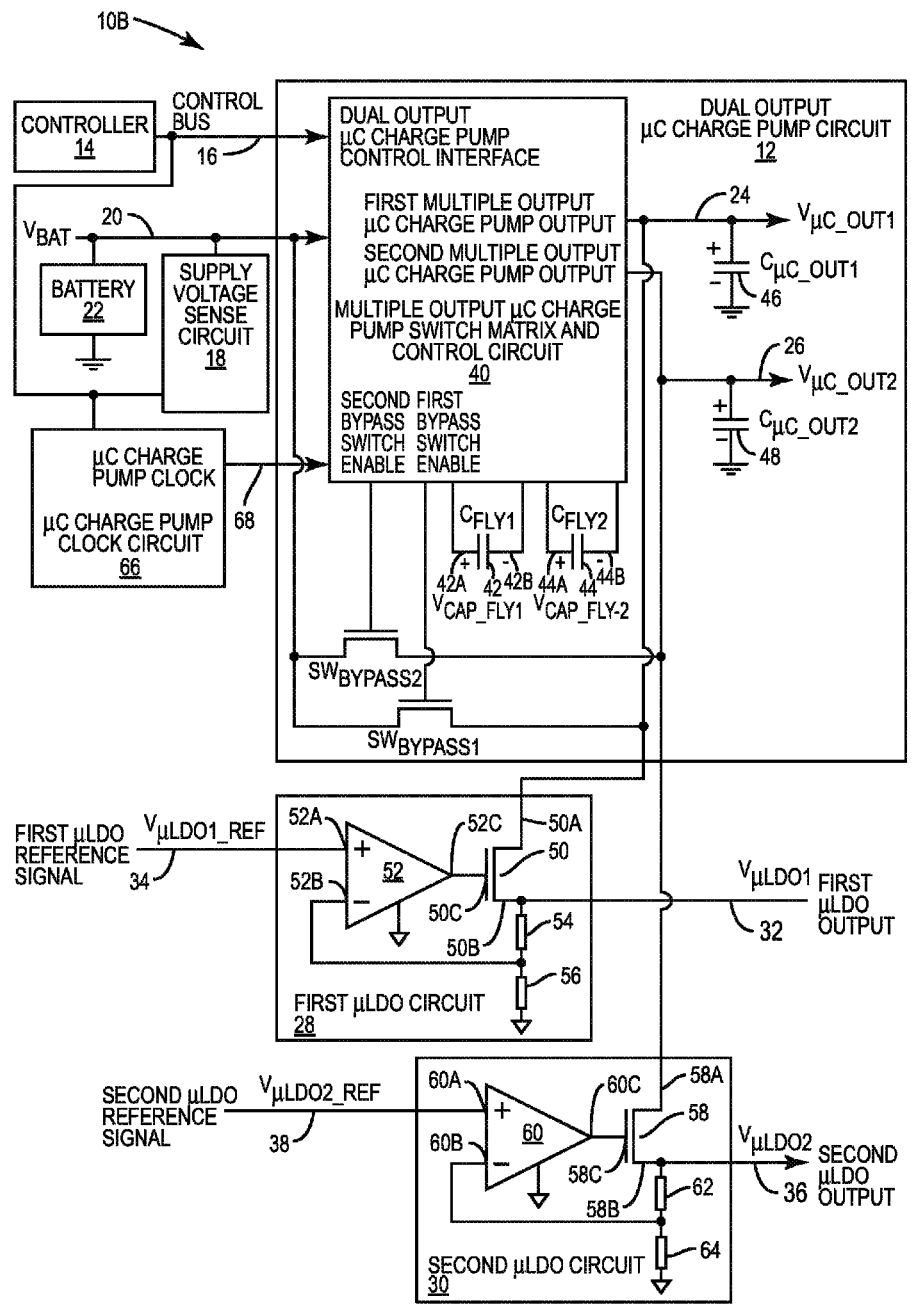
FIG. 1B depicts a second embodiment of the multiple output μC charge pump system 10B.

FIG. 1B depicts a second embodiment of a multiple output μC charge pump system 10B that is similar to the first embodiment of a multiple output μC charge pump system 10A, which is depicted in FIG. 1A. The multiple output μC charge pump system 10B is operationally similar to the multiple output μC charge pump system 10B. However, unlike the multiple output μC charge pump system 10A, the multiple output μC charge pump system 10B, depicted in FIG. 1B, further includes a first bypass switch, ($SW_{BYPASS1}$) coupled between the supply voltage 20 and the first μC charge pump output 24. In addition, the multiple output μC charge pump system 10B further includes a second bypass switch, ($SW_{BYPASS2}$) coupled between the supply voltage 20 and the second μC charge pump output 26. Also, as depicted in FIG. 1B, the multiple output μC charge pump switch matrix and control circuit 40 is depicted as having a first bypass switch enable output coupled to a control input of the first bypass switch, ($SW_{BYPASS1}$) and a second bypass switch enable output coupled to a control input of the second bypass switch, ($SW_{BYPASS2}$). Accordingly, unlike the first embodiment of a multiple output μC charge pump system 10A, depicted in FIG. 1A, the second embodiment of the multiple output μC charge pump system 10B depicted in FIG. 1B may be configured by controller 14, via the control bus 16, selectively couple the first μC charge pump output 24 to the supply voltage 20 and/or the second μC charge pump output 26 to the supply voltage 20.

It will be understood that prior to directly coupling the first μC charge pump output 24 to the supply voltage 20 and/or the second μC charge pump output 26 to the supply voltage 20, the controller 14 configures the multiple output μC charge pump switch matrix and control circuit 40 to place the to be bypassed first μC charge pump output 24 or second μC charge pump output 26 into a floating modes of operation. Accordingly, in the case where one of the embodiments of the multiple output μC charge pump switch matrix and control circuit 40, described above, does not inherently include a bypass mode the multiple output μC charge pump system 10B may provide a bypass mode of operation.

Those skilled in the art will recognize improvements and modifications to the embodiments of the present disclosure. All such improvements and modifications are considered within the scope of the concepts disclosed herein and the claims that follow.

What is claimed is:

1. An apparatus comprising:
   a first flying capacitor;
   a second flying capacitor;
   a switch matrix having an input, a first output, and a second output to which the first flying capacitor and the second flying capacitor are selectively coupled; and
   a controller configured to, in response to a given value X of a ratio between a supply voltage $V_S$ at the input and a first desired output voltage at the first output, control the switch matrix to couple the first flying capacitor and the second flying capacitor to the input in a charging arrangement corresponding to the given value X during a charge phase, and during a first discharge phase couple the first flying capacitor and the second flying capacitor to the first output in a first discharging arrangement corresponding to the given value X to generate the first desired output voltage, and during a second discharge phase couple the first flying capacitor and the second flying capacitor to the second output in a second discharging arrangement corresponding to the given value X to generate a second desired output voltage, wherein the switch matrix and controller are configured to:
   include a first boost/buck mode that generates a voltage equal to $(7/4) \cdot V_S$ for the first desired output voltage in which the second desired output voltage is less than $V_S$; and
   include a first buck/boost mode that at least generates a voltage that is equal to $(7/4) \cdot V_S$ for the second desired output voltage in which the first desired output voltage is less than $V_S$.

2. The apparatus of claim 1 wherein the first desired output voltage is equal to $X \cdot V_S$ and the second desired output voltage is equal to $(1-X) \cdot V_S$, wherein X is one of 1/4, 1/3, 1/2, 2/3, and 3/4 in a buck/buck mode.

3. The apparatus of claim 1 wherein the first desired output voltage is equal to $(1-X) \cdot V_S$ and the second desired output voltage is equal to $X \cdot V_S$, wherein X is one of 1/4, 1/3, 1/2, 2/3, and 3/4 in a buck/buck mode.

4. The apparatus of claim 1 wherein the first desired output voltage is equal to $X \cdot V_S$, wherein X is one of 1/4, 1/3, 1/2, 2/3, and 3/4, and the second desired output voltage is equal to $(1+X) \cdot V_S$, wherein X is one of 1/4, 1/3, 1/2, and 2/3 in a second buck/boost mode.

5. The apparatus of claim 1 wherein the first flying capacitor and the second flying capacitor are coupled in series in the charging arrangement.

6. The apparatus of claim 1 wherein the first flying capacitor and the second flying capacitor are coupled in parallel in the charging arrangement.

7. The apparatus of claim 1 wherein the first flying capacitor and the second flying capacitor are coupled in series in the first discharging arrangement.

8. The apparatus of claim 1 wherein the first flying capacitor and the second flying capacitor are coupled in parallel in the first discharging arrangement.

9. The apparatus of claim 1 wherein the first flying capacitor and the second flying capacitor are coupled in series in the second discharging arrangement.

10. The apparatus of claim 1 wherein the first flying capacitor and the second flying capacitor are coupled in parallel in the second discharging arrangement.

11. The apparatus of claim 1 wherein the first flying capacitor and the second flying capacitor are coupled in series in the charging arrangement, the first discharging arrangement, and the second discharging arrangement.

12. The apparatus of claim 1 wherein the first flying capacitor and the second flying capacitor are coupled in series in both the charging arrangement and the first discharging arrangement, and the first flying capacitor and the second flying capacitor are coupled in parallel in the second discharging arrangement.

13. The apparatus of claim 1 wherein the first flying capacitor and the second flying capacitor are coupled in series in the charging arrangement, the first flying capacitor and the second flying capacitor are coupled in parallel in the first discharging arrangement, and the first flying capacitor and the second flying capacitor are coupled in series in the second discharging arrangement.

14. The apparatus of claim 1 wherein the first flying capacitor and the second flying capacitor are coupled in series in the charging arrangement, and the first flying capacitor and the second flying capacitor are coupled in both the first discharging arrangement and the second discharging arrangement.

15. The apparatus of claim 1 wherein the first flying capacitor and the second flying capacitor are coupled in parallel in the charging arrangement, and the first flying capacitor and the second flying capacitor are coupled in both the first discharging arrangement and the second discharging arrangement.

16. The apparatus of claim 1 wherein the first flying capacitor and the second flying capacitor are coupled in parallel in the charging arrangement, the first flying capacitor and the second flying capacitor are coupled in series in the first discharging arrangement, and the first flying capacitor and the second flying capacitor are coupled in parallel in the second discharging arrangement.

17. The apparatus of claim 1 wherein the first flying capacitor and the second flying capacitor are coupled in both the charging arrangement and the first discharging arrangement, and the first flying capacitor and the second flying capacitor are coupled in series in the second discharging arrangement.

18. The apparatus of claim 1 wherein the first flying capacitor and the second flying capacitor are coupled in parallel in the charging arrangement, the first discharging arrangement, and the second discharging arrangement.

19. The apparatus of claim 1 further including a first holding capacitor coupled between the first output and a fixed voltage node.

20. The apparatus of claim 19 further including a second holding capacitor coupled between the second output and the fixed voltage node.

21. The apparatus of claim 20 wherein the fixed voltage node is ground.

22. The apparatus of claim 1 further including a first bypass switch coupled between the input and the first output.

23. The apparatus of claim 22 further including a second bypass switch coupled between the input and the second output.

24. The apparatus of claim 23 wherein the first bypass switch and the second bypass switch are solid state switches.

25. The apparatus of claim 1 wherein the switch matrix comprises solid state switches.

26. The apparatus of claim 25 wherein the solid state switches are field effect transistors (FETs).

27. The apparatus of claim 1 wherein the switch matrix comprises micro-electromechanical systems (MEMS) contact switches.

28. The apparatus of claim 1 further comprising a first regulator circuit having a first reference voltage input, a first unregulated input coupled to the first output of the switch matrix, and a first regulated output, wherein a first feedback loop coupled between the first regulated output and the first reference voltage input is configured to maintain a first regulated voltage at the first regulated output that is proportional to a first reference voltage at the first reference voltage input.

29. The apparatus of claim 28 further comprising a second regulator circuit having a second reference voltage input, a second unregulated input coupled to the second output of the switch matrix, and a second regulated output, wherein a second feedback loop coupled between the second regulated output and the second reference voltage input is configured to maintain a second regulated voltage at the second regulated output that is proportional to a second reference voltage at the second reference voltage input.

30. The apparatus of claim 1 wherein the first desired output voltage is equal to $(1-X) \cdot V_S$ wherein X is one of 1/4, 1/3, 1/2, 2/3, and 3/4, and the second desired output voltage is equal to $(1+X) \cdot V_S$, wherein X is one of 1/4, 1/3, 1/2, and 2/3 in a second buck/boost mode.

31. The apparatus of claim 1 wherein the first desired output voltage is equal to $(1+X) \cdot V_S$, wherein X is one of 1/4, 1/3, 1/2, and 2/3, and the second desired output voltage is equal to $X \cdot V_S$, wherein X is one of 1/4, 1/3, 1/2, 2/3, and 3/4 in a second boost/buck mode.

32. The apparatus of claim 1 wherein the first desired output voltage is equal to $(1+X) \cdot V_S$, wherein X is one of 1/4, 1/3, 1/2, and 2/3, and the second desired output voltage is equal to $(1-X) \cdot V_S$, wherein X is one of 1/4, 1/3, 1/2, 2/3, and 3/4 in a second boost/buck mode.

33. The apparatus of claim 22 wherein the first desired output voltage is equal to $V_S$ and the second desired output voltage is equal to $X \cdot V_S$, wherein X is one of 1/4, 1/3, 1/2, 2/3, and 3/4.

34. The apparatus of claim 23 wherein the first desired output voltage is equal to $X \cdot V_S$ and the second desired output voltage is equal to $V_S$, wherein X is one of 1/4, 1/3, 1/2, 2/3, and 3/4.

* * * * *